United States Patent [19]

Nason, III et al.

[11] 4,048,728

[45] Sept. 20, 1977

[54] TRAINING SYSTEM FOR TELEPHONE SWITCHBOARD OPERATORS USING COMPUTER CENTRAL PROCESSING UNIT

[75] Inventors: George F. Nason, III, Indialantic; Walter W. Winter, Melbourne, both of Fla.

[73] Assignee: Systex, Inc., Melbourne, Fla.

[21] Appl. No.: 637,136

[22] Filed: Dec. 3, 1975

Related U.S. Application Data

[63] Continuation of Ser. No. 396,620, Sept. 12, 1973, abandoned.

[51] Int. Cl.² ............................................. G09B 9/00
[52] U.S. Cl. ............................................. 35/8 A; 35/14; 340/173 R
[58] Field of Search ............... 35/5, 6, 8 R, 8 A, 9 R, 35/9 A, 10, 13, 14, 35 R, 35 C; 179/27 C, 27 CA, 27 CB, 27 D, 27 FF, 27 R; 340/172.5

[56] References Cited

U.S. PATENT DOCUMENTS

| | | | |
|---|---|---|---|
| 3,103,073 | 9/1963 | Nickl et al. | 35/9 A |
| 3,141,243 | 7/1964 | Chapman et al. | 35/9 A |
| 3,261,111 | 7/1966 | Johnston | 35/6 |
| 3,460,270 | 8/1969 | Blitz et al. | 35/6 |
| 3,550,288 | 12/1970 | Suala et al. | 35/8 A |
| 3,609,227 | 9/1971 | Kuljian et al. | 35/35 C X |
| 3,654,708 | 4/1972 | Brudner | 35/9 A |
| 3,664,036 | 5/1972 | Boswell et al. | 35/6 |

Primary Examiner—Richard C. Pinkham
Assistant Examiner—Vance Y. Hum
Attorney, Agent, or Firm—Johnson, Dienner, Emrich & Wagner

[57] ABSTRACT

The present invention is directed to a computer controlled operator training system for providing audio and visual cues for use in the training of telephone operator personnel in the use of toll service desks in an automatic telephone system.

33 Claims, 18 Drawing Figures

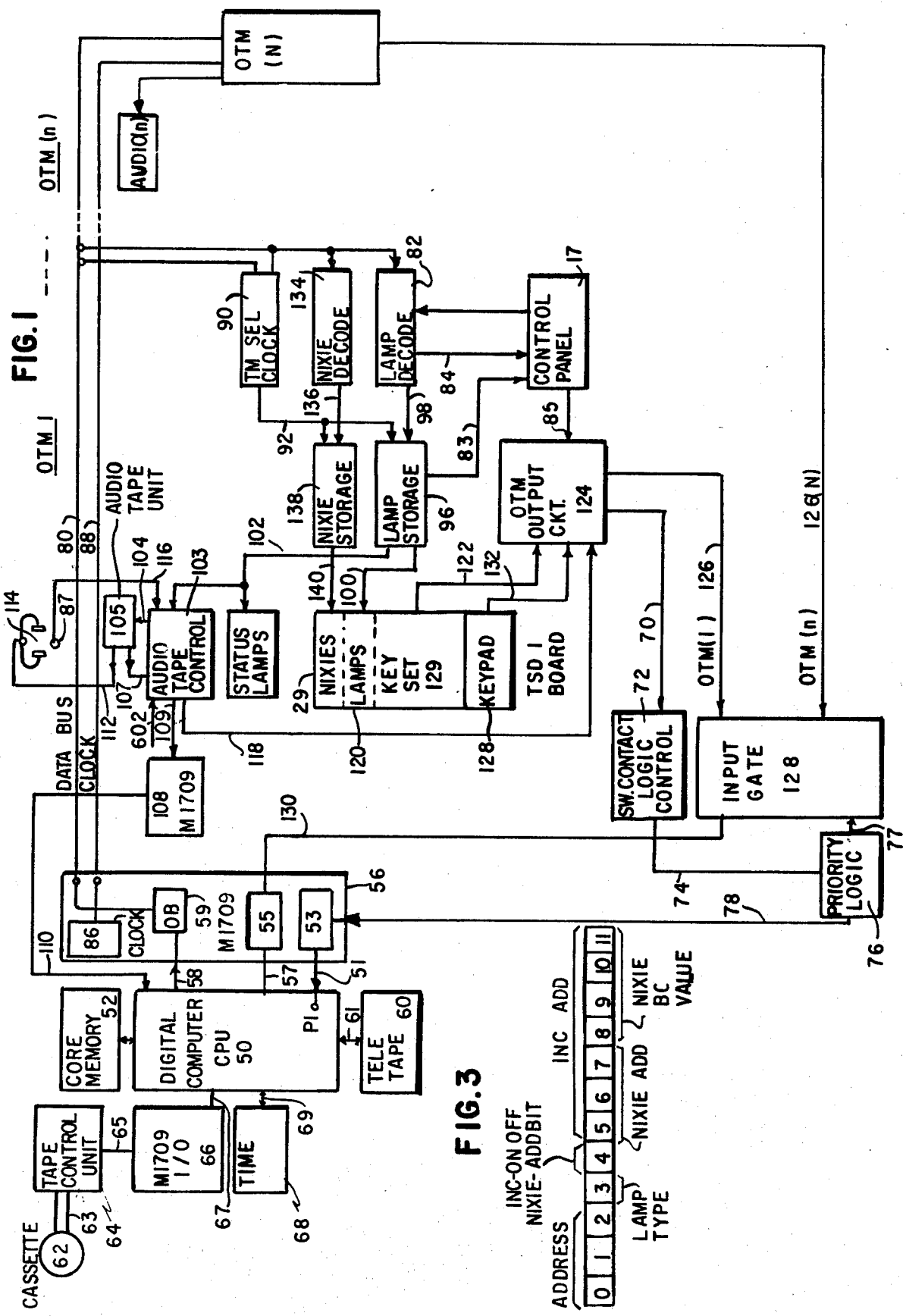

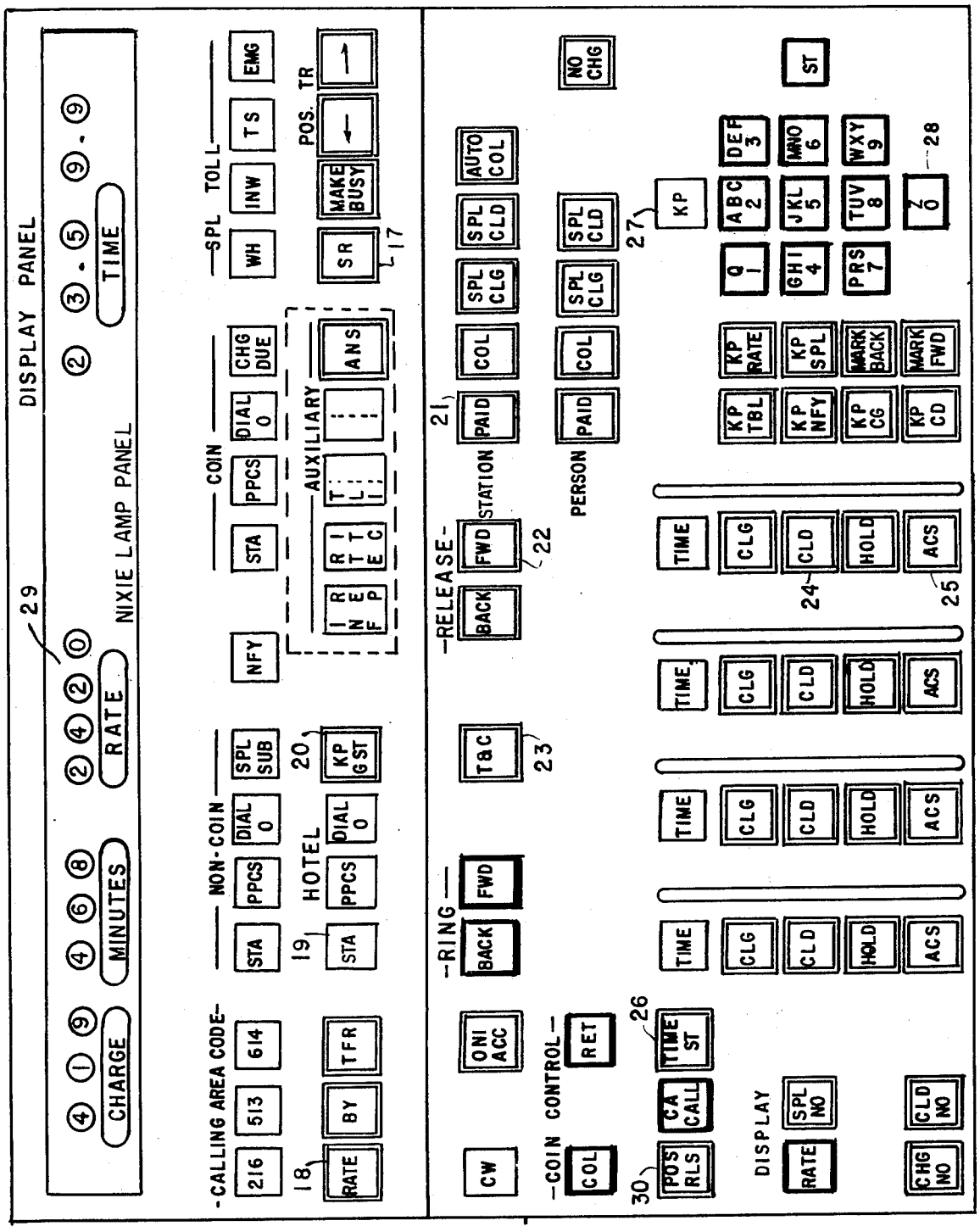

FIG. 4

HOTEL 1 + STATION PAID (GUEST ON LINE)  CALL #013  A 3

| OPERATOR | | | CUSTOMER & POSITION ACTION | |
|---|---|---|---|---|
| AUDIO | * | KEY | AUDIO | LAMP |
| | | | | CALLING AREA CODE white (18)<br>HOTEL STA. white (19)<br>KP GST white (20)<br>STA. PAID green (21)<br>RELEASE FWD red (22)<br>T & C white (23)<br>LOOP: CLD white (24)<br>Steady white ACS (25)<br>TIME ST red (26) |
| | | | | RELEASE FWD goes dark (22) 1/2 SEC. |
| | | | Ziptone | KP lights red, changes to green (27) |
| "YOUR NAME AND ROOM NUMBER, PLEASE?" | x | DEPRESS KP GST | | |
| | | Keypulse 0026 | Cust: "26, Please | Digits display momentarily as KS(29) KP(27) and KP GST(25) go dark. |
| | | Depress TIME ST | | TIME ST changes to green (26) |
| | | | (1 ring) | |
| | | Depress POS RLS (30) | | All lamps go dark:<br>CALLING AREA CODE (18)<br>HOTEL STA. (19)<br>STA PAID (21)<br>T & C (23)<br>Loop: CLD(24) & ACS(25)<br>TIME ST (26) |

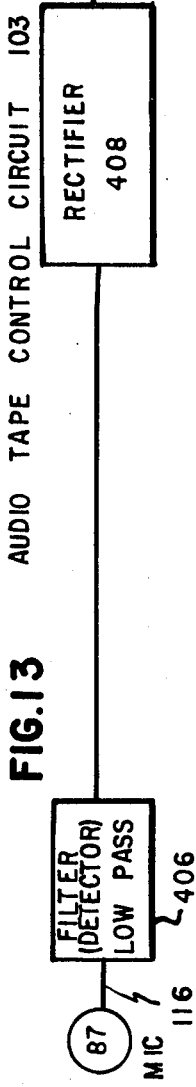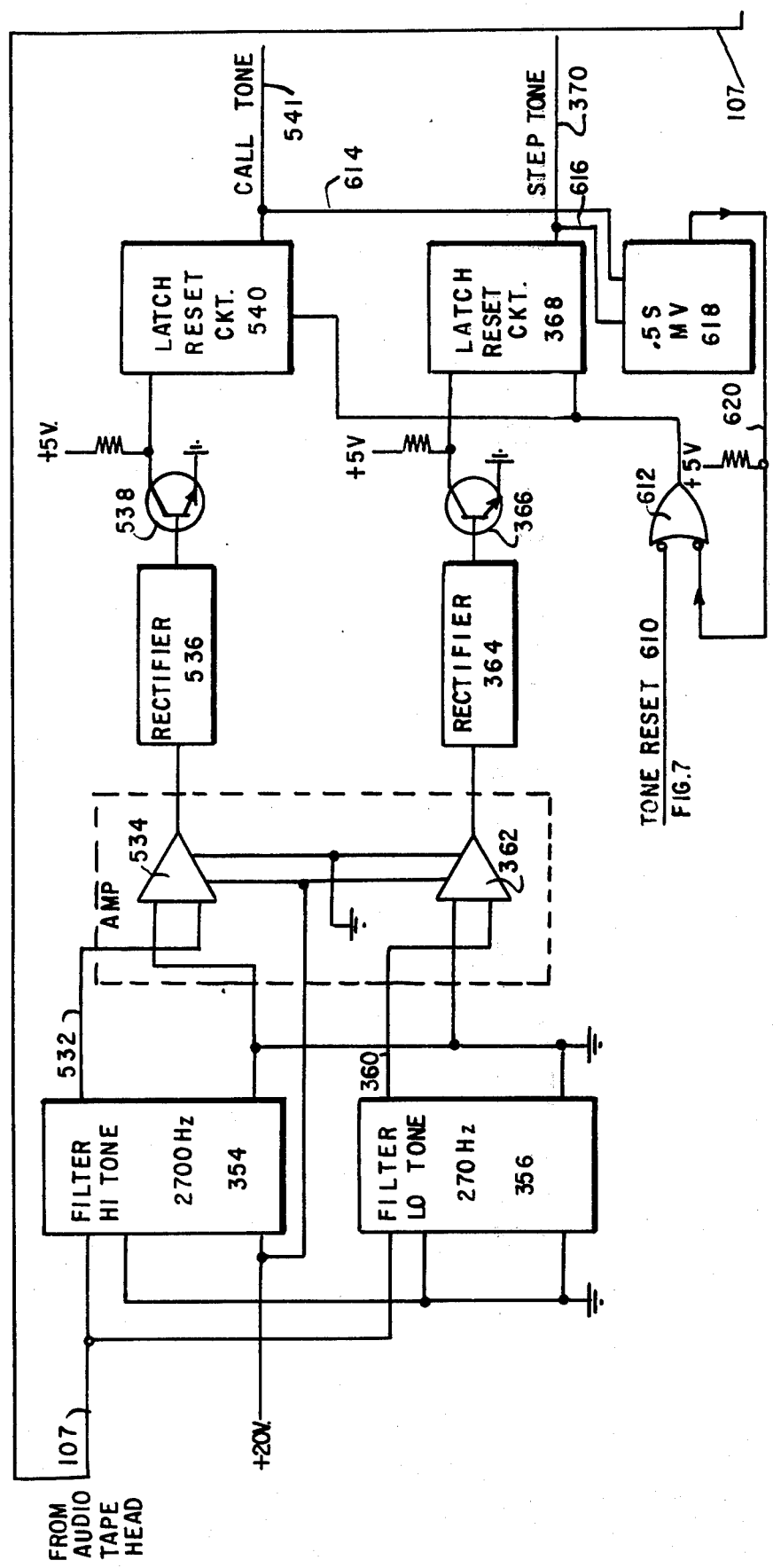
FIG.13 AUDIO TAPE CONTROL CIRCUIT 103

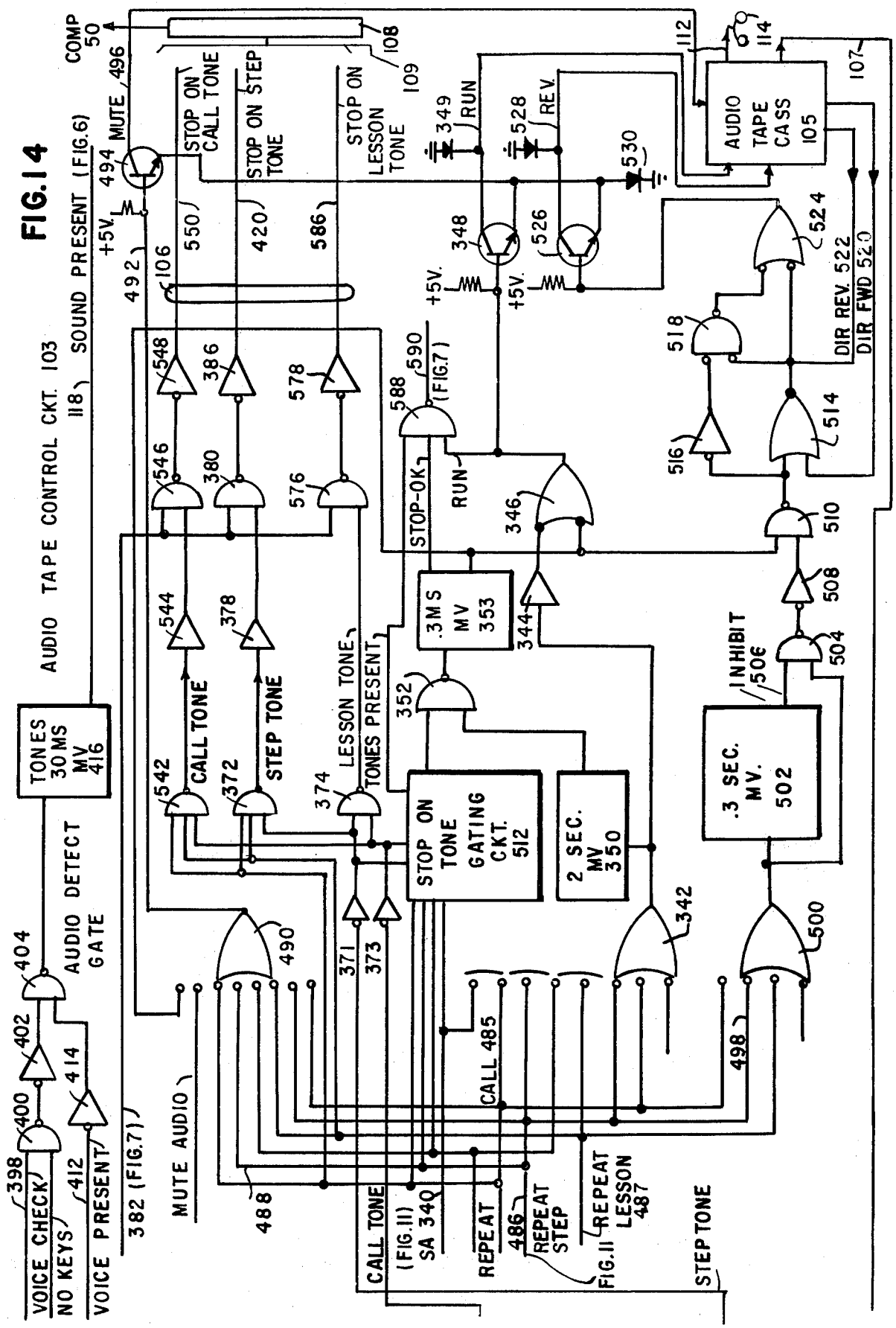

TRAINING SYSTEM FOR TELEPHONE SWITCHBOARD OPERATORS USING COMPUTER CENTRAL PROCESSING UNIT

This is a continuation, of application Ser. No. 396,620, filed Sept. 12, 1973, now abandoned.

BACKGROUND OF THE INVENTION

1. Field of the Invention

The invention relates to subject matter classified in Class 35, Sub-class 8.

2. Description of Prior Art

As the result of the increased use of telephone communication facilities and services by the public, it has been necessary for the telephone industry to develop and provide call handling equipment which is capable of extending more and more calls which do not require assistance from the operator. While the provision of such equipment and corresponding rate reduction to the calling subscribers who make such types of calls has significantly increased, there are still a large number of calls, such as person-to-person calls, collect calls, credit card calls and coin distance dialing which require operator participation.

Since the complete elimination of the operator from all calls was not immediately practical, and the demands for such type service continued to increase, the telephone industry next sought to provide a more efficient arrangement for processing calls in which the operator is involved. To such end, the industry has provided so-called toll service position desks which in particular seek to minimize the participation time of the operator in making calls requiring operator assistance. In so limiting the operator participation time per call, it is apparent that each operator will be able to handle a correspondingly larger number of calls, and a more efficient system is obtained.

The toll service position desks which have been developed herebefore have, in each case, been somewhat complex. In one typical toll service position desk, the operator is required to learn the purpose and function of approximately 100 keys, and in addition the particular sequences and patterns in which different ones of the keys must be operated to process the correspondingly large number of different call types. It was quickly apparent that the training equipment previously utilized in the training of operator personnel to handle the conventional cords of a telephone switchboard were outmoded and inadequate. New types of training equipment were therefore necessarily developed for use in the training of operator personnel for the toll service position desk.

One such training unit comprises a simulator which uses a tape stored program to produce simulated training calls. The unit is equipped with a training position which has substantially the same key and lamp layout as the toll service position desk which is provided for use in the field. The training program is stored on a punched paper tape which is operative to control associated circuits to provide visual displays and audible signals at the training position to simulate different calls which the student then handles in the same manner as the operator in the field. The unit also includes a magnetic tape of the two-channel type which carries the simulated speech of customers and distant operators on one channel, and control pulses on the second channel for stepping the tape at the end of each voice message. The control pulses are also used to synchronize the two tapes at the end of each program.

In a typical training problem, the two tapes are synchronized, and the paper tape is operated to provide signals which light training position lamps. The paper tape source also sets a matching and advance circuit for the anticipated trainer response. Further codes are then transmitted to present the call condition to the trainee and the paper tape then stops. The magnetic tape may also be started by the program tape, and if so, is stopped with the program tape. If the trainee responds properly (i.e., by operating the correct key and/or providing a valid response) within a predetermined time period, the paper tape is advanced to the next training call.

While such training arrangement has facilitated the training of operator personnel in the field, the unit as manufactured has certain basic shortcomings. The use, for example, of two separate tapes for the coded voice information requires that the two tapes be in proper synchronization at all times. Obviously with the occurrence of an out of sync condition, it is necessary to have competent personnel available for the purpose of checking the system and placing the tapes back in synchronization. Of perhaps more significance is the fact that it is difficult, if not impossible, to use each training program in a given time period to provide the same to more than one training position. As a result, each training position requires a separate paper tape source and a separate magnetic tape, and even further, separate control equipment for each individual training position. Such system arrangement is of course quite costly and therefore of limited efficiency. Further since the program is stored on the paper tape, the unit has limited flexibility. That is, in the event that certain steps are to be performed in different sequences, the paper tape must be changed before such change in the mode of operation can be provided. Other shortcomings in flexibility in such type arrangement as compared with the system of the present disclosure will become apparent hereinafter.

A further training arrangement which is available in the field is disclosed in another Patent which uses a single magnetic tape for both programs and materially simplifies the operation while further avoiding the need for synchronizing the equipment, such system requires a separate program source and a separate set of controls for each training desk.

A further basic shortcoming existent in certain prior art devices lies in the inability of the units to provide simultaneous operation in the training sequences. Failing such capability the system fails to provide one of the more desirable objectives of the training system, that is, to build up operator speed in the handling of calls. By way of example, if the operator in a given response is to provide a verbal answer and simultaneously key in a response, the known systems which depend upon sequential responses will not enable the operator to practice simultaneous responses, and the training of the operator to handle the calls more quickly, cannot be achieved in such type system. In those prior art units in which an attempt has been made to provide such capability, a complex synchronization problem has resulted.

It is an object of the present invention therefore to provide a novel training system which utilizes a computer controlled central processor unit for controlling a plurality of traffic service training desks independently or simultaneously, and particularly to provide a training service desk of such type in which different, or the same functions, can be performed by the operators at each of the plurality of training units.

It is a specific object of the present invention to provide a system of such type which performs the desirable functions presently available in known systems, and additionally wherein stop or repeat can be automatically required on key pulse errors, and which includes the capability of advance or go back in training sequence upon request. The novel system also has the capability of providing printed records and accumulated statistics.

A further feature of the invention is the manner in which a simplified program permits ready change in the programming to include further lessons without hardware modification.

Yet another feature of the arrangement is the manner in which the computer compares each and every trainee response with the action which should have been accomplished and provides (a) a go-ahead (correct operation instruction), (b) a repeat instruction (incorrect operation), or (c) notifies the supervisor in the event of the occurrence of a number of errors in excess of a predetermined norm for the particular lesson being used by the trainee.

A further feature of the invention is the manner in which the computer controlled unit makes possible branching during the instruction of the trainee. That is, in many types of training it is desirable as the student progresses to a certain degree of efficiency, to request the student to bypass certain portions of the lessons and advance to a further area of training. The novel circuit arrangement of the present disclosure provides for such mode of use.

SUMMARY OF THE INVENTION

The present invention comprises a digital computer with memory having access to a tape cassette which has a plurality of different lessons stored therein. A data bus connected to the digital computer carries multiple bit address words output from the computer over a plurality of 12-bit channels to a plurality of remote operator training positions. Each of the training positions includes a toll service position training board (OTM) which is similar in format to a corresponding real world toll service position board. In addition, a control panel associated with and connected to the board is used by the trainee in selecting a desired one of the lessons for training purposes.

A lesson selection key also is operable by the trainee to start a training lesson to control word formation circuitry at the OTM to format and transmit a word to the computer which indicates the one of the OTM's which is requesting service. The computer in its routine detects the input of a "request for service" word from the calling OTM and transmits a further word over the common data bus to the OTM's which word includes the address of the particular OTM which has requested the service. Decoder means at each of the OTM's determine which OTM will accept the 12 bit word, and the decoder circuit of such OTM responsively controls the circuitry associated with the control panel to output signals to the word formatting circuit thereat to control same to generate a word which indicates the particular lesson which has been registered on the control panel equipment by the trainee.

Assuming that the requested lesson is in core, the computer then outputs a series of words over the data bus which represent the information to be displayed on the display board, each of which words includes the address of the particular OTM which has requested such lesson. The decoder means at such OTM responsively causes the identified lamps on the board to be illuminated and, (if the call and step involved so requires) causes the audio circuit at the OTM to provide audio signals to be transmitted to the headset of the trainee. The system thus provides visual and/or audio information to the trainee which is the same information as an operator in the real world will experience for the same type of call.

The trainee is now expected to respond to the audio and/or visual information by operating a certain set of keys in a given sequence as determined by the identity of the call being processed. As the trainee operates such keys, the word formatting circuitry in the OTM will form and output 12 bit words which identify to the computer the keys which were operated by the trainee. The computer compares the keys represented by the received words with the keys which are properly operated for such step. If the words compare, the lesson is advanced one step. If the words do not compare, the computer backs the lesson up one step, and retransmits the words representing the step to which the improper response was received. Additionally a record is automatically made by the computer for analysis at a later time.

The computer facility is extremely flexible and has the ability to selectively provide the information relating to a lesson and further which comprises a plurality of calls, and further to selectively provide the steps of each call in a lesson. In addition, the novel facility includes circuitry which permits "branching," i.e., as a particular trainee has advanced to a certain point, the supervisor may decide that such trainee can bypass certain of the lessons, and such bypass can be simply achieved by dialing in a new lesson number on the control panel.

The system also includes a priority tape circuit which controls the pattern and time of input to the computer of the signal output of the different OTM's, whereby each OTM is reliably serviced even though a plurality of OTM's is connected to a single CPU.

Audio circuitry coupled to the novel system provides audio signals to the trainee which are similar to those experienced in the real world. Such circuitry in addition to displaying the type of message which would normally be received from a calling subscriber or distant operator also is operative to detect audio responses made by the trainee, and if such audio response is required the training program will inhibit system operation until an audio response is provided by the operator.

The word format circuitry in the OTM's, (which is a circuit common to the control panel, the board key panel, and the individual response keys on the board) is also operative to provide multiple bit words which identify the audio responses provided by the trainee. In instances in which audio and key responses are required, the system is capable of accepting both responses simultaneously, whereby the ability to increase the operator's efficiency in handling calls is inherently provided in the system.

BRIEF DESCRIPTION OF THE DRAWINGS

FIG. 1 is a block diagram of the control circuitry of the novel trainer system;

FIG. 2 is a block diagram of the toll service desk training keyboard which is used to train operators in the use of commercially available toll service desk positions of such structure;

FIG. 2A discloses the control panel which is used with such keyboard to select the different lessons (or parts of a lesson) and to provide the trainee with an indication of the results of the trainee responses;

FIG. 3 is an illustration of the word format used in the system;

FIG. 4 sets forth steps of an illustrative training lesson;

FIGS. 13-14 are circuit diagrams of the audio tape control circuit; and

FIGS. 15A, B, C are diagrams of the manner in which the circuits of FIGS. 5-8, 9-12 and 13-14 are arranged.

GENERAL DESCRIPTION a. Toll Service Desk

Figure 5:
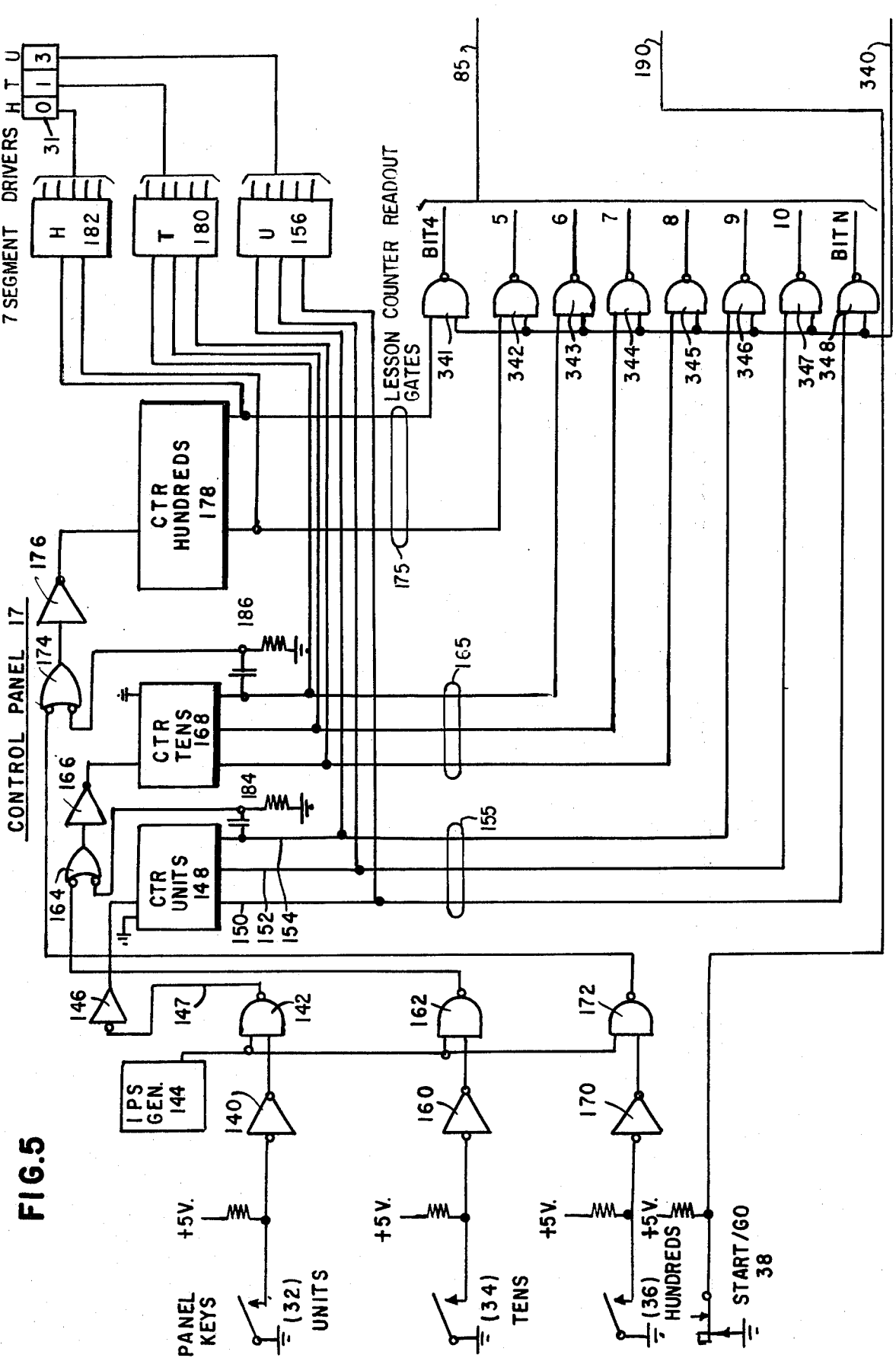
FIGS. 5-8 are detailed circuit diagrams of the OTM equipment for generating words to the computer.

For purposes of understanding the invention, reference is initially made to FIG. 2 which sets forth the disclosure of one commercially available type of toll service desk which is currently available from North Electric Company, Galion, Ohio, and which is described in detail in U.S. Pat. No. 3,702,381.

The general layout of the toll service desk keyboard and lamp displays are described in detail in such patent, and such disclosure is incorporated herein for reference purposes. Briefly stated, the board includes a plurality of Nixie lamps which provide digital displays of call information including charge, number, rate and time. The board further includes a plurality of illuminated keys and non-illuminated keys for use by the operator in performing varius indicated functions, and lamp indicators for visually providing information concerning the call. Reference is made to such patent for detailed explanation of the various functions which may be provided thereby. However, by way of specific example, reference is made to the steps which are performed by the operator in the establishment of a hotel 1+ paid call which requires the hotel guest to audibly provide the extension number of the hotel room to the operator, and in which the operator uses the board keyset to key such information into the system memory. More specifically, in such type of call, the subscriber initiates the call by dialing the operator digit 0. The automatic switching equipment responsively obtains and stores the subscriber directory number, and visually informs the operator by means of the lamp display that the call is a hotel 1+ station paid call with subscriber time and charge, and that a four digit room or guest number is required to complete the call.

Such information is specifically presented to the operator on the toll service position board by illuminating the calling area call lamp 18, the hotel station lamp 19, the KPGST lamp 20, the station paid lamp 21, release forward lamp 22 (red) the T and C lamp 23, the CLD lamp 24 and ACS lamp 25 in call group 1 and time ST lamp 26 (red). As the operator visually examines the board, the illuminated lamps identify the call as a hotel 1+ paid call, and the release forward lamp 22 now goes dark and zip tone will be heard on her head set.

The operator in response to such call is required to depress the KPGST key 20 and simultaneously ask the calling subscriber for the name and room number identification. At this point, the KP lamp 27 lights red and then changes to green. As the calling subscriber provides the room number and his name, the operator depresses the appropriate keys in keyset 28 to key the four digit number into the system for storage purposes. Assuming that the guest room number is identified as 0026, as the operator keys the digits into the system via keyset 28, the Nixie tube set 29 displays the digit number 0026. After a brief interval, the digit display disappears from display set 29 and the KP key 27 and KPGST key 20 go dark. The extinguishing of KP and KPGST lamps 27, 20 indicates to the operator that the equipment has obtained the necessary time and charge information, and automatically recorded such information in the toll ticketing equipment for the system. The call is now ready to be extended.

Thereupon the operator depresses the time start key 26, which changes from red to green and listens on her head set for the first ring, which is sent over the established connection to the called subscriber and to the operator headset by the automatic switching equipment. As the first ring is head the operator depresses the POS RLS (position release) key 30. At this time the lamps which were lit during the call, including the calling area code lamp 18, hotel station lamp 19, station paid lamp 21, TNC lamp 23, the called and ACS lamps 24 and 25 in loop 1 and the time start lamp 26 go dark, and the operator is ready to process another call.

Trainer Desk

The training toll service desk will, of course, have substantially the same physical layout as the toll service desk which is used in the field. Thus, if a trainer desk is to be built to train an operator to handle the toll service position desk shown in FIG. 2, the trainer desk will have the same general layout, and the signal input to the trainer desk will cause the trainer desk to provide the same visual and audio signals as are experienced in the toll service position desk and used in the field.

Assuming that the training set according to the present disclosure is to be used to train personnel for the toll service desk shown in FIG. 2, the trainer unit will include a board, such as shown in FIG. 2, and additionally will include a control panel 17, such as shown in FIG. 2A, which is used by the trainee to select the desired lesson (or part of a lesson) and to provide a display to the trainee of the correct or incorrect nature of the trainee response to the particular call condition which has been displayed on the board. For such purpose, the control panel 17 includes a three digit lesson indicator display 31 which provides a decimal readout to identify the particular lesson which is provided by the system at any given time. Different lessons may be selected by operating the digit, tens and hundreds keys 32, 34 and 36 respectively to advance the display readout to the ones of the digits which correspond to the lesson desired. Thus, assuming the hotel 1+ paid call described above is lesson 13, units key 32 is depressed until digit 3 appears in the units position, key 34 is depressed until digit 1 appears in the tens position, and key 36 is depressed until digit 0 appears in the hundreds position. The start/go switch 38 which generates an interrupt request to the computer processor unit CPU (to be described) to begin the lesson (sequence routine) first causes the CPU to examine the control panel 17 to ascertain the particular lesson which had been selected by the operator. When the CPU has ascertained the identity of the lesson selected and has selected the program for use, a signal back to control pane 17 causes the green lamp on the start/go switch 38 to light up. The CPU next conditions the training board (FIG. 2) by lighting the appropriate ones of the lamps to simulate the conditions which occur in the real world when a call of the type selected by the trainee is input to a toll service position board.

The trainee must now process the call according to the established procedure and further must process the call within a predetermined period of time alloted for the completion of such call and must complete each step of such call in the time allotted for each such step. If the training sequence is properly conducted, the system automatically provides the next step in the lesson to the trainee. However, if the trainee has made an incorrect response, the incorrect lamp 46 on control panel 17 is illuminated, and such step of the training sequence is automatically repeated. At this point, it should be noted that each lesson is comprised of a number of different calls and each call is comprised of a number of different steps. That is, when the operator sets the lesson selector 31 to 013 to select the lesson for hotel 1+ paid calls, the system will provide a series of such type calls in sequence which vary in content sufficiently to provide the operator with different information inputs for the same type of call. Each such call in a lesson is in turn divided into steps. With reference once more to the exemplary call (hotel +1 paid) the first step would begin at the time the lamps are lit on the toll service board, and is terminated with the receipt of the zip tone. The second step starts with the receipt of the reply from the customer, and the third step starts with the receipt of the ring tone from the system.

The last step or conclusion of the lesson occurs with the operation of the illuminated ones of the lamps to the dark condition.

Control panel 17 (FIG. 2A) further includes a set of keys 40, 42, 44, respectively which permit the automatic repeat of a step, a call or a lesson to thereby provide significant flexibility in the training program and pattern provided by the system. A power on-off switch 48 on control panel 17 is used to connect and disconnect power to and from the training system.

As seen from the foregoing, the control panel 17 is a quite simple and informal operation, while yet providing exceptional flexibility in its control of the training sequences.

General Description of Training System Circuitry

With reference to FIG. 1, the decision making circuitry for one embodiment of the novel training system is shown to comprise a digital computer (CPU) 50, which may be of the type which is commercially available from Digital Equipment Company as a DPD-8/M unit. The CPU unit as purchased comprises a basic processor including a single address fixed word length, parallel transfer computer which uses 12 bit, two's complement arithmetic. The DPD-8/M unit further includes a core member 52 which has 8,192 word capacity and operates at a 1.4 μs cycle time. Computer 50 is connected over a first set of I/O ports to an interface 56 commercially available from Digital Equipment Company as an M 1709) which provides connections to a plurality of operator training modules (OTM(-1)-OTM)n) in the system in a manner to be described.

Interface 56 bascially comprises two 12-bit registers 55, 59, one of which is used as an input buffer 55 for the words provided from the OTM's and the other of which is used as an output buffer 59 for outputting words to the OTM's. The word input from the buffer 55 in interface 56 is fed over path 57 to CPU 50. Interface 56 via gate 53 signals the program interrupt terminal PI in digital computer 50 whenever the interface 56 has data to input thereat. When the computer 50 recognizes an input on terminal PI, the computer 50 interrupts its normal program operation and transfers control to an interrupt service routing in a manner to be descried. The service routine records the contents of the input buffer 55 in the core memory 52 and transfers control back to the original program.

The word output from the digital computer 50 is fed over path 58 to the second register 59 in the M1709 interface by a data transfer operation without the interrupt facility. When the program of computer 50 is ready to output data via the interface unit 56, the program loads the accumulator (not shown) in the computer 50, and issues an output command to transfer the data from the accumulator to the output buffer 59 in the interface unit 56. In order to synchronize the word output transfers, the program provides a wait period of 10 microseconds between output commands.

The digital computer 50 has access to, and is accessed by, keyboard/printer 60 which in one embodiment comprised an ASR-33 unit commercially available from Teletype Corporation, Skokie, Illinois, which includes a paper tape reader and punch which is operable at 10 characters per second. As will be shown, the keyboard/printer 60 at times may be used by attendant in the outside the world to request, via path 61, certain information relating to the process of the trainee on a printout basis. In like manner, the software in the computer 50 may be programmed to output trainee progress information over path 61 to the keyboard printer 60 at period intervals for printout process.

A digital tape cassette 62, which may be of the type commercially available from Sycor, Annarbor, Michigan, houses the computer lesson library, and is selectively connected by tape control unit 64 over a second M1709 interface 66 and path 67 to the computer 50. It is initially noted that the core member 52 has a certain section of the core set aside for temporary write in of lessons from the tape cassette 62.

As will be shown, the selection of a lesson from the lesson library stored in cassette 62 by the tape control unit 64 is effected by selective operation of the kyes 32, 34, 36 on control panel 17. With operation of such keys to select lesson 013, for example, cassette tape 62 is operated to the point on the tape which includes the selected lesson, and such lesson is transferred by tape control unit 64 over path 65 and M1709, interface 66 and path 67 to computer 50 which stores same in the temporary write in section of core memory 52. The core memory 52 in the disclosed embodiment is connected to operate with eight OTM's and accordingly will always have eight lessons stored in the core. In the event that the lesson selected by a trainee of one of the OTM's is not in core, the tape control unit 64 automatically controls the tape 62 to advance to a section of the tape which includes the requested lesson and causes the same to be placed in core along with the seven other lessons stored in core for the other seven OMT's.

A separate time loop 68 provides timing interrupt signals over a path 69 to the digital computer 50 for the purpose of updating the internal clocks in digital computer 50.

The computer program which is more specifically described hereinafter generally comprises (a) an executive program which sequentially surveys the various equipments and upon receipt of an external interrupt relinquishes control to the interrupting routine; (b) general routines which basically actuate lamps, digital displays and examine pushkey actuation, and (c) lesson routines which generate the varying training program sequences.

Each lesson routine, as stored in core memory 52, is independently accessed by each of the OTM's as required to thereby permit each trainee to progress at the trainee's own rate. The main function of the software system in the digital computer is to control the execution of a selected set of lessons for each of the operator training units (OTM's) in the system. In general, each such lesson consists of the computer 50 executing a predetermined set of commands to the OMT's which are related to the particular lessons selected by such OMT's, and then waiting for a response from the remote as generated by the trainee. When the response arrives, the program in the computer 50 checks to see if the response is correct. If the response is correct, the program automatically advances to the next step in the selected lesson for such OTM. However, if the response is incorrect, the program lights the incorrect light 46, updates the error count with the identity of the specific OTM on which the error occurred, and automatically backs up to the previous step in the lesson.

The software system consists of the following major routines:

1. Executive Routines which control the overall flow of the system.

2. Lesson routines which contain the instructions to control the execution of each lesson. This group of instructions is unique for each lesson.

3. Common routines which contain the instructions to execute the functions which are common to all routines.

A typical control table which was utilized with the computer 50 in one commercial embodiment comprised a 1. Remote control table (RCT) which is used to store the current status of each remote in the system. There is one RCT for each OTM in the system and the first word in each RCT is pointed to the next RCT in the system, and the pointer is used to connect all of the RCTs together in a circular queue. The circular queue is used such that each remote is given equal chance to use the CPU. As the current remote relinquishes control because it is waiting for a response, the next RCT in the chain is checked to see if it is ready to use the CPU. If it is, the remote is given control. If not the next remote on the chain is checked and so on in circular fashion.

2. Output command table (OCT) which is used to store the complete set of output commands and can be transferred through the OTMs.

3. Input command table (ICT) which is used to store the complete set of input commands that can be transferred from the OTMs.

4. Lesson address table (LAT) which contains the address of the first instruction of each lesson.

5. Active remote pointer (ACT) which contains the address of the RCT that is active.

OTM Circuitry

As previously indicated the computer circuitry 52 and associated tape cassette 62 has the capability of operating with a plurality of training devices OTM-1–OTM*n* (FIG. 1). In one commercial embodiment, the system is capable of handling 32 training positions. However, the embodiment disclosed herein used only eight such positions.

Each OTM in such embodiment had the capability of interfacing with up to 128 lamps, 16 Nixie lamps and 128 pushkey switches. The OTM circuitry as shown in block from in FIG. 1 is perhaps best understood by considering the circuits in their sequence of use in a selected lesson, such as lesson 013 (a hotel +1 paid call).

To select such call, the trainee operates keys 32, 34, 36 (FIG. 2a) on control panel 17 (FIG. 2) until such digits appear on the lesson readout display 31. As the trainee then operates the start/go switch 38, signals output from control panel 17 (FIG. 1) over path 85 and OTM output circuit 124, path 70 to switch contact logic control circuit 72 results in the format of a word which is output over path 74, priority logic circuit 76 and path 78 to gate 53 on interface 56 to indicate to the digital computer 50 in word format that the digital computer 50 should pick up further information from the control panel 17 associated with OTM1.

The digital computer 50 interrupts its executive routine and via path 58 and output buffer 59 outputs a parallel word over twelve conductor bus 80 to lamp decode circuit 82 which decodes the word (sequence request) and over path 84 causes a set of gates on control panel 17 to read out the lesson selected by the keys 32, 34, 36.

Control panel 17 transmits signal information indicating the lessons selected over path 70 to switch contact logic control circuit 72 which formats a 12 bit word and outputs the same over path 70, priority logic circuit 76, and path 78 to gate 53 in the interface unit 56 which word identifies to the computer the particular lesson to be provided from OTM1. If the requested lesson is in core memory 52, the computer 50 sequentially outputs a first set of words over path 58, and interface 56 to data bus 80 and the lamp decode circuit 82 in each of the OTMs. In the present example such set of words effects lighting of the ones of the lamps on the display board which are considerably lit when a hotel 1+ station paid call is received at a toll service position board. As will be shown, such OTM has a discrete address, and accordingly, only the OTM addressed by the word (OTM1 in the present example) will respond to the word instruction.

If the lesson selected by the trainee was not in core memory 52, the computer 50 via path 67, interface 66, and path 65 identifies the number of the lesson indicated to tape control unit 64 and tape control unit 64 causes cassette 62 via path 63 to output the desired lesson back over path 65, interface 66, path 67 to computer 50 for temporary storage in core member 52.

Digressing briefly at this time, as shown in FIG. 1, clock 86 in the interface 66 outputs a clock pulse whenever a word is input to the output buffer 59 which pulse is fed over path 88 to time select clock 90 in each of the OTM's. The timer select clock circuit 90 in each OTM is operative in response to the receipt of an input clock signal to output a fifty nanosecond clocking signal over path 92 to the Nixie storage circuit 138 and lamp storage circuit 96 for the purpose of insuring that the storage circuits 96 and 138 examine the information input from the computer for only the exceedingly brief period of 50 nanoseconds. In practice, it has been found that the utilization of such momentary examination of the information significantly minimizes noise problems in the system, and makes possible a more reliable presentation of the information on the toll service board. In particular such arrangement was found to eliminate the problem of double readings which occur when longer readouts (such as for example, two microsecond readouts) were attempted.

Returning now to the description of the block diagram of FIG. 1, at this time (as shown in FIG. 4) a given set of lamps is lit to simulate the receipt of such call on the toll service trainer board. The computer 50 therefore now outputs a series of words each of which includes the address of OTM1 (the OTM which requested the call). The remaining bits of the different code words effect lighting of the lamps 18-27, which as shown in FIG. 4, include calling area code lamp 18, hotel station lamp 19, KPGST lamp 20, Sta. Paid 21, Release Fwd. 22, T & C lamps 23, Cld, ACS lamps 24, 25, and Time St. lamp 26. Such words as output by computer 50 are transmitted over path 58 to output buffer 59 in interface 59 and over data bus 80 to the lamp decode circuit 82 in each of the OTM's 1–n. The lamp decode circuit 82 in each of the OTM's is connected to data bus 80. However since the words in the present lessons have the OTM1 address only lamp decode circuit 82 in the OTM1 decodes the input words received over data bus 80 from the computer 50. Lamp decode circuit 82 provides a signal over path 98 to lamp storage circuit 96 to effect energization by lamp storage circuit 96 of the ones of the board lamps which were identified by the code words. Since each such word is applied by computer 50 to the data bus for only a 10 μs period, storage circuits 96, 138 are used to store the indicated lamp operation.

As a further assist to an understanding of the operation of the system, a brief description of the word format used in the system is briefly described hereat. As shown in FIG. 3, the word format utilized in the described embodiment (i.e., only eight OTM's) comprises a 12 bit word in which the first three bits 0-2 are used as the OTM address code. In larger systems which include a larger number of training devices, the word length may be increased.

The third bit of each word in the present 12 bit word format is a dual function word. That is, if the third bit is a logic 1, an incandescent lamp is to be controlled, and if the third bit is a 0, the word indicates that a Nixie lamp in group 29 is to be controlled.

The fourth bit is also a dual function bit and the information conveyed by the fourth bit is determined by the value of the third bit. That is, if the third bit is a one (i.e., an incandescent lamp is to be lit) the fourth bit is used as an on-off bit in the word. However, if the third bit is a zero (i.e., a Nixie lamp is to be lit) the fourth bit is then used as a part of the Nixie tube address.

Assuming bit 3 is a logic 1 (an incandescent lamp is to be controlled), bits 5-11 of each word identify the address of the incandescent lamp to be controlled. Alternatively if bit three was a logic 0 (i.e., Nixie tube is to be controlled) bits 5-7 are used as the remainder of the address of the Nixie tube to be operated. In the latter event, bits 8-11 are also used as a variable Nixie BCD value.

The foregoing word format is used throughout the system in each of the circuit operations to be now described.

Continuing now with the description of the exemplary call, it is first recalled that the computer at this stage in the call has answered the OTM request for a hotel +1 paid call lesson by sending words over data bus 80 to illuminate lamps 18-26 on the board (FIG. 2) to identify the call incoming to the board as a hotel 1 + station paid call. After one second of delay time, a further word output from the digital computer 50 over data bus 80 causes the lamp decode circuit 82 in OTM1 to provide a signal over path 98 to cause the lamp storage circuit 96 to output signals over path 100 to extinguish the release forward lamp 22 (see line 2—FIG. 4).

A signal output from lamp storage circuit 96 over path 102 also causes the audio tape control unit 104 to operate tape unit 105 which responsively advances to provide zip tone over path 112 to the headset 114 of the trainee (line 3—FIG. 4). As the audio tape has progressed to the point that the recorded zip tone has been output to the trainee, an automatic stop signal on the audio tape output over path 167 is detected by audio tape control circuit 103 which outputs a signal over path 109 to interface 108 which signals the digital computer 50 to indicate that the tape at this time is in a position to stop or continue depending upon the information in the computer program. In the present example, the program will indicate that the audio tape is to be stopped, and accordingly computer 50 outputs a word over the data bus 80 to the lamp decode circuit 82, which via path 102 controls the audio tape circuit 103 to terminate advance of the audio tape by unit 103. It is noted that since only three word signals are requested from each OTM to the computer 50, a separate commercially available interface is used to provide such words to the digital computer 50. Such arrangement is also used to minimize the possibility of the occurrence of an out of sync condition for the audio tape relative to the computer program.

Continuing with the present call, as the zip tone ends, the trainee is to request the customer name and room number for keying into the system, and to simultaneously or thereafter depress the KPGST key 20 on the toll service trainer board (line 4—FIG. 4; also see key group 129 on OTM1—FIG. 1).

With the depression of the KPGST key 20 by the trainee, signals over path 122 to the OTM output circuit 124 control the word formatting circuit thereon to generate a word which identifies the key operated by the trainee and to transmit the same over path 126, input gate 128 and path 130 to gate 53 for the interface unit 56. Computer 50 in its routine picks up such word for processing purposes.

At the same time as the trainee operated the KPGST key 20 (or prior to or within a predetermined time thereafter) the trainee is required to request the guest name and room number (line 4—FIG. 4). Assuming the trainee makes such request within the allotted time period, the speech input by the trainee over microphone 87 and path 116 to the audio tape circuit 104 controls such circuit to provide a signal output over path 118 to the word formatting circuitry in the OTM output circuit 124 which responsively generates a word which indicates that a verbal response has been provided by the operator. Such word is again output over path 126, input gate 128 and path 130 to gate 55 in the interface 56 for pickup by the computer 50.

The program format in computer 50 effects a comparison of the response indicated by words input from the OTM1 with the response required by the program, and in the event the two words compare the computer outputs a word over the interface 56 and data bus 80 to the lamp decode circuit 82 in OTM1 which as decoded results in a signal over path 98 to lamp storage 96 and path 100 to effect illumination of the red portion of KP lamp 27.

A second word output by the computer one half second later in the same manner effects the illumination of the green indicator on KP lamp 27, and the extinguishment of the red portion of such lamp.

The program on computer 50 now enables the output of a word over the interface 56 and data but 80 to lamp decode circuit 82 which as decoded results in the outputting of a signal over path 102 to the audio tape circuit 103 which in turn via path 104 controls the tape unit 105 to advance and provide the guest response including the guest name and the room number (line 5—FIG. 4) over path 112 to the head set 114 of the trainee.

The audio tape circuit 103 also outputs a signal over path 109 to interface 108 which via path 110 provides a word signal to the computer 50 which indictes that the tape is in a position to be stopped or not stopped. Assuming the program instructions indicate that the tape is to be stopped, the computer 50 outputs the appropriate word for effecting such operation.

With reference to line 6—FIG. 4, it is seen that the trainee is now required to key pulse the room number (0026 in the present application) which is received from the calling subscriber into the system, and such action is effected by operating the keyset 28 (FIGS. 1, 2) in known manner. As the successive digits are keyed, the signals output over path 132 to the OTM output circuit 124 results in the generation by the word formatting circuit thereat of a discrete word for each of the digits which is input thereto. Such words as generated are output to interface 56 and computer 50 over the path previously described.

Computer 50 compares the received words with the words indicated by the program as the proper response, and in the event that the trainee has keyed the value of the word digits, the computer 50 outputs four successive words over interface 56 and data bus 80 to the OTM's which are decoded by the Nixie decode circuit 134 in OTM1. Nixie storage circuit 138 controls the operation of the four Nixie tubes in the display 29 (FIG. 2) to indicate the value of the digits dialled by the trainee (i.e., 0026 in the present example).

After a momentary delay, the computer 50 outputs further words over interface 56 and data bus 80 to the lamp decode circuit 82 to effect extinguishment of KP lamp 27 and KPGST lamp 20. Computer 50 thereafter further outputs four separate words over the same path to the Nixie decode circuit 134 to effect extinguishment of the Nixie lamps which have been illuminated.

With reference once more to FIG. 4, line 7, it will be apparent that the trainee at this time is required to depress the time start key 26 (FIG. 2) in keyset 28. With operation of key 26, a code signal over path 122 to the OTM output circuit 124 results in the generation and transmission of a word to computer 50 as described before which indicates that the time start key 26 has been depressed. Computer 50 examines the received word and compares the same with the word in program and in the event the proper key has been depressed outputs a word over interface 56 and data bus 80 to the lamp decode circuit 82 which enables lamp storage 96 to change the time start lamp 25 to green.

Immediately thereafter the computer 50 outputs a further word over interface 56 and data bus 80 which as decoded by the lamp decode circuit 82 in OTM results in a signal over path 102 to the audio tape circuit 104 for the purpose of operating the tape to output one ring over the path 112 to the headset 114 of the trainee (FIG. 4—line 8).

As the tape provides the necessary ring signal, a signal over path 107 to the audio tape circuit 103 as before results in the output of a signal over 109 to indicate to the computer that the tape unit 105 has advanced the tape to a position where a further decision is required by the program. In the present example, the program includes the tape is to be stopped, and accordingly computer 50 outputs a word back over the path described to OTM1 which responsively controls the audio tape circuit 103 to cause the audio tape unit 105 to stop the tape advance.

With reference to FIG. 4, line 9, the trainee is now required to depress the position release key 30 in keyset 129. The OTM output circuit 124 in response to the receipt of a signal over path 122 generates a word indicating that the position release key 130 has been depressed, which word is output as described above to the computer 50.

As the computer 50 receives such word, it outputs successive words over the interface 56 and data bus 80, and the lamp decode circuit 82 and lamp storage circuit 96 in OTM1 responsively effect the extinguishment of lamps 18, 19, 21, 23, 24, 25 and 26 of the lamp group 120. The system is now ready for the next lesson or call.

It is noted at this time that the computer program in addition to checking for the accuracy of the responses made by the trainee also indicates to an associated internal register the time of outputting certain keywords which require response by the trainee. At the time the required response is received, the computer checks to ascertain that such response was received within the required period. If so, the clock is reset. In the event that the trainee does not provide the response with the required period, the internal register outputs so indicate, and a word is output by the computer over data bus 80 to so indicate. The lamp decode circuit 82 and lamp storage circuit 96 in OTM1 responsively enable the incandescent lamp on control panel 17.

Specific Description of Circuit Operation In Response to Selection of Lesson 13 by Trainee It will be recalled that in initiating a training operation, the trainee sets the lesson selection keys 32, 34, 36 on control panel 17 (FIGS. 1 and 2) to the number which identifies the desired lesson. In the hotel call briefly described above, the trainee set the switches 36, 34, 32 to provide digit readout 013 on the control panel 17.

Lesson Selection By Trainer

With reference now to FIG. 5, the panel keys 32, 34, 36 which are so operated are shown thereat. As the trainee operates switch 32, for example, ground is connected over switch 32 to inverter 140 which puts a high level signal to a first input of AND gate 142. The second input of AND gate 142 is connected to the output of a one pulse per second generator 144, whereby pulses appear at the output of AND gate 142 for the period that key 32 is depressed. The one pps output of AND gate 142 is fed over path 147 to amplifier 146 to digit units counter 148. Units counter 148 advances as each pulse is input from generator 144, and at its outputs 150, 152 and 154 provides a binary coded signal indicating the value of the accumulated count to a seven segment driver 156, which is commercially available from Texas Instruments as a 7446 unit. The decimal output of the seven segment driver 156 is connected over conductor 149 to a seven segment LED display which provides a display of the units digit (3) on the units display U of lesson indicator 31 on control panel 17. That is, as shown in FIGS. 2A and 3, lesson indicator 31 is comprised of three LED display units, which are commercially available from Schelly as No. 3015F-CN one of which, U, is connected to display the selected units digit, the second of which, T, is connected to display the selected tens digit, and the third of which, H1, is connected to display the selected hundreds digit.

The trainee having advanced the units count to digit 3, now operates the tens switch 34 to provide a low level signal to inverter 160 which in turn provides a high level to one input of AND gate 162 to cause one pulse per second to be gated from generator 144 to one input on OR gate 164 and over amplifier 166 to the tens counter 168. In the present example, the trainee holds switch 34 closed until counter 168 advances to count 1.

The binary output of counter 168 is fed to LED seven segment driver 180 which provides a digital output over conductors 169 to the second seven segment LED display T to effect the display of the digit 1 thereon for the operator. The trainee operates the hundreds switch 36 in like manner to provide a hundreds digit "0" on the lesson indicator 31. As switch 36 is closed a high level pulse output from inverter 170 causes AND gate 172 to gate one pulse per second over OR gate 174 to hundreds counter 178. It is noted that counter 178 is wired to provide a maximum count of three in the present embodiment. The binary count output of counter 178 is fed to seven segment driver 182 and the decimal output of driver circuit 182 is fed to the seven segment LED display H in the lesson indicator 31. The display to the operator on control panel 17 at this time (FIG. 2) will therefore read 013, which is the number assigned to the lesson involving the hotel 1+ call.

Digressing briefly, it will be apparent that the highest order output of counter 148 is connected via differentiator circuit 184 to a second input on OR gate 164 and over amplifier 166 to the input of tens counter 168. In like manner, the highest order output of tens counter 168 is fed over differentiating circuit 186 to the second input on OR gate 174 and over amplifier 176 to the input of hundreds counter 178. Thus if the trainee prefers, the units switch 32 can be held down to effect advancement of the lesson number to any desired value requiring the selective operation of switches 34 and 36. The lesson count 013 placed on the three counters 148, 168 and 178 is held in the counters until the trainee once more operates the switches 32, 34, 36 to select a different lesson. Such count is marked over three separate paths 115, 165, 175 to a group of lesson counter readout gates 341-348, which as will be later described, are used to form words for gating to the computer 50 to indicate the particular lesson selected by the trainee.

Identification to Computer

Figure 6:
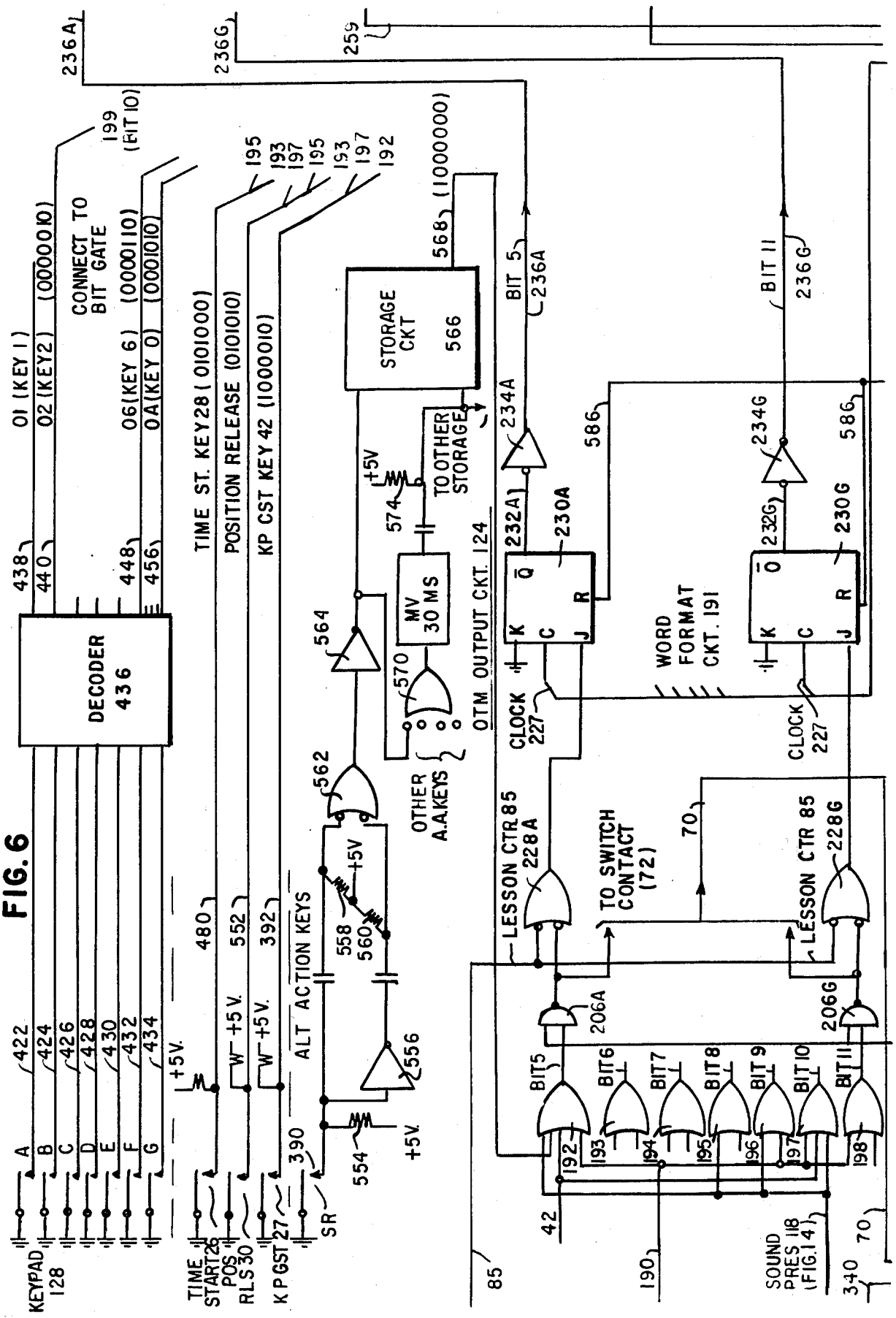

The trainee having selected a lesson 013 on control panel 17 now operates the start/go switch 38 to cause the system to start the lesson. With reference to FIGS. 5 and 6, switch 38 as closed applies ground over path 190, and is fed as an input to word format circuit 191 for OTM1 which comprises seven bit generating gates 192-198 for providing bits 5-11 respectively of each word output by the operator trainer module OTM-1 to the computer 50. In the present example (as shown in the code table hereinafter) the Start word (in code) is 1000111, and accordingly the path 190 is connected to control the gates for bits 5, 9, 10, 11 respectively (192, 196, 197, 198) to generate a logic 1 for such word. Gates 193, 194, 195 being unconnected will output logic 0 when the bits for the Start word are readout.

With logic 1 output from bit gates 5, 9, 10, 11, the corresponding AND gates of the group 206A-206G connected to the outputs of gates 192-198 respectively output a low level signal (absent an inhibit signal over inhibit lead 210) and the AND gates of group 206A-206G connected to the output of bit gates 6, 7, 8 will output a high level signal. As seen in FIG. 6, the outputs of AND gates 206A-206G are connected over path 70 to the switch contact logic control circuit 72 (FIG. 7) and the input of an OR gate 208 to initiate a word readout cycle.

More specifically, with the energization of any one of the bit gates 192-198 by a low level signal, a corresponding one of the outputs of gates 206A-206G over path 70 will be marked to indicate to gate 208 in the key channel 207 that a word must be generated for the computer (CPU) 50. The signal output from OR gate 208 is fed over amplifier 210, and differentiated by differentiator circuit 212, amplified by circuit 214 and fed to one input of AND gate 216.

The output of AND gate 216 is fed to 10 millisecond multivibrator 218 which outputs a 10 microsecond negative going pulse to the input of a 50 millisecond multivibrator 220 which, in turn, at its output provides a signal to the second input of AND gate 216 to inhibit any further pulse input over the key channel 207. The positive-going pulse output from the multivibrator 218 is fed to a further 10 millisecond multivibrator 222, which generates and transmits a 10 microsecond output pulse over inverting amplifier 224 to one input of OR gate 226. The output of OR gate 226, in effect, comprises a clocking pulse which is used to clock the data bits which are output from the bit gates 192-198 (FIG. 6) to input gate circuit 128.

More specifically, the word information (Start word in the present example) which is marked on the inputs of bit gates 192-198 and gated over gates 206A-206G to each of the corresponding OR gates 228A-228G are fed to the J inputs of flip-flops 230A-230G respectively.

Figure 7:
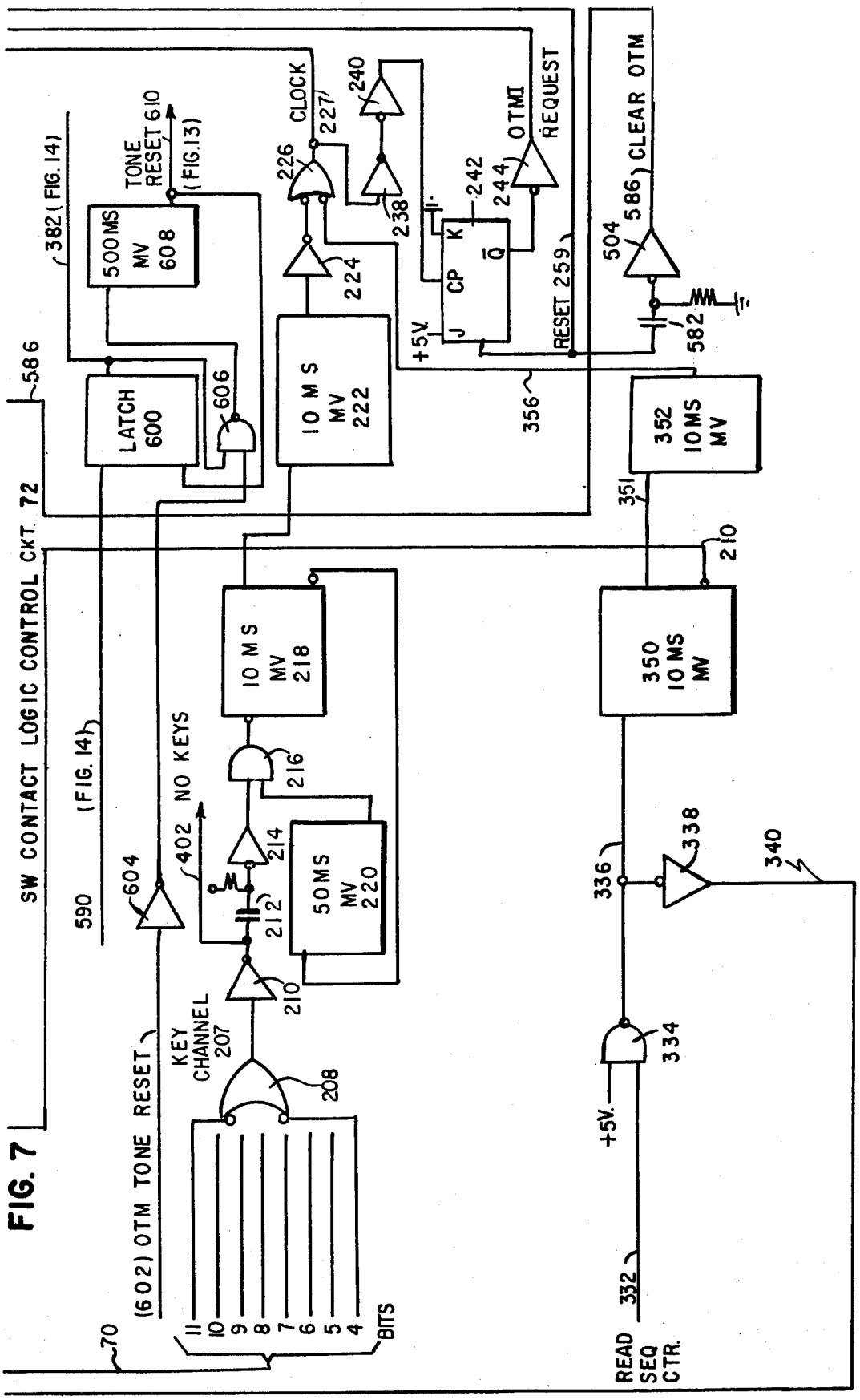
Figure 8:
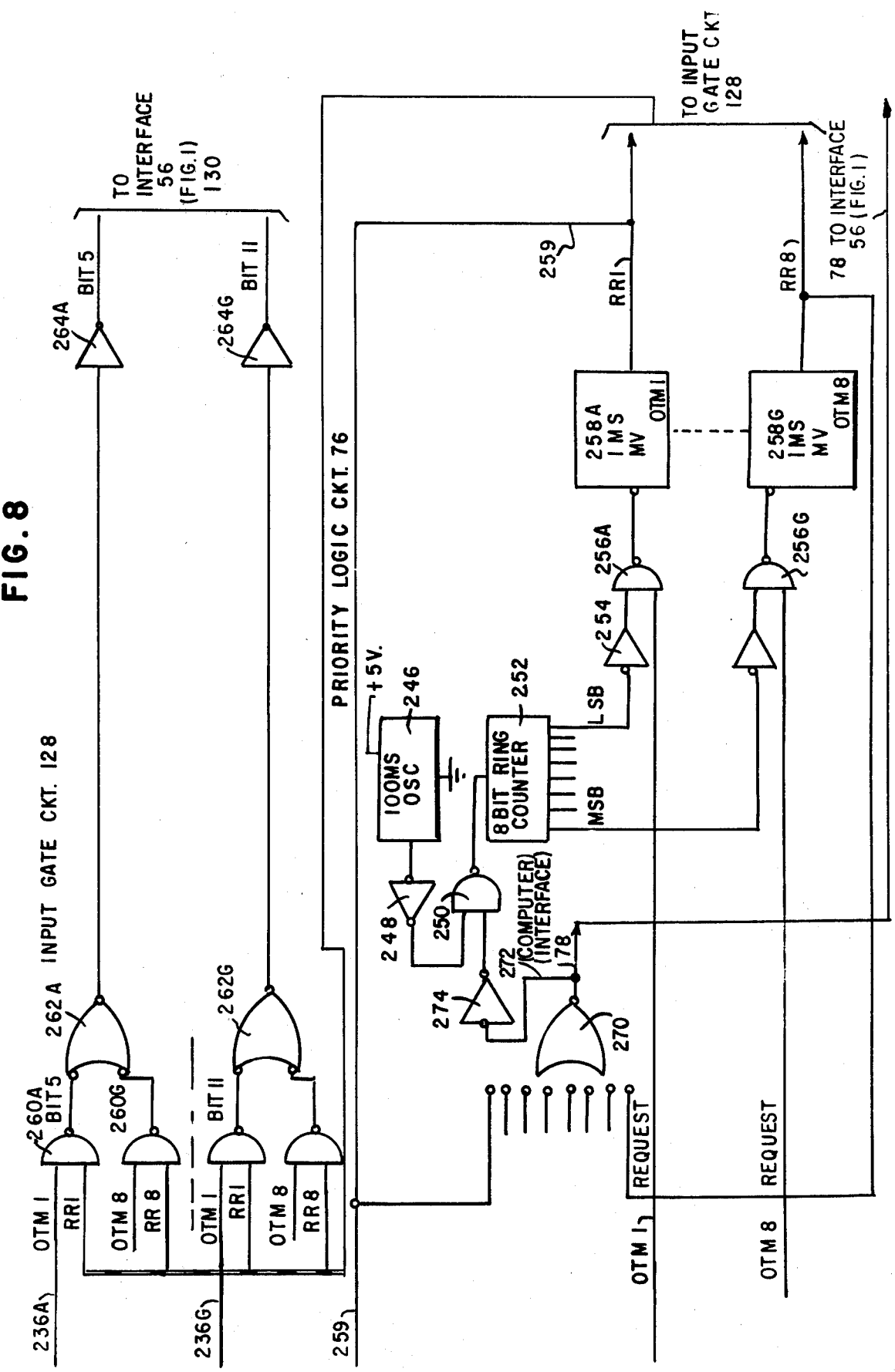

Recalling that the input of the word to the bit gates 192-198 also resulted in a signal over path 70 to key channel 207 (FIG. 7) which in turn resulted in a 10 μ second clock pulse over path 227 to the clock input of flip-flops 230A-230G, it will be apparent that the bit markings on the J inputs of the flip-flops 230A-230G which represent the code for the Start signal (1000111) are output by the flip-flops over paths 230A-230G as a parallel word readout on conductors 236A-236G to the input gate circuit 128 (FIG. 8).

With reference once more to FIG. 7, and the output of key channel circuit 207, it will be seen that the clock pulse output therefrom is also fed over a first and a second series connected amplifier 238 and 240 for the purpose of effecting a slight delay in the generation of the clock pulse signal which is fed to the clock input of a JK flip-flop 242. The $\bar{Q}$ output of the JK flip-flop 242 is fed over amplifier 244 to mark output lead OTM1 in the priority logic circuit 76, (FIG. 8) and thereby provides a signal request for a computer interrupt at the appropriate time and the pickup of such word by the computer.

The priority logic circuit 76 basically comprises a 100 microsecond oscillator 246 which provides output pulses over amplifier 248 and AND gate 250 to the input of an eight-bit ring counter 252. As will be apparent from FIG. 8, the gate outputs of ring counter 252 are connected to gating circuits for the OTM1–OTM8 request leads output from the different OTM training module OTM1–OTMn (n=8 in the disclosed embodiment). Thus, as shown, the lowest significant bit output of ring counter 252 is fed over an amplifier 254 as one input to AND gate 256A. The second input of AND gate 256 comprises the request lead output OTM1. It will be apparent that as the ring counter advances over the successive output leads, the request leads of the successive OTM training units are connected over path 77 to input gate 128. The outputs of gates 256A–256G are thus successively connected to the one microsecond multivibrators 258A–258G respectively. As such scan occurs, those OTM's (such as OTM1 in the present example) which have a mark on the request lead, obtain a 1 millisecond pulse on the output leads, such as RR1, in path 77. The request signals which appear on conductors RR1–RR8 in sequence (if any) in each scan are fed successively to the RR1–RR8 inputs of 56 gate circuits, such as the eight gates 260A–260G (FIG. 8) for bit 5 in the input gate circuit 128. As will be shown, the number of gate circuits, such as 260A, is determined by the number of bits in each word and the number of OTM's in the system.

With specific reference to input gate circuit 128, it will be apparent that there is a set of eight gates for each of the bits 5–11 (i.e., a total of 56 gates). The first gate for each bit, such as gate 260A for bit 5, has one input connected to the bit 5 output of training position OTM1, and each of the successive gates 260B–260G has one input connected to the bit 5 output of training positions OTM2–OTM8. In like manner, the first gate of each of the eight gates for bit 6 has one input connected to the bit 6 output of OTM1 and the successive seven gates for bit 7 have one input connected to the bit 7 output of OTM2–OTM8 respectively.

The second input of each of the gates, such as 260A–260G for bit 5 of OTM1–OTM8, are connected respectively to the RR1–RR8 outputs of the priority logic circuit 76. The second input of each of the eight gates of bits 6–11 are connected in like manner. It will be seen therefore that if the RR1 conductor output from priority logic circuit 76 is marked (and such conductor as described earlier is marked only if there is a word in OTM1 to be input to the computer 50), the first gate, such as gate 260A, for each of the bits 5–11 will be enabled to extend said bits over OR gates 262A–262G as the signal is input over conductor RR1. As the ring counter 252 advances one step (and assuming that the OTM2 also has a word to be input to the computer), the RR2 signal will cause the 7 bits of the word output from OTM2 to be applied to gates 262A–262G. Thus in each scan ring counter 252 will cause the word output of the OTM's which have requested service to be output successively over gates 262A–262G.

The OTM words as output over the OR circuits 262A–262G, are extended over individual inverter amplifiers 264A–264G and over path 130 to input buffer circuit 55 (FIG. 1) in interface 55 for input to the computer 50 as the computer proceeds to such point in its routine.

With reference once more to priority logic circuit 76, (FIG. 8), it will be seen that the signal output from each of the request circuits RR1–RR8 are also connected as inputs to an OR gate 270 which is connected over path 78 (FIG. 1) to gate 53 which has its output connected over path 51 to the priority interrupt (P1) for the computer 50. This it is apparent that as the bit ring counter 252 advances in its scan to provide a request signal over a conductor, such as RR1, the same signal is also fed over a path such as 259 to gate 270 and path 78 to the interface to mark the priority interrupt terminal (P1) of computer 50 with a program interrupt signal.

The signal output from OR gate 270 is also fed over path 272 to inverter amplifier 274 and a second input on AND gate 250 to inhibit the output of the oscillator 246 to the ring counter 252, and thereby terminate advance of the ring counter 252 until such time as the request signal, such as RR1, is removed from the particular request lead which has causes the program interrupt terminal P1 to be marked on the computer 50. As noted above, the request signal from an OTM position, such as the signal on lead OTM1 (FIGS. 7, 8) is a 1 ms. signal.

Briefly summarized, the signal generated for the purpose of determining computer service for an OTM in addition to marking the computer program interrupt terminal P1 over path 78, also inhibits further advance of the ring counter 252 via lead 272 to provide a one millisecond interval in which computer 50 may determine the nature of the request and process the same.

Reset of OTM Unit Requesting Service

Whenever the ring counter 252 (FIG. 8) generates a signal over an RR lead, such as RR1, for use in the priority gating of a word over gate circuit 128 to the computer, the same signal over the RR lead, such as RR1, is also fed over reset conductor 259 (FIGS. 7, 8) to the reset input of the flip-flop 242 (FIG. 8). The same signal over differentiating circuit 582, inverting amplifier 584 and conductor 586 provides a reset signal to the flip-flops 230A–230G (FIG. 6) which were enabled to gate the word from the bit gates 192–198 to the input gate circuit 128. Thus, if computer 50 has not picked up the information during the 1 ms. period, the information will no longer be available during such cycle.

Computer Interrupt

As the interrupt service signal output by the priority logic circuit 76 over conductor 76 is applied by gate 53 to the computer terminal P1, computer 50, as shown in the program description hereinafter, interrupts its routine, and examines the Start signal input from OTM1 over path 130 (FIG. 8, 1) and buffer 55.

Figure 9:
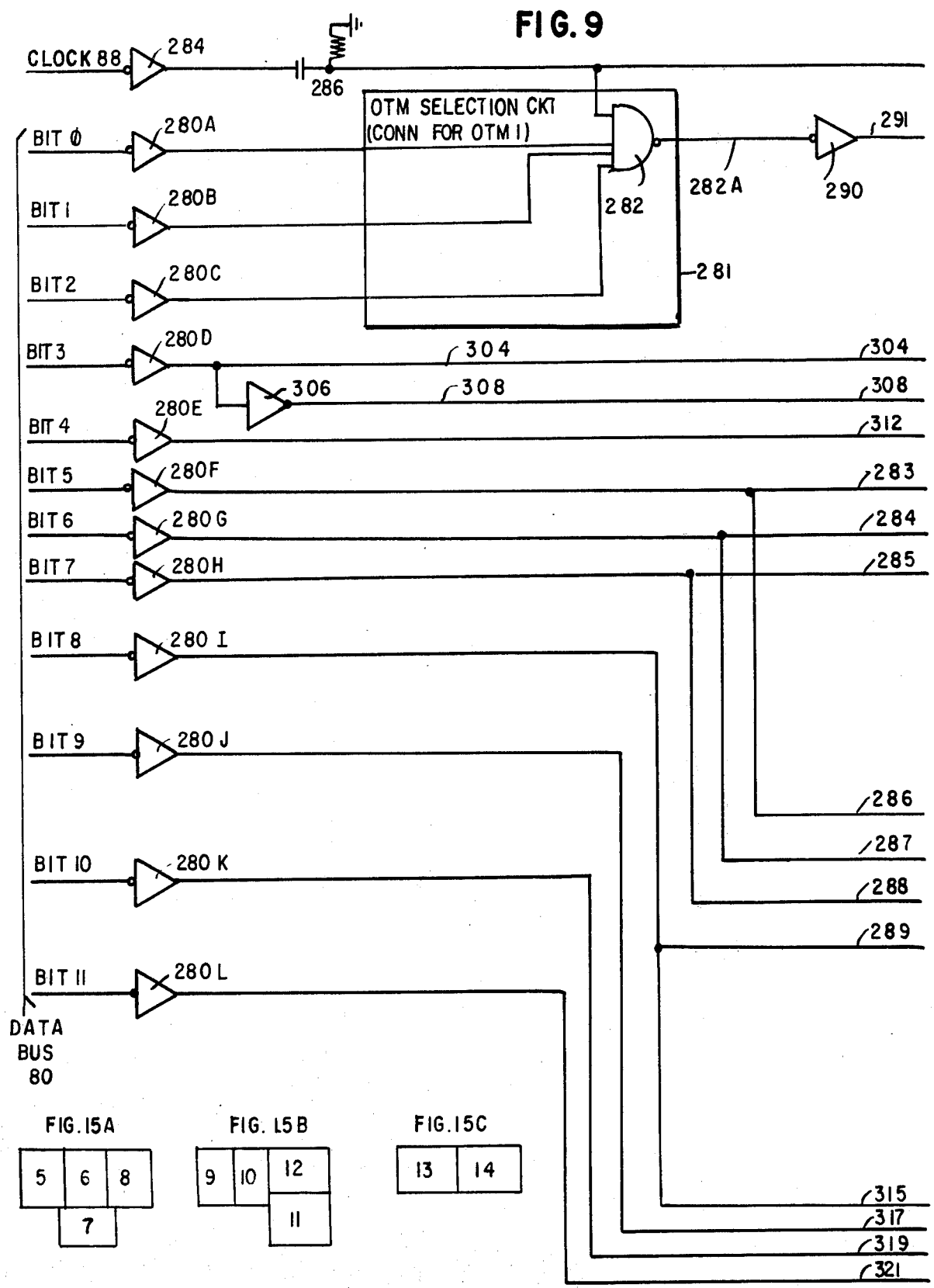
FIGS. 9-12 are circuit diagrams of the decoder and storage circuits at each OTM.

As the digital computer 50 determines that the signal from OTM1 is a start word, the program in the computer 50 outputs the sequence counter code word (000111100001) over path 58 (FIG. 1) to output buffer 59 (which is a 12 bit register used for buffering purposes). Buffer 59 is connected over data bus 80 which comprises twelve parallel leads, which are connected to the inputs of the lamp decoder circuit 82, Nixie decode circuit 134, and timer select clock circuit 90 in each of the training modules OTM1–OTMn in the system. In addition, the clock output of a separate clock 86 is fed over clock conductor path 88 to the timer select clock 90 for purposes to be described. Digressing briefly, it is noted that logic 1 in the words output from the computer are low level signals. With reference to FIG. 9, the manner of connection of data bus 80 to an OTM (such as OTM1, for example) is shown to comprise twelve parallel input paths (bit 0–bit 11) and a thirteenth input path which is connected to the clock path 88. The bit input paths 0-11 are each connected over a separate amplifier, such as 280A-280L, to the decoder circuitry for the OTM. As was indicated earlier, the first three bits of each word provide the OTM address code (three bits are used in the present embodiment which has a total of eight OTM devices). In the binary code, the first OTM1 is identified by bits 000, and accordingly such markings on the first three conductors of the data bus 80 result in high level signals output over amplifiers 280A-280C to OTM selector circuit 281, which as input to AND gate 282 along with the clock pulse fed over amplifier 284 and differentiating circuit 286, results in a low level output signal to amplifier 290, which in turn outputs a high level signal to one input of each of the lamp selection gates 292 and 294.

Digressing briefly, it is noted that the particular connections shown for the OTM selection circuit 281 in FIG. 9 are such that AND gate 282 will output a signal only if the three bits input over bit conductors 0, 1, 2 of data path are low (if any one of the three bits is high, AND gate 282 will not output a marking signal.) It should be understood that the OTM selection circuit 281 in each of the other OTM selection circuits (for units OTM2-OTMN) will each be connected in a different configuration. Thus, the address code in the word address to OTM2 would be 100, and accordingly the output circuit of amplifier 280 would be extended over an inverter in the selection circuit for OTM2 to the second input of its AND gate 282, and all of the inputs for the AND gate 282 in OTM2 would appear high only when the code input on bit inputs 0-2 are 100. The manner in which the other six OTM selection devices are implemented to provide such manner of response only when its particular code is included in the code will be apparent therefrom. Summarized, the first three bits of a word in data bus 80 comprise a discrete address for only one of the OTM's, and the selector circuit 281 at each OTM is implemented to output a circuit only when its assigned address appears as bits 0-2 of the word of data bus 80.

As an OTM selection circuit 281 (FIG. 9) provides an output signal over conductor 282A as the result of detection of its address in a word on data bus 80, the lamp selection gates, such as 294, 292 in only the OTM addressed by the first three bits will be prepared for operation. In the present example, lamp select gates 292, 294 in OTM1 have been so prepared by the marking of one input thereto.

The particular one of the lamp select gates 292 and 294 which is enabled in the OTM1 is determined by the value of bit 3 in the word on data bus 80. That is, as indicated earlier, and shown in FIG. 3, if bit 3 is a logic 1, an incandescent lamp is to be controlled, and if the bit 3 is a logic 0, a Nixie lamp is to be controlled.

Figure 10:
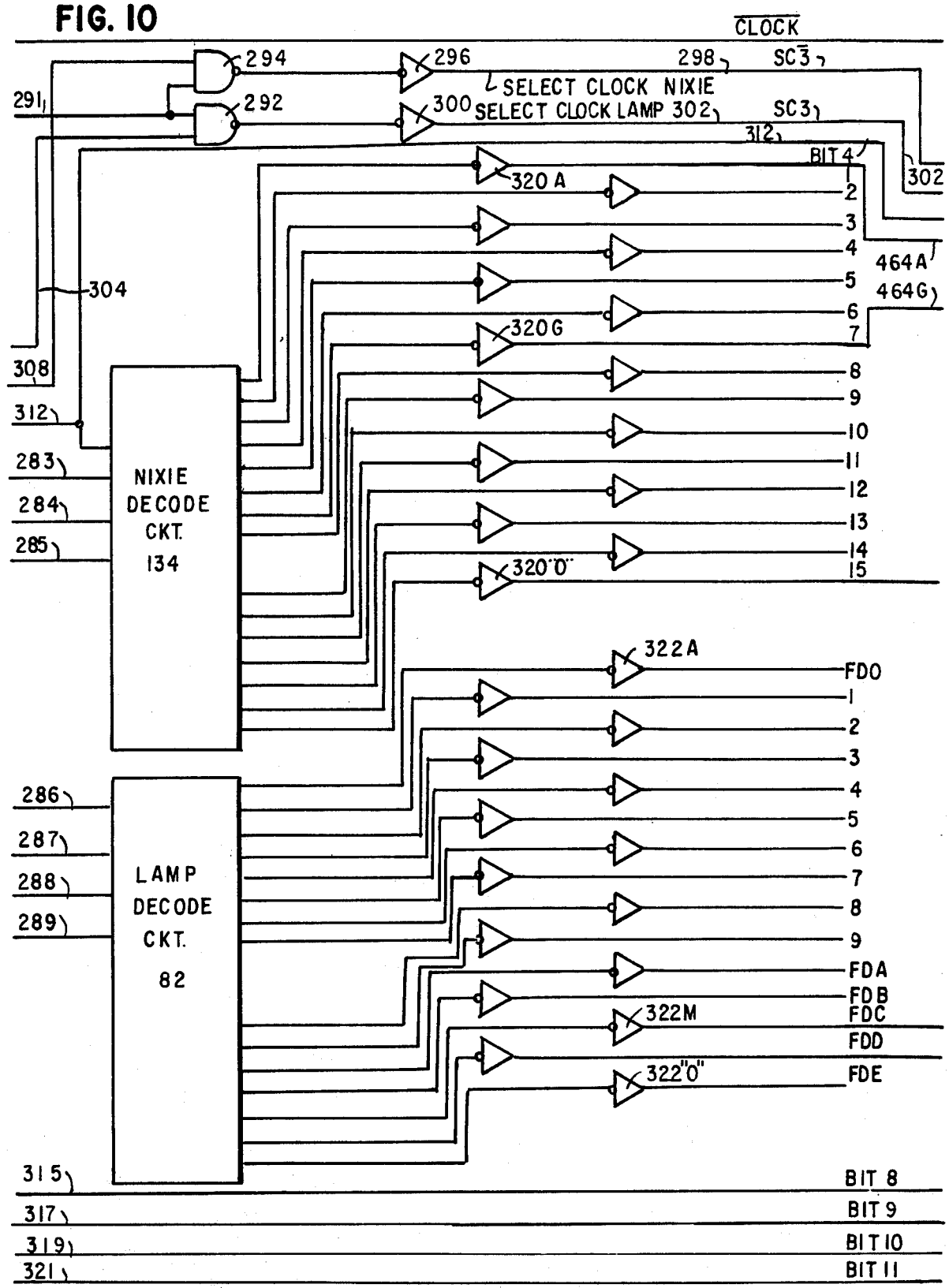
Figure 11:
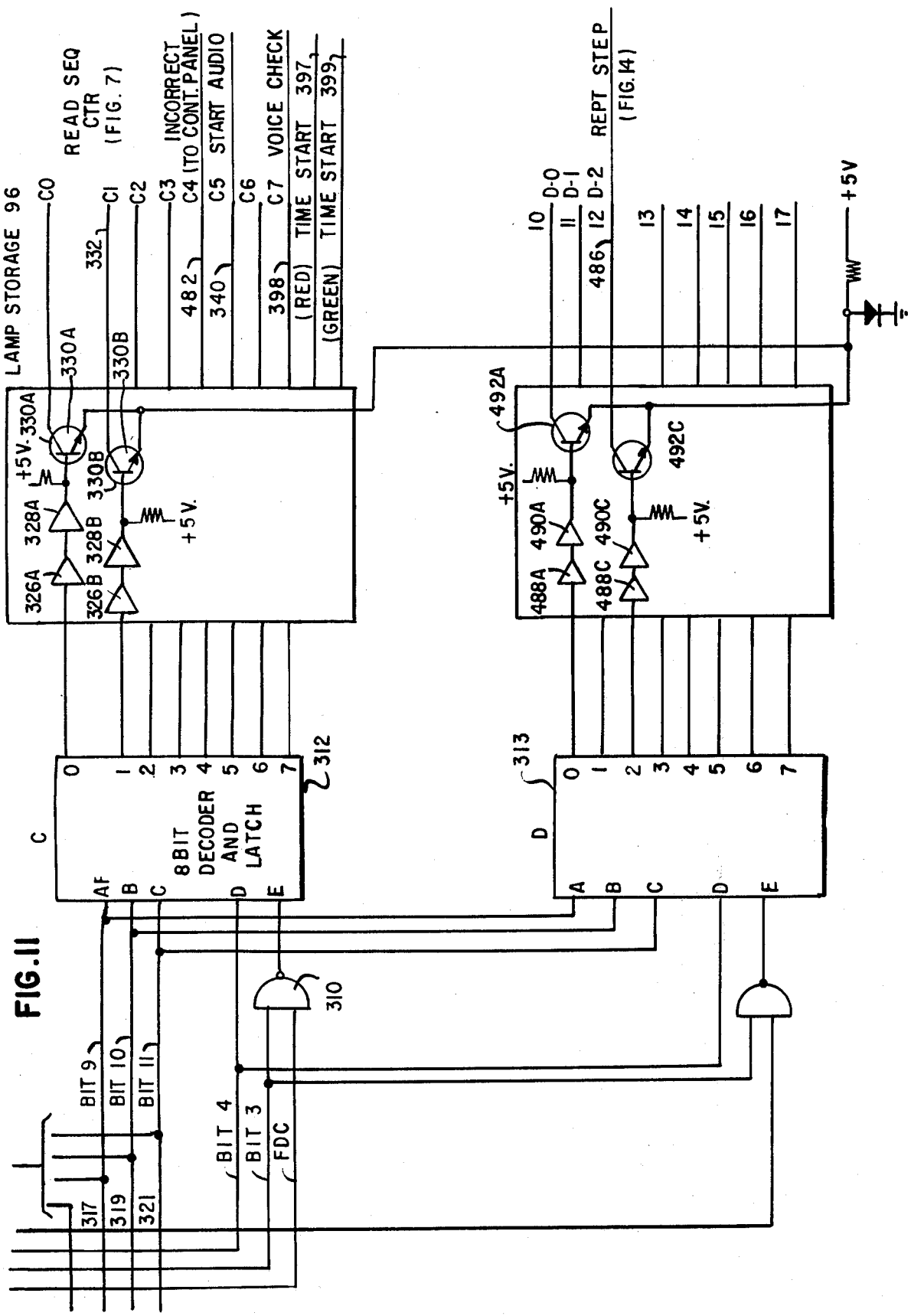
Figure 12:
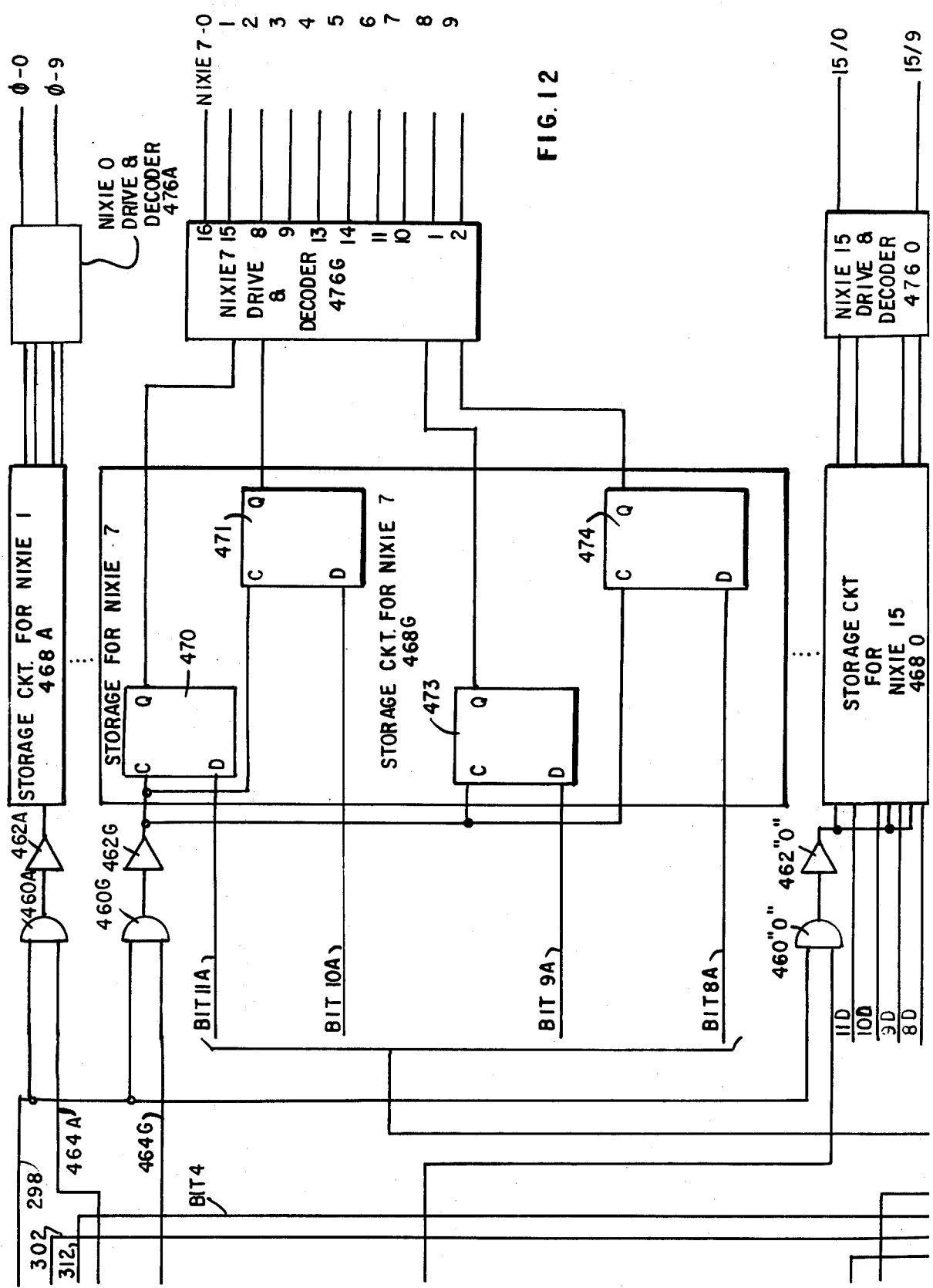

In the present example (sequence counter word 000111100001) bit 3 is a logic 1, and accordingly the output signal of amplifier 280D over path 304 to the second input on gate 292 will be a high level signal, and the signal output of amplifier 280D as fed over inverter 306 is a low signal over path 308 to the second input on gate 294. As a result, only AND gate 292 will be enabled, and gate 294 will be inhibited. The output of AND gate 292 therefore at its output marks the Select Clock Lamp conductor 302 which provides a marking signal for one input of AND gate 310 in lamp storage circuit 96 (FIG. 11). With Nixie select gate 294 (FIG. 10) inhibited the Nixie storage circuits (FIG. 12) will not be prepared for operation.

It will be recalled that bit 4 in each word on data bus 80 is used as an on/off bit whenever an incandescent lamp is to be controlled (i.e., whenever bit 3 is a logic 1). In the present example, bit 4 is a 1, and as a result a high level output is fed by amplifier 280E (FIG. 9) over path 312 (FIGS. 9, 10, 11) to the D input of the eight bit decoder-latch circuit 313, which circuit is commercially available from Fairchild as D9334. When the input of decode-latch circuit 313 is marked by a low level signal, and input D is marked by a high level signal, the decode-latch circuit 313 will provide a decimal output over conductors 4-12 which is determined by the value of the binary markings on the inputs A-C.

It will be recalled that in words in which the control of an incandescent lamp is indicated (bit 3 = logic 1) bits 5-11 are used for address purposes. In the present word, bits 5-8 are 1100 and the inputs to amplifiers 280F-280I (FIG. 9) will be low, low, high, high respectively (i.e., logic 1 signals from computer 50 are low).

The outputs of the amplifiers 280F-280I are fed over conductors 283-285 to the inputs for Nixie Decode Circuits 134 and over conductors 286-289 as inputs to Lamp Decode Circuit 82 as high, high, low, low signals respectively. The Nixie Decode Circuit 134 and the Lamp Decode Circuit 82 are decoders available commercially from Texas Instruments as 74154 devices. In effect, decoders 134, 82 provide binary to hexa-decimal decoding at the output, whereby only one of sixteen output conductors is marked to indicate the value of the signals marked on the four input conductors (bits 5-8). While both decoder circuits 134 and 82 are operated, since bit 3 was a zero in the exemplary word, the circuit is interested only in the output of the Lamp Decode Circuit 82.

The four signals (low, low, high, high respectively) input to Lamp Decode Circuit 82 as a result of word bits 5-8 (1100) will output a low level signal to amplifier 322M and a high level signal over conductor FDC to one input of gate 310. Since the first input of amplifier 310 was marked with a high level signal by reason of bit 3 being a logic 1, gate 310 provides a low level enabling signal to input E of the eight bit decode-latch circuit 313. The decode-latch circuit 313 responsively decodes the bit inputs on bit conductors 9, 10 and 11 (FIG. 9) which have been inverted by amplifier inverters 280I--280L, and fed over contacts 317, 319, 321 (FIGS. 9, 10) to the ABC inputs of decode circuit 313 (FIG. 11). Bits 9-11 of the exemplary word on 001 and the inputs to the ABC terminals are therefore low, low, high respectively. With such input to terminals ABC, the decode-latch circuit 313 outputs a high level signal on conductor 1, which as applied over amplifier 326B, 328B to the base element of transistor 330B, results in a high level signal on output conductor C1 which is connected as a control conductor 332 for the read sequence counter (FIG. 7).

With a high level input signal over conductor 332 to AND gate 334 (FIG. 7), a low level signal is output over conductor 336, and amplifier inverter outputs a high level signal over conductor 340 to mark one input to each of the lesson counter readout gates 341-348 with a high level signal (FIG. 5). In the present example, it will be recalled that the trainee via switches 32, 34, 36 on control panel 17 selected lesson 013. As a result counter 178 marks the second input of gates 341, 342 with logic 0, counter 168 marks the second inputs of the audio tape cassette 105, whereby the tape cassette stops.

Keying Of First Digit Of Guest Number By Trainee

At this time, the trainee is expected to key pulse the room number 26 into the system. In that the particular system used in the field requires the input of a four digit number for each room number, the trainee now uses the key pad 28 (FIGS. 1,2,6) to key pulse the digit 0026 into the system. With reference to FIG. 6 the key pad 28 is seen to comprise seven switches which are operated in various combinations by the ten keys 28 on the board. More specifically, the contacts A-G associated with the ten keys are operated in various combinations to provide signal outputs over conductors according to the path shown in the key code table below.

TABLE I

KEY PAD DECODE TABLE

| Closure Keys | 422 A | 424 B | 426 C | 428 D | 430 E | 432 F | 434 G | Path No. |
|---|---|---|---|---|---|---|---|---|
| 0 | 1 | 0 | 0 | 0 | 0 | 0 | 0 | 456 |
| 1 | 0 | 1 | 1 | 0 | 0 | 0 | 0 | 438 |
| 2 | 0 | 1 | 0 | 1 | 0 | 0 | 0 | 440 |
| 3 | 0 | 0 | 0 | 0 | 1 | 0 | 0 | 442 |
| 4 | 0 | 1 | 0 | 0 | 0 | 1 | 0 | 444 |
| 5 | 0 | 0 | 1 | 0 | 0 | 1 | 0 | 446 |
| 6 | 0 | 0 | 0 | 1 | 0 | 1 | 0 | 448 |
| 7 | 0 | 1 | 0 | 0 | 0 | 0 | 1 | 450 |
| 8 | 0 | 0 | 1 | 0 | 0 | 0 | 1 | 452 |
| 9 | 0 | 0 | 1 | 0 | 0 | 0 | 1 | 454 |

By way of brief explanation of key pad 28, as the operator depresses key zero to enter the first digit of the guest room number, the A key closes to provide a ground signal over conductor 422 to decoder 436. The decoder 436 comprises a series of AND gates connected in the manner indicated by the truth table above to provide a signal output over Key Zero lead 456 which has been assigned the code 0001010 and which is therefore connected to bit gates 195 and 197 (FIG. 6). As the bit gates 192-198 are thus loaded, the OTM output circuit 124 and input gate circuit 128 operate in the manner previously described to output the Key Zero word (0001010) over path 130 to gate 55 on interface 56 for pickup by the digital computer 50.

Display of First Digit on Board

With reference to FIG. 4, line 6, it will be seen that the Nixie lamps 29 (FIG. 2) will momentarily display the digits which are being keyed by the trainee for the purpose of reporting the room number of the guest (0026 in the present example). As the computer 50 receives the word from the OTM1 module indicating that the trainee has keyed the first digit 0, computer 50 outputs the word 000001100000. As earlier described, the first three digits are the OTM address code (000 representing the OTM1 in the system) and when the third bit is a zero the bit indicates that a Nixie lamp is to be selected. In addition, when the third bit is 0, the bits 4-7 are used as the address of the "bin" or the particular Nixie of the set which is to be selected (in this case, the first Nixie tube in the group 29—FIG. 2), and bits 8-11 are used to indicate the value to be displayed by the selected one of the Nixie tubes.

In the present example, the word output by computer 50 over data bus 80 indicates that the first Nixie tube of the four tubes 29 is to be controlled to display a 0 digit. As will be shown, the Nixie decode circuit 134 in OTM1 operates to provide an output signal which effects display of the 0 digit on the first Nixie tube.

More specifically, with reference to FIG. 9, the first three bits 000 of the word are input over amplifiers 280A-280C and decoded by the OTM selection circuit 281. Since the first three bits are 000, the OTM selection circuit 281 for only the OTM1 circuit will enable its associated selection gate 282 to prepare the Lamp and Nixie selection gates 292, 294 for operation. Since the fourth bit is a zero (i.e., bit 3 of the word) the low level signal input over amplifier 280D, inverter 306 and conductor 308 will result in the enablement of selection gate 294 which outputs a signal over inverter amplifier 296 and Select Nixie path 298 to the select gates 460A-460G for each of the Nixie Selection Circuits 468A-468O to prepare the same for enablement.

With reference once more to the word which is input over data bus 80 (FIG. 9) it will be recalled that the bits 4-7 identify the particular Nixie tube on the board which is to be selected for illumination (in this case Nixie Tube 7 of group 29), and accordingly the bits 4-7 of the input word are 0110 respectively. Such signals are input over inverter amplifiers 280E-280H to the Nixie Decode Circuit 134, which is a 4 to 16 decoder of the type commercially available from Texas Instruments as 74154, and the input signals 0110 result in a signal output over amplifier 320G and path 464G to a second input for select gate 460G. The select AND gate 460G for the seventh Nixie tube now gates a low level signal over amplifier 462G to the storage circuit 468G for Nixie tube 7.

The storage circuit 468G, as shown, comprises a quad latch which includes four flip-flops, which may be of the type commercially available from Texas Instruments as 7475 devices, each of which is connected to store a different one of the bits input over bit 8- bit 11 conductors respectively. Briefly summarized, each Nixie tube has a similar storage circuit, but only the storage circuit associated with the particular Nixie tube identified by bits 4-7 will be enbled for the purpose of decoding the particular digit which is identified by the bits 8-11 in the word input over data bus 80.

In the present example in which Nixie tube 7 is to display the digit 0, the inputs over bit conductors 8, 9, 10 and 11 will be zeros respectively, and accordingly the Q outputs of the four latch circuits 470-474 will be 0, and the Nixie driver and decoder circuit 476G (commercially available as a 7441 unit) for the storage circuit 468G outputs a signal on the Nixie "zero" conductor for the first Nixie tube of the set 29 to enable the same to display a 0.

Keying Of Second To Fourth Digits of Guest Room Number

In like manner, as the trainee depresses the key "zero" on the key pad 28 (FIGS. 2, 6) a second time, the same Key Zero code word 0001010 is provided by the circuitry to the computer 50, and the computer responsively outputs the word 000001110000 and bits 0-7 results in the selection of the OTM1 circuit and the selection of the eighth Nixie tube and bits 8-11 cause the display of digits zero on the eighth Nixie tube.

As the trainee now depresses key 2 (FIGS. 2 and 6) in the keyset 28, switches B, D of the key pad (FIG. 6) are operated and ground signals over conductors 424, 428 to decoder circuit 436 result in a signal output over "Key 2" conductor 440. Key 2 conductor 440 is connected to bit gate 197 in the word format circuit 191, and accordingly the code word 0000010 for Key 2 is output by the OTM output circuit 124 to the computer in the manner heretofore described.

Computer 50 respectively generates the word 000010000010, which bits 0-2 (000) result in the selection of the OTM1 unit, bit 3 (0) prepares the selection circuit for the Nixie tubes and bits 4-7 (1000) result in selection of Nixie tube 9 (the third tube of group 29) and bits 8-11 (0010) enable the display of digit 2 on the selected Nixie tube.

The trainee now depresses key 6 (FIGS. 2, 6) in key pad 29 which as shown by the truth table results in the operation of switches D, F (FIG. 6) and the output of signals over conductors 428, 432, to decoder 436, whereby a signal is output over Key 6 conductor 448 which is connected to word-forming bit gates 196, 197 to cause the OTM output circuit 124 to output the Key 6 code word 0000110 to the computer in the manner previously described.

Computer 50 thereupon generates and outputs the code word 000010010110 to effect display of digit 6 in the Nixie tube 10. The Nixie decode circuit 134 (FIG. 10 in OTM1 responds to such word by providing a signal output over path 10-6 of the decoder circuit 476J (not shown) and thereby the energization and display of digit 6 on the fourth Nixie tube of the group 29.

After one-half second, the computer program generates four successive words for the purpose of effecting turnoff of the enerized ones of the Nixie tubes. Bits 0-7 of each of the four words now sent will be the same as those which were transmitted for the purpose of turning on the four Nixie tubes. However, bits 8-11 for each of the four words will now be 1100 which is a turnoff code for energized ones of the Nixie decoder circuit 476 (in this example 476G,H,I and J).

The computer 50 at this time further outputs the words for extinguishing the KP lamp 27 and KPGST lamps 20. The KP (green) code word 000101000010 and the KPGST code word 000100010111, are output successively over the data bus 80, and the lamp decode circuit 82 (FIG. 10) in the OTM1 module only decodes the same and via path 98 enables lamp storage circuit 96 (FIG. 11) to turn off the lamps 20, 27 in the manner of control previously described.

Trainee Depresses Time-Start Key

As the KP and KPGST lamps go dark, the training program requires the trainee to depress the time start key 26 (FIGS. 2 and 6) within a predetermined measured time period. As the trainee depresses time start key 26 (FIG. 6) ground is applied over conductor 480 which is connected to bit gates 193, 195 in the word format circuit 191 to cause the OTM1 output circuit 124 to output the time start code 0101000 to the computer 50.

a. Trainee Delay in Response

In the event that the trainee does not depress the key 26 within a predeterined programmed time (i.e., code word 0101000 is not received within a given time interval after the codes which were transmitted to turn off the KP and KPGST lamps) computer 50 will generate an incorrect code signal (000111100100) to effect the illumination of the incorrect lamp 46 on the control panel 17. More specifically, the computer outputs the "incorrect" word 000111100100 over data bus 80, the lamp decode circuit 82 (FIGS. 9, 10) in the OTM1 only decodes such word, and causes lamp storage circuit 96 (FIG. 11) to output a signal over conductor 482 in the manner previously described and path 83 (FIG. 1) to illuminate incorrect lamp 46 (FIG. 2A) on the control panel 17.

In addition to illuminating the incorrect lamp 46, computer 50 also interrupts its normal program and shifts to an error routine for the purpose of causing the computer program to back up to the beginning of the step in which the error occurred, and simultaneously provides a signal to cause the audio tape unit 105 to back up the tape to the beginning of the corresponding step.

More specifically, computer 50 outputs the back audio step word (000111101011) over the data bus 80, and lamp decode circuit 82 (FIGS. 9, 10) in OTM1 only decodes such word and causes lamp storage circuit 96 (FIG. 11) to output a signal over "Repeat Step" conductor 486 (path 102—FIG. 1). The signal over repeat step conductor 486 is input to the audio tape control circuit 103 (FIG. 14) and over OR gate 342 and amplifier 344, OR gate 346 and transistor 348 to the Run conductor 349 as in the previous example. In addition, the same signal input over conductor 486 is fed over conductor 488 to an input on OR gate 490 and over output path 492 and amplifier 494 to the "Mute" output conductor 496 which is connected to the muting equipment on the audio tape unit 105.

The same input signal on conductor 486 is also input over conductor 498 and over OR gate 500 to the 0.3 second multivibrator 502 and also to one input of AND gate 504. The output of the multivibrator 502 as extended over output 506 acts as an inhibit to the operation of the AND gate 504 until such time as a 0.3 second interval has expired. With the expiration of such interval, the high level signal on conductor 506 causes AND gate 504 to be enabled, and the output thereof is fed to the inverter amplifier 508 and a first input on AND gate 510. The second input to AND gate 510 is connected to the output of the Stop On Tone gating circuit 512 which does not provide an inhibit signal at this time. The output of AND gate 510 is fed to an input on OR gate 514 and also to an inverter amplifier 516, the output of which is connected to one input on OR gate 518. The second inputs of OR gates 514, 518 are connected respectively over conductors 520 and 522 to terminals on the audio tape unit 105 which indicate the direction of travel of the tape as forward or reverse respectively. The Panasonic Audio Tape Unit Model No. 272S used as unit 105 in one embodiment includes such sensing terminals.

The outputs of OR gates 514, 518 thus effectively indicate to the system the particular direction that the tape unit is operating at any given time. The output of gates 514, 518 is fed over OR gate 524 to amplifier 526 and conductor 528 which is connected to the Reverse terminal of the audio tape unit 105. Diode 530 connected in the emitter circuit of amplifier 526 insures that the base of the transistor will be more negative than the emitter when a control signal is input to any of the three transistors 248, 494 and 526.

With application of the reverse signal to the audio tape unit 105, the direction of travel is tape reversed until the starting point of the step in which the error occurred is reached. The start of each step on the audio tape is marked with a 270 Hz tone and the end of each step is marked with 2700 Hz tone. In the present example, the step started with the audio output "26, Please" by the audio cassette to the trainee. It is now necessary therefore to back up the tape to the point at which said the audio tape cassette 105, whereby the tape cassette stops.

Keying Of First Digit Of Guest Number By Trainee

At this time, the trainee is expected to key pulse the room number 26 into the system. In that the particular system used in the field requires the input of a four digit number for each room number, the trainee now uses the key pad 28 (FIGS. 1,2,6) to key pulse the digit 0026 into the system. With reference to FIG. 6 the key pad 28 is seen to comprise seven switches which are operated in various combinations by the ten keys 28 on the board. More specifically, the contacts A-G associated with the ten keys are operated in various combinations to provide signal outputs over conductors according to the path shown in the key code table below.

TABLE I

KEY PAD DECODE TABLE

| Closure Keys | 422 A | 424 B | 426 C | 428 D | 430 E | 432 F | 434 G | Path No. |
|---|---|---|---|---|---|---|---|---|
| 0 | 1 | 0 | 0 | 0 | 0 | 0 | 0 | 456 |
| 1 | 0 | 1 | 1 | 0 | 0 | 0 | 0 | 438 |
| 2 | 0 | 1 | 0 | 1 | 0 | 0 | 0 | 440 |
| 3 | 0 | 0 | 0 | 0 | 1 | 0 | 0 | 442 |
| 4 | 0 | 1 | 0 | 0 | 0 | 1 | 0 | 444 |
| 5 | 0 | 0 | 1 | 0 | 0 | 1 | 0 | 446 |
| 6 | 0 | 0 | 0 | 1 | 0 | 1 | 0 | 448 |
| 7 | 0 | 1 | 0 | 0 | 0 | 0 | 1 | 450 |
| 8 | 0 | 0 | 1 | 0 | 0 | 0 | 1 | 452 |
| 9 | 0 | 0 | 1 | 0 | 0 | 0 | 1 | 454 |

By way of brief explanation of key pad 28, as the operator depresses key zero to enter the first digit of the guest room number, the A key closes to provide a ground signal over conductor 422 to decoder 436. The decoder 436 comprises a series of AND gates connected in the manner indicated by the truth table above to provide a signal output over Key Zero lead 456 which has been assigned the code 0001010 and which is therefore connected to bit gates 195 and 197 (FIG. 6). As the bit gates 192-198 are thus loaded, the OTM output circuit 124 and input gate circuit 128 operate in the manner previously described to output the Key Zero word (0001010) over path 130 to gate 55 on interface 56 for pickup by the digital computer 50.

Display of First Digit on Board

With reference to FIG. 4, line 6, it will be seen that the Nixie lamps 29 (FIG. 2) will momentarily display the digits which are being keyed by the trainee for the purpose of reporting the room number of the guest (0026 in the present example). As the computer 50 receives the word from the OTM1 module indicating that the trainee has keyed the first digit 0, computer 50 outputs the word 000001100000. As earlier described, the first three digits are the OTM address code (000 representing the OTM1 in the system) and when the third bit is a zero the bit indicates that a Nixie lamp is to be selected. In addition, when the third bit is 0, the bits 4-7 are used as the address of the "bin" or the particular Nixie of the set which is to be selected (in this case, the first Nixie tube in the group 29—FIG. 2), and bits 8-11 are used to indicate the value to be displayed by the selected one of the Nixie tubes.

In the present example, the word output by computer 50 over data bus 80 indicates that the first Nixie tube of the four tubes 29 is to be controlled to display a 0 digit. As will be shown, the Nixie decode circuit 134 in OTM1 operates to provide an output signal which effects display of the 0 digit on the first Nixie tube.

More specifically, with reference to FIG. 9, the first three bits 000 of the word are input over amplifiers 280A-280C and decoded by the OTM selection circuit 281. Since the first three bits are 000, the OTM selection circuit 281 for only the OTM1 circuit will enable its associated selection gate 282 to prepare the Lamp and Nixie selection gates 292, 294 for operation. Since the fourth bit is a zero (i.e., bit 3 of the word) the low level signal input over amplifier 280D, inverter 306 and conductor 308 will result in the enablement of selection gate 294 which outputs a signal over inverter amplifier 296 and Select Nixie path 298 to the select gates 460A-460G for each of the Nixie Selection Circuits 468A-468O to prepare the same for enablement.

With reference once more to the word which is input over data bus 80 (FIG. 9) it will be recalled that the bits 4-7 identify the particular Nixie tube on the board which is to be selected for illumination (in this case Nixie Tube 7 of group 29), and accordingly the bits 4-7 of the input word are 0110 respectively. Such signals are input over inverter amplifiers 280E-280H to the Nixie Decode Circuit 134, which is a 4 to 16 decoder of the type commercially available from Texas Instruments as 74154, and the input signals 0110 result in a signal output over amplifier 320G and path 464G to a second input for select gate 460G. The select AND gate 460G for the seventh Nixie tube now gates a low level signal over amplifier 462G to the storage circuit 468G for Nixie tube 7.

The storage circuit 468G, as shown, comprises a quad latch which includes four flip-flops, which may be of the type commercially available from Texas Instruments as 7475 devices, each of which is connected to store a different one of the bits input over bit 8- bit 11 conductors respectively. Briefly summarized, each Nixie tube has a similar storage circuit, but only the storage circuit associated with the particular Nixie tube identified by bits 4-7 will be enbled for the purpose of decoding the particular digit which is identified by the bits 8-11 in the word input over data bus 80.

In the present example in which Nixie tube 7 is to display the digit 0, the inputs over bit conductors 8, 9, 10 and 11 will be zeros respectively, and accordingly the Q outputs of the four latch circuits 470-474 will be 0, and the Nixie driver and decoder circuit 476G (commercially available as a 7441 unit) for the storage circuit 468G outputs a signal on the Nixie "zero" conductor for the first Nixie tube of the set 29 to enable the same to display a 0.

Keying Of Second To Fourth Digits of Guest Room Number

In like manner, as the trainee depresses the key "zero" on the key pad 28 (FIGS. 2, 6) a second time, the same Key Zero code word 0001010 is provided by the circuitry to the computer 50, and the computer responsively outputs the word 000001110000 and bits 0-7 results in the selection of the OTM1 circuit and the selection of the eighth Nixie tube and bits 8-11 cause the display of digits zero on the eighth Nixie tube.

As the trainee now depresses key 2 (FIGS. 2 and 6) in the keyset 28, switches B, D of the key pad (FIG. 6) are operated and ground signals over conductors 424, 428 to decoder circuit 436 result in a signal output over "Key 2" conductor 440. Key 2 conductor 440 is connected to bit gate 197 in the word format circuit 191, and accordingly the code word 0000010 for Key 2 is output by the OTM output circuit 124 to the computer in the manner heretofore described.

Computer 50 respectively generates the word 000010000010, which bits 0-2 (000) result in the selection of the OTM1 unit, bit 3 (0) prepares the selection circuit for the Nixie tubes and bits 4-7 (1000) result in selection of Nixie tube 9 (the third tube of group 29) and bits 8-11 (0010) enable the display of digit 2 on the selected Nixie tube.

The trainee now depresses key 6 (FIGS. 2, 6) in key pad 29 which as shown by the truth table results in the operation of switches D, F (FIG. 6) and the output of signals over conductors 428, 432, to decoder 436, whereby a signal is output over Key 6 conductor 448 which is connected to word-forming bit gates 196, 197 to cause the OTM output circuit 124 to output the Key 6 code word 0000110 to the computer in the manner previously described.

Computer 50 thereupon generates and outputs the code word 000010010110 to effect display of digit 6 in the Nixie tube 10. The Nixie decode circuit 134 (FIG. 10 in OTM1 responds to such word by providing a signal output over path 10-6 of the decoder circuit 476J (not shown) and thereby the energization and display of digit 6 on the fourth Nixie tube of the group 29.

After one-half second, the computer program generates four successive words for the purpose of effecting turnoff of the enerized ones of the Nixie tubes. Bits 0-7 of each of the four words now sent will be the same as those which were transmitted for the purpose of turning on the four Nixie tubes. However, bits 8-11 for each of the four words will now be 1100 which is a turnoff code for energized ones of the Nixie decoder circuit 476 (in this example 476G,H,I and J).

The computer 50 at this time further outputs the words for extinguishing the KP lamp 27 and KPGST lamps 20. The KP (green) code word 000101000010 and the KPGST code word 000100010111, are output successively over the data bus 80, and the lamp decode circuit 82 (FIG. 10) in the OTM1 module only decodes the same and via path 98 enables lamp storage circuit 96 (FIG. 11) to turn off the lamps 20, 27 in the manner of control previously described.

Trainee Depresses Time-Start Key

As the KP and KPGST lamps go dark, the training program requires the trainee to depress the time start key 26 (FIGS. 2 and 6) within a predetermined measured time period. As the trainee depresses time start key 26 (FIG. 6) ground is applied over conductor 480 which is connected to bit gates 193, 195 in the word format circuit 191 to cause the OTM1 output circuit 124 to output the time start code 0101000 to the computer 50.

a. Trainee Delay in Response

In the event that the trainee does not depress the key 26 within a predeterined programmed time (i.e., code word 0101000 is not received within a given time interval after the codes which were transmitted to turn off the KP and KPGST lamps) computer 50 will generate an incorrect code signal (000111100100) to effect the illumination of the incorrect lamp 46 on the control panel 17. More specifically, the computer outputs the "incorrect" word 000111100100 over data bus 80, the lamp decode circuit 82 (FIGS. 9, 10) in the OTM1 only decodes such word, and causes lamp storage circuit 96 (FIG. 11) to output a signal over conductor 482 in the manner previously described and path 83 (FIG. 1) to illuminate incorrect lamp 46 (FIG. 2A) on the control panel 17.

In addition to illuminating the incorrect lamp 46, computer 50 also interrupts its normal program and shifts to an error routine for the purpose of causing the computer program to back up to the beginning of the step in which the error occurred, and simultaneously provides a signal to cause the audio tape unit 105 to back up the tape to the beginning of the corresponding step.

More specifically, computer 50 outputs the back audio step word (000111101011) over the data bus 80, and lamp decode circuit 82 (FIGS. 9, 10) in OTM1 only decodes such word and causes lamp storage circuit 96 (FIG. 11) to output a signal over "Repeat Step" conductor 486 (path 102—FIG. 1). The signal over repeat step conductor 486 is input to the audio tape control circuit 103 (FIG. 14) and over OR gate 342 and amplifier 344, OR gate 346 and transistor 348 to the Run conductor 349 as in the previous example. In addition, the same signal input over conductor 486 is fed over conductor 488 to an input on OR gate 490 and over output path 492 and amplifier 494 to the "Mute" output conductor 496 which is connected to the muting equipment on the audio tape unit 105.

The same input signal on conductor 486 is also input over conductor 498 and over OR gate 500 to the 0.3 second multivibrator 502 and also to one input of AND gate 504. The output of the multivibrator 502 as extended over output 506 acts as an inhibit to the operation of the AND gate 504 until such time as a 0.3 second interval has expired. With the expiration of such interval, the high level signal on conductor 506 causes AND gate 504 to be enabled, and the output thereof is fed to the inverter amplifier 508 and a first input on AND gate 510. The second input to AND gate 510 is connected to the output of the Stop On Tone gating circuit 512 which does not provide an inhibit signal at this time. The output of AND gate 510 is fed to an input on OR gate 514 and also to an inverter amplifier 516, the output of which is connected to one input on OR gate 518. The second inputs of OR gates 514, 518 are connected respectively over conductors 520 and 522 to terminals on the audio tape unit 105 which indicate the direction of travel of the tape as forward or reverse respectively. The Panasonic Audio Tape Unit Model No. 272S used as unit 105 in one embodiment includes such sensing terminals.

The outputs of OR gates 514, 518 thus effectively indicate to the system the particular direction that the tape unit is operating at any given time. The output of gates 514, 518 is fed over OR gate 524 to amplifier 526 and conductor 528 which is connected to the Reverse terminal of the audio tape unit 105. Diode 530 connected in the emitter circuit of amplifier 526 insures that the base of the transistor will be more negative than the emitter when a control signal is input to any of the three transistors 248, 494 and 526.

With application of the reverse signal to the audio tape unit 105, the direction of travel is tape reversed until the starting point of the step in which the error occurred is reached. The start of each step on the audio tape is marked with a 270 Hz tone and the end of each step is marked with 2700 Hz tone. In the present example, the step started with the audio output "26, Please" by the audio cassette to the trainee. It is now necessary therefore to back up the tape to the point at which said audio output will be repeated to the trainee. As the tape rewinds to the point at which the 270 Hz tone indicating the beginning of the step is detected, such tone is output over the recorder head of the tape unit 105 and fed over path 107 to the input of the audio tape control circuit 103 (FIG. 13) which signal being a 270 hertz signal passes over filter 356, and the path as previously described to enable latch reset 368 to output a control signal over step tone conductor 370 and amplifier 371 and Step Tone gate 372, amplifier 378, AND gate 380, and amplifier 386 to Stop on Step Tone conductor 420. Such signal via path 109 results in an output signal for interface 108 over 110 to the computer indicating that the tape is in a position to be stopped. It is noted at this time that since only three words are required from the audio tape control circuit 103 to the computer 50, the circuitry in interface 109 is hardwired in known manner to provide such word (and the two other words "Stop On Call Tone" and "Stop On Lesson Tone") as the corresponding conductor is energized.

Computer 50 responds to the receipt of the Stop on Step Tone word by outputting a tape stop word, and specifically by changing bit 4 of the back audio step word (which was previously output to run the tape in the reverse direction) from a logic 1 to logic 0. Such word is decoded by the lamp decode circuit 82 (FIGS. 9 and 10) in OTM1 only which enables lamp storage circuit 96 to remove the signal from Repeat Step conductor 486 to the audio tape control circuit 103 and thereby stop of the reverse operation of the audio tape unit 105. With the interruption of the signal on Repeat Step conductor 486 the enabling signal on Mute lead force 96 (FIG. 14) and the reverse signal on conductor 528 are also interrupted.

It is noted that as the tape reversed to place the system in a condition to repeat the step, the Step On Tone circuit 512 which has a first set of inputs connected to the repeat call conductor 485, repeat step conductor 486, and repeat lesson conductor 487, and a second set of inputs connected via amplifiers 371, 373 to call tone and step tone paths 541 and 370, respectively, is gated to insure that an output signal occurs from a Stop On Tone gating circuit 512 only when a tone is being detected. It is apparent that with the control of the system such that the tape can only stop at the point of detection of the tone, the possibility of out of in sync condition is significantly minimized.

The output of the Stop On Tone gating circuit 572 is fed to AND circuit 352 which has a second input connected to a two second output signal on multivibrator 350. AND circuit 352 enables a 0.3 millisecond multivibrator in the provision of a second input to the OR gate 346 to insure that the run conductor 349 will be enabled until such time as tone is reached even though the request for the enabling signal on the run device input over OR gate 342 should be prematurely terminated. The output of the multivibrator 353 also insures that the tape is always moving in the forward direction at the time of a stop.

The Stop-OK signal output of multivibrator 353 is also ANDED by gate 588 with the "Tone Present" output of gating circuit 512 and the run signal of OR gate 346 and the resultant signal is fed over conductor 590 to latch 600 (FIG. 7) which outputs a signal over conductor 382 as an enable signal for the call tone and step tone gates 546 and 380 and lesson tone gate 576 (FIG. 14). Such circuit prevents against the application of a stop signal indication to the computer 50 at a time other than when the tone is actually being detected.

When the computer 50 receives a signal over path 420, 550 or 580, the interface 108 generates an OTM reset signal which is transmitted back over path 602 (FIG. 7) and inverter amplifier 604 to one input of AND gate 606 which has its second input connected to the output of latch 600. An output signal is thus provided to the multivibrator 608, and after 500 milliseconds, the output of multivibrator 608 effects the reset of latch 600.

The output of the multivibrator 608 is also extended over tone reset conductor 610 to OR gate 612 (FIG. 13) and latch reset circuits 368 and 540 in the step tone and call tone channels. The latch reset circuits 368 and 540 also have an alternative reset which is applied at their output circuits respectively over conductors 614 and 616 to a 0.5 second multivibrator 618 which, after 0.5 seconds, outputs a signal over differentiating circuit 620 to a second input on gate 612 and thereby insures reset within a given time period.

b. Trainee Provides Proper Response in Allotted Time

As the step is now repeated, the trainee responds and assuming that the proper response is received in the allotted time period, computer 56 will provide a word output over data bus 80 to change the time start lamp 26 to the green light condition. Such operation requires that the computer provide a first output word for the purpose of turning off the red time start lamp, and immediately thereafter a second output word for causing the time start lamp to be illuminated green.

Briefly, the computer 50 first transmits the "Turnoff Red" code word 000100111100 for the red time start lamp over data bus 80 and lamp decode circuit 82 (FIGS. 9, 10) in OTM1 enable lamp storage 96, 98 to cause turnoff of the red lamp on time start key 26 via conductor 397. Immediately thereafter the computer 50 sends out the "Turn on Green" time start lamp code word (000110111101), and the circuitry operates in a similar manner to provide an enabling signal over conductor 399 to effect the turn on of the green lamp in time start key 26.

One Ring Generation For Operator Headset

Computer 50 after a brief interval now outputs word 000111100101 over data bus 80 for the purpose of turning on the audio and effecting the output of one ring to the operator headset. Loop decoder circuit 82 (FIGS. 9 and 10) in OTM1 decodes the word and enables lamp storage 96 (FIG. 11) to provide an output signal over Start Audio conductor 340 as before to Audio Tape Control Circuit (FIG. 14) which responsively applies an enable signal to Run conductor 349 and the audio tape unit 105. As the tape advances, the ring tone recorded on the tape is output over path 112 to the headset of the operator 114, and also over path 107 to the input of the audio tape control circuit 103 (FIG. 13) which operates in the manner described before. Since the one ring is the terminating step of the call, the call tone on the tape will be a 2700 hertz signal. As such signal is fed over conductor 107, filter 354 passes such signal over conductor 532 to amplifier 534. The signal output of amplifier 534 is rectified by rectifier 536 and fed to transistor 538 and latch reset 540. Latch reset circuit 540 operates in the manner of latch reset circuit 368 to output a signal over call tone conductor 541 and over inverter amplifier 373 to call tone AND gate 542, which outputs a signal over amplifier 544 and one input of AND gate 546, which not being inhibited at this time, passes the signal over inverter amplifier 548 and Stop on Call tone conductor 550 to the interface 108 which responsively outputs a signal to the digital computer 50 indicating the tape may be stopped as a result of a call tone detection.

The computer 50 responsively changes the bit 4 of the original Start Audio code word from logic 1 to logic 0 (i.e., the code word is now changed to 000101100101) and the OTM1 lamp decoder and storage circuits 82, 96 (FIGS. 9-11) operate in the manner described to remove the signal from conductor 340 to terminate the advance of the tape by the audio tape unit 105.

Trainee Depresses POS RLS Key 30

At this point in the call (FIG. 4, line 9) the trainee is required to depress the position release key 30 for the purpose of releasing the call. With reference to FIG. 6, the position release key 30 as operated applies ground over conductor 552 to bit gates 193, 195, 197 to provide Position Release code word 0101010 output by OTM output circuit 124 to the computer 50.

With the receipt of such word, computer 50 successively generates calling area code 0001000000000, the hotel station code 00010010100, station paid code 000100100111, the T and C code 000100100100, the CDL code (loop 1) 000101001011, the ACS code (loop 1) 000101011001, and time start code 000100111100. Such codes as transmitted over the data bus 80 are detected at the lamp decode circuit 82 of the OTM1 unit which responsively causes lamp storage circuit 96 to turn off such lamps. At this time, one training call for a hoel + station paid call has been completed. As indicated above, each lesson includes a plurality of such calls which vary in the manner of calls received on a toll service board in the field to thereby provide the trainee with increased exposure during the training period.

Alternate Action Keys

Certain of the keys, such as the SR key 17 (FIGS. 2 and 6) on the TSD board are alternate action or on-off keys; that is, when the key is depressed it stays in the depressed condition, and when moved to the outward position, it remains in such position. The operation of such keys, i.e., the time of opening and the time of closing, is necessarily detected to provide proper indications of the condition of the keys to the system. Accordingly, each such key such as SR (FIG. 6) includes a resistor 554 connected to +5 volt battery and over amplifier 556, and differentiator 560 to one input of OR gate 562, and also over differentiator circuit 558 to the second input on OR gate 562. The output of OR gate 562 is connected over amplifier inverter 564 to a latch storage circuit 556 which is commercially available as a TTL-7400. The output of the latch storage circuit 566 changes in accordance with the condition of the associated one of the alternate action keys. That is, when the key such as SR is closed, the differentiating circuit 558 provides a pulse over OR gate 562 and amplifier to the latch storage circuit 566, which causes the latch circuit 566 to latch and provide a low level output signal over conductor 568. The output of amplifier 564 is also connected over OR gate 570 to the input of a 30 ms. multivibrator 572 and a differentiating circuit 574 to provide a reset signal for the latch storage circuit 566 after the expiration of a 30 ms. period.

When the key switch SR is opened, the pulse output over amplifier 556 and differentiating circuit 558 results in a pulse over OR gate 562 of amplifier 564 to the latch storage circuit 566 which latches and provides a low level signal over conductor 568 for the period of 30 ms. at which time the reset circuit including OR gate 570, multivibrator 522 and differentiator circuit 574 are operative to reset the latch 566.

The output of each alternating action key, such as SR, is connected to the bit gate word format circuit 191 to provide correspondingly different code words. The SR switch, for example, with each operation (as closed or opened) is completed to gate 192 only and accordingly will effect output of code word 1000000 to the computer 50.

Lesson Tone

The start of each tape used with the audio tape unit 105 has dual tone signals recorded thereon which are comprised of the 2700 htz and 270 htz signals (the call and step tone frequencies) for the purpose of providing a synchronization for the tape. That is, as the tape is inserted preparatory to a search for the desired lesson, the movement of the tape in the search will cause the two tones to be applied over path 107 (FIG. 13) to audio tape control circuit 103 and the two filter circuits 354, 356 via the associated output paths place a signal on the step tone conductor 370 and pulse tone conductor 541 which are output over inverter amplifiers 371, 373 to the lesson tone gate 374. The output of lesson tone gate 374 is ANDED over gate 576 and amplifier 578 to Stop on Lesson tone conductor 580. Such signal over path 109 to interface 108 results in the code word output to digital computer 50 as described before which indicates that the tape may be stopped at such point.

Software

As noted above, the main function of the software system is to control the execution of a set of lessons for the Toll Service Desks (TSD). Each lesson consists of the PDP-8 computer 50 executing a predetermined set of commands to the TSD, such as lighting a specific group of lamps, or starting the audio unit, and then waiting for a response from the TSD. When the response arrives, the program checks to see if the response is correct; if so, the program advances to the next step in the current lesson; however, if the response is incorrect, the program lights the error lamp on the control panel, and repeats the current step. All eight TSD boards may be operating at the same time on either the same lesson or different lessons.

In order to control the above process, the software system consists of the following sets of routines:

1. Executive Routines: The Executive Routines control the overall flow of the system.
2. Lesson Routines: The Lesson Routines contain the instructions to control the execution of each lesson.
3. General Routines: The General Routines contain the instructions to execute the functions common to all the Lesson Routines.

Below is a brief description of each routine in the CBTS software system.

A. Executive Routines

1. *INT* — INT initializes all tables, clears all interrupts, and starts the system.

2. *INTP* — INTP is the interrupt processor for the system. When an interrupt occurs INTP processes the interrupt.
3. *OUT* — OUT transfers the code in the AC to the TSD board.
4. *WAIT* — Wait picks up the wait count value in the AC and places it in the RCT wait count field.
5. *DISPAT* — DISPAT checks each RCT to see if the active flag is set; if so the remote is scheduled for execution.
6. *TASKSW* — TASKSW sets up the next instruction address in the RCT and waits for the interrupt.
7. *GETINP* — GETINP gets the last interrupt from the input buffer and loads it into the AC.
8. *TSD* — TSD handles all interrupts from the TSD board.
9. *TIMER* — Timer checks each Timer field in the RCT to see if it is set; if so, it decrements it by one, checks for zero and schedules the
10. *NORM* — Norm places the interrupt from the TSD in the input buffer.
11. *RCR* — RCR processes the repeat call key on the control panel.
12. *RESET* — Reset resets the input buffer pointer to the beginning of the buffer.
13. *RESBUF* — Resbuf resets the active flag, repeat step, repeat call, repeat lesson flags in the RCT.
14. *RLR* — RLR processes the Repeat Lesson key on the control panel.
15. *RESDF* — RESDF loads the DATA Field that the lesson is loaded in the TASFSW DATA Field in the RCT.
16. *CLOCK* — Clock routine update, the time of day clock on each TSD.
17. *ERROR* — Error routines processes an error condition on the TSD.
18. *RSR* — RSR processes the repeat step key on the control panel.
19. *FLASH* — Flash routines flashes any lamps that are in the flash table for each RCT.
20. *STRTR* — STRTR processes the start key on the control panel.
21. *CASS* — CASS handles the loading of the lessons from the digital tape cassette.
22. *BRIDGE* — Bridge handles the interface for the lessons from BANK 1 to BANK 0 of the memory on the PDP-8.

B. Lesson Routines

The lesson routines are made up of calls to the general routines for each lesson. Each lesson is unique and is simply a combination of lighting lamps and playing the audio, and checking responses.

C. General Routines

1. *UPSTEP* — Upstep updates the RCT with the ADDRESS of the current step in the lesson.
2. *UPCALL* — Upcall updates the RCT with the ADDRESS of the current call in the lesson.
3. *ASTOP* — Astop checks the code passed in the AC to see if it was an Audio Stop Code.
4. *TONE* — Tone routines turn off the tone bit for the remote.
5. *AUDOFF* — Audoff routine turns off the Audio play bit for the remote.
6. *KEYRNT* — Routines checks for the TSD key passed as a parameter when the next interrupt comes in. No error time is set.
7. *CLKON* — CLKON sets the clock flag in the RCT to 1.
8. *CLKOFF* — CLKOFF sets the clock flag in the RCT to 0.
9. *DELAY* — Delay sets the timer field in the AC to the value passed in the AC.
10. *SAVE1* — SAVE1 routines saves the return address for lesson subroutines.
11. *REST1* — REST1 restores the return address for lesson subroutines.
12. *ZARSPF* — ZARSPF zeros the audio response flag in the RCT.
13. *SARSPF* — SARSPF sets the audio response flag in the RCT to 1.
14. *GARSPF* — GARSPF loads the audio response flag in the AC.
15. *LOFF* — LOFF routine turns off the lamp passed to it in the AC.
16. *LON* — LON routine turns on the lamp passed to it in AC.
17. *SAVE4* — SAVE4 saves the return address in the RCT for general routines that do not wait.
18. *REST4* — REST4 restores the return address in RCT for general routines that do not wait.
19. *SAVE* — SAVE saves the return address in RCT for general routines that wait.
20. *RESTOR* — RESTOR restores the return address in RCT for general routines that wait.
21. *SAVP1* — SAVP1 saves the parameter passed to it in AC in RCT.
22. *RETP1* — RETP1 restores the parameter from the RCT into AC.
23. *MCLRGO* — MCLRGO master clears the board and turns on the go lamp.
24. *WAST* — WAST checks to see if the audio has stopped; if not, WAST waits for the audio to stop.
25. *ZASTPF* — ZASTPF zeros the audio stop flag.
26. *SASTPF* — SASTPF sets the audio stop flag to 1.
27. *GASTPF* — GASTPF loads the AC with the audio stop flag.
28. *KEYR* — KEYR sets the error count to 5 seconds and waits for the key passed to it in AC.
29. *WLON* — WLON waits 5 seconds and then turns the lamp passed to it in the AC on.
30. *WLOFF* — WLOFF waits 5 seconds and then turns the lamp passed to it in AC off.
31. *DTIME* — DTIME displays the time passed to it on the TSD board.
32. *ARKEY* — ARKEY plays the audio and waits for the key passed to it to be depressed.
33. *SAKEY* — SAKEY plays the audio and waits for the key passed to it to be depressed and the verbal response to come in.
34. *RKEY* — RKEY waits for the key passed to it to come in and the verbal response.
35. *SAUDIO* — SAUDIO plays the audio unit and waits for it to stop.
36. *RESP* — Resp sets the response time for a verbal response and wait for the response to come in.
37. *WVRSP* — WVRSP waits for the verbal response to come in; if it has already come in, routine returns to calling routine.
38. *INCOFF* — Routine turns off all lamps on the TSD board.
39. *MUTON* — Routine mutes the aduio and returns to the lesson.
40. *MUTOFF* — Routine turns off the mute bit for the audio unit.

41. *DISPLY* — DISPLY displays in the NIXIE Lamps the number passed to it.
42. *DOFF* — DOFF blanks the NIXIE blanks.
43. *KEYPUL* — KEYPUL handles the digits keyed in from the TSD keyboard; if the digit is the proper key it displays it on the NIXIE lamp.
44. *FLHON* — FLHON places the lamp code passed to it in the flash queue.
45. *FLHOFF* — FLHOFF eliminates the lamp code passed to it from the flash queue.

TABLE II

OTM TO COMPUTER CODES

| HEX CODE | DESCRIPTION | HEX CODE | DESCRIPTION |
|---|---|---|---|
| 00 | Unassigned | 1C | Loop 1 HOLD |
| 01 | Keyset 1 | 1D | Loop 2 HOLD |
| 02 | Keyset 2 | 1E | Loop 3 HOLD |
| 03 | Keyset 3 | 1F | Loop 4 HOLD |
| 04 | Keyset 4 | 20 | Loop 1 ACS |
| 05 | Keyset 5 | 21 | Loop 2 ACS |
| 06 | Keyset 6 | 22 | Loop 3 ACS |
| 07 | Keyset 7 | 23 | Loop 4 ACS |
| 08 | Keyset 8 | 24 | SPL NO |
| 09 | Keyset 9 | 25 | DISPLAY RATE |
| 0A | Keyset 0 | 26 | CLD NO |
| 0B | ST | 27 | CLG NO |
| 0C | KP Rate | 28 | TIME ST |
| 0D | KP TBL | 29 | CA CALL |
| 0E | KP SPL | 2A | POS RLS |
| 0F | KP NFY | 2B | NO CHG |
| 10 | MARK BACK | 2C | SPL CLD-P |
| 11 | KP CG | 2D | SPL CLG-P |
| 12 | MARK FWD | 2E | COL-P |
| 13 | KP CD | 2F | PAID-P |
| 14 | Loop 1 CLG* | 30 | COIN RET |
| 15 | Loop 2 CLG* | 31 | COIN COL |
| 16 | Loop 3 CLG* | 32 | AUTO COL-STA |
| 17 | Loop 4 CLG* | 33 | SPL CLD-STA |
| 18 | Loop 1 CLD* | 34 | SPL CLG-STA |
| 19 | Loop 2 CLD* | 35 | COL-STA |
| 1A | Loop 3 CLD* | 36 | PAID-STA |
| 1B | Loop 4 CLD* | 37 | REL FWD |
| 38 | REL BACK | | |
| 39 | T&C | | |
| 3A | RING FWD | | |
| 3B | RING BACK | | |
| 3C | ONI ACC | | |
| 3D | POS TR*← | | |
| 3E | POS TR*→ | | |
| 3F | MAKE BUSY* | | |
| 40 | SR* | | |
| 41 | ANS | | |
| 42 | KP-GST | | |
| 43 | TRF | | |
| 44 | BV* | | |
| 45 | RATE* | | |
| 46 | PCB-WH | | |
| 47 | START/GO | | |
| 48 | REPEAT LESSON | | |
| 49 | REPEAT CALL | | |
| 4A | REPEAT STEP | | |
| 4B | NO ADVANCE | | |
| 4C | AUDIO STOP CALL/ | | |
| 4D | AUDIO STOP STEP/ | | |
| 4E | SOUND PRESENT | | |
| 4F | AUDIO STOP LESSON/ | | |
| 50 | KP | | |
| | Remaining numbers unassigned | | |

*Alternate Action

COMPUTER TO OTM CODES

| FD | SD | DESCRIPTION | FD | SD | DESCRIPTION |
|---|---|---|---|---|---|
| 0 | 0 | HNPA | 3 | 5 | SR |
| 0 | 1 | FNPA #1 | 3 | 6 | MAKE BUSY |
| 0 | 2 | FNPA #2 | 3 | 7 | POS TR← |
| 0 | 3 | 1+ NON COIN | 4 | 0 | POS TR→ |
| 0 | 4 | 0+ NON COIN | 4 | 1 | CW |
| 0 | 5 | 0− NON COIN | 4 | 2 | ONI ACC-G |
| 0 | 6 | SPL SUB NON COIN | 4 | 3 | ONI ACC-R |
| 0 | 7 | NFY | 4 | 4 | T&C |
| 1 | 0 | 1+ COIN | 4 | 5 | REL BACK |
| 1 | 1 | 0+ COIN | 4 | 6 | REL FWD |
| 1 | 2 | 0− COIN | 4 | 7 | PAID-G-STA |
| 1 | 3 | CHG DUE COIN | 5 | 0 | PAID-R-STA |
| 1 | 4 | WH-W | 5 | 1 | COL-G-STA |
| 1 | 5 | WH-G | 5 | 2 | COL-R-STA |
| 1 | 6 | INW | 5 | 3 | SPL CLG-G-STA |
| 1 | 7 | TS | 5 | 4 | SPL CLG-R-STA |
| 2 | 0 | EMG | 5 | 5 | SPL CLD-G-STA |
| 2 | 1 | RATE | 5 | 6 | SPL CLD-R-STA |
| 2 | 2 | BV | 5 | 7 | AUTO COL-G-STA |
| 2 | 3 | TFR | 6 | 0 | AUTO COL-R-STA |
| 2 | 4 | 1+ Hotel | 6 | 1 | PAID-G-PER |
| 2 | 5 | 0+ Hotel | 6 | 2 | PAID-R-PER |
| 2 | 6 | 0− Hotel | 6 | 3 | COL-G-PER |

TABLE II-continued

| | | | | | |
|---|---|---|---|---|---|
| 2 | 7 | KP-GST | 6 | 4 | COL-R-PER |
| 3 | 0 | Toll INF | 6 | 5 | SPL CHG-G-PER |
| 3 | 1 | LOC INF | 6 | 6 | SPL CHG-R-PER |
| 3 | 2 | CDO INF | 6 | 7 | SPL CLD-G-PER |
| 3 | 3 | RATE RTE | 7 | 0 | SPL CLD-R-PER |
| 3 | 4 | INTC | 7 | 1 | NO CHG-G |
| 7 | 2 | NO CHG-R | A | 7 | KP CG |
| 7 | 3 | POS REL | B | 0 | MARK BACK |
| 7 | 4 | TIME ST-G | B | 1 | L1 ACS |
| 7 | 5 | TIME ST-R | B | 2 | L2 ACS |
| 7 | 6 | L1 TIME BACK | B | 3 | L3 ACS |
| 7 | 7 | L2 TIME BACK | B | 4 | L4 ACS |
| 8 | 0 | L3 TIME BACK | B | 5 | KP CD |
| 8 | 1 | L4 TIME BACK | B | 6 | MARK FWD |
| 8 | 2 | KP-G | B | 7 | REPEAT LESSON LAMP |
| 8 | 3 | KP-R | C | 0 | GO/START |
| 8 | 4 | L1 CLG | C | 1 | SEQ CTR-READ |
| 8 | 5 | L2 CLG | C | 2 | SEQ CTR-ADV. |
| 8 | 6 | L3 CLG | C | 3 | REPEAT CALL LAMP |
| 8 | 7 | L4 CLG | C | 4 | INCORRECT LAMP |
| 9 | 0 | KP TBL | C | 5 | READ AUDIO |
| 9 | 1 | KP RATE | C | 6 | REPEAT STEP LAMP |
| 9 | 2 | SPL NO | C | 7 | TONE CHECK |
| 9 | 3 | L1 CLD | D | 0 | AUDIO FWD STEP |
| 9 | 4 | L2 CLD | D | 1 | AUDIO FWD CALL |
| 9 | 5 | L3 CLD | D | 2 | AUDIO FWD LESSON |
| 9 | 6 | L4 CLD | D | 3 | AUDIO BACK STEP |
| 9 | 7 | KP NFY | D | 4 | AUDIO BACK CALL |
| A | 0 | KP SPL | D | 5 | AUDIO BACK LESSON |
| A | 1 | CLG NO | D | 6 | MASTER CLEAR |
| A | 2 | CLD NO | D | 7 | MUTE SOUND |
| A | 3 | L1 HOLD | E | 0 | L1 TIME FWD |
| A | 4 | L2 HOLD | E | 1 | L3 TIME FWD |
| A | 5 | L3 HOLD | E | 2 | L3 TIME FWD |
| A | 6 | L4 HOLD | E | 3 | L4 TIME FWD |
| | | | | | Remaining numbers unassigned |

SYSTEM OVERVIEW CHART

The logic flow of the CBTS software system is separated into two parts. The first part is the Executive Control portion which controls the internal processing of the system and the second is the Interrupt Processor which controls the Input/Output portion of the system.

| Executive Control | |
|---|---|
| INT | Initialize and start CBTS system. |
| DISPAT | Wait for remote to be serviced. |
| STRTR | Remote has started a lesson. |
| CASS | Load lesson into core and start lesson. |
| LESSON | Lesson is executed using the general routines to support the lessons. |
| GENERAL ROUTINES | Routines previously described. |
| END OF LESSON | Lesson is completed. |
| Return to Dispatch | |
| Interrupt Processor | |
| INTP | Pick up interrupt from remote. |
| NORM | If normal input load and input into remote control table. |
| SPECIAL | Special input, process STRTR for start key, RLR, RCR, RSR or Repeat Lesson Routine, Repeat Call Routines, Repeat Step Routine. |
| RETURN | Return from the interrupt processor. |

BRIEF FLOW DIAGRAM

Lesson — Hotel 1+ Station Paid (Guest On Line)

1. START — In any of the following steps jump to error routine if incorrect response is made.
2. Turn on lamps:
    CAC, Hotel STA, KP GST, STA PAID (green), Release FWD, T&C, Loop 1 CLD, Loop 1 ACS, TIME ST Red.
3. One half second later turn OFF release FWD.
4. START Audio
5. Check for speech present, and KP GST Actuation, and audio stop.
6. When KP GST has been depressed turn ON KP Red for ½ second then turn KP Red OFF and turn KP Green ON.
7. START Audio.
8. Detect keypulse "0," then "0," then 2, then 6 and display until after #6 key has been depressed. Turn OFF displays, KP, and KP GST; and audio stop.
9. Detect TIME ST Key depression. Turn TIME ST (Red) OFF. Turn TIME ST (Green) ON.
10. START Audio.
11. Check for POS Release actuation.
12. After POS Release actuation, turn OFF Audio, CAS, Hotel STA, STA PAID, T&C, Loop 1 CLD, Loop 1 ACS, TIME START (Green).
13. Lesson is complete — STOP.

PAGE 0 CONSTANTS

```
            *0000
0000 0000        0              / PC STORED HERE ON INTERRUPT
0001 5402        JMP I   SERV   / BRANCH TO INTERRUPT PROCCESSOR
0002 0240 SERV,  INTP           / ADDR OF INTERRUPT PROCESSOR
0003 0226 C150,  226            / CONSTANT FOR 15 SEC
            *0010               / START OF AUTO INDEXES REGISTER
```

```
0010  0000  STRLES, 0000            / PTR TO CORE LOCATION TO LOAD WORD
                    *0020           / PAGE 0 CONSTANTS
0020  6000  CURRCT, 6000            / ADDR OF RCT IN CONTROL
0021  2136  PRCTAB, RCTAB           / _ TO TABLE OF RCT ADDRESSS
0022  0023  PSAVPAR,SAVPAR          / PTR TO SAVE PARAMETER
0023  0000  SAVPAR, 0000            / SAVE AREA FOR PARAMETER
            /
            /           DISPLACEMENTS IN RCTS
            /
0024  0001  AFD,      1             / ACTIVE FLAG DISPLACEMENT
0025  0002  RNMD,     2             / REMOTE NUMBER MASK DISPLACEMENT
0026  0003  BACKSD,   3             / BACKSPACE COUNT DISPLACEMENT
0027  0004  ALCD,     4             / ADDRESS OF LAST CALL DISPLACEMENT
0030  0005  ANID,     5             / ADDR OF NEXT INSTRUCTION DISP.
0031  0006  SACD,     6             / SAVE AC DISPLACEMENT
0032  0010  ABLD,    10             / ADDRESS OF BEG. OF LESSON DISP.
0033  0011  ALSD,    11             / ADDRESS OF LAST STEP DISPLACEMENT
0034  0012  WCD,     12             / WAIT COUNT DISPLACEMENT
0035  0013  PROPD,   13             / PROCESS POINTER DISPLACEMENT
0036  0014  STOPD,   14             / STORE POINTER DISPLACEMENT
0037  0015  PTBBD,   15             / POINTER TO BEG. OF BUFFER DISP.
0040  0016  PTEBD,   16             / POINTER TO END OF BUFFER DISPLAC.
0041  0035  ERCD,    35             / ERROR COUNT DISPLACEMENT
0042  0036  RAD,     36             / RETURN ADDRESS DISPLACEMENT
0043  0037  PARM1D,  37             / PARM1 DISPLACEMENT
0044  0052  CLKFD,   52             / CLOCK FLAG DISPLACEMENT
0045  0053  ASTD,    53             / AUDIO STOP DISP.
0046  0054  RAD1,    54             / RETURN ADDR FOR LESSONS
0047  0055  ARSPD,   55             / DISP FOR AUDIO RESPONSE FLAG
0050  0056  RLFD,    56             / REPEAT LESSON FLAG DISP
0051  0057  RCFD,    57             / REPEAT CALL FLAG DISP.
0052  0060  RSFD,    60             / REPEAT STEP FLAG DISP.
            /
            /           POINTERS TO SYSTEM ROUTINES
            /
0053  0400  PDISPAT,DISPAT          / _ TO DISPATCHER ROUTINE
0054  0460  PTASKSW,TASKSW          / _ TO TASK SWITCH ROUTINE
0055  0511  PGETIN, GETINP          / PTR TO GET INPUT ROUTINE
0056  0356  PWAIT,  WAIT            / PTR TO WAIT ROUTINE
0057  4071  PDOFF,  DOFF            / PTR TO ROUTINE TO TURN OFF NIXIES
0060  3000  PERROR, ERROR           / POINTER TO ERROR ROUTINE
0061  0742  PASTOP, ASTOP           / POINTER TO AUDIO STOP ROUTINE
0062  0342  POUT,   OUT             / POINTER TO OUTPUT ROUTINE
0063  1412  PRESET, RESET           / POINTER TO RESET ROUTINE
0064  3023  PRSR,   RSR             / POINTER TO REPEAT STEP ROUTINE
0065  1471  PRLR,   RLR             / POINTER TO REPEAT LESSON ROUTINE
0066  1200  PRCR,   RCR             / POINTER TO REPEAT CALL ROUTINE
0067  2624  PRESTOR,RESTOR          / PTR TO RESTORE ROUTINE
0070  2662  PRETP1,RETP1            / PTR TO RETURN PARM1 ROUTINE
0071  2600  PSAVE,  SAVE            / PTR TO SAVE ROUTINE
0072  2650  PSAVP1, SAVP1           / PTR TO SAVE PARM1 ROUTINE
0073  4600  PSTRTR, 4600            / POINTER TO START ROUTINE
0074  3600  PSAUDIO,SAUDIO          / PTR TO PLAY AUDIO 1 TIME
0075  3614  PRESP,  RESP            / PTR TO AUDIO RESPONSE 1 TIME
0076  4000  PDISPLY,DISPLY          / PTR TO DISPLAY NIXIES
0077  4200  PKMPUL,KMPUL            / POINTER TO KEYPULSE ROUTINE
0100  4116  PLISDIG,LISDIG          / DISPLAY KEYPULSES
0101  2007  PCLOCK, CLK             / PTR TO CLOCK ROUTINE
0102  0271  PRETURN TO RETURN       / PTR TO RETURN FROM INTERRUPT ROU
0103  2514  PSAVE4, SAVE4           / PTR TO SAVE 4 ROUTINE
0104  1000  PTONE,  TONE            / PTR TO TURN OFF TONE CHECK BIT
0105  1010  PAULOFF,AUDOFF          / PTR TO TURN OFF PLAY BIT
0106  2541  PREST4, REST4           / PTR TO REST4 ROUTINE
0107  0331  PUPCALL,UPCALL          / PTR TO UPDATE CALL ROUTINE
0110  0317  PUPSTEP,UPSTEP          / PTR TO UPDATE STEP ROUTINE
0111  2672  PUPBCK, UPBCK           / PTR TO UP BACKSPACE COUNT
0112  2706  PMCLRGO,MCLRGO          / PTR TO MASTER CLAER GO LAMP ROU
0113  2717  PWAST,  WAST            / PTR TO WAIT FOR AUDIO TO STOP ROU
0114  2000  PDELAY, DELAY           / PTR TO DELAY ROUTINE
0115  2021  PSAVE1, SAVE1           / PTR TO SAVE ROUTINE FOR LESSONS
0116  2035  PREST1, REST1           / PTR TO RESTORE 1 ROUTINE FOR LESS
0117  2735  PZASTPF,ZASTPF          / ZERO AUDIOSTOP FLAG
0120  2747  PSASTPF,SASTPF          / ROUTINE SETS AUDIO STOP FLAG
```

```
0121  2762  PGASTPF,GASTPF           / GET AUDIO STOP FLAG
0122  2050  PZARSPF,ZARSPF           / ZERO AUDIO RESPONSE FLAG
0123  2062  PSARSPF,SARSPF           / SET AUDIO RESPONSE FLAG
0124  2075  PGARSPF,GARSPF           / GET AUDIO RESPONSE FLAG
0125  3460  PSAKEY, SAKEY            /SIMULTANEOUS AUDIO & KEY
0126  3400  PARKEY, ARKEY            / AUDIO,RESPONSE,AUDIO STOP & KEY
0127  3200  PWLON,  WLON             / WAIT & TURN LAMP ON
0130  3251  PWLOFF, WLOFF            / WAIT & TURN LAMP OFF
0131  2107  PLOFF,  LOFF             / LAMP OFF
0132  2123  PLON,   LON              / LAMP ON
0133  3136  PKEYR,  KEYR             / KEY RESPONSE
0134  3525  PRKEY,  RKEY             / AUDIO RESPONSE & KEY
            /
            /
            /              OTHER CONSTANTS
            /
0135  7577  OFFBIT, 7577             / MASK TO TURN OFF LAMPS
0136  0756  MCLEAR, 0756             / CODE FOR MASTER CLEAR COMMAND
0137  7662  SOUNDP, -0116            / CODE FOR SOUND PRESENT
0140  0747  TONECH, 0747             / CODE FOR TONE CHECK
0141  0745  PLAY,   0745             / CODE TO PLAY AUDIO
0142  0001  ONE,    1                / CONSTANT 1
0143  0001  M7777,  1                / CONSTANT 1
0144  0012  TEN,    12               / CONSTANT 10
0145  0067  LDFD,   67               / LESSON DATA FIELD DISP
0146  2146  PRESDF, RESDF            / PTR TO RESDT ROUTINE
0147  0002  PLUS2,  2                / CONSTANT 2
0150  7777  M1,     -1               / CONSTANT -1
0151  7770  NUMREM, -8               / NUMBER OF REMOTES ON SYSTEM
0152  0005  C5,     5                / CONSTANT 5
0153  0740  GOLAMP, 0740             / CODE FOR GO LAMP 0154  0024  C20,    24               / CONSTANT 20
0155  3323  PDTIME, DTIME            / PTR TO DISPLAY TIME ROUTINE
0156  0012  C10,    12               / CONSTANT 10
0157  0062  C50,    62               / CONSTANT 50
0160  0036  C30,    36               / CONSTANT 30
0161  3647  PWVRSP, WVRSP            / PTR TO WAIT FOR VERBAL RESP. ROUT
0162  3671  PINCOFF,INCOFF           / PTR TO ROUTINES TO CLEAR ALL INCT
0163  1324  PKEYRNT,KEYRNT           / PTR TO KEY ROUTINE WITH NO ERRORS
0164  1443  PRESBUF,RESBUF           / PTR TO RESET BUFFER ROUTINE
0165  3736  PMUTON, MUTON            / PTR TO MUTE ON ROUTINE
0166  3745  PMUTOFF,MUTOFF           / PTR TO MUTE OFF ROUTINE
0167  1356  PCLKON, CLKON            / PTR TO CLOCK ON ROUTINE
0170  1400  PCLKOFF,CLKOFF           / PTR TO CLOCK OFF ROUTINE
0171  4400  PFLHON, FLHON            / PTR TO FLASH ON ROUTINE
0172  4437  PFLHOFF,FLHOFF           / PTR TO FLASH OFF ROUTINE
0173  4506  PFLASH, FLASH            / PTR TO FLASH ROUTINE
0174  6201  DF0,    6201             / SET DF=0 INST 0175  6202  IF0,    6202             / SET IF=0 INST 0176  6203  IDF0,   6203             / SET IF & DF INST
                    PAUSE
            /
            /
            *0200
            /
            /              ENTRY POINT FOR START OF CBTS PROGRAM
            /              ROUTINE CLEAR ALL INTERRUPTS,
            /              TURNS ON THE INTERRUPT SYSTEM &
            /              JUMPS TO THE DISPATCHER ROUTINE
            /
0200  6007  START,  CAF              / CLEAR ALL FLAGS 0201  6520          6520             / CLEAR INTERRUPTS FROM TIMER
0202  6500          6500             / CLEAR INTERRUPTS FROM TSD
0203  6510          6510             / CLEAR INTERRUPTS FROM AUDIO
0204  6450          6450             / CLEAR INTERRUPTS FROM CASSETTE
0205  6203          6203             / SET DF,IF=0
0206  6001          ION              / TURN ON THE INTERUPT SYSTEM
            /
            /              TURN ON GO LAMP FOR EACH REMOTE ON SYSTEM
            /
```

```
0207  1021           TAD   Z PRCTAB   / LOAD PTR TO RCTAB
0210  3312           DCA   INTPRCT    / STORE PTR TO RCT
0211  1151           TAD   Z NUMREM   / LOAD IN NEG. OF NUMBER OF REM. O
0212  3315           DCA   RMTLOP     / STORE IT IN REMOTE LOOP
0213  1712   INT3,   TAD I INTPRCT    / LOAD ADDR OF RCT IN AC
0214  1025           TAD   Z RNMD     / ADD IN REMOTE NO. MASK
0215  3313           DCA   INTPRM     / STORE PTR TO REMOTE MASK
0216  1713           TAD I INTPRM     / LOAD AC WITH REMOTE MASK
0217  1314           TAD   INTGOK     / ADD IN CODE FOR GO KEY
0220  6507           6507             / SEND IT OUT
0221  1712           TAD I INTPRCT    / LOAD PTR TO RCT
0222  3020           DCA   Z CURRCT   / STORE IT IN RCT
0223  4457           JMS I PDOFF      / TURN DISPALS OFF
0224  2315           ISZ   RMTLOP     / ARE WE THROUGH WITH REMOTES YET
0225  5227           JMP   INT1       / NO, GO DO NEXT 1
0226  5233           JMP   INT2       / YES, GO ENABLE INTERRUPTS & START
0227  1312   INT1,   TAD   INTPRCT    / LOAD PTR TO RCT
0230  7001           IAC              / ADD 1 TO IT
0231  3312           DCA   INTPRCT    / STORE IT
0232  5213           JMP   INT3       / GO DO IT
0233  6501   INT2,   6501             / ENABLE INTERRUPTS FROM TSD
0234  6521           6521             / ENABLE INTERRUPTS FROM TIMER
0235  6511           6511             / ENABLE INTERRUPTS FROM AUDIO
0236  6451           6451             / ENABLE INTERRUPTS FROM CASSETTE
0237  4453           JMS I PDISPAT    / JUMP TO THE DISPATCHER ROUTINE
             /
             /                        INTERRUPT PROCESSOR ROUTINE
             /
0240  3303   INTP,   DCA   SAVAC      / SAVE AC
0241  6522           6522             / WAS IT THE TIMER
0242  7410           SKP              / NO, SKIP NEXT INST.
0243  5704           JMP I PTIMER     / YES, GO TO TIMER ROUTINE
0244  6041           TSF              / WAS IT A PRINTER INTERUPT
0245  7410           SKP              / NO, CHECK READER
0246  5705           JMP I PPRT       / YES, GO TO READER ROUTINE
0247  6452           6452             / WAS IT THE CASSETTE
0250  7410           SKP              / NO, CHECK TSD
0251  5706           JMP I PREAD      / YES, GO TO READ ROUTINE
0252  6502           6502             / DBSK, WAS IT THE TSD
0253  7410           SKP              / NO, MUST BE AN ERROR
0254  5261           JMP   TSD50      / GO PROCESS INTERRUPT FROM BOARD
0255  6512           6512             / WAS IT THE AUDIO
0256  7410           SKP              / NO, MUST BE AN ERROR
0257  5265           JMP   TSD51      / YES, MUST BE FROM AUDIO
0260  4502           JMS I PRETURN    / NONSENSE INTERUPT FORGET IT
0261  7200   TSD50,  CLA              / CLEAR THE AC
0262  6504           6504             / READ INPUT INTO AC
0263  6500           6500             / DISABLE INTERRUPTS FROM TSD
0264  5707           JMP I PTSD       / GO TO TSD INTERRUPT ROUTINE
0265  7200   TSD51,  CLA              / CLEAR THE AC
0266  6514           6514             / READ INPUT INTO AC
0267  6510           6510             / DISABLE INTERRUPTS FROM AUDIO
0270  5707           JMP I PTSD       / GO TO TSD INTERRUPT ROUTINE
0271  0000   RETURN, 0000             / RETURN ADDR
0272  7200           CLA              / CLEAR THE AC
0273  1303           TAD   SAVAC      / RESTORE THE AC
0274  6521           6521             / REENABLE INTERRUPTS FROM TIMER
0275  6501           6501             / REENABLE INTERRUPTS FROM TSD
0276  6511           6511             / TURN INTERRUPT FROM TONE BACK ON
0277  6451           6451             / REENABLE INTERRUPTS FROM CASSETTE
0300  6244           6244             / RESTORE MEMORY FIELD
0301  6001           ION              / TURN THE INTERUPT SYSTEM BACK ON
0302  5400           JMP I 0          / RETURN THROUGH LOCATION 0
0303  0000   SAVAC,  0000             / WORD TO SAVE AC 0304  1020   PTIMER, TIMER            / ADDR OF TIMER ROUTINE
0305  0316   PPRT,   PRT              / ADDR OF PRINT ROUTINE
0306  5207   PREAD,  5207             / ADDR OF READ ROUTINE
0307  0600   PTSD,   TSD              / AADR OF TSD ROUTINE
0310  0000   MESCON, 0000             / MESSAGE COUNTER 0311  0000   MESSP,  0000             / PTR TO MESSAGE TABLE
0312  0000   INTPRCT,0000             / PTR TO RCT
0313  0000   INTPRM, 0000             / POINTER TO REMOTE NUMBER MASK
0314  0740   INTGOK, 0740             / CODE FOR GO KEY
0315  0000   RMTLOP, 0000             / LOOP COUNTER
0316  4502   PRT,    JMS I PRETURN    / FORGET PRINT INTER FOR NOW
```

```
                        /                   UPDATE STEP ROUTINE
                        /                   ROUTINE UPDATES ADDR OF LAST STEP FIELD
                        /                   IN RCT & SETS BACKSPACE COUNT=0
0317  0000  UPSTEP, 0000
0320  7200          CLA                     / CLEAR THE AC
0321  1020          TAD Z   CURRCT          / LOAD PTR TO RCT IN AC
0322  1033          TAD Z   ALSD            / ADD IN DISP. TO ADDR. OF LAST STE
0323  3327          DCA     UPSALS          / STORE PTR TO ADDR OF LAST STEP
0324  1317          TAD     UPSTEP          / LOAD AC WITH RETURN ADDR
0325  3727          DCA I   UPSALS          / STORE IT IN ADDR. OF LAST STEP IN
0326  5717          JMP I   UPSTEP          / RETURN TO CALLING PROGRAM
0327  0000  UPSALS, 0                       / POINTER TO ADDR. OF LAST STEP IND
0330  0000  UPBSP,  0000                    / POINTER TO BACKSPACE COUNT
                        /
                        /
                        /                   UPDATE CALL ROUTINE
0331  0000  UPCALL, 0000
0332  7200          CLA                     / CLEAR THE AC
0333  1020          TAD Z   CURRCT          / LOAD PTR TO RCT IN AC
0334  1027          TAD Z   ALCD            / ADD IN DISP. FOR ADDR. OF LAST CL
0335  3341          DCA     UPCALC          / STORE PTR TO ADDR OF LAST CALL
0336  1331          TAD     UPCALL          / LOAD AC WITH RETURN ADDR
0337  3741          DCA I   UPCALC          / STORE IT IN ADDR OF LAST CALL IND
0340  5731          JMP I   UPCALL          / RETURN TO CALLING PROGRAM
0341  0000  UPCALC, 0                       / POINTER TO ADDR OF LAST CALL
                        /                   OUTPUT ROUTINE TO DREA2
                        /                   OUTPUT CODE IS IN AC ON ENTRY
                        /                   AC IS CLEARED ON RETURN
                        /
0342  0000  OUT,    0000
0343  3354          DCA     OUTINP          / SAVE OUTPUT CODE IN AC
0344  1020          TAD Z   CURRCT          / LOAD AC WITH PTR TO RCT
0345  1025          TAD Z   RNMD            / ADD IN DISP. FOR REMOTE NO. MASK
0346  3355          DCA     OUTPRM          / STORE PTR TO REMOTE NUM. MASK
0347  1755          TAD I   OUTPRM          / LOAD AC WITH REMOTE NO. MASK
0350  1354          TAD     OUTINP          / ADD IN OUTPUT CODE
0351  6507          6507                    / SEND IT OUT TO TSD
0352  7200          CLA                     / CLEAR THE AC BEFORE RETURNING
0353  5742          JMP I   OUT             / RETURN TO THE CALLING ROUTINE
0354  0000  OUTINP, 0                       / SAVE OUTPUT CODE IN THE AC
0355  0000  OUTPRM, 0                       / POINTER TO REMOTE NUMBER MASK
                        /
                        /       WAIT
                        /                   ROUTINE PICKS UP WAIT COUNT VALUE IN AC
                        /                   & PLACES IT IN THE RCT WAIT COUNT FIELD
                        /                   AC=0 ON RETURN
                        /
0356  0000  WAIT,   0                       / RETURN ADDRESS 0357  3366          DCA     WAITAC          / SAVE WAIT COUNT 0360  1020          TAD Z   CURRCT          / LOAD PTR TO RCT IN CONTROL
0361  1034          TAD Z   WCD             / ADD IN WAIT COUNT DISPLACEMENT
0362  3367          DCA     PWCOUN          / STORE PTR TO WAIT COUNT
0363  1366          TAD     WAITAC          / LOAD WAIT COUNT IN AC
0364  3767          DCA I   PWCOUN          / STORE IT IN RCT
0365  5756          JMP I   WAIT            / RETURN TO CALLING PROGRAM
0366  0000  WAITAC, 0                       / WAIT COUNT
0367  0000  PWCOUN, 0                       / PTR TO WAIT COUNT IN RCT
                        /
                        /
                        /                   DISPATCHER ROUTINE
                        /                   ROUTINE CHECKS EACH RCT TO SEE IF THE ACTIVE
                        /                   FLAG IS SET; IF SO, ACTIVE FLAG IS SET TO 0
                        /                   CURRCT IS SET TO THE ADDRESS OF THE RCT
                        /                   THE AC IS RESTORED AND CONTROL IS
                        /                   TRANSFERED TO THE NEXT INST. ADDRESS IN RCT
                        /
                        /
                                *0400
0400  0000  DISPAT, 0000                    / RETURN ADDRESS
0401  6203          6203                    / SET DF,IF=0
0402  7200  DISPA1, CLA                     / CLEA AC
```

```
0403  1020           TAD Z   CURRCT   / LOAD PTR TO RCT
0404  1256           TAD     ZTRKD    / ADD IN DISP FOR START KEY FLAG
0405  3257           DCA     ZTRSKF   / STORE PTR TO START KEY FLAG
0406  3657           DCA I   ZTRSKF   / ZERO START KEY FLAG
0407  1420 DISPA2,   TAD I   CURRCT   / LOAD _ TO NEXT RCT IN AC
0410  3020           DCA Z   CURRCT   / STORE _ IN CURRCT
0411  1020           TAD Z   CURRCT   / LOAD IT BACK IN AC
0412  1024           TAD Z   AFD      / ADD DISP. FOR ACTIVE FLAG
0413  3251           DCA     AFADDR   / STORE ADDR OF ACTIVE FLAG
0414  1651           TAD I   AFADDR   / LOAD ACTIVE FLAG IN AC
0415  7440           SZA CLA          / SKIP IF AC=0
0416  5220           JMP     SCHED    / AC=1, SCHEDULE RCT
0417  5202           JMP     DISPA1   / AC=0, CHECK NEXT RCT
0420  7200  SCHED,   CLA              / CLEAR AC
0421  3651           DCA I   AFADDR   / ZERO ACTIVE FLAG
0422  1020           TAD Z   CURRCT   / LOAD AC WITH _ TO RCT
0423  1030           TAD Z   ANID     / ADD IN DISP. FOR ADDR OF NEXT IN.
0424  3252           DCA     NIADDR   / STORE ADDR OF NEXT INST.
0425  1252           TAD     NIADDR   / LOAD IT BACK IN AC
0426  7001           IAC              / INCREMENT IT BY ONE
0427  3253           DCA     ACADDR   / STORE ADDR OF SAVE AC
0430  1652           TAD I   NIADDR   / LOAD AC WITH ADDR OF NEXT INST
0431  3254           DCA     NINST    / STORE IT
0432  1653           TAD I   ACADDR   / RESTORE AC
0433  3255           DCA     DISAC    / SAVE AC FOR NOW
0434  1020           TAD Z   CURRCT   / LOAD PTR TO RCT
0435  1307           TAD     TASDFD   / ADD IN DISP FOR SAVE DATA FIELD
0436  3253           DCA     ACADDR   / STORE PTR
0437  1653           TAD I   ACADDR   / LOAD AC WITH SAVE DATA FIELD
0440  1175           TAD Z   IF0      / LOAD CODE FOR SET IF
0441  3246           DCA     CIF1     / STORE IT
0442  1653           TAD I   ACADDR   / LOAD AC WITH SAVE DF
0443  1174           TAD Z   DF0      / LOAD CODE FOR SET DF=0
0444  3247           DCA     CDF4     / STORE IT IN INST
0445  1255           TAD     DISAC    / RELOAD AC
0446  6202  CIF1,    6202             / CHANGE INST FIELD
0447  6201  CDF4,    6201             / CHANGE DF INST 0450  5654           JMP I   NINST    / BRANCH TO THAT ADDRESS
0451  0000  AFADDR,  0                / ACTIVE FLAG ADDR
0452  0000  NIADDR,  0                / NEXT INST. ADDR
0453  0000  ACADDR,  0                / SAVE AC ADDR
0454  0000  NINST,   0                / ADDRESS OF NEXT INST
0455  0000  DISAC,   0000             / SAVE AC
0456  0007  ZTRKD,   7                / DISP FOR START KEY FLAG
0457  0000  ZTRSKF,  0000             / PTR TO START KEY FLAG
      /
      /
      /                     TASKSWITCH ROUTINE
      /                     ROUTINE TAKES THE NEXT INSTRUCTION ADDR
      /                     TO BE EXEUTED IN TASKSW & THE AC &
      /                     STORES IT IN THE REMOTE CONTROL TABLE.
      /                     AC=0 ON RETURN & PROGRAM JUMPS TO DISPATCHER
      /
      /
0460  0000  TASKSW,  0000             / RETURN ADDRESS
0461  3305           DCA     TSAC     / SAVE AC
0462  6214           6214             / OR DATA FIELD WITH AC
0463  3310           DCA     TSPSAC   / SAVE DATA FIELD
0
 464  6201           6201             / SET DF=0
0465  1020           TAD Z   CURRCT   / LOAD PTR TO RCT
0466  1307           TAD     TASDFD   / ADD IN DISP FOR TASKSW DATA FIED
0467  3306           DCA     TSANI    / SAVE IT FOR NOW 0470  1310           TAD     TSPSAC   / RELOAD SAVE DATA FIELD
0471  3706           DCA I   TSANI    / STORE IT IN RCT 0472  1020           TAD Z   CURRCT   / LOAD AC WITH _ TO RCT IN CONTROL
0473  1030           TAD Z   ANID     / ADD IN DISP. FOR ADDR OF NEXT INS
0474  3306           DCA     TSANI    / SAVE IT
0475  1260           TAD     TASKSW   / LOAD AC WITH ADDR TO BE STORED
0476  3706           DCA I   TSANI    / STORE IT IN RCT
0477  1306           TAD     TSANI    / LOAD AC _ TO ADDR OF NEXT INST.
```

```
0500  7001             IAC                    / INCR. IT BY 1
0501  3310             DCA    TSPSAC          / STORE ADDR OF SAVE AC
0502  1305             TAD    TSAC            / LOAD AC WITH SAVE AC
0503  3710             DCA I  TSPSAC          / STORE IT IN RCT
0504  4453 JMP TSPA2   JMS I  PDISPAT         / JUMP TO DISPATCHER
0505  0000    TSAC,    0                      / AC FOR CALLING PROGRAM
0506  0000    TSANI,   0                      / _ TO ADDR OF NEXT INST. IN RCT
0507  0065    TASDFD,  65                     / DISP FOR SAVE DF FOR TASKSW
0510  0000    TSPSAC,  0                      / _ TO SAVE AC IN RCT
              /
              /                               BUFFER MANAGER ROUTINE
              /                               ROUTINE PASSES BACK IN AC NEXT
              /                               WORD IN BUFFER; IF NEXT WORD IS
              /                               NOT IN YET, 0000 IS PASSED BACK
              /                               IN AC.
              /
0511  0000    GETINP,  0000                   / RETURN ADDRESS
0512  7200             CLA                    / CLEAR THE AC
0513  1311             TAD    GETINP          / LOAD RETURN ADDR
0514  4503             JMS I  PSAVE4          / GO SAVE IT
0515  1020             TAD Z  CURRCT          / LOAD AC WITH PTR TO RCT
0516  3367             DCA    GETRCT          / STORE IT
0517  1367             TAD    GETRCT          / LOAD IT BACK IN
0520  1035             TAD Z  PROPD           / ADD IN PROCESSOPTR DISP.
0521  3370             DCA    GPROPP          / STORE POINTER TO PROCESS POINTER
0522  1770             TAD I  GPROPP          / LOAD PROCESS POINTER
0523  3371             DCA    GPROP           / STORE PROCESS POINTER
0524  1370             TAD    GPROPP          / RELOAD PTR TO PROCESS POINTER
0525  7001             IAC                    / GET POINTER TO STORE POINTER
0526  3372             DCA    GSTOPP          / STORE POINTER TO STORE POINTER
0527  1772             TAD I  GSTOPP          / LOAD AC WITH STORE POINTER
0530  7041             CIA                    / SET IT NEGATIVE 0531  1371             TAD    GPROP           / ADD IN PROCESS POINTER
0532  7440             SZA                    / SKIP NEXT IF AC=0
0533  5336             JMP    GETIT           / AC NOT 0, GO GET WORD
0534  7200             CLA                    / AC=0, NO DATA
0535  4506             JMS I  PREST4          / RETURN TO CALLING PROGRAM
0536  7200    GETIT,   CLA                    / CLEAR THE AC
0537  1371             TAD    GPROP           / LOAD PROCESS POINTER
0540  7001             IAC                    / INCREMENT IT BY 1
0541  3371             DCA    GPROP           / STORE IT
0542  1371             TAD    GPROP           / LOAD IT BACK IN 0543  3770             DCA I  GPROPP          / STORE IT BACK IN RCT
0544  1367             TAD    GETRCT          / LOAD PTR TO RCT 0545  1040             TAD Z  PTEBD           / ADD IN PTR TO END OF BUF. DISP.
0546  3373             DCA    GPTEB           / STORE IT
0547  1773             TAD I  GPTEB           / LOAD END OF BUFFER ADDR IN AC
0550  7041             CIA                    / SET IT NEGATIVE 0551  1371             TAD    GPROP           / ADD IN PROCESS POINTER
0552  7440             SZA                    / SKIP NEXT IF AC=0
0553  5364             JMP    GLOAD           / GO PUT DATA IN AC
0554  7200             CLA                    / AC=0, MUST BE END OF BUFFER
0555  1367             TAD    GETRCT          / LOAD AC WITH PTR TO RCT
0556  1037             TAD Z  PTBBD           / ADD IN DISP. FOR BEG. OF BUFFER
0557  3374             DCA    GPTBB           / STORE POINTER TO BEG. OF BUFFER
0560  1774             TAD I  GPTBB           / LOAD PTR TO BEG. OF BUF. IN AC
0561  3371             DCA    GPROP           / STORE IT
0562  1371             TAD    GPROP           / RELOAD IT IN AC 0563  3770             DCA I  GPROPP          / NOW STORE IT IN RCT
0564  7200    GLOAD,   CLA                    / CLEAR THE AC
0565  1771             TAD I  GPROP           / LOAD INPUT IN AC
0566  4506             JMS I  PREST4          / RETURN
0567  0000    GETRCT,  0                      / ADDRESS OF RCT 0570  0000    GPROPP,  0                      / POINTER TO PROCESS POINTER IN RCT
0571  0000    GPROP,   0                      / PROCESS POINTER IN RCT
0572  0000    GSTOPP,  0                      / POINTER TO STORE POINTER IN RCT
0573  0000    GPTEB,   0                      / POINTER TO END OF BUFFER ADDR IN
0574  0000    GPTBB,   0                      / POINTER TO BEG OF BUFFER ADDRESS
```

```
                              PAUSE
                    /
                    /         TSD INTERUPT ROUTINE
                    /         ROUTINE HANDLES ALL INTERUPTS FROM TSD
                    /
                    /
                              *0600
0600  3320   TSD,     DCA    TSDIN    / STORE INPUT IN TSDIN
0601  1320            TAD    TSDIN    / RELOAD THE INPUT
0602  0325            AND    MSKIN    / ZERO 1ST 3 BITS TO TEST FOR
                                          ZEROS
0603  7450            SNA             / IS IT ALL ZEROS
0604  4502            JMS I  PRETURN  / YES, RETURN FOM INTER. NOISE
0605  7421            7421            / TRANSFER AC TO MQ
0606  7300            CLA CLL         / CLEAR AC AND LINK
0607  1320            TAD    TSDIN    / LOAD INPUT IN AC
0610  0322            AND    MSKRMT   / MASK OUT LAST 9 BITS
0611  7012            RTR             / SHIFT AC 2 RIGHT
0612  7012            RTR             / AGAIN 2
0613  7012            RTR             / AGAIN 2
0614  7012            RTR             / AGAIN 2
0615  7010            RAR             / NOW 1
0616  3323            DCA    TSDRMT   / STORE REMOTE NUMBER
0617  1021            TAD Z  PRCTAB   / LOAD AC WITH - TO RCT TABLE
0620  1323            TAD    TSDRMT   / ADD IN REMOTE NUMBER
0621  3324            DCA    TSDRCT   / STORE POINTER TO RCT
0622  1724            TAD I  TSDRCT   / LOAD PTR TO RCT IN AC
0623  3324            DCA    TSDRCT   / SAVE IT IN TSDRCT
0624  1320            TAD    TSDIN    / LOAD INPUT INTO AC
0625  0325            AND    MSKIN    / ZERO FIRST 3 BITS
0626  3326            DCA    TSDIN1   / STORE IT
0627  1326            TAD    TSDIN1   / RELOAD INPUT
0630  1327            TAD    CPSTRK   / ADD IN NEG. OF START KEY
0631  7650            SNA CLA         / SKIP NEXT IF AC NOT 0
0632  5257            JMP    STARTK   / START KEY
0633  1326            TAD    TSDIN1   / RELOAD INPUT
0634  1330            TAD    CPRELK   / ADDD IN NEG FOR REPEAT LESSON KEY
0635  7650            SNA CLA         / SKIP NEXT IF AC NOT 0
0636  5271            JMP    RELK     / REPEAT LESSON KEY
0637  1326            TAD    TSDIN1   / RELOAD INPUT
0640  1331            TAD    CPR1SK   / ADD IN NEG. FOR REPEAT 1 STEP KEY
0641  7650            SNA CLA         / SKIP NEXT IF AC NOT 0
0642  5273            JMP    RSK      / REPEAT STEP KEY
0643  1326            TAD    TSDIN1   / RELOAD THE INPUT
0644  1337            TAD    CPERK    / WAS IT THE ERROR KEY
0645  7650            SNA CLA         / IS AC=0
0646  5274            JMP    RSK1     / YES, GO TO REPEAT STEP
0647  1326            TAD    TSDIN1   / RELOAD THE INPUT
0650  1332            TAD    CPRCK    / ADD IN NEG. FOR REPEAT CALL KEY
0651  7450   SNA CLA  SNA             / IS THE AC=0
0652  5276            JMP    RECK     / YES, REPEAT CALL KEY
0653  1326   TSD1,    TAD    TSDIN1   / LOAD INPUT INTO AC
0654  4736            JMS I  PNORM    / GO PROCESS NORMAL INPUT
0655  0724            TSDRCT          / ADDRESS OF RCT, PARAMETER FOR ND
0656  4502            JMS I  PRETURN  / RETURN FROM INTERUPT PROCESSOR
0657  1324   STARTK,  TAD    TSDRCT   / LOAD PTR TO RCT IN AC
0660  1340            TAD    STRKD    / ADD IN DISP FOR STAR KEY FLAG
0661  3341            DCA    PTRSKF   / STORE PTR TO START KEY FLAG
0662  1741            TAD I  PTRSKF   / LOAD START KEY FLAG
0663  7640            SZA CLA         / IS IT 0
0664  4502            JMS I  PRETURN  / NO, FORGET THIS 1
0665  7001            IAC             / SET AC=1
0666  3741            DCA I  PTRSKF   / SET START KEY FLAG
0667  1073            TAD Z  PSTRTR   / PUT POINTER TO START ROUTINE IN AC
0670  5300            JMP    SETRCT   / GO SETUP RCT & RETURN
0671  1065   RELK,    TAD Z  PRLR     / PUT PTR TO REPEAT LESSON ROU IN AC
0672  5300            JMP    SETRCT   / JUMP TO SET RCT
0673  7200   RSK,     CLA             / CLEAR THE AC
0674  1064   RSK1,    TAD Z  PRSR     / PUT - TO REPEAT STEP ROU. IN AC
0675  5300            JMP    SETRCT   / JUMP TO SET RCT
0676  1066   RECK,    TAD Z  PRCR     / PUT PTR TO REPEAT CALL ROUTINE IN AC
0677  5300            JMP    SETRCT   / JUMP TO SET RCT
0700  3334   SETRCT,  DCA    SETAC    / STORE THE ADDR FROM AC
0701  1324            TAD    TSDRCT   / LOAD AC WITH - TO RCT
0702  1030            TAD Z  ANID     / ADD IN DISP. FOR ADDR OF NEXT INST.
```

```
0703    3333                    DCA     TSDNIP  / STORE - TO ADDR OF NEXT INST.
0704    1334                    TAD     SETAC   / LOAD AC WITH ADDR
0705    3733                    DCA I   TSDNIP
0706    1324    SETAF,          TAD     TSDRCT  / LOAD - TO RCT IN AC
0707    1024                    TAD Z   AFD     / ADD IN ACTIVE FLAG DISP.
0710    3335                    DCA     TSDAFP  / STORE IT
0711    7001                    IAC             / SET AC=1
0712    3735                    DCA I   TSDAFP  / SET ACTIVE FLAG IN RCT = 1
0713    1324                    TAD     TSDRCT  / LOAD PTR TO RCT
0714    1321                    TAD     TSDF1D  / ADD IN DISP FOR TASKSW DF
0715    3335                    DCA     TSDAFP  / STORE PTR INTO RCT
0716    3735                    DCA I   TSDAFP  / SET DF=0
0717    4502                    JMS I   PRETURN / JUMP TO RETURN FROM INTERUPT
0720    0000    TSDIN,  0               / SAVE AREA FOR INPUT
0721    0065    TSDF1D, 65              / DISP FOR TASKSW & DISP
0722    7000    MSKRMT, 7000            / MASK FOR REMOTE NUMBER
0723    0000    TSDRMT, 0               / REMOTE NUMBER
0724    0000    TSDRCT, 0               / POINTER TO RCT
0725    0777    NSKIN,  0777            / MASK FOR INPUT
0726    0000    TSDIN1, 0               / INPUT WITH REMOTE # MASKED OUT
0727    7671    CPSTRK, -0107           / NEG. FOR START KEY
0730    7670    CPRELK, -0110           / NEG. FOR REPEAT LESSON KEY
0731    7666    CPR1SK, -0112           / NEG. FOR REPEAT 1 STEP
0732    7667    CPRCK,  -0111           / NEG. FOR REPEAT CALL KEY
0733    0000    TSDNIP,    0            / PTR TO NEXT INST. IN RCT
0734    0000    SETAC,     0            / SAVE AC
0735    0000    TSDAFP,    0            / PTR TO ACTIVE FLAG IN RCT
0736    1071    PNORM,  NORM            / PTR TO NORMAL INPUT ROUTINE
0737    0007    CPERK,  0007            / CODE FOR ERROR KEY ON CONTROL PANEL
0740    0007    STRKD,  7               / DISP FOR START KEY IN AC
0741    0000    PTRSKF, 0000            / PTR TO START KEY FLAG
                /
                /       ASTOP
                /               ROUTINE TESTS CODE PASSED IN THE AC
                /               TO SEE IF CODE IS ASS, ASC, ASL,
                /               IF SO, AC=0 ON RETURN, IF NOT AC=1
0742    0000    ASTOP,  0000
0743    3371                    DCA     ASTINP  / RELOAD INPUT
0744    1342                    TAD     ASTOP   / LOAD RETURN ADDR
0745    4503                    JMS I   PSAVE4  / GO SAVE IT
0746    1371                    TAD     ASTINP  / RELOAD INPUT
0747    1372                    TAD     ASS     / ADD IN NEG. FOR AUDIO STOP STEP
0750    7450                    SNA             / IS THE AC=0
0751    5367                    JMP     AST1    / YES, GO SET AC=0, AND RETURN
0752    7200                    CLA             / NO, CLEAR THE AC
0753    1371                    TAD     ASTINP  / RELOAD THE INPUT
0754    1373                    TAD     ASC     / ADD N AUDIO STOP CALL
0755    7450                    SNA             / IS THE AC=0
0756    5367                    JMP     AST1    / YES, GO SET AC=0, RETURN
0757    7200                    CLA             / NO, CLEAR THE AC
0760    1371                    TAD     ASTINP  / RELOAD THE INPUT
0761    1374                    TAD     ASL     / ADD IN AUDIO STOP LESSON
0762    7450                    SNA             / IS THE AC=0
0763    5367                    JMP     AST1    / YES, GO SET AC=0 & RETURN
0764    7200                    CLA             / NO CLEAR THE AC
0765    7001                    IAC             / SET IT =1
0766    4506                    JMS I   PREST4  / RETURN
0767    7200    AST1,   CLA             / CLEAR THE AC
0770    4506                    JMS I   PREST4  / RETURN
0771    0000    ASTINP, 0000            / SAVE AREA FOR INPUT
0772    7663    ASS,    -0115           / CODE FOR AUDIO STOP STEP
0773    7664    ASC,    -0114           / CODE FOR AUDIO STOP CALL
0774    7661    ASL,    -0117           / CODE FOR AUDIO STOP LESSON
                        *1000
                /
                /       TONE
                /               ROUTINE TURNS OFF TONECH BIT FOR REMOTE
                /
1000    0000    TONE,   0000            / RETURN ADDR
1001    7200            CLA             / CLEAR THE AC
1002    1200            TAD     TONE    / LOAD RETURN ADDR
1003    4503            JMS I   PSAVE4  / GO SAVE IT
1004    1140            TAD Z   TONECH  / LOAD AC WITH CODE FOR TONE CHECK
1005    0135            AND Z   OFFBIT  / AND IN THE OFFBIT
```

```
1006  4462              JMS I   POUT     / SEND IT OUT
1007  4506              JMS I   PREST4   / RETURN
                /
                /        AUDOFF
                /                        ROUTINE TURNS OFF AUDIO PLAY BIT FOR REMOTE
                /
1010  0000     AUDOFF,  0000             / RETURN ADDR
1011  7200              CLA              / CLEAR THE AC
1012  1210              TAD     AUDOFF   / LOAD RETURN ADDR
1013  4503              JMS I   PSAVE4   / GO SAVE IT
1014  1141              TAD Z   PLAY     / LOAD IN CODE TO PLAY AUDIO
1015  0135              AND Z   OFFBIT   / AND IN THE OFFBIT
1016  4462              JMS I   POUT     / SEND IT OUT
1017  4506              JMS I   PREST4   / RETURN
                /
                /
                /                        TIMER INTERRUPT ROUTINE
                /                        ROUTINE CHECKS EACH RCT TO SEE IF THE
                /                        WAIT COUNT IS SET; IF SO IT DECREMENTS IT BY
                /                        IF IT IS NOW 0, ACTIVE FLAG IS SET TO 1;
                /
1020  7200     TIMER,   CLA              / CLEAR THE AC
1021  6524              6524             / READ DATA
1022  6520              6520             / DISABLE INTERRUPT
1023  7200              CLA              / CLEAR THE AC
1024  1151              TAD Z   NUMREM   / LOAD AC WITH NUMBER OF REMOTES
1025  3264              DCA     LOOPT    / STORE NEG OF NUM OF REMOTES
1026  1021              TAD Z   PRCTAB   / LOAD AC WITH ADDR OF RCT TABLE
1027  3265              DCA     TIPRCT   / STORE IT IN TIPRCT
1030  1665     TITEST,  TAD I   TIPRCT   / LOAD AC WITH - TO RCT
1031  1034              TAD Z   WCD      / ADD IN WAIT COUNT DISP.
1032  3266              DCA     TIPWCT   / STORE IT IN TIPWCT
1033  1666              TAD I   TIPWCT   / LOAD AC WITH WAIT COUNT
1034  7440              SZA              / SKIP IF WAIT COUNT = 0
1035  5246              JMP     TIDECR   / JUMP TO DECREMENT
1036  2264     TILOOP,  ISZ     LOOPT    / DECREMENT LOOP BY 1
1037  5241              JMP     TINEXT   / GO TEST NEXT ONE
1040  5573              JMP I   PFLASH   / JUMP TO FLASH ROUTINE
1041  7200     TINEXT,  CLA              / CLEAR THE AC
1042  1265              TAD     TIPRCT   / LOAD AC WITH - IN RCT TABLE
1043  7001              IAC              / INCREMENT IT BY 1
1044  3265              DCA     TIPRCT   / STORE IT BACK IN TIPRCT
1045  5230              JMP     TITEST   / JUMP TO TEST NEXT ONE
1046  1270     TIDECR,  TAD     MONE     / DECREMENT WAIT COUNT BY 1
1047  7450              SNA              / SKIP NEXT IF AC NOT 0
1050  5253              JMP     TIWC0    / WAIT COUNT NOW 0
1051  3666              DCA I   TIPWCT   / STORE IT BACK IN WAIT COUNT IN RCT
1052  5236              JMP     TILOOP   / TRY NEXT RCT
1053  7200     TIWC0,   CLA              / CLEAR THE AC
1054  1265              TAD     TIPRCT   / LOAD PTR TO PTR TO RCT IN AC
1055  3260              DCA     TIPARM   / STORE IN IN PARAMETER WORD
1056  1267              TAD     T7777    / LOAD AC WITH 7777
1057  4271              JMS     NORM     / GO PUT IT IN BUFFER IN RCT
1060  0000     TIPARM,  0                / PTR TO RCT, USED AS PARAMETER
1061  7200              CLA              / CLEAR THE AC
1062  3666              DCA I   TIPWCT   / SET WAIT COUNT =0 IN RCT
1063  5236              JMP     TILOOP   / TRY NEXT ONE
1064  0000     LOOPT,   0000             / TEMP LOOP COUNTER
1065  0000     TIPRCT,  0                / - INTO RCT TABLE
1066  0000     TIPWCT,  0                / - TO WAIT COUNT IN RCT
1067  7777     T7777,   7777             / ALL 7777 FOR TIMER INTERRUPT
1070  7777     MONE,    -1               / CONSTANT -1
                /
                /
                /        NORM
                /                        ROUTINE PLACES INPUT IN AC IN INPUT BUFFER
                /                        IN THE RCT; 1ST PARAMETER IS POINTER TO
                /                        THE RCT ADDRESS
                /
1071  0000     NORM,    0                / ADDRESS OF RCT
1072  3352              DCA     SAVEIN   / SAVE INPUT
1073  1671              TAD I   NORM     / LOAD PTR TO PTR TO RCT IN AC
```

```
1074  3347             DCA    PRCT1   / SAVE IT
1075  1747             TAD I  PRCT1   / LOAD PTR TO RCT IN AC
1076  3347             DCA    PRCT1   / SAVE IT
1077  7200             CLA            / CLEAR THE AC
1100  1347             TAD    PRCT1   / LOAD AC WITH PTR TO RCT
1101  1036             TAD Z  STOPD   / ADD IN DISP. FOR STORE POINTER
1102  3344             DCA    TSDSTP  / STORE POINTER TO STORE POINTER
1103  1744             TAD I  TSDSTP  / LOAD STORE POINTER IN AC
1104  7001             IAC            / INCREMENT IT BY 1
1105  3744             DCA I  TSDSTP  / STORE STORE POINTER
1106  1347             TAD    PRCT1   / LOAD AC WITH PTR TO RCT
1107  1040             TAD Z  PTEBD   / ADD IN DISP. FOR PTR TO EOB
1110  3345             DCA    TSDEBP  / STORE PTR TO EOB PTR
1111  1745             TAD I  TSDEBP  / LOAD END OF BUFFER ADDR. IN AC
1112  7041             CIA            / SET IT NEGATIVE
1113  1744             TAD I  TSDSTP  / ADD IN STORE POINTER
1114  7450             SNA            / SKIP NEXT IF AC NOT 0
1115  5335             JMP    ENDBUF  / AC=0, END OF BUFFER
1116  7200   STORE1,   CLA            / CLEAR THE AC
1117  1744             TAD I  TSDSTP  / LOAD AC WITH STORE POINTER
1120  3344             DCA    TSDSTP  / STORE STORE POINTER
1121  1352             TAD    SAVEIN  / LOAD INPUT INTO AC
1122  3744             DCA I  TSDSTP  / STORE IT IN BUFFER IN RCT
1123  7200             CLA            / CLEAR THE AC
1124  1347             TAD    PRCT1   / LOAD PTR TO RCT IN AC
1125  1024             TAD Z  AFD     / ADD IN DISP. FOR ACTIVE FLAG
1126  3350             DCA    AFP1    / STORE IT
1127  7001             IAC            / SET AC=1
1130  3750             DCA I  AFP1    / SET ACTIVE FLAG IN RCT
1131  1271             TAD    NORM    / LOAD AC WITH RETURN ADDRESS
1132  7001             IAC            / GET PAST ARGUMENT
1133  3351             DCA    RET1    / STORE RETURN ADDRESS
1134  5751             JMP I  RET1    / BRANCH BACK
1135  7200   ENDBUF,   CLA            / CLEAR THE ACTIVE FLAG
1136  1347             TAD    PRCT1   / LOAD AC WITH PTR TO RCT
1137  1037             TAD Z  PTBBD   / ADD IN DISP. FOR PTR TO BEG. OF
1140  3346             DCA    TSDBBP  / STORE IT
1141  1746             TAD I  TSDBBP  / LOAD AC WITH BEG. OF BUF PTR
1142  3744             DCA I  TSDSTP  / STORE BEG. OF BUF PTR IN STR. PTR
1143  5316             JMP    STORE1  / GO STORE INPUT
1144  0000   TSDSTP,   0              / PTR TO STORE PTR IN RCT
1145  0000   TSDEBP,   0              / PTR TO END OF BUFFER PTR IN RCT
1146  0000   TSDBBP,   0              / PTR TO BEG. OF BUFFER IN RCT
1147  0000   PRCT1,    0              / PTR TO RCT
1150  0000   AFP1,     0              / POINTER TO ACTIVE FLAG
1151  0000   RET1,     0              / PTR TO RETURN ADDRESS
1152  0000   SAVEIN,   0              / SAVE INPUT
               PAUSE
               *1200
      /
      /                       REPEAT CALL ROUTINE
      /                       ROUTINE SETS UP THE RCT & AUDIO
      /                       TO REPEAT THE LAST CALL
      /
1200  7200   RCR,      CLA            / CLEAR THE AC
1201  1020             TAD Z  CURRCT  / LOAD PTR TO RCT
1202  1050             TAD Z  RLFD    / ADD IN DISP FOR REPEAT LESSON FLG
1203  3323             DCA    RCRGOP  / STORE PTR TO REPEAT LESSON FLAG
1204  1723             TAD I  RCRGOP  / LOAD REPEAT LESSON FLAG
1205  7440             SZA            / IS IT SET
1206  5465             JMP I  PRLR    / JUMP TO REPEAT LESSON ROUTINE
1207  1020             TAD Z  CURRCT  / YES, LOAD PTR TO RCT
1210  1052             TAD Z  RSFD    / ADD IN DISP FOR REPEAT STEP FLAG
1211  3323             DCA    RCRGOP  / STORE PTR TO REPEAT STEP FLAG
1212  1723             TAD I  RCRGOP  / LOAD FLAG IN AC
1213  7440             SZA            / IS IT SET
1214  5464             JMP I  PRSR    / JUMP TO REPEAT STEP ROUTINE
1215  1020             TAD Z  CURRCT  / LOAD PTR TO RCT
1216  1051             TAD Z  RCFD    / ADD IN DISP. FOR REPEAT CALL FLAG
1217  3323             DCA    RCRGOP  / STORE PTR TO GO FLAG
1220  1723             TAD I  RCRGOP  / LOAD GO FLAG
1221  7440             SZA            / IS IT ZERO
1222  5265             JMP    RCR2    / GO TO SECOND TIME AROUND
1223  4504             JMS I  PTONE   / TURN OFF TONE BIT
```

```
1224  4505              JMS I   PAUDOFF  / TURN OFF PLAY BIT
1225  4566              JMS I   PMUTOFF  / TURN OFF MUTE BIT
1226  4564              JMS I   PRESBUF  / GO RESET BUFFER
1227  1317              TAD     RCRCL    / LIGHT REPEAT CALL LAMP
1230  4462              JMS I   POUT
1231  4517              JMS I   PZASTPF  / ZERO AUDIO STOP FLAG
1232  7001              IAC              / SET AC=1
1233  3723              DCA I   RCRGOP   / SET REPEAT CALL FLAG IN AC
1234  1153              TAD Z   GOLAMP   / LOAD IN CODE FOR GO LAMP
1235  0135              AND Z   OFFBIT   / AND IN THE OFF BIT
1236  4462              JMS I   POUT     / OUTPUT IT
1237  1322              TAD     RCRABC   / LOAD CODE TO BACKSPACE TO LAST CALL
1240  4462              JMS I   POUT     / OUTPUT IT
1241  4454   RBACK,     JMS I   PTASKSW  / WAIT FOR INPUT
1242  4455              JMS I   PGETIN   / GET THE INPUT
1243  3313              DCA     RCRIN    / STORE IT
1244  1313              TAD     RCRIN    / RELOAD IT
1245  1320              TAD     RCRASC   / WAS IT AUDIO STOP CALL
1246  7650              SNA CLA           / IS AC=0
1247  5255              JMP     RCR1     / YES, GO ON
1250  1313              TAD     RCRIN    / RELOAD THE INPUT
1251  1321              TAD     RCRASL   / WAS IT AUDIO STOP LESSON
1252  7450              SNA
1253  5255              JMP     RCR1     / YES, GO ON
1254  5241              JMP     RBACK    / NO, WAIT SOME MORE
1255  1322   RCR1,      TAD     RCRABC   / RELOAD CODE TO BACKSPACE CALL
1256  0135              AND Z   OFFBIT   / AND IN OFF BIT
1257  4462              JMS I   POUT     / SEND IT OUT
1260  4520              JMS I   PSASTPF  / GO SET AUDIO STOP FLAG
1261  1153              TAD Z   GOLAMP   / LOAD IN CODE FOR GO LAMP
1262  4462              JMS I   POUT     / SEND IT OUT
1263  4454   RCR3,      JMS I   PTASKSW  / WAIT FOR KEY
1264  5263              JMP     RCR3     / NOT REPEAT CALL KEY FORGET IT
1265  4521   RCR2,      JMS I   PGASTPF  / GO GET AUDIO STOP FLAG
1266  7650              SNA CLA           / IS IT SET
1267  5241              JMP     RBACK    / NO, WAIT SOME MORE
1270  1020              TAD Z   CURRCT   / LOAD PTR TO RCT
1271  1030              TAD Z   ANID     / ADD IN DISP. FOR ADDR. OF
                                            NEXT INST.
1272  3315              DCA     RCANI    / STORE POINTER TO ADDR OF NEXT INST.
1273  1020              TAD Z   CURRCT   / LOAD PTR TO RCT
1274  1027              TAD Z   ALCD     / ADD IN DISP. FOR ADDR OF LAST CALL
1275  3314              DCA     RCPALC   / STORE POINTER TO ADDR. OF LAST CALL
1276  1714              TAD I   RCPALC   / LOAD ADDR OF LAST CALL
1277  3715              DCA I   RCANI    / STORE IT IN ADDR. OF NEXT INST.
1300  1020              TAD Z   CURRCT   / LOAD PTR TO RCT
1301  1033              TAD Z   ALSD     / ADD IN DISP. FOR ADDR OF LAST STEP
1302  3316              DCA     RCPALS   / STORE POINTER TO ADDR. OF LAST STEP
1303  1714              TAD I   RCPALC   / LOAD ADDR. OF LAST CALL
1304  3716              DCA I   RCPALS   / STORE IT ADDR. OF LAST STEP
1305  1317              TAD     RCRCL    / LOAD CODE FOR REPEAT CALL LAMP
1306  0135              AND Z   OFFBIT   / AND IN THE OFFBIT
1307  4462              JMS I   POUT     / OUTPUT IT
1310  4463              JMS I   PRESET   / JUMP TO RESET ROUTINE
1311  4546              JMS I   PRESDF   / GO RESTORE DATA FIELD
1312  4453              JMS I   PDISPAT  / JUMP TO DISPATCHER ROUTINE
1313  0000   RCRIN,     0000             / SAVE INPUT
1314  0000   RCPALC,    0000             / PTR TO ADDR OF LAST CALL
1315  0000   RCANI,     0                / POINTER TO ADDR. OF NEXT INST.
1316  0000   RCPALS,    0                / POINTER TO ADDR. OF LAST STEP
1317  0743   RCRCL,     0743             / CODE FOR REPEAT CALL LAMP
1320  7664   RCRASC,    -0114            / CODE FOR AUDIO STOP CALL
1321  7661   RCRASL,    -0117            / CODE FOR AUDIO STOP LESSON
1322  0754   RCRABC,    0754             / CODE TO BACKSPACE AUDIO TO LAST CALL
1323  0000   RCRGOP,    0000             / POINTER TO GO FLAG
      /
      /                 KEYRNT
      /                          ROUTINE CHECKS FOR A KEY PASSED AS
      /                          A PARAMETER; ROUTINE DOES NOT SET ERROR
      /                          TIME;
      /
1324  0000   KEYRNT,    0000             / ADDR OF KEY
1325  7200              CLA              / CLEAR THE AC
1326  4456              JMS I   PWAIT    / SET WAIT COUNT=0
```

| | | | | | |
|---|---|---|---|---|---|
| 1327 | 1724 | | TAD I | KEYRNT | / PICK UP PARAM |
| 1330 | 3023 | | DCA Z | SAVPAR | / STORE IT IN PAGE 0 |
| 1331 | 1324 | | TAD | KEYRNT | / LOAD ADDR OF PARAMETER |
| 1332 | 7001 | | IAC | | / ADD 1 TO GET TO RETURN ADDR |
| 1333 | 4471 | | JMS I | PSAVE | / GO SAVE RETURN ADDR |
| 1334 | 1022 | | TAD Z | PSAVPAR | / LOAD ADR OF PARAM |
| 1335 | 4472 | | JMS I | PSAVP1 | / GO SAVE IT IN RCT |
| 1336 | 4454 | KEYRN2, | JMS I | PTASKSW | / WAIT FOR INTERRUPT |
| 1337 | 4455 | | JMS I | PGETIN | / GET INPUT |
| 1340 | 3355 | | DCA | KRNIN | / STORE IT |
| 1341 | 1355 | | TAD | KRNIN | / RELOAD INPUT |
| 1342 | 1137 | | TAD Z | SOUNDP | / WAS IT SOUND PRESENT |
| 1343 | 7640 | | SZA CLA | | / IS AC=0 |
| 1344 | 5350 | | JMP | KEYRN1 | / NO GO TEST FOR KEY |
| 1345 | 4504 | | JMS I | PTONE | / YES, TURN OFF TONE BIT |
| 1346 | 4523 | | JMS I | PSARSPF | / GO SET AUDIO RESPONSE FLAG |
| 1347 | 5336 | | JMP | KEYRN2 | / GO WAIT FOR KEY |
| 1350 | 4470 | KEYRN1, | JMS I | PRETP1 | / GO GET KEY |
| 1351 | 1355 | | TAD | KRNIN | / ADD IN INPUT |
| 1352 | 7440 | | SZA | | / IS IT ZERO |
| 1353 | 4460 | | JMS I | PERROR | / NO, MUST BE ERROR |
| 1354 | 4467 | | JMS I | PRESTOR | / RETURN TO LESSON |
| 1355 | 0000 | KRNIN, | 0000 | | / SAVE AREA FOR INPUT |

/
/ CLKON
/ ROUTINE SETS CLOCK FLAG IN RCT
/

| | | | | | |
|---|---|---|---|---|---|
| 1356 | 0000 | CLKON, | 0000 | | |
| 1357 | 7200 | | CLA | | / CLEAR THE AC |
| 1360 | 1356 | | TAD | CLKON | / LOAD RETURN ADDR |
| 1361 | 4503 | | JMS I | PSAVE4 | / GO SAVE IT |
| 1362 | 1020 | | TAD Z | CURRCT | / LOAD PTR TO RCT |
| 1363 | 1044 | | TAD Z | CLKFD | / ADD IN DISP FOR CLOCK FLAG |
| 1364 | 3370 | | DCA | CLKONP | / STORE PTR TO CLOCK FLAG |
| 1365 | 7001 | | IAC | | / SET AC=1 |
| 1366 | 3770 | | DCA I | CLKONP | / SET CLOCK FLAG=1 IN AC |
| 1367 | 4506 | | JMS I | PREST4 | / RETURN |
| 1370 | 0000 | CLKONP, | 0000 | | / PTR TO CLOCK FLAG |

*1400

/
/ CLKOFF
/ ROUTINE ZEROES CLOCK FLAG IN RCT
/

| | | | | | |
|---|---|---|---|---|---|
| 1400 | 0000 | CLKOFF, | 0000 | | / RETURN ADDR |
| 1401 | 7200 | | CLA | | / CLEAR THE AC |
| 1402 | 1200 | | TAD | CLKOFF | / LOAD RETURN ADDR |
| 1403 | 4503 | | JMS I | PSAVE4 | / GO SAVE IT |
| 1404 | 1020 | | TAD Z | CURRCT | / LOAD PTR TO RCT |
| 1405 | 1044 | | TAD Z | CLKFD | / ADD IN DISP FOR CLOCK FLAG |
| 1406 | 3211 | | DCA | CLKOFP | / STORE PTR TO CLOCK FLAG |
| 1407 | 3611 | | DCA I | CLKOFP | / ZERO CLOCK FLAG |
| 1410 | 4506 | | JMS I | PREST4 | / RETURN |
| 1411 | 0000 | CLKOFP, | 0000 | | / PTR TO CLOCK FLAG |

/
/ RESET
/ ROUTINE SETS ACTIVE FLAG=1,
/ ZEROES WAIT COUNT, REPEAT LES, STEP, CALL
/ FLAG

| | | | | | |
|---|---|---|---|---|---|
| 1412 | 0000 | RESET, | 0000 | | |
| 1413 | 7200 | | CLA | | / CLEAR THE AC |
| 1414 | 1020 | | TAD Z | CURRCT | / LOAD PTR TO RCT IN AC |
| 1415 | 1024 | | TAD Z | AFD | / ADD IN ACTIVE FLAG DISPLACEMENT |
| 1416 | 3242 | | DCA | REAFP | / STORE POINTER TO ACTIVE FLAG |
| 1417 | 7001 | | IAC | | / SET AC=1 |
| 1420 | 3642 | | DCA I | REAFP | / STORE 1 IN ACTIVE FLAG IN RCT |
| 1421 | 1020 | | TAD Z | CURRCT | / LOAD PTR TO RCT |
| 1422 | 1034 | | TAD Z | WCD | / ADD IN WAIT COUNT DISP. |
| 1423 | 3242 | | DCA | REAFP | / STORE PTR TO WAIT COUNT |
| 1424 | 3642 | | DCA I | REAFP | / ZERO WAIT COUNT |
| 1425 | 1020 | | TAD Z | CURRCT | / LOAD PTR TO RCT |
| 1426 | 1051 | | TAD Z | RCFD | / ADD IN REPEAT CALL FLAG DISP |
| 1427 | 3242 | | DCA | REAFP | / STORE PTR TO GO FLAG |
| 1430 | 3642 | | DCA I | REAFP | / ZERO GO FLAG |
| 1431 | 1020 | | TAD Z | CURRCT | / LOAD PTR TO RCT |
| 1432 | 1050 | | TAD Z | RLFD | / ADD IN DISP FOR REPEAT LESSON |
| 1433 | 3242 | | DCA | REAFP | / STORE PTR TO REPEAT LESSON FLAG |

```
1434   3642              DCA I    REAFP    / ZERO REPEAT LESSON FLAG
1435   1020              TAD Z    CURRCT   / LOAD PTR TO RCT
1436   1052              TAD Z    RSFD     / ADD IN PTR TO REPEAT STEP FLAG
1437   3242              DCA      REAFP    / STORE PTR TO REPEAT STEP FLAG
1440   3642              DCA I    REAFP    / ZERO STEP FLAG
1441   5612              JMP I    RESET    / RETURN TO CALLING ROUTINE
1442   0000     REAFP,   0                 / POINTER TO ACTIVE FLAG
                /
                /        RESBUF
                /                 ROUTINE RESETS THE BUFFER IN RCT
                /
1443   0000     RESBUF,  0000              / RETURN ADDR
1444   7200              CLA               / CLEAR THE AC
1445   1020              TAD Z    CURRCT   / LOAD AC WITH PTR TO RCT
1446   1037              TAD Z    PTBBD    / ADD IN DISP. TO GET PTR TO BEG.OF BUF
1447   3265              DCA      REPBBP   / STORE POINTER TO BEGINNING OF BUFFER
1450   1665              TAD I    REPBBP   / LOAD AC WITH BEG. OF BUFFER PTR
1451   3266              DCA      REPBB    / STORE BEG. OF BUFFER POINTER
1452   1020              TAD Z    CURRCT   / LOAD AC WITH PTR TO RCT
1453   1035              TAD Z    PROPD    / ADD IN DISP. FOR PROCESS POINTER
1454   3267              DCA      REPPRO   / STORE POINTER TO PROCESS POINTER
1455   1266              TAD      REPBB    / LOAD AC WITH BEG. OF BUFFER POINTER
1456   3667              DCA I    REPPRO   / STORE IT IN PROCESS POINTER
1457   1020              TAD Z    CURRCT   / LOAD AC WITH PTR TO RCT
1460   1036              TAD Z    STOPD    / ADD IN STORE POINTER DISPLACEMENT
1461   3270              DCA      REPSTO   / STORE POINTER TO STORE POINTER
1462   1266              TAD      REPBB    / LOAD AC WITH BEGGING OF BUFFER POINTER
1463   3670              DCA I    REPSTO   / STORE IT IN STORE POINTER
1464   5643              JMP I    RESBUF   / RETURN TO CALLING ROUTINE
1465   0000     REPBBP,  0                 / POINTER TO BEGGING OF BUFFER POINTER
1466   0000     REPBB,   0                 / POINTER TO BEG. OF BUFFER
1467   0000     REPPRO,  0                 / POINTER TO PROCESS POINTER
1470   0000     REPSTO,  0                 / POINTER TO STORE POINTER
                /
                /        RLR
                /                 REPEAT LESSON ROUTINE PROCESSES THE
                /                 REPEAT LESSON KEY ON THE CONTROL PANEL
                /
1471   7200     RLR,     CLA               / CLEAR THE AC
1472   1020              TAD Z    CURRCT   / LOAD PTR TO RCT
1473   1051              TAD Z    RCFD     / ADD IN DISP. FOR REPEAT CALL
1474   3370              DCA      RLRGOP   / STORE PTR TO REPEAT CALL FLAG
1475   1770.             TAD I    RLRGOP   / LOAD REPEAT CALL FLAG
1476   7440              SZA               / IS IT SET
1477   5466              JMP I    PRCR     / JUMP TO REPEAT CALL ROUTINE
1500   1020              TAD Z    CURRCT   / LOAD PTR TO RCT
1501   1052              TAD Z    RSFD     / ADD IN REPEAT STEP FLAG
1502   3370              DCA      RLRGOP   / STORE PTR TO REPEAT STEP FLAG
1503   1770              TAD I    RLRGOP   / LOAD REPEAT STEP FLAG IN AC
1504   7440              SZA               / IS IT SET
1505   5464              JMP I    PRSR     / JUMP TO REPEAT STEP ROUTINE
1506   1020              TAD Z    CURRCT   / LOAD PTR TO RCT
1507   1050              TAD Z    RLFD     / ADD IN DISP FOR REPEAT LESSON FLAG
1510   3370              DCA      RLRGOP   / STORE POINTER TO GO FLAG
1511   1770              TAD I    RLRGOP   / LOAD GO FLAG
1512   7440              SZA               / IS IT ZERO
1513   5347              JMP      RLR2     / NO, MUST BE SECOND TIME AROUND
1514   4504              JMS I    PTONE    / TURN OFF TONE BIT
1515   4505              JMS I    PAUDOFF  / TURN OFF PLAY BIT
1516   4566              JMS I    PMUTOFF  / TURN OFF MUTE BIT
1517   4564              JMS I    PRESBUF  / GO RESET BUFFER
1520   1376              TAD      RLRRLL   / LIGHT REPEAT LESSON LAMP
1521   4462              JMS I    POUT
1522   4517              JMS I    PZASTPF  / ZERO AUDIO STOP FLAG
1523   7001              IAC               / SET AC=1
1524   3770              DCA I    RLRGOP   / SET AREPEAT LESSON FLAG
1525   1373              TAD      RLRGO    / YES, LOAD IN CODE FOR GO LAMP
1526   0135              AND Z    OFFBIT   / AND IN OFF BIT
1527   4462              JMS I    POUT     / SEND IT OUT
1530   1371              TAD      RLRABL   / LOAD CODE TO BACKSPACE TO LAST LESSON
1531   4462              JMS I    POUT     / SEND IT OUT
1532   4454     RLR1,    JMS I    PTASKSW  / WAIT FOR TONE
1533   4455              JMS I    PGETIN   / GET THE INPUT
1534   1372              TAD      RLRASL   / WAS IT AUDIO STOP LESSON
1535   7440              SZA               / IS THE AC=0
```

```
1536  5332            JMP      RLR1      / NO, WAIT SOME MORE
1537  1371            TAD      RLRABL    / YES, RELOAD CODE TO BACKSP. LESSON
1540  0135            AND Z    OFFBIT    / AND IN OFF BIT
1541  4462            JMS I    POUT      / SEND IT OUT
1542  4520            JMS I    PSASTPF   / GO SET AUDIO STOP FLAG
1543  1373            TAD      RLRGO     / LOAD IN CODE FOR GO LAMP
1544  4462            JMS I    POUT      / SEND IT OUT
1545  4454   RLR3,    JMS I    PTASKSW   / WAIT FOR KEY
1546  5345            JMP      RLR3      / MUST NOT BE REPEAT LESSON KEY
1547  4521   RLR2,    JMS I    PGASTPF   / GET AUDIO STOP FLAG
1550  7650            SNA CLA            / IS IT SET
1551  5332            JMP      RLR1      / NO, GO WAIT SOME MORE
1552  1020            TAD Z    CURRCT    / LOAD PTR TO RCT
1553  1032            TAD Z    ABLD      / ADD IN DISP. FOR BEG. OF LESSON
1554  3374            DCA      RLRPBL    / STORE PTR TO BEG. OF LESS. ADDR
1555  1020            TAD Z    CURRCT    / RELOAD PTR TO RCT
1556  1030            TAD Z    ANID      / ADD IN DISP. FOR ADDR OF NEXT INST.
1557  3375            DCA      RLRPNI    / STORE PTR TO ADDR. OF NEXT INST.
1560  1774            TAD I    RLRPBL    / STORE BEG. OF LESSON IN AC
1561  3775            DCA I    RLRPNI    / STORE IT IN ADDR OF NEXT INST.
1562  1376            TAD      RLRRLL    / LOAD CODE FOR REPEAT LESSON LAMP
1563  0135            AND Z    OFFBIT    / AND IN OFF BIT
1564  4462            JMS I    POUT      / SEND IT OUT
1565  4463            JMS I    PRESET    / GO RESET EVERYTHING
1566  4546            JMS I    PRESDF    / GO RESTORE DTA FIELAD
1567  4453            JMS I    PDISPAT   / JUMP TO DISPATCHER
1570  0000   RLRGOP,  0000               / POINTER TO GO FLAG
1571  0755   RLRABL,  0755               / CODE TO BACKSPACE LESSON
1572  7661   RLRASL,  -0117              / CODE FOR AUDIO STOP LESSON
1573  0740   RLRGO,   0740               / CODE FOR GO LAMP
1574  0000   RLRPBL,  0000               / PTR TO ADDR OF BEG. OF LESSON
1575  0000   RLRPNI,  0000               / PTR TO ADDR OF NEXT INST.
1576  0737   RLRRLL,  0737               / CODE FOR REPEAT LESSON LAMP
                      PAUSE
                      *2000
      /
      /               DELAY
      /
      /                         ROUTINE SETS THE TIMER IN THE RCT TO
      /                         VALUE PASSED IN AC & WAITS FOR TIMER INTERRUPT
      /
2000  0000   DELAY,   0000               / RETURN ADDR
2001  3217            DCA      DELAC     / STORE INPUT
2002  1200            TAD      DELAY     / LOAD RETURN ADDR
2003  4471            JMS I    PSAVE     / GO SAVE IT
2004  1020            TAD Z    CURRCT    / LOAD AC WITH PTR TO RCT
2005  1034            TAD Z    WCD       / ADD IN WAIT COUNT DISP.
2006  3220            DCA      DELPTW    / STORE PTR TO WAIT COUNT
2007  1217            TAD      DELAC     / RELOAD INPUT
2010  3620            DCA I    DELPTW    / STORE IT IN RCT
2011  4454            JMS I    PTASKSW   / WAIT
2012  4455            JMS I    PGETIN    / GET THE INPUT
2013  1143            TAD Z    M7777     / WAS ITA TIMER INTER
2014  7440            SZA                
2015  4460            JMS I    PERROR    / NO, MUST BE AN ERROR
2016  4467            JMS I    PRESTOR   / YES, RETURN
2017  0000   DELAC,   0000               / SAVE AREA FOR INPUT
2020  0000   DELPTW,  0000               / PTR TO WAIT COUNT
      /
      /
      /               SAVE1
      /
      /                         ROUTINE SAVES RETURN ADDR IN RCT
      /                         USED ONLY FOR SUBS OF LESSON
      /
2021  0000   SAVE1,   0000
2022  3233            DCA      S1INP     / STORE RETURN ADDR
2023  1221            TAD      SAVE1     / LOAD RETURN ADDR
2024  4503            JMS I    PSAVE4    / GO SAVE IT
2025  1020            TAD Z    CURRCT    / LOAD PTR TO RCT
2026  1046            TAD Z    RAD1      / ADD IN DISP. FOR SAVE1
2027  3234            DCA      S1PRA     / STORE PTR TO RETURN ADDR
2030  1233            TAD      S1INP     / RELOAD INPUT
2031  3634            DCA I    S1PRA     / STORE IT IN RCT
2032  4506            JMS I    PREST4    / RETURN
```

```
2033  0000  S1INP,    0000              /  SAVE AREA FOR INPUT
2034  0000  S1PRA,    0000              /  PTR TO RETURN ADDR IN RCT
            /
            /         REST1
            /                            ROUTINE PICKS UP RETURN ADDR FOR LESSON
            /                            & RETURN STO THAT ADDR
            /                            AC=0 ON RETURN
2035  0000  REST1,    0000
2036  7200            CLA                /  CLEAR THE AC
2037  1235            TAD     REST1      /  LOAD RETURN ADDR
2040  4503            JMS I   PSAVE4     /  GO SAVE IT
2041  1020            TAD Z   CURRCT     /  LOAD AC WITH PTR TO RCT
2042  1046            TAD Z   RAD1       /  ADD IN DISP. FOR SAVE1
2043  3247            DCA     RES1PR     /  STORE PTR TO SAVE1
2044  1647            TAD I   RES1PR     /  LOAD RETURN ADDR IN AC
2045  3247            DCA     RES1PR     /  STORE IT
2046  5647            JMP I   RES1PR     /  RETURN TO THAT ADDR
2047  0000  RES1PR,   0000               /  PTR TO RETURN ADDR
            /
            /         ZARSPF
            /                            ROUTINE ZEROES THE AUDIO RESPONSE FLAG
            /                            AC=0 ON RETURN
2050  0000  ZARSPF,   0000
2051  7200            CLA                /  CLEAR THE AC
2052  1250            TAD     ZARSPF     /  LOAD RETURN ADDR
2053  4503            JMS I   PSAVE4     /  GO SAVE IT
2054  1020            TAD Z   CURRCT     /  LOAD PTR TO RCT
2055  1047            TAD Z   ARSPD      /  ADD IN DISP. FOR AUDIO RESP.
2056  3261            DCA     ZPARF      /  STORE PTR TO AUDIO RESP. FLAG
2057  3661            DCA I   ZPARF      /  ZERO AUDIO RESP. FLAG
2060  4506            JMS I   PREST4     /  RETURN
2061  0000  ZPARF,    0000               /  PTR TO AUDIO RESPONSE FLAG
            /
            /         SARSPF
            /                            ROUTINE SETS THE AUDIO RESPONSE FLAG
            /                            IN THE RCT=1
2062  0000  SARSPF,   0000
2063  7200            CLA                /  CLEAR THE AC
2064  1262            TAD     SARSPF     /  LOAD RETURN ADDR
2065  4503            JMS I   PSAVE4     /  GO SAVE IT
2066  1020            TAD Z   CURRCT     /  LOAD PTR TO RCT
2067  1047            TAD Z   ARSPD      /  ADD IN DISP. FOR AUDIO RESP
2070  3274            DCA     SPARF      /  STORE PTR TO AUDIO RESP. FLAG
2071  7001            IAC                /  SET THE AC=1
2072  3674            DCA I   SPARF      /  STORE IT IN RCT
2073  4506            JMS I   PREST4     /  RETURN
2074  0000  SPARF,    0000               /  PTR TO AUDIO RESPONSE FLAG
            /
            /         GARSPF
            /                            ROUTINE RETURNS THE AUDIO RESPONSE FLAG
            /                            FROM THE RCT
2075  0000  GARSPF,   0000
2076  7200            CLA                /  CLEAR THE AC
2077  1275            TAD     GARSPF     /  LOAD RETURN ADDR
2100  4503            JMS I   PSAVE4     /  GO SAVE IT
2101  1020            TAD Z   CURRCT     /  LOAD PTR TO RCT
2102  1047            TAD Z   ARSPD      /  ADD IN DISP. FOR AUDIO RESP.
2103  3306            DCA     GPARF      /  STORE PTR TO AUDIO RESPONSE FLAG
2104  1706            TAD I   GPARF      /  LOAD AC WITH AUDIO RESP. FLAG
2105  4506            JMS I   PREST4     /  RETURN
2106  0000  GPARF,    0000
            /
            /         LOFF
            /                            ROUTINE TURNS OFF THE LIGHT
            /                            PASSED AS A PARAMETER
            /
2107  0000  LOFF,     0000
2110  7200            CLA                /  CLEAR THE AC
2111  1707            TAD I   LOFF       /  LOAD LAMP CODE IN AC
2112  3023            DCA Z   SAVPAR     /  SAV PAR
2113  1307            TAD     LOFF       /  LOAD ADDR OD PARAM IN AC
2114  7001            IAC                /  GET PASSED PARAM
2115  4503            JMS I   PSAVE4     /  SAVE IT
2116  1023            TAD Z   SAVPAR     /  PICK UP PAR
2117  0135            AND Z   OFFBIT     /  AND IN OFFBIT
```

```
2120   4462                JMS I    POUT
2121   4506                JMS I    PREST4   / RETURN
2122   0000   LOFFRT,  0000                  / SAVE ARAE FOR RETURN ADDTR
               /
               /          LON
               /          ROUTINE TURNS ON THE LAMP PASSED AS
               /          A PARAMETER
2123   0000   LON,     0000
2124   7200                CLA               / CLEAR THE AC
2125   1723.               TAD I    LON      / LOAD LAMP CODE IN AC
2126   3023                DCA Z    SAVPAR   / STORE PARAM
2127   1323                TAD      LON      / LOAD ADDR OF PARAMETER
2130   7001                IAC               / ADD 1 TO GET TO RETURN ADDR
2131   4503                JMS I    PSAVE4   / GO SAVE IT
2132   1023                TAD Z    SAVPAR   / LOAD PARAM
2133   4462                JMS I    POUT     / SEND IT OUT
2134   4506                JMS I    PREST4   / RETURN
2135   0000   LONRT,   0000                  / SAVE AREA FOR RETURN ADDR
2136   6000   RCTAB,   6000                  / RCT0
2137   6100            6100                  / RCT1
2140   6200            6200                  / RCT2
2141   6300            6300                  / RCT3
2142   6400            6400                  / RCT4
2143   6500            6500                  / RCT5
2144   6600            6600                  / RCT6
2145   6700            6700                  / RCT7
               /
               /          RESDF
               /                    ROUTINE PICKS UP DF THAT LESSON IS
               /                    LOADED & STORES THE DF IN TASKSW DF
               /
2146   0000   RESDF,   0000                  / RETURN ADDR
2147   7200                CLA               / CLEAR AC
2150   1020                TAD Z    CURRCT   / LOAD PTR TO RCT
2151   1361                TAD      TSDFD    / ADD IN DISP FOR TASKSW DF
2152   3362                DCA      RESDF1   / STORE PTR TO TASKSW DF
2153   1020                TAD Z    CURRCT   / LOAD PTR TO RCT
2154   1145                TAD Z    LDFD     / ADD IN DISP FOR LESSON DF
2155   3363                DCA      RESDF2   / STORE PTR
2156   1763                TAD I    RESDF2   / LOAD LESSON DF
2157   3762                DCA I    RESDF1   / STORE IT IN TASKSW DF
2160   5746                JMP I    RESDF    / RETURN TO CALLING ROUTINE
2161   0065   TSDFD,   65                    / DISP FOR TASKSW DF
2162   0000   RESDF1,  0000                  / PTR TO TASKSW DATA FIELD
2163   0000   RESDF2,  0000                  / PTR TO LESSON DF
                        *2200
               /
               /          CLOCK
               /                    ROUTINE HANDLES CLOCKS FOR ALL OIM'S
               /                    IF CLOCK FLAG=1 IN RCT ROUTINE DOES
               /                    NOT DISTURB CLOCK FOR THAT REMOTE
               /
2200   7000   CLOCK,   7000                  / NOP FOR NOW
2201   4502                JMS I    PRETURN  / NOT 0, RETURN FROM INTERUPT
2202   7200                CLA               / CLEAR THE AC
2203   1354                TAD      M60      / LOAD AC WITH - 60
2204   3353                DCA      CLKCON   / STORE IT IN CLOCK COUNTER FOR NEXT
2205   1346                TAD      SEC6     / ADD IN TENTH OF A MINUTE
2206   1355                TAD      M9       / ADD IN -9
2207   7450                SNA               / IS THE AC=0
2210   5216                JMP      UPMIN1   / GO UPDATE MIN*1
2211   7200                CLA               / CLEAR THE AC
2212   1346                TAD      SEC6     / RELOAD 6 SECONDS
2213   7001                IAC               / ADD 1 TO IT
2214   3346                DCA      SEC6     / STORE IT
2215   5267                JMP      DISCLK
2216   3346   UPMIN1,  DCA      SEC6     / 0 SEC*6 FOR NEXT TIME
2217   1347                TAD      MIN1     / ADD IN MIN*1
2220   1355                TAD      M9       / ADD IN -9
2221   7450                SNA               / IS THE AC=0
2222   5230                JMP      UPMN10   / YES, GO UPDATE MIN*10
2223   7200                CLA               / NO, CLEAR THE AC
2224   1347                TAD      MIN1     / RELOAD MIN*10
2225   7001                IAC               / INCREMENT IT BY 1
2226   3347                DCA      MIN1     / STORE IT BACK
```

| | | | | | |
|---|---|---|---|---|---|
| 2227 | 5267 | | JMP | DISCLK | / GO DISPLAY IT |
| 2230 | 3347 | UPMN10, | DCA | MIN1 | / ZERO MIN*10 FOR NEXT TIME |
| 2231 | 1350 | | TAD | MIN10 | / ADD IN MIN*10 |
| 2232 | 1356 | | TAD | M5 | / ADD IN -5 |
| 2233 | 7450 | | SNA | | / IS THE AC=0 |
| 2234 | 5242 | | JMP | UPHR1 | / YES, GO UPDATE HR*1 |
| 2235 | 7200 | | CLA | | / CLEAR THE AC |
| 2236 | 1350 | | TAD | MIN10 | / RELOAD MIN*10 |
| 2237 | 7001 | | IAC | | / ADD 1 TO IT |
| 2240 | 3350 | | DCA | MIN10 | / STORE IT |
| 2241 | 5267 | | JMP | DISCLK | / GO DISPLAY CLOCK |
| 2242 | 3350 | UPHR1, | DCA | MIN10 | / ZERO MIN*10 FOR NEXT TIME |
| 2243 | 1351 | | TAD | HR1 | / LOAD HR*1 |
| 2244 | 1355 | | TAD | M9 | / IS IT 9 |
| 2245 | 7450 | | SNA | | / IS AC=0 |
| 2246 | 5254 | | JMP | UPHR10 | / YES, GO UPDATE HR*10 |
| 2247 | 7200 | | CLA | | / NO, CLEAR THE AC |
| 2250 | 1351 | | TAD | HR1 | / RELOAD HR*1 |
| 2251 | 7001 | | IAC | | / INCREMENT IT BY 1 |
| 2252 | 3351 | | DCA | HR1 | / STORE IT |
| 2253 | 5267 | | JMP | DISCLK | / GO, DISPLAY CLOCK |
| 2254 | 3351 | UPHR10, | DCA | HR1 | / ZERO HR*10 |
| 2255 | 1352 | | TAD | HR10 | / LOAD HR*10 |
| 2256 | 1357 | | TAD | M2 | / ADD IN -2 |
| 2257 | 7450 | | SNA | | / IS THE AC=0 |
| 2260 | 5266 | | JMP | ZHR10 | / GO ZERO HR*10 |
| 2261 | 7200 | | CLA | | / CLEAR THE AC |
| 2262 | 1352 | | TAD | HR10 | / RELOAD HR*10 |
| 2263 | 7001 | | IAC | | / INCREMENT IT BY 1 |
| 2264 | 3352 | | DCA | HR10 | / STORE IT |
| 2265 | 5267 | | JMP | DISCLK | / GO DISPLAY IT |
| 2266 | 3352 | ZHR10, | DCA | HR10 | / ZERO HR*10 |
| 2267 | 1151 | DISCLK, | TAD Z | NUMREM | / LOAD AC WITH NEG OF NUMBER OF REM |
| 2270 | 3366 | | DCA | CLKLOP | / STORE IT IN LOOP COUNTER |
| 2271 | 1021 | | TAD Z | PRCTAB | / LOAD PTR TO RCT TABLE |
| 2272 | 3360 | | DCA | CKPRCT | / STORE PTR TO 1ST RCT |
| 2273 | 1760 | CLOCK3, | TAD I | CKPRCT | / LOAD ADDR OF RCT IN AC |
| 2274 | 1044 | | TAD Z | CLKFD | / ADD IN DISP. FOR CLOCK FLAG |
| 2275 | 3361 | | DCA | PTRCKF | / STORE PTR TO CLOCK FLAG |
| 2276 | 1761 | | TAD I | PTRCKF | / LOAD CLOCK FLAG |
| 2277 | 7440 | | SZA | | / IS IT ZERO |
| 2300 | 5327 | | JMP | CLOCK4 | / YES, TRY NEXT 1 |
| 2301 | 1760 | | TAD I | CKPRCT | / RELOAD ADDR OF RCT |
| 2302 | 1025 | | TAD Z | RNMD | / ADD IN DISP. FOR REMOTE NO. MASK |
| 2303 | 3362 | | DCA | PTRRNM | / STORE PTR TO REMOTE NUMBER MASK |
| 2304 | 3363 | | DCA | CLKC1 | / ZERO COUNTER |
| 2305 | 7200 | CLOCK1, | CLA | | / CLEAR THE AC |
| 2306 | 1337 | | TAD | PNXCOD | / LOAD START OF NIXIE CODES |
| 2307 | 1363 | | TAD | CLKC1 | / ADD IN COUNTER |
| 2310 | 3365 | | DCA | PTRNCD | / STORE PTR TO NIXIE CODE |
| 2311 | 1345 | | TAD | PCLK | / LOAD PTR TO CLOCK VALUES |
| 2312 | 1363 | | TAD | CLKC1 | / ADD IN COUNTER |
| 2313 | 3364 | | DCA | PTRCLK | / STORE PTR TO CLOCK |
| 2314 | 1765 | | TAD I | PTRNCD | / LOAD NIXIE CODE |
| 2315 | 1764 | | TAD I | PTRCLK | / ADD IN CLOCK VALUE |
| 2316 | 1762 | | TAD I | PTRRNM | / ADD IN REMOTE NUMBER |
| 2317 | 6507 | | 6507 | | / SEND IT OUT |
| 2320 | 1363 | | TAD | CLKC1 | / RELOAD COUNTER |
| 2321 | 7001 | | IAC | | / INCREMENT IT BY 1 |
| 2322 | 3363 | | DCA | CLKC1 | / STORE IT |
| 2323 | 1363 | | TAD | CLKC1 | / RELOAD COUNTER |
| 2324 | 1356 | | TAD | M5 | / ADD IN M5 |
| 2325 | 7440 | | SZA | | / IS THE AC=0 |
| 2326 | 5305 | | JMP | CLOCK1 | / GO DO NEXT 1 |
| 2327 | 2366 | CLOCK4, | ISZ | CLKLOP | / ARE WE THROUGH YET |
| 2330 | 5332 | | JMP | CLOCK2 | / NO, UPDATE RCT & GOON |
| 2331 | 4502 | | JMS I | PRETURN | / YES, RETURN FROM INTERRUPT |
| 2332 | 7200 | CLOCK2, | CLA | | / CLEAR THE AC |
| 2333 | 1360 | | TAD | CKPRCT | / LOAD ADDR OF RCT IN PRCTAB |
| 2334 | 7001 | | IAC | | / ADD 1 TO IT |
| 2335 | 3360 | | DCA | CKPRCT | / STORE IT |
| 2336 | 5273 | | JMP | CLOCK3 | / GO DO NEXT 1 |
| 2337 | 2340 | PNXCOD, | NXCOD | | / PTR TO NIXIE CODES |
| 2340 | 0340 | NXCOD, | 0340 | | / 6 SECONDS |
| 2341 | 0320 | | 0320 | | / MIN*1 |

```
2342    0300                    0300            / MIN*10
2343    0260                    0260            / HOURS*1
2344    0240                    0240            / HOURS*10
2345    2346    PCLK,           SEC6            / PTR TO CLOCK VALUES
2346    0000    SEC6,           0000            / 6 SECONDS
2347    0000    MIN1,           0000            / MIN*1
2350    0000    MIN10,          0000            / MIN*10
2351    0000    HR1,            0000            / HR*1
2352    0000    HR10,           0000            / HR*10
2353    7702    CLKCON,         -76             / CLOCK COUNTER
2354    7702    M60,            -76             / CONSTANT -60
2355    7767    M9,             -11             / CONSTANT -9
2356    7773    M5,             -5              / -5
2357    7776    M2,             -2              / -2
2360    0000    CKPRCT,         0000            / PTR TO RCT
2361    0000    PTRCKF,         0000            / PTR TO CLOCK FLAG
2362    0000    PTRRNM,         0000            / PTR TO REMOTE NUMBER MASK
2363    0000    CLKC1,          0000            / CLOCK COUNTER
2364    0000    PTRCLK,         0000            / POINTER TO CLOCK
2365    0000    PTRNCD,         0000            / POINTER TO NIXIE CODES
2366    0000    CLKLOP,         0000            / LOOP COUNTER
                                *2400
        /
        /               P0ADDR TABLE-BANK0
        /                       TABLE INCLUDES THE ADDRESS OF THE
        /                       ROUTINE IN USED IN BANK 1
        /
2400    0400    P0ADDR,         DISPAT
2401    0460                    TASKSW
2402    0511                    GETINP
2403    4071                    DOFF
2404    3000                    ERROR
2405    0742                    ASTOP
2406    3600                    SAUDIO
2407    3614                    RESP
2410    1000                    TONE
2411    1010                    AUDOFF
2412    2672                    UPBCK
2413    2706                    MCLRGO
2414    2717                    WAST
2415    2735                    ZASTPF
2416    2747                    SASTPF
2417    2050                    ZARSPF
2420    2062                    SARSPF
2421    3460                    SAKEY
2422    3400                    ARKEY
2423    3200                    WLON
2424    3251                    WLOFF
2425    2107                    LOFF
2426    2123                    LON
2427    3136                    KEYR
2430    3525                    RKEY
2431    3647                    WVRSP
2432    3671                    INCOFF
2433    1324                    KEYRNT
2434    3736                    MUTON
2435    3745                    MUTOFF
2436    1356                    CLKON
2437    1400                    CLKOFF
2440    4400                    FLHON
2441    4437                    FLHOFF
        /
        /               PARTITION ADDR TABLE
        /
        /               INCLUDE THE STARTING ADDR OF EACH PARTITION
        /               BITS 6, 7, 8 ARE THE DF OF THE PARTITION
        /
2442    7000    PARTAB,         7000            / ADDR OF P0
2443    1010                    1010            / ADDR OF P1
2444    2010                    2010            / ADDR OF P2
2445    3010                    3010            / ADDR OF P3
2446    4010                    4010            / ADDR OF P4
2447    5010                    5010            / ADDR OF P5
2450    6010                    6010            / ADDR OF P6
```

```
2451   7010              7010                         / ADDR OF P7
                /
                /         INCORE TABLE
                /
                /                   TABLE INCLUDE THE:
                /                   WORD1-LESSON NO.
                /                        2-STARTING ADDR OF LESSON & DF
                /                        4-PARTITION NUMBER
                /
2452   0000   INCORE,     0000
2453   0000               0000
2454   0000               0000
2455   0000               0000
2456   0000               0000
2457   0001               0001
2460   0000               0000
2461   0000               0000
2462   0002               0002
2463   0000               0000
2464   0000               0000
2465   0003               0003
2466   0000               0000
2467   0000               0000
2470   0004               0004
2471   0000               0000
2472   0000               0000
2473   0005               0005
2474   0000               0000
2475   0000               0000
2476   0006               0006
2477   0000               0000
2500   0000               0000
2501   0007               0007
2502   7777               7777                        / END OF TABLE
                /
                /         USEMAP TABLE
                /                   TABLE INCLUDES THE REMOTES USING THE PARTITIONS
                /                   BIT 0-REMOTE 1
                /                   BIT 1-REMOTE 2
                /                        "
                /                   BIT 7-REMOTE 7
                /
2503   0000   USEMAP,     0000                        / USEMAP FOR P0
2504   0000               0000                        / P1
2505   0000               0000                        / P2
2506   0000               0000                        / P3
2507   0000               0000                        / P4
2510   0000               0000                        / P5
2511   0000               0000                        / P6
2512   0000               0000                        / P7
2513   7777               7777                        / END OF TABLE
                /
                /         SAVE4 ROUTINE
                /                   ROUTINE STORES THE ADDR. IN THE AC
                /                   IN THE RETURN ADDRESS WORD IN THE RCT
                /                   AC=0 BEFORE RETURNING
                /
2514   0000   SAVE4,      0000                        / RETURN ADDR
2515   3334               DCA       ZAVINP           / SAVE RETURN ADDR
2516   6214               6214                        / OR IN DATA FIELD
2517   3336               DCA       ZAVDF            / SAVE DATA FIELD
2520   6201               6201                        / CHANGE DATA FIEF=0
2521   1020               TAD Z     CURRCT           / LOAD THE PTR TO RCT IN AC
2522   1340               TAD       ZAD              / ADD IN DISP FOR RETURN ADDR
2523   3335               DCA       ZAVPRA           / STORE POINTER TO RETURN ADDR.
2524   1334               TAD       ZAVINP           / LOAD RETURN ADDR. IN AC
2525   3735               DCA I     ZAVPRA           / STORE IT IN RCT
2526   1020               TAD Z     CURRCT           / LOAD PTR TO RCT
2527   1337               TAD       ZAVDFD           / ADD IN DISP FOR DF
2530   3335               DCA       ZAVPRA           / STORE PTR
2531   1336               TAD       ZAVDF            / LOAD DATA FIELD
2532   3735               DCA I     ZAVPRA           / SAVE IT IN RCT
2533   5714               JMP I     SAVE4            / RETURN TO CALLING ROU
2534   0000   ZAVINP,     0000                        / RETURN ADDRESS
2535   0000   ZAVPRA,     0000                        / POINTER TO RETURN ADDR. IN AC
```

```
2536    0000    ZAVDF,      0000                    / SAVE AREA FOR DATA FIELD
2537    0071    ZAVDFD,71                           / DISP FOR SAVE DF
2540    0070    ZAD,        70                      / DISP FOR RETURN ADDR
                /
                /
                /           REST4
                /                           ROUTINE PICKS UP RETURN ADDR.
                /                           FROM RCT AND RETURNS TO THAT ADDR.
                /                           AC=0 ON RETURN
                /
2541    0000    REST4,      0000                    / RETURN ADDR
2542    3334                DCA         ZAVINP      / SAVE AC
2543    7200                CLA                     / CLEAR THE AC
2544    1020                TAD Z       CURRCT      / LOAD PTR TO RCT
2545    1340                TAD Z       ZAD         / ADD IN DISP. FOR RETURN ADDR.
2546    3363                DCA         ZESPRA      / STORE PTR TO RETURN ADDR
2547    1763                TAD I       ZESPRA      / LOAD RETURN ADDR IN AC
2550    3363                DCA         ZESPRA      / STORE IT
2551    1020                TAD Z       CURRCT      / LOAD PTR TO RCT
2552    1337                TAD         ZAVDFD      / ADD IN DISP FOR4 SAVE FIELD
2553    3362                DCA         ZESDFP      / STORE PTR TO DATA FIELD
2554    1762                TAD I       ZESDFP      / LOAD DATA FIELD
2555    1176                TAD Z       IDF0        / ADD IN 6203
2556    3360                DCA         CIF2        / STORE IT IN CIF INST
2557    1334                TAD         ZAVINP      / RELOAD AC
2560    6202    CIF2,       6202                    / CIF INST
2561    5763                JMP I       ZESPRA      / RETURN TO THAT ADDR.
2562    0000    ZESDFP,     0000                    / DATA FIELD PTR
2563    0000    ZESPRA,     0000                    / POINTER TO RETURN ADDRESS
                            PAUSE
                            *2600
                /
                /           SAVE ROUTINE
                /                           ROUTINE STORES THE ADDR. IN THE AC
                /                           IN THE RETURN ADDRESS WORD IN THE RCT
                /                           AC=0 BEFORE RETURNING
                /
2600    0000    SAVE,       0000
2601    3220                DCA         SAVINP      / SAVE THE RETURN ADDR
2602    6214                6214                    / OR IN DATA FIELD
2603    3222                DCA         SAVDF       / SAVE DATA FIELD
2604    6201                6201                    / CHANGE DATA FIEF=0
2605    1020                TAD Z       CURRCT      / LOAD THE PTR TO RCT IN AC
2606    1042                TAD Z       RAD         / ADD IN DISP. FOR RETURN ADDR.
2607    3221                DCA         SAVPRA      / STORE POINTER TO RETURN ADDR.
2610    1220                TAD         SAVINP      / LOAD RETURN ADDR. IN AC
2611    3621                DCA I       SAVPRA      / STORE IT IN RCT
2612    1020                TAD Z       CURRCT      / LOAD PTR TO RCT
2613    1223                TAD         SAVDFD      / ADDD IN DISP FOR DF
2614    3221                DCA         SAVPRA      / STORE PTR
2615    1222                TAD         SAVDF       / LOAD DATA FIELD
2616    3621                DCA I       SAVPRA      / SAVE IT IN RCT
2617    5600                JMP I       SAVE        / RETURN TO CALLING ROUTINE
2620    0000    SAVINP,     0000                    / RETURN ADDRESS
2621    0000    SAVPRA,     0000                    / POINTER TO RETURN ADDR. IN AC
2622    0000    SAVDF,      0000                    / SAVE AREA FOR DATA FIELD
2623    0066    SAVDFD,     66                      / DISP FOR SAVE DATA FIELD
                /
                /
                /           RESTOR
                /                           ROUTINE PICKS UP RETURN ADDR.
                /                           FROM RCT AND RETURNS TO THAT ADDR.
                /                           AC=0 ON RETURN
                /
2624    0000    RESTOR,     0000
2625    3245                DCA         RESSAC      / SAVE AC FOR RETURN
2626    7200                CLA                     / CLEAR THE AC
2627    1020                TAD Z       CURRCT      / LOAD PTR TO RCT
2630    1042                TAD Z       RAD         / ADD IN DISP. FOR RETURN ADDR.
2631    3247                DCA         RESPRA      / STORE POINTER TO RETURN ADDR.
2632    1647                TAD I       RESPRA      / LOAD RETURN ADDR IN AC
2633    3247                DCA         RESPRA      / STORE IT
2634    1020                TAD Z       CURRCT      / LOAD PTR TO RCT
2635    1223                TAD         SAVDFD      / ADD IN DISP FOR SAVE FIELD
2636    3246                DCA         RESDFP      / STORE PTR TO DATA FIELD
```

```
2637    1646                    TAD I       RESDFP      / LOAD DATA FIELD
2640    1176                    TAD Z       IDF0        / ADD IN 6203 INST.
2641    3243                    DCA         CIF6        / SORE IT IN INST.
2642    1245                    TAD         RESSAC      / RESTORE AC
2643    6202    CIF6,           6202                    / CIF INST
2644    5647                    JMP I       RESPRA      / RETURN TO THAT ADDR.
2645    0000    RESSAC,         0000                    / SAVE AC
2646    0000    RESDFP,         0000                    / DATA FIELD PTR
2647    0000    RESPRA,         0000                    / POINTER TO RETURN ADDRESS
                /
                /               SAVP1
                /                           ROUTINE PICKS UP 1ST PARAMETER FROM
                /                           CALLING ROUTINE AND SAVES IT IN PARM1
                /                           FIELD OF RTC; ADDR IN AC ON ENTRY
                /                           IS ADDR. OF PARAMETER; AC=0 ON RETURN
                /
2650    0000    SAVP1,          0000
2651    3260                    DCA         PPARM1      / STORE PTR TO PARM1
2652    1020                    TAD Z       CURRCT      / LOAD PTR TO RCT
2653    1043                    TAD Z       PARM1D      / ADD IN DISP. TO PARM1 IN RCT
2654    3261                    DCA         PRCTP1      / STORE PTR TO PARM1 FIELD IN RCT
2655    1660                    TAD I       PPARM1      / LOAD PARM1 IN AC
2656    3661                    DCA I       PRCTP1      / STORE IT IN RCT
2657    5650                    JMP I       SAVP1       / RETURN TO CALLING ROUTINE
2660    0000    PPARM1,         0000                    / PTR TO PARM1
2661    0000    PRCTP1,         0000                    / PTR TO PARM1 FIELD IN RCT
                /
                /               RETP1
                /                           ROUTINE PICKS UP PARM1 FIELD FROM RCT
                /                           LOADS IT IN AC & RETURNS TO CALLING ROUTINE
                /
2662    0000    RETP1,          0000
2663    7200                    CLA                     / CLEAR THE AC
2664    1020                    TAD Z       CURRCT      / LOAD PTR TO RCT IN AC
2665    1043                    TAD Z       PARM1D      / ADD IN DISP. TO PARM1 FIELD
2666    3271                    DCA         RETPP1      / STORE PTR TO PARM1 FIELD
2667    1671                    TAD I       RETPP1      / LOAD PTR///PARAMETER IN AC
2670    5662                    JMP I       RETP1       / RETURN TO CALLING ROUTINE
2671    0000    RETPP1,         0000                    / PTR TO PARM1 FIELD IN RCT
                /
                /               UPBCK
                /                           ROUTINE UPDATES BACKSPACE COUNT
                /                           IN RCT BY 1
                /
2672    0000    UPBCK,          0000                    / RETURN ADDR.
2673    7200                    CLA                     / CLEAR THE AC
2674    1272                    TAD         UPBCK       / LOAD RETURN ADDR
2675    4503                    JMS I       PSAVE4      / GO SAVE IT
2676    1020                    TAD Z       CURRCT      / LOAD ADDR OF RCT
2677    1026                    TAD Z       BACKSD      / ADD IN BACKSPACE COUNT DISP.
2700    3305                    DCA         UPPBCK      / STORE PTR TO BACKSPACE COUNT
2701    1705                    TAD I       UPPBCK      / LOAD BACKSPACE COUNT
2702    7001                    IAC                     / ADD 1 TO IT
2703    3705                    DCA I       UPPBCK      / STORE IT BACK IN RCT
2704    4506                    JMS I       PREST4      / RETURN
2705    0000    UPPBCK,         0000                    / PTR TO BACKSPACE COUNT IN RCT
                /
                /               MCLRGO
                /                           ROUTINE MASTER CLEAR THE BOARD &
                /                           TURNS THE GO LAMP ON
2706    0000    MCLRGO,         0000                    / RETURN ADDR
2707    7200                    CLA                     / CLEAR THE AC
2710    1306                    TAD         MCLRGO      / LOAD RETURN ADDR
2711    4503                    JMS I       PSAVE4      / GO SAVE IT
2712    1136                    TAD Z       MCLEAR      / MASTER CLEAR
2713    4462                    JMS I       POUT
2714    1153                    TAD Z       GOLAMP      / TURN ON GO LAMP
2715    4462                    JMS I       POUT
2716    4506                    JMS I       PREST4      / RETURN
                /
                /               WAST
                /                           ROUTINE WAITS FOR AUDIO TO STOP
2717    0000    WAST,           0000                    / RETURN ADDR
2720    7200                    CLA                     / CLEAR THE AC
```

```
2721   1317               TAD       WAST       / LOAD RETURN ADDR
2722   4471               JMS I     PSAVE      / GO SAVE IT
2723   4521               JMS I     PGASTPF    / GO GET THE AUDIO STOP FLAG
2724   7440               SZA                  / IS IT SET
2725   4467               JMS I     PRESTOR    / YES, RETURN
2726   4454               JMS I     PTASKSW    / WAIT FOR INTER
2727   4455               JMS I     PGETIN     / GET THE INPUT
2730   4461               JMS I     PASTOP     / DID THE AUDIO STOP
2731   7440               SZA
2732   4460               JMS I     PERROR     / NO, MUST BE AN ERROR
2733   4505               JMS I     PAUDOFF    / YES, GO TURN OFF AUDIO BIT
2734   4467               JMS I     PRESTOR    / RETURN
                /
                /         ZASTPF
                /                              ROUTINE ZEROES THE AUDIO STOP FLAG IN RCT
                /                              AC=0 ON RETURN
2735   0000     ZASTPF,   0000
2736   7200               CLA                  / CLEAR THE AC
2737   1335               TAD       ZASTPF     / LOAD RETURN ADDR
2740   4503               JMS I     PSAVE4     / GO SAVE IT
2741   1020               TAD Z     CURRCT     / LOAD PTR TO RCT
2742   1045               TAD Z     ASTD       / ADD IN DISP. FOR AUDIO STOP FLAG
2743   3346               DCA       ZPASF      / STORE PTE TO AUDIO STOP FLAG
2744   3746               DCA I     ZPASF      / ZERO AUDIO STOP FLAG
2745   4506               JMS I     PREST4     / RETURN
2746   0000     ZPASF,    0000                 / PTR TO AUDIO STOP FLAG
                /
                /         SASTPF
                /                              ROUTINE SETS THE AUDIO STOP FLAG
                /                              IN RCT=1;AC=0 ON RETURN
2747   0000     SASTPF,   0000
2750   7200               CLA                  / CLEAR THE AC
2751   1347               TAD       SASTPF     / LOAD RETURN ADDR
2752   4503               JMS I     PSAVE4     / GO SAVE IT
2753   1020               TAD Z     CURRCT     / LOAD PTR TO RCT
2754   1045               TAD Z     ASTD       / ADD IN DISP. FOR AUDIO STOP
2755   3361               DCA       SPASF      / STORE PTR TO AUDIO STOP FLAG
2756   7001               IAC                  / SET AC=1
2757   3761               DCA I     SPASF      / STORE IT IN AUDIO STOP FLAG
2760   4506               JMS I     PREST4     / RETURN
2761   0000     SPASF,    0000
                /
                /         GASTPF
                /                              ROUTINE RETURNS THE AUDIO STOP FLAG FROM RCT
                /
2762   0000     GASTPF,   0000
2763   7200               CLA                  / CLEAR THE AC
2764   1362               TAD       GASTPF     / LOAD RETURN ADDR
2765   4503               JMS I     PSAVE4     / GO SAVE IT
2766   1020               TAD Z     CURRCT     / LOAD PTR TO RCT
2767   1045               TAD Z     ASTD       / ADD IN DISP FOR AUDIO STOP
2770   3373               DCA       GPASF      / STORE PTR TO AUDIO STOP FLAG
2771   1773               TAD I     GPASF      / LOAD AC WITH AUDIO STOP FLAG
2772   4506               JMS I     PREST4     / RETURN
2773   0000     GPASF,    0000
                          *3000
                /
                /                              ERROR ROUTINE
                /                              ROUTINE UPDATES THE ERROR COUNT
                /                              & THEN JUMPS TO REPEAT STEP ROUTINE
                /
3000   0000     ERROR,    0000
3001   6203               6203                 / SET DF, IF=0
3002   4504               JMS I     PTONE      / GO TURN OFF TONE BIT IF IT WAS ON
3003   4505               JMS I     PAUDOFF    / GO TURN OFF PLAY BIT IF ON
3004   1222               TAD       ERRLMP     / LOAD CODE FOR ERROR LAMP
3005   4462               JMS I     POUT       / SEND IT OUT
3006   1220               TAD       ERRRSL     / LOAD AC WITH CODE FOR REPEAT STEP
3007   4462               JMS I     POUT       / SEND IT OUT
3010   4457               JMS I     PDOFF      / TURN THE DISPLAY OFF
3011   1020               TAD Z     CURRCT     / LOAD POINTER TO RCT IN AC
3012   1041               TAD Z     ERCD       / ADD IN ERROR COUNT DISPLACEMENT
3013   3221               DCA       ERCPTR     / STORE POINTER TO ERROR COUNT
3014   1621               TAD I     ERCPTR     / LOAD ERROR COUNT INTO AC
```

```
3015   7001           IAC                      / INCREMENT IT BY 1
3016   3621           DCA I    ERCPTR          / STORE IT BACK INTO RCT
3017   5464           JMP I    PRSR            / GO TO REPEAT STEP ROUTINE
3020   0746   ERRRSL, 0746                     / CODE FOR REPEAT STEP LAMP
3021   0000   ERCPTR, 0                        / POINTER TO ERROR COUNT
3022   0744   ERRLMP, 0744                     / CODE FOR ERROR LAMP
              /
              /                                REPEAT STEP ROUTINE
              /                                ROUTINE SETS UP THE RCT & AUDIO
              /                                TO REPEAT THE LAST STEP
              /
3023   7200   RSR,    CLA                      / CLEAR THE AC
3024   1020           TAD Z    CURRCT          / LOAD PTR TO RCT
3025   1050           TAD Z    RLFD            / ADD IN DISP. FOR REPEAT LESSON FLAG
3026   3333           DCA      PTRGOF          / STORE PTR TO REPEAT LESSON FLAG
3027   1733           TAD I    PTRGOF          / LOAD REPEAT LESSON FLAG
3030   7440           SZA                      / IS IT SET
3031   5465           JMP I    PRLR            / JUMP TO REPEAT LESSON ROUTINE
3032   1020           TAD Z    CURRCT          / NO, CHECK REPEAT CALL FLAG
3033   1051           TAD Z    RCFD            / ADD IN DISP FOR REPEAT CALL
3034   3333           DCA      PTRGOF          / STORE PTR TO REPEAT CALL FLAG
3035   1733           TAD I    PTRGOF          / LOAD REPEAT CALL FLAG IN AC
3036   7440           SZA                      / IS IT SET
3037   5466           JMP I    PRCR            / JUMP TO REPEAT CALL ROUTINE
3040   1020           TAD Z    CURRCT          / LOAD PTR TO RCT
3041   1052           TAD Z    RSFD            / ADD IN DISP. FOR REPEAT STEP FLAG
3042   3333           DCA      PTRGOF          / STORE PTR TO GO FLAG
3043   1733           TAD I    PTRGOF          / LOAD GO FLAG
3044   7440           SZA                      / IS IT 0
3045   5301           JMP      RSR1            / YES, MUST BE SECOND TIME AROUND
3046   4504           JMS I    PTONE           / TURN OFF TONE BIT
3047   4505           JMS I    PAUDOFF         / TURN OFF PLAY BIT
3050   4566           JMS I    PMUTOFF         / TURN OFF MUTE BIT
3051   4564           JMS I    PRESBUF         / GO RESET BUFFER
3052   1334           TAD      RSRSL           / LIGHT REPEAT STEP LAMP
3053   4462           JMS I    POUT
3054   4517           JMS I    PZASTPF         / ZERO AUDIO STOP FLAG
3055   7001           IAC                      / SET AC=1
3056   3733           DCA I    PTRGOF          / SET REPEAT STEP FLAG IN AC
3057   1153           TAD Z    GOLAMP          / TURN OFF GOLAMP
3060   0135           AND Z    OFFBIT          / AND IN OFF BIT
3061   4462           JMS I    POUT            / OUTPUT IT
3062   1331           TAD      RSRABS          / LOAD CODE TO BACKSPACE AUDIO
3063   4462           JMS I    POUT            / SEND IT OUT
3064   4454   RSR3,   JMS I    PTASKSW         / WAIT
3065   4455           JMS I    PGETIN          / GET THE INPUT
3066   4461           JMS I    PASTOP          / GO SEE IF IT WAS AUDIO STOP
3067   7440           SZA                      / IS THE AC=0
3070   5264           JMP      RSR3            / NO, WAIT SOME MORE
3071   1331           TAD      RSRABS          / LOAD CODE TO BACKSPACE STEP
3072   0135           AND Z    OFFBIT          / AND IN OFFBIT
3073   4462           JMS I    POUT            / SEND IT OUT
3074   4520           JMS I    PSASTPF         / SET THE AUDIO STOP FLAG
3075   1153           TAD Z    GOLAMP          / LOAD CODE FOR GO LAMP
3076   4462           JMS I    POUT            / SEND IT OUT
3077   4454   RSR5,   JMS I    PTASKSW         / WAIT FOR KEY
3100   5277           JMP      RSR5            / MUST NOT BE REPEAT STEP WAIT SOME
3101   4521   RSR1,   JMS I    PGASTPF         / GET THE AUDIO STOP FLAG
3102   7450           SNA                      / IS IT SET
3103   5264           JMP      RSR3            / NO, WAIT SOME MORE
3104   7200           CLA                      / YES, CLEAR THE AC
3105   1020           TAD Z    CURRCT          / YES, LOAD PTR TO RCT
3106   1030           TAD Z    ANID            / ADD IN DISP. FOR ADDR. OF NEXT INST.
3107   3326           DCA      RSANI           / STORE POINTER TO ADDR OF NEXT INST.
3110   1020           TAD Z    CURRCT          / LOAD AC WITH POINTER TO RCT
3111   1033           TAD Z    ALSD            / ADD IN DISP. FOR ADDR. OF LAST STEP
3112   3327           DCA      RSPALS          / STORE POINTER TO ADDR. OF LAST STEP
3113   1727           TAD I    RSPALS          / LOAD ADDR. OF LAST STEP
3114   3726           DCA I    RSANI           / STORE IT IN ADDR. OF NEXT STEP
3115   1334           TAD      RSRSL           / LOAD CODE FOR REPEAT STEP
3116   0135           AND Z    OFFBIT          / AND IN THE OFF BIT
3117   4462           JMS I    POUT            / OUTPUT IT
3120   4463           JMS I    PRESET          / JUMP TO RESET ROUTINE
3121   1335           TAD      RSERRL          / LOAD CODE FOR ERROR LAMP
```

```
3122   0135              AND Z    OFFBIT    / AND IN OFFBIT
3123   4462              JMS I    POUT      / SEND IT OUT
3124   4546              JMS I    PRESDF    / GO RESTORE DAT FIELD
3125   4453              JMS I    PDISPAT   / JUMP TO DISPATCHER ROUTINE
3126   0000   RSANI,     0                  / POINTER TO ADDR OF NEXT INSTRUCTION
3127   0000   RSPALS,    0                  / POINTER TO ADDR. OF LAST STEP
3130   0000   RSPWC,     0                  / POINTER TO WAIT COUNT
3131   0753   RSRABS,    0753               / CODE TO BACKSPACE AUDIO 1 STEP
3132   0000   RSRPBC,    0000               / POINTER TO BACKSPACE COUNT
3133   0000   PTRGOF,    0000               / POINTER TO GO FLAG
3134   0746   RSRSL,     0746               / CODE FOR REPEAT STEP LAMP
3135   0744   RSERRL,    0744               / CODE FOR ERROR LAMP
              /
              /          KEYR
              /                             ROUTINE SETS ERROR COUNT TO 5 SEC. &
              /                             CHECKS FOR KEY PASSED AS PARAMETER
              /
3136   0000   KEYR,      0000
3137   7200              CLA                / CLEAR THE AC
3140   1736              TAD I    KEYR      / PICK UP PARAMETER
3141   3023              DCA Z    SAVPAR    / SAVE IT IN PAGE 0
3142   1336              TAD      KEYR      / LOAD PTR TO PARAM
3143   7001              IAC                / ADD 1 TO GET TO RETURN DDR
3144   4471              JMS I    PSAVE     / GO SAVE IT
3145   1022              TAD Z    PSAVPAR   / LOAD PTR TO PARAM
3146   4472              JSM I    PSAVP1    / LOAD ADDR OF KEY
3147   1003              TAD Z    C150      / SET ERROR COUNT =15 SEC
3150   4456              JMS I    PWAIT
3151   4454   KEYRBB,    JMS I    PTASKSW   / WAIT FOR INTERRUPT
3152   4455              JMS I    PGETIN    / GET INPUT
3153   3371              DCA      KEYRIN    / STORE IT
3154   1371              TAD      KEYRIN    / RELOAD INPUT
3155   4461              JMS I    PASTOP    / WAS IT AUDIO STOP
3156   7440              SZA
3157   5363              JMP      KEYRAA    / NO, CHECK FOR KEY
3160   4505              JMS I    PAUDOFF   / YES, TURN AUDIO STOP BIT OFF
3161   4520              JMS I    PSASTPF   / STOP FLAG SET
3162   5351              JMP      KEYRBB    / GO WAIT FOR KEY
3163   4470   KEYRAA,    JMS I    PRETP1    / GO GET KEY
3164   1371              TAD      KEYRIN    / ADD IN INPUT
3165   7440              SZA                / IS IT 0
3166   4460              JMS I    PERROR    / NO, MUST BE AN ERROR
3167   4456              JMS I    PWAIT     / 0 WAIT COUNT
3170   4467              JMS I    PRESTOR   / RETURN TO LESSON
3171   0000   KEYRIN,    0000               / SAVE AREA FOR INPUT
                         *3200
              /
              /          WLON
              /                             ROUTINE WAITS .5 SEC & THE
              /                             TURNS THE LAMP PASSD AS A PARAMETER ON
              /
3200   0000   WLON,      0000
3201   7200              CLA                / CLEAR THE AC
3202   1600              TAD I    WLON      / LOAD PARAMETER
3203   3023              DCA Z    SAVPAR    / STORE IT IN PAGE 0
3204   1200              TAD      WLON      / LOAD ADDR OF PARAMETER
3205   7001              IAC                / ADD 1 TO GET PASSED PARAMETER
3206   4471              JMS I    PSAVE     / GO SAVE IT
3207   1022              TAD Z    PSAVPAR   / LOAD PTR TO PARAMETER
3210   4472              JMS I    PSAVP1    / GO SAVE CODE
3211   1152              TAD Z    C5        / SET WAIT COUNT=5 SEC
3212   4456              JMS I    PWAIT
3213   4454   WLON3,     JMS I    PTASKSW   / WAIT FOR INTERRUPT
3214   4455              JMS I    PGETIN    / GET THE INPUT
3215   3250   WLON4,     DCA      WLONIN    / SAVE INPUT
3216   1250              TAD      WLONIN    / RELOAD INPUT
3217   1143              TAD Z    M7777     / WAS IT A TIMER INTERRUPT
3220   7440              SZA
3221   5225              JMP      WLON1     / GO CHECK SOUND PRES, OR AUDIO STOP
3222   4470              JMS I    PRETP1    / GO GET CODE FOR LAMP
3223   4462              JMS I    POUT      / SEND IT OUT
3224   4467              JMS I    PRESTOR   / RETURN TO LESSON
3225   7200   WLON1,     CLA                / CLEAR THE AC
3226   1250              TAD      WLONIN    / RELOAD THE INPUT
3227   4461              JMS I    PASTOP    / WAS IT AUDIO STOP
```

```
3230  7440            SZA
3231  5240            JMP         WLON2     / NO, CHECK VERBAL RESPONSE
3232  4505            JMS I       PAUDOFF   / YES, TURN OFF PLAY BIT
3233  4520            JMS I       PSASTPF   / GO, SET THE AUDIO STOP FLAG
3234  4455   WLON5,   JMS I       PGETIN    / IS THE NEXT 1 HERE YET
3235  7450            SNA                   / IS IT HERE YET
3236  5213            JMP         WLON3     / NO, GO WAIT FOR IT
3237  5215            JMP         WLON4     / NO, GO PROCESS IT
3240  7200   WLON2,   CLA                   / CLEAR THE AC
3241  1250            TAD         WLONIN    / RELOAD THE INPUT
3242  1137            TAD Z       SOUNDP    / WAS THERE SOUND PRESENT
3243  7440            SZA
3244  4460            JMS I       PERROR    / NO, MUST BE AN ERROR
3245  4504            JMS I       PTONE     / YES, TURN OFF TONE BIT
3246  4523            JMS I       PSARSPF   / SET AUDIO RESPONSE FLAG
3247  5234            JMP         WLON5     / GO SEE IF NEXT ONE IS HERE YET
3250  0000   WLONIN,  0000                  / SAVE AREA FOR INPUT
              /
              /       WLOFF
              /                   ROUTINE WAITS .5 SEC & THEN TURNS
              /                   THE LAMP OFF PASSED AS A PARAMETER
              /
3251  0000   WLOFF,   0000
3252  7200            CLA                   / CLEAR THE AC
3253  1651            TAD I       WLOFF     / PICK UP PARAMETER
3254  3023            DCA         SAVPAR    / STORE IT IN PAGE 0
3255  1251            TAD         WLOFF     / LOAD ADDR OF PARAMETER
3256  7001            IAC                   / ADD 1 TO GET TO RETURN ADDR
3257  4471            JMS I       PSAVE     / GO SAVE IT
3260  1022            TAD Z       PSAVPAR   / LOAD PTR TO PARAM
3261  4472            JMS I       PSAVP1    / GO SAVE IT IN RCT
3262  1152            TAD Z       C5        / SET WAIT COUNT= .5 SEC.
3263  4456            JMS I       PWAIT
3264  4454   WLOFF3,  JMS I       PTASKSW   / WAIT FOR INTERRUPT
3265  4455            JMS I       PGETIN    / GET THE INPUT
3266  3322   WLOFF4,  DCA         WLOFFIN   / STORE INPUT
3267  1322            TAD         WLOFFIN   / RELOAD INPUT
3270  1143            TAD Z       M7777     / WAS IT A TIMER INTERRUPT
3271  7440            SZA                   / IS IT 0
3272  5277            JMP         WLOFF1    / GO SEE IF AUDIO EDN OR VERBAL RES.
3273  4470            JMS I       PRETP1    / GET LAMP CODE
3274  0135            AND Z       OFFBIT    / AND IN THE OFFBIT
3275  4462            JMS I       POUT
3276  4467            JMS I       PRESTOR   / RETURN TO LESSON
3277  7200   WLOFF1,  CLA                   / CLEAR THE AC
3300  1322            TAD         WLOFFIN   / RELOAD THE INPUT
3301  4461            JMS I       PASTOP    / WAS IT AUDIO STOP
3302  7440            SZA
3303  5312            JMP         WLOFF2    / NO, CHECK VERBAL RESPONSE
3304  4505            JMS I       PAUDOFF   / YES, TURN OFF PLAY BIT
3305  4520            JMS I       PSASTPF   / GO, SET THE AUDIO STOP FLAG
3306  4455   WLOFF5,  JMS I       PGETIN    / IS THE NEXT 1 HERE YET
3307  7450            SNA                   / IS IT HERE YET
3310  5264            JMP         WLOFF3    / NO, WAIT FOR IT
3311  5266            JMP         WLOFF4    / NO, GO PROCESS IT
3312  7200   WLOFF2,  CLA                   / CLEAR THE AC
3313  1322            TAD         WLOFFIN   / RELOAD THE INPUT
3314  1137            TAD Z       SOUNDP    / WAS THERE SOUND PRESENT
3315  7440            SZA
3316  4460            JMS I       PERROR    / NO, MUST BE AN ERROR
3317  4504            JMS I       PTONE     / YES, TURN OFF TONE BIT
3320  4523            JMS I       PSARSPF   / SET AUDIO RESPONSE FLAG
3321  5306            JMP         WLOFF5    / GO SEE IF NEXT 1 IS HERE YET
3322  0000   WLOFFIN, 0000                  / SAVE AREA FOR INPUT
              /
              /       DTIME
              /                   ROUTINE DISPLAYS THE TIME PASSED TO IT
              /                   IN THE PARAMETERS IN THE CALLING ROUTINE
              /                   ( HR*10, HR*1, MIN*10, MIN*1, 6 SEC.)
              /
3323  0000   DTIME,   0000                  / RETURNING ADDR
3324  3352            DCA         DTCOUN    / ZERO COUNTER
3325  7200   DTIME1,  CLA                   / CLEAR THE AC
3326  1323            TAD         DTIME     / LOAD AC WITH ADDR OF PARAM.
```

```
3327    1352                    TAD     DTCOUN      / ADD IN COUNTER
3330    3353                    DCA     DTPTP       / STORE PTR TO PARAMETERS
3331    1356                    TAD     PTIMCD      / LOAD PTR TO TIME CODES
3332    1352                    TAD     DTCOUN      / ADD IN COUNTER
3333    3354                    DCA     DTPTT       / STORE PTR TO TIME CODE
3334    1753                    TAD I   DTPTP       / LOAD AC WITH PARAMETER
3335    1754                    TAD I   DTPTT       / ADD IN A NIXIE CODE
3336    4462                    JMS I   POUT        / SEND IT OUT
3337    1352                    TAD     DTCOUN      / RELOAD COUNTER
3340    7001                    IAC                 / ADD 1 TO IT
3341    3352                    DCA     DTCOUN      / STORE IT BACK
3342    1352                    TAD     DTCOUN      / RELOAD COUNTER
3343    1355                    TAD     DTM5        / ADD IN M5
3344    7440                    SZA                 / IS THE AC=0
3345    5325                    JMP     DTIME1      / GO DO NEXT 1
3346    1323                    TAD     DTIME       / RELOAD ADDR OF PARAMETER
3347    1352                    TAD     DTCOUN      / ADD IN COUNTER
3350    3353                    DCA     DTPTP       / STORE RETURN ADDR
3351    5753                    JMP I   DTPTP       / BRANCH TO THAT ADDR
3352    0000    DTCOUN,         0000                / COUNTER FOR LOOP
3353    0000    DTPTP,          0000                / PTR TO PARAMETER
3354    0000    DTPTT,          0000                / PTR TO TIME CODES
3355    7773    DTM5,           -5                  / CONSTANT -5
3356    3357    PTIMCD,         TIMCD               / PTR TO NIXIE CODES
3357    0240    TIMCD,          0240                / HR*10
3360    0260                    0260                / HR*1
3361    0300                    0300                / MIN*10
3362    0320                    0320
3363    0340                    0340
                                *3400
                /
                /               ARKEY
                /                           ROUTINE PLAYS THE AUDIO, WAITS FOR AUDIO RESPONSE
                /                           AUDIO STOP & KEY PASSED AS A PARAMETER
                /
3400    0000    ARKEY,          0000
3401    7200                    CLA                 / CLEAR THE AC
3402    1600                    TAD I   ARKEY       / LOAD PARM
3403    3023                    DCA Z   SAVPAR      / STORE IT IN PAGE 0
3404    1200                    TAD     ARKEY       / LOAD AC WITH ADDR OF CODE
3405    7001                    IAC                 / ADD 1 TO GET TO RETURN ADDR
3406    4471                    JMS I   PSAVE       / GO SAVE RETURN ADDR
3407    1022                    TAD Z   PSAVPAR     / LOAD PTR TO PARAM
3410    4472                    JMS I   PSAVP1      / GO SAVE IT
3411    4517                    JMS I   PZASTPF     / ZERO AUDIO STOP FLAG
3412    4522                    JMS I   PZARSPF     / ZERO AUDIO RESPONSE FLAG
3413    4511                    JMS I   PUPBCK      / GO UP BACKSPACE COUNT
3414    1141                    TAD Z   PLAY        / PLAY AUDIO
3415    4462                    JMS I   POUT
3416    1140                    TAD Z   TONECH      / SEND OUT TONE CHECK
3417    4462                    JMS I   POUT
3420    4454    ARK2,           JMS I   PTASKSW     / WAIT FOR INTERRUPT
3421    4455                    JMS I   PGETIN      / GET THE INPUT
3422    3257    ARK3,           DCA     ARKIN       / STORE INPUT
3423    4470                    JMS I   PRETP1      / GO GET NEG. OF KEY
3424    1257                    TAD     ARKIN       / RELOAD INPUT
3425    7450                    SNA                 / IS THE AC=0
3426    5254                    JMP     ARK7        / YES, RETURN TO LESSON
3427    7200                    CLA                 / NO, CLEAR THE AC
3430    1257                    TAD     ARKIN       / RELOAD INPUT
3431    4461                    JMS I   PASTOP      / DID THE AUDIO STOP
3432    7440                    SZA
3433    5241                    JMP     ARK5        / NO, CHECK IF IT WAS AUDIO RESP.
3434    4505                    JMS I   PAUDOFF     / YES, TURN OFF PLAY BIT
3435    4520                    JMS I   PSASTPF     / GO SET AUDIO STOP FLAG
3436    1003                    TAD Z   C150        / SET 15 SEC WAIT
3437    4456                    JMS I   PWAIT
3440    5250                    JMP     ARK6        / GO, SEE IF NEXT ONE IS HERE
3441    7200    ARK5,           CLA                 / CLEAR THE AC
3442    1257                    TAD     ARKIN       / RELOAD INPUT
3443    1137                    TAD Z   SOUNDP      / WAS THERE SOUND PRESENT
3444    7440                    SZA
3445    4460                    JMS I   PERROR      / NO, MUST BE AN ERROR
3446    4504                    JMS I   PTONE       / YES, TURN OFF TONE BIT
3447    4523                    JMS I   PSARSPF     / SET AUDIO RESPONSE FLAG
```

```
3450  4455  ARK6,   JMS I  PGETIN    / IS NEXT ONE HERE
3451  7450          SNA
3452  5220          JMP    ARK2      / NO, GO WAIT FOR IT
3453  5222          JMP    ARK3      / YES, GO PROCESS IT
3454  7200  ARK7,   CLA              / COUNT=0
3455  4456          JMS I  PWAIT
3456  4467          JMS I  PRESTOR   / RETURN TO LESSON
3457  0000  ARKIN,  0000             / SAVE AREA FOR INPUT
      /
      /     SAKEY
      /                              ROUTINE PLAYS THE AUDIO, CHECKS FOR KEY
      /                              PASSED IN AC & SIMULT. AUDIO STOP
      /
3460  0000  SAKEY,  0000
3461  7200          CLA              / CLEAR THE AC
3462  1660          TAD I  SAKEY     / LOAD PARAM
3463  3023          DCA Z  SAVPAR    / SAVE IT ON PAGE 0
3464  1260          TAD    SAKEY     / LOAD AC WITH ADDR OF CODE
3465  7001          IAC              / ADD ONE TO GET TO RETURN ADDR
3466  4471          JMS I  PSAVE     / GO SAVE RETURN ADDR
3467  1022          TAD Z  PSAVPAR   / LOAD PTR TO PARAM
3470  4472          JMS I  PSAVP1    / GO SAVE IT
3471  4517          JMS I  PZASTPF   / ZERO AUDIO STOP FLAG
3472  4511          JMS I  PUPBCK    / UP BACKSPACE COUNT
3473  1141          TAD Z  PLAY      / LOAD CODE TO PLAY AUDIO
3474  4462          JMS I  POUT      / SEND IT OUT
3475  4454  SAK2,   JMS I  PTASKSW   / WAIT FOR RESPONSE
3476  4455          JMS I  PGETIN    / GET THE INPUT
3477  3324  SAK3,   DCA    SAKIN     / GO GET NEG OF KEY
3500  4470          JMS I  PRETP1    / GO GET NEG. OF KEY
3501  1324          TAD    SAKIN     / ADD IN THE INPUT
3502  7450          SNA              / IS THE AC=0
3503  5321          JMP    SAK4      / YES, RETURN TO LESSON
3504  7200          CLA              / CLEAR THE AC
3505  1324          TAD    SAKIN     / RELOAD INPUT
3506  4461          JMS I  PASTOP    / GO CHECK IF AUDIO STOPPED
3507  7440          SZA
3510  4460          JMS I  PERROR    / NO, MUST BE AN ERROR
3511  4505          JMS I  PAUDOFF   / YES, TURN OFF AUDIO STOP BIT
3512  4520          JMS I  PSASTPF   / YES, GO SET AUDIO STOP FLAG
3513  1003          TAD Z  C150      / SET ERROR COUNT=150
3514  4456          JMS I  PWAIT
3515  4455  SAK5,   JMS I  PGETIN    / IS THE NEXT 1 HERE
3516  7450          SNA
3517  5275          JMP    SAK2      / NO, GO WAIT FOR IT
3520  5277          JMP    SAK3      / YES, GO PROCESS IT
3521  7200  SAK4,   CLA              / CLEAR THE AC
3522  4456          JMS I  PWAIT     / SET ERROR COUNT=0
3523  4467          JMS I  PRESTOR   / RETURN TO LESSON
3524  0000  SAKIN,  0000             / SAVE AREA FOR INPUT
                    PAUSE
      /
      /     RKEY
      /                              ROUTINE CHECKS FOR AUDIO RESPONSE & KEY
      /                              PASSED TO IT AS A PARAMETER
      /
3525  0000  RKEY,   0000
3526  7200          CLA              / CLEAR THE AC
3527  1725          TAD I  RKEY      / LOAD PARAM
3530  3023          DCA Z  SAVPAR    / STORE IT ON PAGE 0
3531  1325          TAD    RKEY      / LOAD ADDR OF PARARM
3532  7001          IAC              / INCREMENT AC BY 1
3533  4471          JMS I  PSAVE     / GO SAVE RETURN ADDR
3534  1022          TAD Z  PSAVPAR   / LOAD ADDR OF PARAM
3535  4472          JMS I  PSAVP1    / GO SAVE IT IN RCT
3536  1003          TAD Z  C150      / SET ERROR COUNT=15 SEC
3537  4456          JMS I  PWAIT
3540  4522          JMS I  PZARSPF   / ZERO AUDIO RESPONSE FLAG
3541  1140          TAD Z  TONECH    / CHECK FOR SOUND PRESENT
3542  4462          JMS I  POUT
3543  4454  RKEY2,  JMS I  PTASKSW   / WAIT FOR INTERRUPT
3544  4455          JMS I  PGETIN    / GET THE INPUT
3545  3370  RKEY3,  DCA    RKEYIN    / SAVE INPUT
3546  4470          JMS I  PRETP1    / GET THE KEY
```

```
3547    1370                TAD     RKEYIN      / ADD IN INPUT
3550    7450                SNA                 / IS THE AC=0
3551    5365                JMP     RKEY4       / YES, RETURN TO LESSON
3552    7200                CLA                 / CLEAR THE AC
3553    1370                TAD     RKEYIN      / RELOAD INPUT
3554    1137                TAD Z   SOUNDP      / WAS IT SOUND PRESENT
3555    7440                SZA                 / IS THE AC=0
3556    4460                JMS I   PERROR      / NO, MUST BE AN ERROR
3557    4504                JMS I   PTONE       / TURN OFF TONE BIT
3560    4523                JMS I   PSARSPF     / SET AUDIO RESPONSE FLAG
3561    4455                JMS I   PGETIN      / IS THE NEXT ONE HERE YET
3562    7450                SNA
3563    5343                JMP     RKEY2       / NO, GO WAIT FOR IT
3564    5345                JMP     RKEY3       / YES, GO PROCESS IT
3565    7200    RKEY4,      CLA                 / CLEAR THE AC
3566    4456                JMS I   PWAIT       / SET ERROR COUNT=0
3567    4467                JMS I   PRESTOR     / RETURN TO LESSON
3570    0000    RKEYIN,     0000                / SAVE AREA FOR INPUT
                            *3600

/           SAUDIO ( ROUTINE STARTS AUDIO & WAITS FOR
                /                    IT TO STOP)
                /
3600    0000    SAUDIO,     0000
3601    1200                TAD     SAUDIO      / LOAD RETURN ADDRESS IN AC
3602    4471                JMS I   PSAVE       / SAVE IT IN RCT
3603    1141                TAD Z   PLAY        / PLAY THE AUDIO
3604    4462                JMS I   POUT
3605    4454                JMS I   PTASKSW     / TASKSWITCH
3606    4455                JMS I   PGETIN      / GET THE INPUT
3607    4461                JMS I   PASTOP      / DID THE AUDIO STOP
3610    7440                SZA
3611    4460                JMS I   PERROR      / NO, MUST BE AN ERROR
3612    4505                JMS I   PAUDOFF     / GO TURN OFF PLAY BIT
3613    4467                JMS I   PRESTOR     / YES, RETURN TO LESSON

/           RESP
                /                   ROUTINE SETS ERROR COUNT=3 SEC.
                /                   PICKS UP LENGTH OF RESPONSE (PARAM1)
                /                   CHECKS FOR A RESPONSE
                /                   WAITS LENGTH OF RESPONSE & RETURNS TO LESSON
                /
3614    0000    RESP,       0000
3615    7200                CLA
3616    1614                TAD I   RESP        / LOAD PARAM
3617    3023                DCA Z   SAVPAR      / STORE IT
3620    1214                TAD     RESP        / LOAD RETURN ADDR IN AC
3621    7001                IAC                 / GET PASS PARAMETER
3622    4471                JMS I   PSAVE       / SAVE RETURN ADDR. IN RCT
3623    1022                TAD Z   PSAVPAR     / LOAD PTR TO PARAM
3624    4472                JMS I   PSAVP1      / SAVE IT IN RCT
3625    1003                TAD Z   C150        / SET ERROR COUNT=15 SEC
3626    4456                JMS I   PWAIT
3627    1140                TAD Z   TONECH      / WAS THERE AUDIO
3630    4462                JMS I   POUT
3631    4454                JMS I   PTASKSW     / TASKSWITCH
3632    4455                JMS I   PGETIN      / GET THE INPUT
3633    1137                TAD Z   SOUNDP      / WAS THERE SOUND PRESENT
3634    7440                SZA
3635    4460                JMS I   PERROR      / NO, MUST BE AN ERROR
3636    4504                JMS I   PTONE       / GO TURN OFF TONE BIT
3637    4470                JMS I   PRETP1      / YES, GO GET PARM1
3640    4456                JMS I   PWAIT       / SET WAIT COUNT IN RCT
3641    4454                JMS I   PTASKSW     / TASKSWITCH
3642    4455                JMS I   PGETIN      / GET THE INPUT
3643    1143                TAD Z   M7777       / WAS IT A TIMER INTERRUPT
3644    7440                SZA
3645    4460                JMS I   PERROR      / NO MUST BE AN ERROR
3646    4467                JMS I   PRESTOR     / YES, RETURN TO LESSON

/           WVRSP
                /                   ROUTINE WAITS FOR VERBAL RESPONSE
                /
3647    0000    WVRSP,      0000                / RETURN ADDR
```

```
3650   7200              CLA                      / CLEAR THE AC
3651   1247              TAD         WVRSP        / LOAD RETURN ADDR
3652   4471              JMS I       PSAVE        / GO SAVE IT
3653   4524              JMS I       PGARSPF      / GET AUDIO RESPONSE FLAG
3654   7440              SZA                      / IS IT SET
3655   4467              JMS I       PRESTOR      / YES, RETURN TO LESSON
3656   1003              TAD Z       C150         / SET ERROR COUNT=15 SEC
3657   4456              JMS I       PWAIT
3660   4454              JMS I       PTASKSW      / NO, WAIT
3661   4455              JMS I       PGETIN       / GET THE INPUT
3662   1137              TAD Z       SOUNDP       / WAS THERE SOUND PRESENT
3663   7440              SZA
3664   4460              JMS I       PERROR       / NO, MUST BE AN ERROR
3665   4504              JMS I       PTONE        / YES, TURN OFF TONE BIT
3666   4523              JMS I       PSARSPF      / SET AUDIO RESPONSE FLAG
3667   4456              JMS I       PWAIT        / 0 WAIT COUNT
3670   4467              JMS I       PRESTOR      / RETURN TO LESSON
              /
              /          INCOFF
              /                                   ROUTINE TURNS OFF ALL INCADESCANT LAMPS
              /
3671   0000   INCOFF,    0000                     / RETURN ADDR
3672   7200              CLA                      / CLEAR THE AC
3673   1271              TAD         INCOFF       / LOAD RETURN ADDR
3674   4503              JMS I       PSAVE4       / GO SAVE IT
3675   3327              DCA         INCFLAG      / ZERO FLAG
3676   1333              TAD         INCSTR       / LOAD START ADDR INAC
3677   3335              DCA         INCTEM       / STORE IT IN TEMP
3700   1330              TAD         INCEN1       / LOAD 1ST END LAMP
3701   3334              DCA         INCEND       / STORE IT
3702   7200   INCOF1,    CLA                      / CLEAR THE AC
3703   1335              TAD         INCTEM       / RELOAD OUTPUT CODE
3704   0135              AND Z       OFFBIT       / AND IN OFF BIT
3705   4462              JMS I       POUT         / SEND IT OUT
3706   1335              TAD         INCTEM       / RELOAD CODE
3707   7001              IAC                      / ADD 1 TO IT
3710   3335              DCA         INCTEM       / STORE IT
3711   1335              TAD         INCTEM       / RELOAD CODE
3712   1334              TAD         INCEND       / ARE WE DONE
3713   7440              SZA
3714   5302              JMP         INCOF1       / NO, DO NEXT 1
3715   1327              TAD         INCFLAG      / LOAD FLAG
3716   7640              SZA CLA                  / IS IT SET
3717   5671              JMP I       INCOFF       / YES, RETURN
3720   7001              IAC                      / NO, SET AC=1
3721   3327              DCA         INCFLAG      / SET FLAG
3722   1332              TAD         INCST1       / LOAD SECOND START
3723   3335              DCA         INCTEM       / STORE IT INSTART OF LOOP
3724   1331              TAD         INCEN2       / LOAD SEC STOP
3725   3334              DCA         INCEND       / STORE IT IN END OF LOOP
3726   4506              JMS I       PREST4       / RETURN
3727   0000   INCFLAG,   0000                     / FLAG FOR LOOP
3730   7041   INCEN1,    -0737                    / END OF 1ST LOOP +1
3731   7012   INCEN2,    -0766                    / END OF SEC LOOP +1
3732   0760   INCST1,    0760                     / START OF SEC LOOP
3733   0600   INCSTR,    0600                     / STARTING ADDR
3734   0000   INCEND,    0000                     / END ADDR FOR LOOP
3735   0000   INCTEM,    0000                     / TEMP FOR COUNTER
              /
              /          MUTON
              /                                   ROUTINE MUTES AUDIO & RETURNS TO LESSON
              /
3736   0000   MUTON,     0000                     / RETURN ADDR
3737   7200              CLA                      / CLEAR THE AC
3740   1336              TAD         MUTON        / LOAD RETURN ADDR
3741   4503              JMS I       PSAVE4       / GO SAVE IT
3742   1355              TAD         MUTE1        / LOAD MUTE CODE
3743   4462              JMS I       POUT         / SEND IT OUT
3744   4506              JMS I       PREST4       / RETURN
              /
              /          MUTOFF
              /                                   ROUTINE TURNS OFF MUTE BIT 6 RETURNS TO LESSON
              /
3745   0000   MUTOFF,    0000                     / RETURN ADDR
3746   7200              CLA                      / CLEAR THE AC
```

```
3747   1345              TAD       MUTOFF    / LOAD RETURN ADDR
3750   4503              JMS I     PSAVE4    / GO SAVE IT
3751   1355              TAD       MUTE1     / LOAD MUTE COMMAND
3752   0135              AND Z     OFFBIT    / AND IN OFFBIT
3753   4462              JMS I     POUT      / SEND IT OUT
3754   4506              JMS I     PREST4    / RETURN
3755   0757    MUTE1,    0757                / MUTE COMMAND
                *4000
       /
       /                 DISPLY              ROUTINE PICKS UP FIRST PARAMETER WHICH IS
       /                                     THE BIN NUMBER TO DISPLAY 1ST DIGIT;
       /                                     THE NEXT N PARAMETERS ARE THE DIGITS TO BE
       /                                     DISPLAYED; DIGITS ARE DISPLAYED UNTIL BIN
       /                                     NUMBER 10 HAS BEEN DISPLAYED
       /
4000   0000    DISPLY,   0000
4001   7200              CLA
4002   1200              TAD       DISPLY    / PICK UP ADDR OF 1ST PARAMETER
4003   3235              DCA       DPARMP    / SAVE IT
4004   1635              TAD I     DPARMP    / LOAD 1ST PARAM IN AC
4005   3236              DCA       DBINNO    / STORE IT IN BINNO
4006   1235    DISP1,    TAD       DPARMP    / RELOAD PARAMETER ADDR.
4007   7001              IAC                 / INCREMENT IT BY 1
4010   3235              DCA       DPARMP    / STORE IT
4011   1241              TAD       PBINTA    / LOAD PTR TO BIN TABLE
4012   1236              TAD       DBINNO    / ADD IN BIN NUMBER
4013   3237              DCA       PBINCD    / STORE PTR TO BIN CODE
4014   1637              TAD I     PBINCD    / LOAD BIN CODE IN AC
4015   1635              TAD I     DPARMP    / ADD IN PARAMETER
4016   4462              JMS I     POUT      / OUTPUT IT
4017   1236              TAD       DBINNO    / LOAD BIN NUMBER IN AC
4020   1240              TAD       M10       / IS IT 10
4021   7450              SNA
4022   5230              JMP       DISP2     / YES, RETURN TO CALLING ROUTINE
4023   7200              CLA                 / NO, CLEAR THE AC
4024   1236              TAD       DBINNO    / ADD IN BIN NUMBER
4025   7001              IAC                 / INCREMENT IT BY 1
4026   3236              DCA       DBINNO    / STORE IT BACK IN BIN NUMBER
4027   5206              JMP       DISP1     / GO PROCESS NEXT DIGIT
4030   7200    DISP2,    CLA                 / CLEAR THE AC
4031   1235              TAD       DPARMP    / ADD IN PARMETER ADDR.
4032   7001              IAC                 / GET TO RETURN ADDR.
4033   3235              DCA       DPARMP    / STORE IT
4034   5635              JMP I     DPARMP    / RETURN TO CALLING LESSON
4035   0000    DPARMP,   0000                / POINTERS TO PARAMETER
4036   0000    DBINNO,   0000                / BIN NUMBER TO PROCESS
4037   0000    PBINCD,   0000                / POINTER TO CODE IN BIN TABLE
4040   7766    M10,      -12                 / -10 DECIMAL
4041   4042    PBINTA,   BINTAB              / POINTER TO BIN TABLE
4042   0000    BINTAB,   0000
4043   0000              0000                / BIN 1
4044   0020              0020                / BIN 2
4045   0040              0040                / BIN 3
4046   0060              0060                / BIN 4
4047   0100              0100                / BIN 5
4050   0120              0120                / BIN 6
4051   0140              0140                / BIN 7
4052   0160              0160                / BIN 8
4053   0200              0200                / BIN 9
4054   0220              0220                / BIN 10
4055   4056    PKEYTA,   KEYTAB              / KEYPULSE TABLE
4056   7766    KEYTAB,   -12                 / KEYPULSE 0
4057   7777              -1                  /          1
4060   7776              -2                  /          2
4061   7775              -3                  /          3
4062   7774              -4                  /          4
4063   7773              -5                  /          5
4064   7772              -6                  /          6
4065   7771              -7                  /          7
4066   7770              -10                 /          8
4067   7767              -11                 /          9
4070   7765              -13                 / ST KEY
```

```
                /
                /               DOFF
                /                               ROUTINE TURNS OFF
                /                               DISPLAY BIN1 - BIN10
                /
4071   0000     DOFF,   0000
4072   7200             CLA                     / CLEAR THE AC
4073   1271             TAD     DOFF            / LOAD RETURN ADDR
4074   4503             JMS I   PSAVE4          / GO SAVE IT
4075   1312             TAD     LOP10           / LOAD - 10 IN AC
4076   3313             DCA     TLOP10          / STORE IT IN TLOP10
4077   1241             TAD     PBINTA          / LOAD ADDR OF BIN TABLE IN AC
4100   3314             DCA     BINTAT          / STORE IT IN BIN TABLE TEMP
4101   1314     DOFF1,  TAD     BINTAT          / RELOAD PTR TO BIN TABLE
4102   7001             IAC                     / INCREMENT IT BY 1
4103   3314             DCA     BINTAT          / STORE IT
4104   1714             TAD I   BINTAT          / LOAD BIN CODE IN AC
4105   1315             TAD     NIXOFF          / ADD IN CODE TO TURN IT OFF
4106   4462             JMS I   POUT            / OUTPUT IT
4107   2313             ISZ     TLOP10          / ARE WE DONE YET
4110   5301             JMP     DOFF1           / NO, TURN OFF NEXT ONE
4111   4506             JMS I   PREST4          / RETURN
4112   7766     LOP10,  -12                     / -10 DECIMAL
4113   0000     TLOP10, 0000                    / TEMP COUNTER
4114   0000     BINTAT, 0000                    / TEMP POINTER INTO BIN TABLE
4115   0014     NIXOFF, 0014                    / 12 DECIMAL
                /
                /               DISDIG
                /                               ROUTINE PICKS UP KEYPULSE DIGIT IN AC
                /                               PICKS UP BIN NUMBER IN RCT
                /                               THEN DISPLAYS DIGIT ON DISPLAY
                /
4116   0000     DISDIG, 0000
4117   3352             DCA     DIGINP          / SAVE DIGIT TO BE DISPLAYED
4120   1020             TAD Z   CURRCT          / LOAD PTR TO RCT
4121   1043             TAD Z   PARM1D          / ADD IN DISP. TO GET TO BIN NUMBER
4122   3353             DCA     DIGPP           / SAVE PTR TO BIN NUMBER
4123   1241             TAD     PBINTA          / LOAD AC WITH ADDR. OF BIN TABLE
4124   1753             TAD I   DIGPP           / ADD IN BIN NUMBER
4125   3354             DCA     DIGPBC          / STORE PTR TO BIN CODE
4126   3355             DCA     DIGCTR          / SET DIGIT COUNTER=0
4127   1255     DIG2,   TAD     PKEYTA          / LOAD AC WITH PTR TO KEY TABLE
4130   1355             TAD     DIGCTR          / ADD IN COUNTER
4131   3356             DCA     PKEYC           / STORE PTR TO KEY CODE
4132   1352             TAD     DIGINP          / LOAD AC WITH DIGIT INPUT
4133   1756             TAD I   PKEYC           / ADD IN KEY CODE
4134   7450             SNA                     / IS AC=0
4135   5343             JMP     DIG1            / AC=0, GO DISPLAY DIGIT
4136   7200             CLA                     / NO, CLEAR THE AC
4137   1355             TAD     DIGCTR          / RELOAD DIGIT COUNTER
4140   7001             IAC                     / INCREMENT IT BY 1
4141   3355             DCA     DIGCTR          / STORE IT
4142   5327             JMP     DIG2            / CHECK NEXT ITEM IN TABLE
4143   1241     DIG1,   TAD     PBINTA          / LOAD AC WITH ADDRESS OF BIN TABLE
4144   1753             TAD I   DIGPP           / ADD IN BIN NUMBER
4145   3354             DCA     DIGPBC          / STORE PTR TO BIN CODE
4146   1754             TAD I   DIGPBC          / LOAD AC WITH BIN CODE
4147   1355             TAD     DIGCTR          / ADD IN DIGIT TO BE DISPLAYED
4150   4462             JMS I   POUT            / OUTPUT IT
4151   4716             JMS I   DISDIG          / RETURN TO CALLING ROUTINE
4152   0000     DIGINP, 0000                    / KEYPULSE CODE FROM TSD BOARD
4153   0000     DIGPP,  0000                    / PTR TO BIN NUMBER
4154   0000     DIGPBC, 0000                    / PTR TO BIN CODE
4155   0000     DIGCTR, 0000                    / COUNTER FOR KEY TABLE
4156   0000     PKEYC,  0000                    / PTR TO KEY CODE
                        *4200
                /
                /               KEYPUL
                /                               ROUTINE PICKS UP KEYPULSE DIGITS
                /                               STORES BIN NUMBER AND DIGITS IN RCT
                /                               SETS ERROR COUNT = 3 SECONDS /
                /                               CHECKS KEYPULSES AS THEY COME IN
                /                               IF CORRECT DISPLAYS THEM IN PROPER BIN NO.
                /                               UNTIL BIN NUMBER 10; THEN RETURNS
                /
```

| | | | | | |
|---|---|---|---|---|---|
| 4200 | 0000 | KEYPUL, | 0000 | | |
| 4201 | 7200 | | CLA | | / CLEAR THE AC |
| 4202 | 6214 | | 6214 | | / OR DF WITH AC |
| 4203 | 3371 | | DCA | KEYDF | / STORE IT FOR NOW |
| 4204 | 6201 | | 6201 | | / CHG DF = 0 |
| 4205 | 1371 | | TAD | KEYDF | / RELOAD DATA FIELD |
| 4206 | 1174 | | TAD Z | DF0 | / ADD IN DF INST |
| 4207 | 3223 | | DCA | CDF1 | / STORE IT IN INST |
| 4210 | 1371 | | TAD | KEYDF | / RELOAD DATA FIELD |
| 4211 | 1174 | | TAD Z | DF0 | / ADD IN DF INST |
| 4212 | 3244 | | DCA | CDF2 | / STORE IT IN INST |
| 4213 | 1371 | | TAD | KEYDF | / RELOAD DATA FIELD |
| 4214 | 1174 | | TAD Z | DF0 | / ADD IN DF INST |
| 4215 | 3257 | | DCA | CDF3 | / STORE IT IN INST |
| 4216 | 1200 | | TAD | KEYPUL | / LOAD ADDR OF BIN NO. IN AC |
| 4217 | 3360 | | DCA | KEYPP | / STORE POINTER TO PARAMS IN LESSON |
| 4220 | 1020 | | TAD Z | CURRCT | / LOAD PTR TO RCT |
| 4221 | 1043 | | TAD Z | PARM1D | / ADD IN DISP. FOR PARM1 FIELD |
| 4222 | 3361 | | DCA | KRCTPP | / STORE PTR TO PARM FIELD IN RCT |
| 4223 | 6201 | CDF1, | 6201 | | / SET DF INST |
| 4224 | 1760 | | TAD I | KEYPP | / LOAD STARTING BIN NO. IN AC |
| 4225 | 3362 | | DCA | KBINNO | / STORE BIN NO. |
| 4226 | 6201 | | 6201 | | / SET DF=1 |
| 4227 | 1362 | | TAD | KBINNO | / RELOAD BIN NUMBER |
| 4230 | 3761 | | DCA I | KRCTPP | / STORE BIN NO. IN RCT |
| 4231 | 1361 | | TAD | KRCTPP | / RELOAD PTR TO PARM1 FIELD |
| 4232 | 1362 | | TAD | KBINNO | / ADD IN BIN NUMBER |
| 4233 | 1367 | | TAD | MM1 | / ADD IN -1, TO SETUP LOOP |
| 4234 | 3361 | | DCA | KRCTPP | / STORE IT IN RCT PARM POINTER |
| 4235 | 7200 | KEY1, | CLA | | / CLEAR THE AC |
| 4236 | 1361 | | TAD | KRCTPP | / RELOAD PARM PTR IN RCT |
| 4237 | 7001 | | IAC | | / INCREMENT IT BY 1 |
| 4240 | 3361 | | DCA | KRCTPP | / STORE IT |
| 4241 | 1360 | | TAD | KEYPP | / RELOAD PTRS TO PARAMETERS IN LESSON |
| 4242 | 7001 | | IAC | | / INCREMENT IT BY 1 |
| 4243 | 3360 | | DCA | KEYPP | / STORE IT |
| 4244 | 6201 | CDF2, | 6201 | | / SET DF INST |
| 4245 | 1760 | | TAD I | KEYPP | / LOAD NEXT PARM IN TO AC |
| 4246 | 6201 | | 6201 | | / SET DF=1 |
| 4247 | 3761 | | DCA I | KRCTPP | / STORE IT IN RCT |
| 4250 | 1362 | | TAD | KBINNO | / RELOAD BIN NUMBER |
| 4251 | 7001 | | IAC | | / INCREMENT IT BY 1 |
| 4252 | 3362 | | DCA | KBINNO | / STORE IT |
| 4253 | 1362 | | TAD | KBINNO | / RELOAD IT |
| 4254 | 1370 | | TAD | MM11 | / IS IT 11 YET |
| 4255 | 7440 | | SZA | | |
| 4256 | 5235 | | JMP | KEY1 | / NO, GET AND STORE NEXT ONE |
| 4257 | 6201 | CDF3, | 6201 | | / SET DF INST |
| 4260 | 1360 | | TAD | KEYPP | / YES LOAD ADDR OF LAST PARAM |
| 4261 | 7001 | | IAC | | / INCREMENT IT BY 1 |
| 4262 | 4471 | | JMS I | PSAVE | / SAVE RETURN ADDRESS IN RCT |
| 4263 | 4455 | KEY3, | JMS I | PGETIN | / IS THE KEYPULSE HERE YET |
| 4264 | 7440 | | SZA | | |
| 4265 | 5270 | | JMP | KEY2 | / YES, GO PROCESS IT |
| 4266 | 4454 | | JMS I | PTASKSW | / NO, TASKSWITCH |
| 4267 | 4455 | | JMS I | PGETIN | / GET THE INPUT |
| 4270 | 3364 | KEY2, | DCA | KEYINP | / SAVE THE INPUT |
| 4271 | 1364 | | TAD | KEYINP | / RELOAD INPUT |
| 4272 | 4461 | | JMS I | PASTOP | / WAS IT AUDIO STOP |
| 4273 | 7440 | | SZA | | / IS THE AC=0 |
| 4274 | 5302 | | JMP | KEY6 | / NO, CHECK VERBAL |
| 4275 | 4505 | | JMS I | PAUDOFF | / TURN OFF AUDIO STOP BIT |
| 4276 | 4520 | | JMS I | PSASTPF | / GO SET AUDIO STOP FLAG |
| 4277 | 1160 | | TAD Z | C30 | / SET ERROR COUNT=3 SEC |
| 4300 | 4456 | | JMS I | PWAIT | |
| 4301 | 5263 | | JMP | KEY3 | / GO SEE IF NEXT 1 IS HERE YET |
| 4302 | 7200 | KEY6, | CLA | | / CLEAR THE AC |
| 4303 | 1364 | | TAD | KEYINP | / RELOAD INPUT |
| 4304 | 1137 | | TAD Z | SOUNDP | / WAS THERE SOUND PRESENT |
| 4305 | 7440 | | SZA | | |
| 4306 | 5312 | | JMP | KEY4 | / NO, GO CHECK KEYPULSE |
| 4307 | 4504 | | JMS I | PTONE | / YES, TURN OFF TONE BIT |
| 4310 | 4523 | | JMS I | PSARSPF | / SET AUDIO RESPONSE FLAG |
| 4311 | 5263 | | JMP | KEY3 | / GO SEE IF NEXT 1 IS HERE |

| | | | | | | |
|---|---|---|---|---|---|---|
| 4312 | 7200 | KEY4, | CLA | | / | CLEAR THE AC |
| 4313 | 1020 | | TAD Z | CURRCT | / | LOAD PTR TO RCT |
| 4314 | 1043 | | TAD Z | PARM1D | / | ADD IN DISP TO BIN NUMBER |
| 4315 | 3365 | | DCA | KEYP1 | / | STORE PTR TO BIN NUMBER |
| 4316 | 1765 | | TAD I | KEYP1 | / | LOAD BIN NUMBER IN AC |
| 4317 | 1365 | | TAD | KEYP1 | / | ADD IN STARTING ADDR. |
| 4320 | 3366 | | DCA | KPKEYP | / | STORE PTR TO CURRENT KEYPULSE |
| 4321 | 1766 | | TAD I | KPKEYP | / | LOAD AC WITH CURRENT KEYPULSE |
| 4322 | 1364 | | TAD | KEYINP | / | ADD IN INPUT |
| 4323 | 7440 | | SZA | | | |
| 4324 | 4460 | | JMS I | PERROR | / | NOT =; MUST BE AN ERROR |
| 4325 | 4456 | | JMS I | PWAIT | / | = SET ERROR COUNT = 0 |
| 4326 | 7200 | | CLA | | / | CLEAR THE AC |
| 4327 | 1364 | | TAD | KEYINP | / | RELOAD THE KEY INPUT |
| 4330 | 4500 | | JMS I | PDISDIG | / | GO DISPLAY THE DIGIT |
| 4331 | 7200 | | CLA | | / | CLEAR THE AC |
| 4332 | 1765 | | TAD I | KEYP1 | / | RELOAD BIN NUMBER IN AC |
| 4333 | 1363 | | TAD | MM10 | / | ADD IN -10 |
| 4334 | 7450 | | SNA | | / | IS THE AC = 0 |
| 4335 | 5343 | | JMP | KEY5 | / | GO SET UP RETURN |
| 4336 | 7200 | | CLA | | / | CLEAR THE AC |
| 4337 | 1765 | | TAD I | KEYP1 | / | NO, RELOAD BIN NUMBER |
| 4340 | 7001 | | IAC | | / | INCREMENT IT BY 1 |
| 4341 | 3765 | | DCA I | KEYP1 | / | STORE IT BACK IN RCT |
| 4342 | 5263 | | JMP | KEY3 | / | GO WAIT FOR NEXT 1 |
| 4343 | 7200 | KEY5, | CLA | | / | CLEAR AC |
| 4344 | 1020 | | TAD Z | CURRCT | / | LOAD PTR TO RCT |
| 4345 | 1355 | | TAD | ZSAVDF | / | ADD IN DISP FOR LES DF |
| 4346 | 3356 | | DCA | ZPTRSDF | / | STORE PTR |
| 4347 | 1756 | | TAD I | ZPTRSDF | / | LOAD LESSON DF |
| 4350 | 7650 | | SNA CLA | | / | IS IT 0 |
| 4351 | 4467 | | JMS I | PRESTOR | / | YES, RETURN NORMALLY |
| 4352 | 6212 | | 6212 | | / | NO, SER IF=1 |
| 4353 | 4754 | | JMS I | ARESBR | / | JUMP TO RESTOR BANK IN BANK 1 |
| 4354 | 0344 | ARESBR, | 0344 | | / | ADDR OF RESBR IN BANK1 |
| 4355 | 0066 | ZSAVDF, | 0066 | | / | DISP FOR SAVE LESSON DF |
| 4356 | 0000 | ZPTRSDF, | 0000 | | / | PTR TO SAVE DF |
| 4357 | 0000 | KEYPRA, | 0000 | | / | POINTER TO RETURN ADDR |
| 4360 | 0000 | KEYPP, | 0000 | | / | POINTER TO PARAMETERS IN LESSON |
| 4361 | 0000 | KRCTPP, | 0000 | | / | POINTER TO PARM FIELDS IN RCT |
| 4362 | 0000 | KBINNO, | 0000 | | / | BIN NUMBER |
| 4363 | 7766 | MM10, | -12 | | / | -10 DECIMAL |
| 4364 | 0000 | KEYINP, | 0000 | | / | STORE AREA FOR KEYPULSE INPUT |
| 4365 | 0000 | KEYP1, | 0000 | | / | POINTER TO BIN NUMBER IN RCT |
| 4366 | 0000 | KPKEYP, | 0000 | | / | POINTER TO CURRENT KEYPULSE |
| 4367 | 7777 | MM1, | -1 | | / | -1 |
| 4370 | 7765 | MM11, | -13 | | / | CONSTANT -11 |
| 4371 | 0000 | KEYDF, | 0000 | | / | SAVE AREA FOR DF |
| | | | PAUSE | | | |
| | | *4400 | | | | |
| 4400 | 0000 | FLHON, | 0000 | | / | RETURN ADDR |
| 4401 | 7200 | | CLA | | / | CLEAR THE AC |
| 4402 | 1600 | | TAD I | FLHON | / | PICK UP PARAM |
| 4403 | 3023 | | DCA | SAVPAR | / | STORE IT |
| 4404 | 1200 | | TAD | FLHON | / | LOAD ADDR OF PARAM |
| 4405 | 7001 | | IAC | | / | ADD 1 |
| 4406 | 4503 | | JMS I | PSAVE4 | / | GO SAVE IT |
| 4407 | 1020 | | TAD Z | CURRCT | / | LOAD PTR TO RCT |
| 4410 | 1025 | | TAD Z | RNMD | / | ADD IN DISP FOR REMOTE NO. MASK |
| 4411 | 3302 | | DCA | FLHTEM | / | STORE PTR TO REMOTE NO. MASK |
| 4412 | 1702 | | TAD I | FLHTEM | / | LOAD AC WITH REMOTE NO. MASK |
| 4413 | 1023 | | TAD | SAVPAR | / | LOAD PARAM |
| 4414 | 3303 | | DCA | FLHIN | / | STORE INPUT |
| 4415 | 3304 | | DCA | FLHCON | / | STORE COUNTER |
| 4416 | 1363 | FLH2, | TAD | PFSHTAB | / | LOAD ADDR OF FLASH TABLE |
| 4417 | 1304 | | TAD | FLHCON | / | ADD IN COUNTER |
| 4420 | 3302 | | DCA | FLHTEM | / | STORE PTR INTO FLASH TABLE |
| 4421 | 1702 | | TAD I | FLHTEM | / | LOAD ELEMENT INTO TABLE |
| 4422 | 7650 | | SNA CLA | | / | IS IT ZERO |
| 4423 | 5234 | | JMP | FLH1 | / | YES, GO UPDATE TABLE |
| 4424 | 1304 | | TAD | FLHCON | / | NO, RELOAD COUNTER |
| 4425 | 7001 | | IAC | | / | ADD 1 TO IT |
| 4426 | 3304 | | DCA | FLHCON | / | STORE COUNTER |
| 4427 | 1304 | | TAD | FLHCON | / | RELOAD COUNTER |
| 4430 | 1305 | | TAD | FLHM10 | / | ADD IN -10 |

| | | | | | |
|---|---|---|---|---|---|
| 4431 | 7640 | | SZA CLA | | / IS IT ZERO |
| 4432 | 5216 | | JMP | FLH2 | / NO, GO TRY NEXT 1 |
| 4433 | 5236 | | JMP | FLH3 | / NO, RROM FORGET & RETURN TO LESSON |
| 4434 | 1303 | FLH1, | TAD | FLHIN | / RELOAD INPUT |
| 4435 | 3702 | | DCA I | FLHTEM | / STORE IT IN TABLE |
| 4436 | 4506 | FLH3, | JMS I | PREST4 | / RETURN |

```
        /
        /           FLHOFF
        /                       ROUTINE TAKSE CODE PASSED TO IT
        /                       OUT OF FLASH TABLE
        /
4437 0000   FLHOFF,  0000                  / RETURN ADDR
4440 7200            CLA                   / CLEAR THE AC
4441 1637            TAD I    FLHOFF       / PICK UP PARAM
4442 3023            DCA Z    SAVPAR       / SAVE IT IN PAGE 0
4443 1237            TAD      FLHOFF       / LOAD ADDR OF PARAM
4444 7001            IAC                   / ADD 1 FOR RETURN
4445 4503            JMS I    PSAVE4       / GO SAVE IT
4446 1020            TAD Z    CURRCT       / LOAD PTR TO RCT
4447 1025            TAD Z    RNMD         / ADD IN DISP FOR REMOTE NO. MASK
4450 3302            DCA      FLHTEM       / STORE PTR TO REMOTE NO. MASK
4451 1702            TAD I    FLHTEM       / LOAD REMOTE NUMBER MASK
4452 1023            TAD      SAVPAR       / LOAD PARAM
4453 7041            CIA                   / SET IT NEG
4454 3303            DCA      FLHIN        / STORE IT
4455 3304            DCA      FLHCON       / ZERO COUNTER
4456 1363   FLS1,    TAD      PFSHTAB      / LOAD START OF FLASH TABLE
4457 1304            TAD      FLHCON       / ADD IN COUNTER
4460 3302            DCA      FLHTEM       / STORE PTR INTO TABLE
4461 1702            TAD I    FLHTEM       / LOAD ELEMENT OF TABLE
4462 1303            TAD      FLHIN        / ADD IN INPUT
4463 7650            SNA CLA               / IS IT ZERO
4464 5275            JMP      FLS2         / YES, GO ZERO ELEMENT
4465 1304            TAD      FLHCON       / RELOAD COUNTER
4466 7001            IAC                   / ADD 1 TO IT
4467 3304            DCA      FLHCON       / STORE COUNTER
4470 1304            TAD      FLHCON       / RELOAD COUNTER
4471 1305            TAD      FLHM10       / ADD IN -10
4472 7640            SZA CLA               / IS IT ZERO
4473 5256            JMP      FLS1         / NO, GO TRY NEXT 1
4474 5301            JMP      FLS3         / YES, NO FIND FORGET IT
4475 1702   FLS2,    TAD I    FLHTEM       / LOAD ELEMENT FROM TABLE
4476 0135            AND Z    OFFBIT       / TURN IT OUT
4477 6507            6507
4500 3702            DCA I    FLHTEM       / ZERO ELEMT IN TABLE
4501 4506   FLS3,    JMS I    PREST4       / RETURN
4502 0000   FLHTEM,  0000                  / WORK AREA
4503 0000   FLHIN,   0000                  / SAVE AREA FOR INPUT
4504 0000   FLHCON,  0000                  / COUNTER
4505 7766   FLHM10,  -12                   / -10 DEC
        /
        /           FLASH
        /                       ROUTINE CHECKS FLSH TABLE TO SEE IF ANY
        /                       LIGHTS SHOULD BE FLASHED
        /
4506 2357   FLASH,   ISZ      FLAINC       / INCREMENT COUNTER
4507 5501            JMP I    PCLOCK       / NOT ZERO GO TO CLOCK ROUTINE
4510 7200            CLA                   / ZERO CLEAR THE AC
4511 3361            DCA      FLACON       / ZERO COUNTER
4512 1363   FLASH4,  TAD      PFSHTAB      / LOAD START OF FLASH TABLE
4513 1361            TAD      FLACON       / ADD IN COUNTER
4514 3362            DCA      FLATEM       / STORE PTR TO FLASH TABLE
4515 1360            TAD      STATE        / ADD IN ONOFF FLAG
4516 7640            SZA CLA               / IS IT ZERO
4517 5343            JMP      FLASH1       / YES, TURN THEM OFF
4520 5351            JMP      FLASH2       / NO, TURN THEM ON
4521 7200   FLASH3,  CLA                   / CLEAR THE AC
4522 1361            TAD      FLACON       / RELOAD COUNTER
4523 7001            IAC                   / AD 1 TO IT
4524 3361            DCA      FLACON       / STORE IT
4525 1361            TAD      FLACON       / RELOAD COUNTER
4526 1305            TAD      FLHM10       / ADD IN -10
4527 7640            SZA CLA               / IS IT ZERO
4530 5312            JMP      FLASH4       / NO, TRY NEXT 1
4531 1360            TAD      STATE        / YES, RELOAD STATE
```

```
4532    7640            SZA CLA              / IS IT SET
4533    5337            JMP      FLASH5      / YES, RESET IT
4534    7001            IAC                  / NO, SET IT TO 1
4535    3360            DCA      STATE       / STORE IT
4536    5340            JMP      FLASH6      / RETURN
4537    3360   FLASH5,  DCA      STATE       / 0 STATE
4540    1356   FLASH6,  TAD      FLAM5       / LOAD AC WITH -5
4541    3357            DCA      FLAINC      / STORE IT
4542    5501            JMP I    PCLOCK      / GO TO CLOCK ROUTINE
4543    1762   FLASH1,  TAD I    FLATEM      / LOAD ELEMENT IN TABLE
4544    7450            SNA                  / IS IT ZERO
4545    5321            JMP      FLASH3      / YES, GO TRY NEXT 1
4546    0135            AND Z    OFFBIT      / AND IN OFFBIT
4547    6507            6507                 / SEND IT OUT
4550    5321            JMP      FLASH3      / GO TRY NEXT 1
4551    1762   FLASH2,  TAD I    FLATEM      / LOAD ELEMENT IN TABLE
4552    7450            SNA                  / IS IT ZERO
4553    5321            JMP      FLASH3      / YES, TRY NEXT 1
4554    6507            6507                 / NO, SEND IT OUT
4555    5321            JMP      FLASH3      / GO TRY NEXT 1
4556    7773   FLAM5,   -5                   / -5
4557    7773   FLAINC,  -5                   / FLASH INCREMENT
4560    0000   STATE,   0                   / ON OFF FLAG
4561    0000   FLACON,  0000                 / FLASH COUNTER
4562    0000   FLATEM,  0000                 / TEMP CELL
4563    4564   PFSHTAB, FSHTAB               / PTR TO FLASH TABLE
4564    0000   FSHTAB,  0000                 / FLASH TABLE
4565    0000            0000
4566    0000            0000
4567    0000            0000
4570    0000            0000
4571    0000            0000
4572    0000            0000
4573    0000            0000
4574    0000            0000
4575    0000            0000
                        PAUSE
                        *4600
        /
        /               START ROUTINE
        /
4600    4564   STRTR,   JMS I    PRESBUF  / GO RESET BUFFER
4601    1136            TAD Z    MCLEAR   / MASTER CLEAR THE BOARD
4602    4462            JMS I    POUT     / SEND IT OUT
4603    5772            JMP I    PSTRRD   / GO CHECK READER BUSY FLAG
        /
        /               READ SEQUENCE COUNTER
        /
4604    7200   STRLOP,  CLA                / CLEAR THE AC
4605    1355            TAD      SEQCON    / LOAD CODE TO READ SEQ
4606    4462            JMS I    POUT      / SEND IT OUT
4607    1157            TAD Z    C50       / SET WAIT FOR 5 SEC
4610    4456            JMS I    PWAIT
4611    4454            JMS I    PTASKSW   / WAIT FOR INTERRUPT
4612    4455            JMS I    PGETIN    / GET INPUT
4613    3356            DCA      LESNUM    / STORE INPUT
4614    1355            TAD      SEQCON    / RELOAD CODE READ SEQ
4615    0135            AND Z    OFFBIT    / AND IN OFFBIT
4616    4462            JMS I    POUT      / SEND IT OUT
4617    1356            TAD      LESNUM    / LOAD INPUT
4620    1143            TAD Z    M7777     / WAS IT TIMER
4621    7650            SNA CLA
4622    5204            JMP      STRLOP    / YES, SEQ STUCK TRY AGAIN
4623    4456            JMS I    PWAIT     / NO, ZERO WAIT COUNT
4624    1356            TAD      LESNUM    / RELOAD INPUT
4625    0357            AND      SEQMSK    / AND OUT EVERYTHING BUT SEQ BIT
4626    7650            SNA CLA            / IS AC=0
4627    5204            JMP      STRLOP    / NO, TRY AGAIN
4630    1356            TAD      LESNUM    / YES, RELOAD INPUT
4631    0360            AND      SEQBIT    / ZERO SEQ BIT
4632    3356            DCA      LESNUM    / STORE IT BACK IN LESSON NUM
        /
        /               DELETE BIT IN BIT MAT FOR LAST LESSON
        /
```

```
4633  1020            TAD Z    CURRCT    / LOAD PTR TO RCT
4634  1377            TAD      PARTND    / ADD IN PARTITION NUMBER DISP
4635  3361            DCA      STRTN1    / STORE PTR TO PARTITION NUM
4636  1373            TAD      PUSEMAP   / LOAD PTR TO USEMAP TABLE
4637  1761            TAD I    STRTM1    / ADD IN PARTITION NUMBER OF LAST
4640  3361            DCA      STRTM1    / STORE PTR TO USEMAP         LES
4641  1020            TAD Z    CURRCT    / LOAD PTR TO RCT
4642  1376            TAD      DPD       / ADDIN DISP FOR DELETE PATTERN
4643  3362            DCA      STRTM2    / STORE PTR TO DELETE MASK
4644  1761            TAD I    STRTM1    / LOAD USE MAP IN AC
4645  0762            AND I    STRTM2    / AND IN DELETE MASK FOR PARTITION
4646  3761            DCA I    STRTM1    / STORE USEMAP BACK
               /
               /            IS LESSON IN INCORE TABLE
               /
4647  3364            DCA      TABCON    / ZERO TABLE COUNTER
4650  1374   STRTR1,  TAD      PINCORE   / LOAD PTR TO INCORE TABLE
4651  1364            TAD      TABCON    / ADD IN COUNTER
4652  3361            DCA      STRIM1    / STORE PTR INTO INCORE TAB
4653  1761            TAD I    STRIM1    / LOAD ENTRY OF INCORE TAB
4654  1143            TAD Z    M7777     / ADD IN 1
4655  7650            SNA CLA            / IS AC=0
4656  5767            JMP I    ZSTRRD8   / LESSON NOT IN TABLE READ IT IN
4657  1761            TAD I    STRIM1    / LOAD ELEMENT OF TABLE
4660  7041            CIA                / SET IT NEG
4661  1356            TAD      LESNUM    / ADD IN LESNUM
4662  7650            SNA CLA            / IS AC=0
4663  5271            JMP      UPRCT     / YES, LESSON IN CORE GO UPDATE TAB
4664  1364            TAD      TABCON    / NO, RELOAD COUNTT
4665  1147            TAD Z    PLUS2     / ADD 2
4666  1142            TAD Z    ONE       / 1 MORE FOR NEXT ENTRY
4667  3364            DCA      TABCON    / STOR COUNTER BACK
4670  5250            JMP      STRTR1    / GO TRY NEXT 1
               /
               /            LESSON IS IN INCORE TABLE; UPDATE USEMAP &
               /            PARTITION NUMBER IN RCT
               /
4671  1361   UPRCT,   TAD      STRIM1    / LOADADDR OF 1ST ELEMETOF INCORE TAB
4672  1147            TAD Z    PLUS2     / ADD 2 TO GET TO PARTITION NUM
4673  3362            DCA      STRIM2    / STORE PTR TO PARTITION NUM
4674  1020            TAD Z    CURRCT    / LOAD PTR TO RCT
4675  1377            TAD      PARTND    / ADD IN PART NUMBER DISP
4676  3363            DCA      STRIM3    / STORE PTR TO PARTITION NUMBER IN TAB
4677  1762            TAD I    STRIM2    / LOAD PART NUMBER FROM INCORE TABLE
4700  3763            DCA I    STRIM3    / STORE IT IN RCT
4701  1373            TAD      PUSEMAP   / LOAD PTR TO USEMAP TABLE
4702  1762            TAD I    STRIM2    / ADD IN PARTITION NUM FROM INCR TAB
4703  3363            DCA      STRIM3    / STORE PTR TO USEMAP
4704  1020            TAD Z    CURRCT    / LOAD PTR TO RCT
4705  1376            TAD      DPD       / ADD IN DISP FOR DELETE MASK
4706  3362            DCA      STRIM2    / STOR PTR TO DELETE MASK
4707  1763            TAD I    STRIM3    / LOAD USEMAP IN AC
4710  0762            AND I    STRIM2    / AND IN DELETE PATTERN
4711  3763            DCA I    STRIM3    / STORE USEMAP BACK
4712  1020            TAD Z    CURRCT    / LOAD PTR TO RCT
4713  1375            TAD      APD       / ADD IN ADD PATTERN DISP
4714  3362            DCA      STRIM2    / STORE PTR TO ADD MASK
4715  1763            TAD I    STRIM3    / LOAD USEMAP IN AC
4716  1762            TAD I    STRIM2    / ADD IN ADD PATTERN
4717  3763            DCA I    STRIM3    / STORE USEMAP BACK
               /
               /            UPDATE RCT
               /
4720  1361            TAD      STRIM1    / LOAD 1ST ELEMENT OF ENTRY
4721  1142            TAD Z    ONE       / ADD 1 TO GET STARTING ADDR OF LESSON
4722  3362            DCA      STRIM2    / STORE PTR TO STARTING ADDR OF LESSON
4723  1762            TAD I    STRIM2    / LOAD START ADDR OF LES IN AC
4724  0370            AND      UPMSK1    / ZERO DATA FIELD
4725  3365            DCA      SADDR     / STORE IT
4726  1020            TAD Z    CURRCT    / LOAD PTR TO RCT
4727  1030            TAD Z    ANID      / ADD IN DISP FOR ADDR OF NEXT INST
4730  3366            DCA      UPPTR     / STORE PTR TO ADDR OF NEXT INST
4731  1365            TAD      SADDR     / RELOAD STARTING ADDR OF LESSON
4732  3766            DCA I    UPPTR     / STORE IT IN ADDR OF NEXT INST
```

```
4733  1020              TAD Z     CURRCT    / LOAD PTR TO RCT
4734  1032              TAD Z     ABLD      / ADD IN DISP FOR BEG OF LESSON
4735  3366              DCA       UPPTR     / STORE IT
4736  1365              TAD       SADDR     / RELOAD STARTING ADDR
4737  3766              DCA I     UPPTR     / STORE IT IN ADDR OF BEG OF LESSON
4740  1020              TAD Z     CURRCT    / LOAD PTR TO RCT
4741  1145              TAD Z     LDFD      / DISP FOR LESSON DF
4742  3366              DCA       UPPTR     / STORE PTR
4743  1762              TAD I     STRIM2    / LOAD START ADDR OF LESSON
4744  0371              AND       UPMSK2    / ZERO EVERYTHING BUT DF
4745  3766              DCA I     UPPTR     / STORE IT IN RCT
4746  1153              TAD Z     GOLAMP    / LOAD CODE FOR GOLAMP
4747  4462              JMS I     POUT      / SEND IT OUT
4750  4564              JMS I     PRESBUF   / RESET BUFFER
4751  4463              JMS I     PRESET    / REST REST OF BUFFER
4752  1766              TAD I     UPPTR     / LOAD DF
4753  5754              JMP I     PNEXTP    / GO CONTINUE ON NEXT PAGE
4754  5200     PNEXTP,  NEXTP               / PTR TO CONTINUE
4755  0741     SEQCON,  0741                / CODE TO READ SEQ COUNTER
4756  0000     LESNUM,  0000                / SAVE AREA FOR LESSON NUMBER
4757  0400     SEQMSK,  0400                / MASK TO 0 EVERYTHING BUT SEQ BIT
4760  7377     SEQBIT,  7377                / CODE TO 0 SEQ BIT
4761  0000     STRIM1,  0000                / TEMP CELL 1
4762  0000     STRIM2,  0000                / TEMP CELL 2
4763  0000     STRIM3,  0000                / TEMP CELL 3
4764  0000     TABCON,  0000                / TABLE COUNTER
4765  0000     SADDR,   0000                / SADDR OF LESSON
4766  0000     UPPTR,   0000                / TEMP PTR
4767  5015     ZSTRRD8, STRRD8              / PTR TO STRRD8
4770  7707     UPMSK1,  7707                / MASK TO 0 DF
4771  0070     UPMSK2,  0070                / MASK TO 0 EVERYTHING BUT DF
4772  5000     PSTRRD,  STRRD               / ADDR OF READ ROUTINE
4773  2503     PUSEMAP, USEMAP              / TABLE OF USEMAP FOR PARTITIONS
4774  2452     PINCORE, INCORE              / PTR TO INCORE TABLE
4775  0061     APD,     61                  / ADD PATTERN DISP
4776  0062     DPD,     62                  / DELETE PATTERN DISP
4777  0063     PARIND,  63                  / PARTITION NUMBER DISP
                        *5000
               /
               /        READ LESSON INTO CORE
               /
5000  5362     STRRD,   JMP       SETAUD    / GO SETUP AUDIO
5001  7200     STRRD9,  CLA                 / CLEAR AC
5002  1341              TAD       RDBUSY    / LOAD RDBUSY FLAG
5003  7650              SNA CLA             / IS IT SET
5004  5212              JMP       STRRD1    / NO, GO USE READER
5005  1154              TAD Z     C20       / WAIT 2 SEC
5006  4456              JMS I     PWAIT     / GO WAIT 5 SEC
5007  4454     STRRD2,  JMS I     PTASKSW   / WAIT FOR INTERRUPT
5010  4455              JMS I     PGETIN    / GET INPUT
5011  5201              JMP       STRRD9    / GO TRY AGAIN
               /
               /        READER NOT BUSY GO USE IT
               /
5012  7001     STRRD1,  IAC                 / SET AC=1
5013  3341              DCA       RDBUSY    / SET READER BUSY FLAG
5014  5751              JMP I     PSTRLOP   / GO READ SEQ COUNTER
5015  3342     STRRD8,  DCA       USEMPC    / 0 USE MAP COUNTER
5016  1343     STRRD4,  TAD       ZUSEMAP   / LOAD START OF USEMAP TABLE
5017  1342              TAD       USEMPC    / ADD IN USEMAP COUNTER
5020  3344              DCA       STRTP1    / STORE PTR INTO USEMAP TABLE
5021  1744              TAD I     STRTP1    / LOAD ELEMENT OD TABLE
5022  1143              TAD Z     M7777     / ARE WE AT THE END
5023  7650              SNA CLA
5024  7402              HLT                 / YES, HALT SOMETHING MUST BE WRONG
5025  1744              TAD I     STRTP1    / NO, RELOAD ELEMENT OF TABLE
5026  7650              SNA CLA             / IS IT ZERO
5027  5234              JMP       STRRD3    / YES, GO USE PARTITION
5030  1342              TAD       USEMPC    / NO, RELOAD COUNTER
5031  7001              IAC                 / ADD 1 TO IT
5032  3342              DCA       USEMPC    / STORE IT BACK
5033  5216              JMP       STRRD4    / GO TRY NEXT 1
               /
               /        ZERO ENTRY IN INCORE TABLE FOR THIS
               /        PARTITION ;
               /
```

| | | | | | |
|---|---|---|---|---|---|
| 5034 | 3345 | STRRD3, | DCA | ZINCON | / ZERO COUNTER |
| 5035 | 1355 | STRR02, | TAD | ZINCORE | / LOAD START OF INCORE TABLE |
| 5036 | 1345 | | TAD | ZINCON | / ADD IN COUNTER |
| 5037 | 3346 | | DCA | ZINPT1 | / STORE PTR INTO INCORE TABLE |
| 5040 | 1746 | | TAD I | ZINPT1 | / LOAD 1ST ELEMENT OF INCORE ENTRY |
| 5041 | 1143 | | TAD Z | M7777 | / CHECK FOR END OF TABLE |
| 5042 | 7650 | | SNA CLA | | |
| 5043 | 7402 | | HLT | | / END OF TABLE SOMETHING IS WRONG |
| 5044 | 1346 | | TAD | ZINPT1 | / RELOAD ADDR OF 1ST ELEMENT |
| 5045 | 1147 | | TAD Z | PLUS2 | / ADD 2 TO IT TO GET TO PARTITION |
| 5046 | 3346 | | DCA | ZINPT1 | / STORE IT |
| 5047 | 1746 | | TAD I | ZINPT1 | / LOAD PARTITION NUMBER |
| 5050 | 7041 | | CIA | | / SET IT NEG |
| 5051 | 1342 | | TAD | USEMPC | / ADD IN USEMAP COUNTER |
| 5052 | 7650 | | SNA CLA | | / IS IT ZERO |
| 5053 | 5261 | | JMP | STRR01 | / YES, FOUND PARTITION NUMBER |
| 5054 | 1345 | | TAD | ZINCON | / NO, RELOAD COUNTER |
| 5055 | 1147 | | TAD Z | PLUS2 | / ADD 2 TO IT |
| 5056 | 1142 | | TAD Z | ONE | / ADD 1 MORE |
| 5057 | 3345 | | DCA | ZINCON | / STORE IT BACK |
| 5060 | 5235 | | JMP | STRR02 | / TRY NEXT 1 |
| 5061 | 1355 | STRR01, | TAD | ZINCORE | / RELOAD START OF INCORE TABLE |
| 5062 | 1345 | | TAD | ZINCON | / ADD IN COUNTER |
| 5063 | 3346 | | DCA | ZINPT1 | / STORE PTR INTO INCORE TABLE |
| 5064 | 3746 | | DCA I | ZINPT1 | / ZERO LESSON NUMBER |
| 5065 | 1346 | | TAD | ZINPT1 | / RELOAD ENTRY |
| 5066 | 7001 | | IAC | | / ADD 1 TO IT |
| 5067 | 3346 | | DCA | ZINPT1 | / STORE IT BACK |
| 5070 | 3746 | | DCA I | ZINPT1 | / ZERO STARTING ADDR |
| 5071 | 1752 | | TAD I | PLESNUM | / LOAD LESSON NUMBER |
| 5072 | 3353 | | DCA | SAVLES | / STORE IT |

/
/ SETUP PARTITION ADDR IN AUTO INDEX REG
/

| | | | | | |
|---|---|---|---|---|---|
| 5073 | 1347 | | TAD | ZPARTAB | / LOAD START OF PARTITION ADDR TABLE |
| 5074 | 1342 | | TAD | USEMPC | / ADD IN USEMAP COUNTER |
| 5075 | 3350 | | DCA | STRTP2 | / STORE PTR INTO TABLE |
| 5076 | 1750 | | TAD I | STRTP2 | / LOAD STARTING ADDR OF PARTITION |
| 5077 | 0356 | | AND | STRDM1 | / 0 DF |
| 5100 | 1150 | | TAD Z | M1 | / SUBTRACT 1 FOR AUTO INDEX |
| 5101 | 3010 | | DCA Z | STRLES | / STORE IT IN AUTO INDEX REF |
| 5102 | 1750 | | TAD I | STRTP2 | / LOAD PARTITION ADDR |
| 5103 | 0357 | | AND | STRDM2 | / 0 EVERYTHING BUT DF |
| 5104 | 3360 | | DCA | STRDF | / STORE IT |
| 5105 | 1174 | | TAD Z | DF0 | / LOAD DF INST |
| 5106 | 1360 | | TAD | STRDF | / ADD IN DF |
| 5107 | 3761 | | DCA I | ZCASS25 | / STORE IT BACK |
| 5110 | 5754 | | JMP I | PCONP2 | / JUMP TO NEXT PAGE TO SETUP READ |

/
/ UPDATE INCORE TABLE WITH LESSON
/ THAT HAS BEEN READ IN
/

| | | | | | |
|---|---|---|---|---|---|
| 5111 | 3345 | CONP1, | DCA | ZINCON | / ZERO COUNTER |
| 5112 | 1355 | STRR04, | TAD | ZINCORE | / LOAD START OF INCORE TABLE |
| 5113 | 1345 | | TAD | ZINCON | / ADD IN COUNTER |
| 5114 | 3346 | | DCA | ZINPT1 | / STORE PTR TO INCORE TABLE |
| 5115 | 1746 | | TAD I | ZINPT1 | / LOAD ELENT OF TABLE |
| 5116 | 7650 | | SNA CLA | | / IS IT 0 |
| 5117 | 5331 | | JMP | STRR03 | / YES, FOUND BLANK SPOT IN TABLE |
| 5120 | 1746 | | TAD I | ZINPT1 | / NO, CHECK FOR END OF TABLE |
| 5121 | 1143 | | TAD Z | M7777 | |
| 5122 | 7650 | | SNA CLA | | |
| 5123 | 7402 | | HLT | | / YES, SOMETHING MUST BE WRONG |
| 5124 | 1345 | | TAD | ZINCON | / RELOAD COUNTER |
| 5125 | 1147 | | TAD Z | PLUS2 | / ADD 2 TO IT |
| 5126 | 1142 | | TAD Z | ONE | / ADD 1 MORE TO IT |
| 5127 | 3345 | | DCA | ZINCON | / STORE COUNTER |
| 5130 | 5312 | | JMP | STRR04 | / GO TRY NEXT 1 |
| 5131 | 1353 | STRR03, | TAD | SAVLES | / LOAD LESSON NUMBER |
| 5132 | 3746 | | DCA I | ZINPT1 | / STORE IT IN TABLE |
| 5133 | 1346 | | TAD | ZINPT1 | / LOAD ADDR OF ENTRY |
| 5134 | 7001 | | IAC | | / ADD 1 TO GET TO START ADDR |
| 5135 | 3346 | | DCA | ZINPT1 | / STORE ADDR |
| 5136 | 1750 | | TAD I | STRTP2 | / LOAD STARTING ADDR OF LESSON |
| 5137 | 3746 | | DCA I | ZINPT1 | / STORE IT IN INCORE TABLE |

```
5140   5751              JMP I    PSTRLOP    / GO BACK TO START OF READ
5141   0000   RDBUSY,    0000                / READER BUSY FLAG
5142   0000   USEMPC,    0000                / COUNTER FOR USEMAP TABLE
5143   2503   ZUSEMAP,   USEMAP              / ADDR OF USEMAP TABLE
5144   0000   STRTP1,    0000                / TEMP PTR
5145   0000   ZINCON,    0000                / COUNTER FOR INCORE TABLE
5146   0000   ZINPT1,    0000                / PTR TO INCORE TABLE
5147   2442   ZPARTAB,   PARTAB              / PTR TO PARTITION TABLE
5150   0000   STRTP2,    0000                / PTR TO STARTING ADDR OF PARTITION
5151   4604   PSTRLOP,   STRLOP              / PTR TO STRLOP
5152   4756   PLESNUM,   LESNUM              / PTR TO LESSON NUMBER
5153   0000   SAVLES,    0000                / SAVE AREA FOR LESSON NUMBER
5154   5400   PCONP2,    CONP2               / ADDR OF 2 PAGE FOR THOS ROU
5155   2452   ZINCORE,   INCORE              / PTR TO INCORE TABLE
5156   7707   STRDM1,    7707                / MASK TO ZERO DF
5157   0070   STRDM2,    0070                / MASK TO 0 EVERYTHING BUT DF
5160   0000   STRDF,     0000                / TEMP FOR DF
5161   5732   ZCASS25,   CASS25              / PTR TO CASS25
              /
              /          SKIP FOR LESSON TONE
              /
5162   1375   SETAUD,    TAD      STRAFL     / LOAD CODE FOR AUDIO FORWARD LESSON
5163   4462              JMS I    POUT       / SEND IT OUT
5164   4454   STRW1,     JMS I    PTASKSW    / WAIT FOR INTERRUPT
5165   4455              JMS I    PGETIN     / GET INPUT
5166   1376              TAD      STRASL     / WAS IT AUDIO STOP LESSON
5167   7640              SZA CLA             / IS AC=0
5170   5364              JMP      STRW1      / NO, WAIT SOME MORE
5171   1375              TAD      STRAFL     / YES, RELOAD CODE FOR AUDIO FORWARD
5172   0135              AND Z    OFFBIT     / AND IN OFFBIT
5173   4462              JMS I    POUT       / SEND IT OUT
5174   5201              JMP      STRRD9     / RETURN TO STRRD9
5175   0752   STRAFL,    0752                / CODE FOR AUDIO FORWARD LESSON
5176   7661   STRASL,    -0117               / CODE FOR AUDIO STOP LESSON
                         PAUSE
                         *5200
5200   3342   NEXTP,     DCA      NEXTDF     / STORE DF
5201   1020              TAD Z    CURRCT     / LOAD PTR TO RCT
5202   1343              TAD      NEXT65     / ADD IN DISP OF 65
5203   3344              DCA      NEXTPTR    / STORE PTR TO TASK SW DF
5204   1342              TAD      NEXTDF     / RELOAD DF
5205   3744              DCA I    NEXTPTR    / STORE IT IN RCT
5206   5373              JMP      NEXTP1     / GO 0 READER BUSR FLAG
                         *5207
5207   7200   READ,      CLA                 / CLEAR THE AC
5210   6454              6454                / READ INPUT
5211   6450              6450                / DISABLE INTERRUPTS
5212   3320              DCA      CASSIN     / STORE INPUT
5213   1320              TAD      CASSIN     / RELOAD INPUT
5214   0321              AND      BOTMSK     / IS IT BOT EOT FLAG
5215   7650              SNA CLA
5216   5227              JMP      CASS10     / NO, GO TRY NEXT 1
5217   7001              IAC                 / YES, SET AC=1
5220   3322              DCA      BOTF       / SET BOT FLAG
5221   1323              TAD      STOP2      / STOP TAPE
5222   6457              6457
5223   1324              TAD      REWIN2     / TAKE AWAY REWIND
5224   0135              AND Z    OFFBIT
5225   6457              6457
5226   4502              JMS I    PRETURN    / RETURN
5227   1320   CASS10,    TAD      CASSIN     / RELOAD INPUT
5230   0325              AND      RDCMSK     / IS IT READ DATA CHAR
5231   7650              SNA CLA             /
5232   5237              JMP      CASS11     / NO, GO TRY NEXT 1
5233   1326              TAD      READF      / YES, LOAD READ FLAG
5234   7650              SNA CLA             / IS IT SET
5235   4502              JMS I    PRETURN    / NO, RETURN
5236   5740              JMP I    PCASS20    / YES, GO PROCESS READ
5237   1320   CASS11,    TAD      CASSIN     / RELOAD INPUT
5240   0327              AND      DASMSK     / WAS IT DATA STARTED
5241   7650              SNA CLA             /
5242   5251              JMP      CASS12     / NO, GO CHECK NEXT 1
5243   1326              TAD      READF      / YES, LOAD READ FLAG
5244   7650              SNA CLA             / IS IT SET
```

| | | | | | |
|---|---|---|---|---|---|
| 5245 | 4502 | | JMS I | PRETURN | / NO, RETURN |
| 5246 | 7001 | | IAC | | / YES, SET AC=1 |
| 5247 | 3330 | | DCA | ENDDF | / SET END DATA FLAG |
| 5250 | 4502 | | JMS I | PRETURN | / RETURN |
| 5251 | 1320 | CASS12, | TAD | CASSIN | / RELOAD INPUT |
| 5252 | 0331 | | AND | GAPMSK | / WAS IT GAP DETECTED |
| 5253 | 7650 | | SNA CLA | | |
| 5254 | 4502 | | JMS I | PRETURN | / NO, FORGET IT |
| 5255 | 1332 | | TAD | FSRF | / YES, LOAD FAST SEARCH FLAG |
| 5256 | 7650 | | SNA CLA | | / IS IT SET |
| 5257 | 5276 | | JMP | CASS13 | / NO, GO CHECK END DATA FLAG |
| 5260 | 1333 | | TAD | GAPCNT | / LOAD GAP COUNT |
| 5261 | 7001 | | IAC | | / ADD 1 TO IT |
| 5262 | 3333 | | DCA | GAPCNT | / STORE IT |
| 5263 | 1333 | | TAD | GAPCNT | / RELOAD GAP COUNT |
| 5264 | 7640 | | SZA CLA | | / IS IT 0 |
| 5265 | 4502 | | JMS I | PRETURN | / NO, RETURN |
| 5266 | 1334 | | TAD | FSRCH1 | / YES, TAKE AWAY FAST SEARCH |
| 5267 | 0135 | | AND Z | OFFBIT | |
| 5270 | 6457 | | 6457 | | |
| 5271 | 1323 | | TAD | STOP2 | / STOP TAPE |
| 5272 | 6457 | | 6457 | | |
| 5273 | 7200 | | CLA | | / CLEAR AC |
| 5274 | 3332 | | DCA | FSRF | / 0 FAST SEARCH FLAG |
| 5275 | 4502 | | JMS I | PRETURN | |
| 5276 | 1330 | CASS13, | TAD | ENDDF | / LOAD END DATA FLAG |
| 5277 | 7650 | | SNA CLA | | / IS IT SET |
| 5300 | 4502 | | JMS I | PRETURN | / NO, RETURN |
| 5301 | 3330 | | DCA | ENDDF | / YES, 0 END DATA FLAG |
| 5302 | 3326 | | DCA | READF | / 0 READ FLAG |
| 5303 | 1323 | | TAD | STOP2 | / STOP TAPE |
| 5304 | 6457 | | 6457 | | |
| 5305 | 1335 | | TAD | READ1 | / TAKE AWAY READ |
| 5306 | 0135 | | AND Z | OFFBIT | |
| 5307 | 6457 | | 6457 | | |
| 5310 | 1736 | | TAD I | PSAWORD | / LOAD CHKSUM FROM TAPE |
| 5311 | 7041 | | CIA | | / SET IT NEG |
| 5312 | 1737 | | TAD I | ZCHKSUM | / ADD IN CHKSUM |
| 5313 | 7650 | | SNA CLA | | / IS IT 0 |
| 5314 | 4502 | | JMS I | PRETURN | / NO, RETURN |
| 5315 | 7001 | | IAC | | / YES, SET AC=1 |
| 5316 | 3341 | | DCA | READOK | / SET READOK FLAG |
| 5317 | 4502 | | JMS I | PRETURN | / RETURN |
| 5320 | 0000 | CASSIN, | 0000 | | / SAVE AREA FOR INPUT |
| 5321 | 4000 | BOTMSK, | 4000 | | / MASK FOR BOT EOT |
| 5322 | 0000 | BOTF, | 0000 | | / BOT FLAG |
| 5323 | 0000 | STOP2, | 0000 | | / CODE TO STOP TAPE |
| 5324 | 4600 | REWIN2, | 4600 | | / CODE TO REWIND |
| 5325 | 0200 | RDCMSK, | 0200 | | / READ DATA CHAR MASK |
| 5326 | 0000 | READF, | 0000 | | / READ FLAG |
| 5327 | 0400 | DASMSK, | 0400 | | / DATA STARTED MASK |
| 5330 | 0000 | ENDDF, | 0000 | | / END DATA FLAG |
| 5331 | 1000 | GAPMSK, | 1000 | | / MASK FOR GAP PRESENT |
| 5332 | 0000 | FSRF, | 0000 | | / FAST SEARCH FLAG |
| 5333 | 0000 | GAPCNT, | 0000 | | / GAP COUNT |
| 5334 | 3200 | FSRCH1, | 3200 | | / CODE FOR FAST SEARCH |
| 5335 | 1600 | READ1, | 1600 | | / CODE TO READ |
| 5336 | 5755 | PSAWORD, | SAWORD | | / PTR TO SAVE WORD |
| 5337 | 5753 | ZCHKSUM, | CHKSUM | | / PTR TO CHKSUM |
| 5340 | 5600 | PCASS20, | CASS20 | | / PTR TO CASS20 |
| 5341 | 0000 | READOK, | 0000 | | / READ OK FLAG |
| 5342 | 0000 | NEXTDF, | 0000 | | / SAVE AREA FOR DF |
| 5343 | 0065 | NEXT65, | 65 | | / DISP 65 FOR TASKSW DF |
| 5344 | 0000 | NEXTPTR, | 0000 | | / PTR INTO RCT |

/
/ REW
/
/

| | | | | | |
|---|---|---|---|---|---|
| 5345 | 0000 | REW, | 0000 | | / RETURN ADDR |
| 5346 | 7200 | | CLA | | / CLEAR AC |
| 5347 | 1367 | | TAD | STOP4 | / MAKE SURE TAPE IS STOPPED |
| 5350 | 6457 | | 6457 | | |
| 5351 | 7200 | | CLA | | / CLEAR AC |
| 5352 | 3772 | | DCA I | PBOTF | / ZERO BOT FLAG |

```
5353  1371   REW1,    TAD     REWIND   / LOAD CODE TO REWIND
5354  6457            6457
5355  1370            TAD     MOVE4    / START TAPE MOVING
5356  6457            6457
5357  1157            TAD Z   C50      / SET WAIT FOR 5 SEC
5360  4456            JMS I   PWAIT
5361  4454            JMS I   PTASKSW  / WAIT
5362  7200            CLA              / CLEAR AC
5363  1772            TAD I   PBOTF    / LOAD BOT FLAG
5364  7650            SNA CLA          / IS IT SET
5365  5353            JMP     REW1     / NO, GO DO IT AGAIN
5366  5745            JMP I   REW      / RETURN
5367  0000   STOP4,   0000             / CODE TO STOP TAPE
5370  0200   MOVE4,   0200             / CODE TO START TAPE
5371  4600   REWIND,  4600             / CODE TO REWIND
5372  5322   PBOTF,   BOTF             / PTR TO BOT FLAG
             /
             /        0 READER BUSY FLAG
             /        JUMP TO DISPATCHER
             /
5373  3775   NEXTP1,  DCA I   ZRDBUSY  / ZERO READER BUSY FLAG
5374  4453            JMS I   PDISPAT  / JUMP TO DISPATCHER
5375  5141   ZRDBUSY, RDBUSY           / PTR TO READER BUSY FLAG
             *5400
5400  7200   CONP2,   CLA              / CLEAR AC
5401  1351            TAD     CMIN3    / LOAD -3
5402  3347            DCA     RETCON   / STORE IT IN RETRY COUNT
5403  1010            TAD Z   STRLES   / LOAD START ADDR
5404  3377            DCA     SAVSTR   / SAVE IT
5405  4774   CONP3,   JMS I   PCLRBOT  / CLEAR BOT
5406  4775            JMS I   PREW     / REWIND TAPE
5407  4776            JMS I   PWAIT1   / WAIT .6 SEC
5410  4776            JMS I   PWAIT1   / WAIT .6 SEC
5411  4774            JMS I   PCLRBOT  / CLEAR BOT
5412  1156            TAD Z   C10      / LOAD CONSTANT 10
5413  7041            CIA              / SET IT NEG.
5414  3346            DCA     IGCOUN   / STORE IT IN IGNORE COUNT
5415  1754            TAD I   ZLESNUM  / LOAD LESSON NUMBER IN AC
5416  7450            SNA              / IS IT 0
5417  5756            JMP I   ZSTRLOP  / YES, FORGET IT
5420  7041            CIA              / NOT 0 SET IT NEG
5421  3757            DCA I   PGAPCNT  / STORE IT IN GAP COUNT
5422  7001            IAC              / SET AC=1
5423  3760            DCA I   PFSRF    / SET FAST SEARCH FLAG
5424  1352            TAD     STOP     / MAKE SURE TAPE IS STOP
5425  6457            6457
5426  1353            TAD     FSRCH    / LOAD CODE FOR FAST SEARCH
5427  6457            6457             / SEND IT OUT
5430  1345            TAD     MOVE     / START TAPE MOVING
5431  6457            6457
5432  7200   CASS1,   CLA              / CLEAR THE AC
5433  1757            TAD I   PGAPCNT  / LOAD GAP COUNT
5434  7650            SNA CLA          / IS IT 0
5435  5242            JMP     CASS2    / YES, GO START READ
5436  1154            TAD Z   C20      / NO, WAIT 2 SEC
5437  4456            JMS I   PWAIT
5440  4454            JMS I   PTASKSW  / WAIT
5441  5232            JMP     CASS1    / GO CHECK AGAIN
5442  7001   CASS2,   IAC              / SET READ FLAG
5443  3761            DCA I   PREADF   /
5444  1362            TAD     CASS512  / LOAD AC WITH 512
5445  3763            DCA I   PINCOUN  / STORE IT IN CHAR COUNT
5446  3764            DCA I   PBLKFLG  / ZERO BLOCK CHECK FLAG
5447  3755            DCA I   PFHFLG   / ZERO 1ST HALF FLAG
5450  3765            DCA I   PCHKSUM  / ZERO CHECKSUM
5451  3766            DCA I   PREADOK  / ZERO READ OK FLAG
5452  3767            DCA I   PIGNORF  / ZERO IGNORE FLAG
5453  3770            DCA I   PREAF1   / ZERO 1ST READ FLAG
5454  1371            TAD     READ3    / LOAD CODE TO READ
5455  6457            6457
5456  1345            TAD     MOVE     / LOAD CODE TO MOVE
5457  6457            6457
5460  1761   CASS3,   TAD I   PREADF   / LOAD READ FLAG
5461  7650            SNA CLA          / IS IT SET
```

```
5462    5270            JMP     CASS4   / NO, MUST BE FINISHED READING
5463    1154            TAD Z   C20     / YES, WAIT 2 MORE SEC
5464    4456            JMS I   PWAIT
5465    4454            JMS I   PTASKSW / WAIT FOR INTERRUPT
5466    7200            CLA             / CLEAR AC
5467    5260            JMP     CASS3   / GO TRY AGAIN
5470    1766   CASS4,   TAD I   PREADOK / LOAD READ OK FLAG
5471    7650            SNA CLA         / IS IT SET
5472    5772            JMP I   PCONP1  / YES, GO UPDATE TABLE
5473    1767            TAD I   PIGNORF / LOAD IGNORE FLAG
5474    7650            SNA CLA         / IS IT SET
5475    5301            JMP     CASS70  / NO, GO UPDATE RETRY COUNT
5476    2346            ISZ     IGCOUN  / YES, INCRE IGNORE COUNT
5477    5242            JMP     CASS2   / NOT 0 READ NEXT 1
5500    5312            JMP     CASS80  / 0 GO FLASH ERROR LAMP
5501    2347   CASS70,  ISZ     RETCON  / INCR RETRY COUNT
5502    5304            JMP     CASS71  / NOT 0, TRY AGAIN
5503    5312            JMP     CASS80  / 0, GO FLASH ERROR LAMP
5504    7200   CASS71,  CLA             / CLEAR AC
5505    1750            TAD I   PSAVLES / RELOAD CURRENT LESSON NUMBER
5506    3754            DCA I   ZLESNUM / STORE IT FOR FAST SEARCH
5507    1377            TAD     SAVSTR  / RELOAD START ADDR
5510    3010            DCA Z   STRLES  / STORE IT IN AUTO INDEX
5511    5205            JMP     CONP3   / GO DO IT AGAIN
5512    4571   CASS80,  JMS I   PFLHON  / FLASH GO LAMP
5513    0740            0740
5514    1157   CASS81,  TAD Z   C50     / WAIT 5 SEC
5515    4456            JMS I   PWAIT
5516    4454            JMS I   PTASKSW / WAIT FOR INTERRUPT
5517    4455            JMS I   PGETIN  / GET INPUT
5520    1143            TAD Z   M7777   / WAS IT TIMER
5521    7640            SZA CLA
5522    5316            JMP     CASS81  / NOT TIMER FORGET IT
5523    4572            JMS I   PFLHOFF / YES, STOP FLASHING GO LAMP
5524    0740            0740
5525    4532            JMS I   PLON    / TURN ON GO LAMP
5526    0740            0740
5527    3773            DCA I   PRDBUSY / 0, READER BUSY FLAG
5530    4453            JMS I   PDISPAT / JUMP TO DISPAT
               /
               /        CLRBOT
               /                        ROUTINE CLEARS BOTEOT FLAG
               /
5531    0000   CLRBOT,  0000            / RETURN ADDR
5532    7200            CLA             / CLEAR AC
5533    1344            TAD     CLBOT   / LOAD CODE TO CLEAR BOT
5534    6457            6457
5535    1345            TAD     MOVE    / START MOVING TAPE
5536    6457            6457
5537    4776            JMS I   PWAIT1  / WAIT .6 SE
5540    1344            TAD Z   CLBOT   / TAKE AWAT BOT
5541    0135            AND Z   OFFBIT
5542    6457            6457
5543    5731            JMP I   CLRBOT  / RETURN
5544    6600   CLBOT,   6600            / CODE TO CLEAR BOT
5545    0200   MOVE,    0200            / CODE TO MOVE TAPE
5546    0000   IGCOUN,  0000            / BLOCK COUNT
5547    0000   RETCON,  0000            / RETRY COUNT
5550    5153   PSAVLES, SAVLES          / PTR TO LESSON NUM
5551    7775   CMIN3,   -3              / CONSTA -3
5552    0000   STOP,    0000            / CODE TO STOP TAPE
5553    3200   FSRCH,   3200            / CODE FOR FAST SEARCH
5554    4756   ZLESNUM, LESNUM          / PTR TO LESSON NUMBER
5555    5742   PFHFLG,  FHFLG           / PTR TO 1ST HALF FLAG
5556    4604   ZSTRLOP, STRLOP          / PTR TO START LOOP
5557    5333   PGAPCNT, GAPCNT          / PTR TO GAP COUNT
5560    5332   PFSRF,   FSRF            / PTR TO FAST SEARCH FLAG
5561    5326   PREADF,  READF           / PTR TO READ FLAG
5562    7000   CASS512, -1000           / -512 DEC
5563    5754   PINCOUN, INCOUN          / PTR TO CHAR COUNT
5564    5741   PBLKFLG, BLKFLG          / PTR TO CHK BLK FLAG
5565    5753   PCHKSUM, CHKSUM          / PTR TO CHKSUM
5566    5341   PREADOK, READOK          / PTR TO READ OK FLAG
5567    5751   PIGNORF, IGNORF          / PTR TO IGNORE FLAG
```

| | | | | | |
|---|---|---|---|---|---|
| 5570 | 5752 | PREAF1, | REAF1 | | / PTR TO 1ST READ FLAG |
| 5571 | 1600 | READ3, | 1600 | | / CODE TO READ |
| 5572 | 5111 | PCONP1, | CONP1 | | / PTR TO CONP1 |
| 5573 | 5141 | PRDBUSY, | RDBUSY | | / PTR TO READER BUSY FLAG |
| 5574 | 5531 | PCLRBOT, | CLRBOT | | / PTR TO CLRBOT ROUTINE |
| 5575 | 5345 | PREW, | REW | | / PTR TO REWIND ROUTINE |
| 5576 | 5757 | PWAIT1, | WAIT1 | | / PTR TO WAIT1 |
| 5577 | 0000 | SAVSTR, | 0000 | | / SAVE FOR FOR START ADDR |
| | | | *5600 | | |
| 5600 | 1341 | CASS20, | TAD | BLKFLG | / LOAD BLK CHECK FLAG |
| 5601 | 7640 | | SZA CLA | | / IS IT 0 |
| 5602 | 5255 | | JMP | CASS26 | / NO, GO PROCESS GOOD DATA |
| 5603 | 1356 | | TAD | M52FLG | / LOAD M52 FLAG |
| 5604 | 7640 | | SZA CLA | | / IS IT SET |
| 5605 | 5215 | | JMP | CASS29 | / YES, GO TO CASS29 |
| 5606 | 7001 | | IAC | | / NO, SET AC=1 |
| 5607 | 3356 | | DCA | M52FLG | / SET FLAG |
| 5610 | 1743 | | TAD I | PCASSIN | / LOAD INPUT WORD |
| 5611 | 0347 | | AND | CASSM2 | / 0 1ST 6 BITS |
| 5612 | 1345 | | TAD | MM52 | / ADD IN -52 |
| 5613 | 7650 | | SNA CLA | | / IS IT 0 |
| 5614 | 4502 | | JMS I | PRETURN | / YES, RETURN |
| 5615 | 1743 | CASS29, | TAD I | PCASSIN | / LOAD INPUT WORD |
| 5616 | 0347 | | AND | CASSM2 | / 0 1ST 6 BITS |
| 5617 | 1353 | | TAD | CHKSUM | / ADD IN CHECKSUM |
| 5620 | 3353 | | DCA | CHKSUM | / STORE IT |
| 5621 | 1342 | | TAD | FHFLG | / LOAD 1ST HALF FLAG |
| 5622 | 7640 | | SZA CLA | | / IS IT 0 |
| 5623 | 5231 | | JMP | CASS21 | / NO, MUST BE SECOND PART |
| 5624 | 1743 | | TAD I | PCASSIN | / YES, RELOAD INPUT |
| 5625 | 3344 | | DCA | FHBUF | / STORE IT IN FIRST HALF BUFFER |
| 5626 | 7001 | | IAC | | / SET AC=1 |
| 5627 | 3342 | | DCA | FHFLG | / SET FIRST HALF FLAG |
| 5630 | 4502 | | JMS I | PRETURN | / RETURN |
| 5631 | 1344 | CASS21, | TAD | FHBUF | / LOAD 1ST HALF BUFFER |
| 5632 | 7006 | | RTL | | / SHIFT LEFT 6 |
| 5633 | 7006 | | RTL | | |
| 5634 | 7006 | | RTL | | |
| 5635 | 0346 | | AND | CASSM1 | / 0 LAST 6 BITS |
| 5636 | 3344 | | DCA | FHBUF | / STORE IT |
| 5637 | 1743 | | TAD I | PCASSIN | / RELOAD 2ND PART |
| 5640 | 0347 | | AND | CASSM2 | / ZERO 1ST 6 BITS |
| 5641 | 1344 | | TAD | FHBUF | / ADD IN 1ST PART |
| 5642 | 7041 | | CIA | | / SET IT NEG |
| 5643 | 1750 | | TAD I | XLESNUM | / ADD IN LESSON NUMBER |
| 5644 | 7650 | | SNA CLA | | / IS AC=0 |
| 5645 | 5250 | | JMP | CASS22 | / YES, RIGHT BLOCK |
| 5646 | 7001 | | IAC | | / SET AC=1 |
| 5647 | 3351 | | DCA | IGNORF | / SET IGNORE FLAG |
| 5650 | 3342 | CASS22, | DCA | FHFLG | / ZERO 1ST HALF FLAG |
| 5651 | 7001 | | IAC | | / SET AC=1 |
| 5652 | 3341 | | DCA | BLKFLG | / SET BLKFLAG |
| 5653 | 3356 | | DCA | M52FLG | / 0 M52 FLAG |
| 5654 | 4502 | | JMS I | PRETURN | / RETURN |
| 5655 | 1351 | CASS26, | TAD | IGNORF | / LOAD IGNORE FLAG |
| 5656 | 7640 | | SZA CLA | | / IS IT SET |
| 5657 | 4502 | | JMS I | PRETURN | / YES, FORGET |
| 5660 | 1342 | | TAD | FHFLG | / LOAD 1ST HALF FLAG |
| 5661 | 7640 | | SZA CLA | | / IS IT SET |
| 5662 | 5271 | | JMP | CASS23 | / YES, GO PROCESS 2ND HALF |
| 5663 | 1743 | | TAD I | PCASSIN | / NO, RELOAD INPUT |
| 5664 | 0347 | | AND | CASSM2 | / ZER 1ST 6 BITS |
| 5665 | 3344 | | DCA | FHBUF | / STORE IT |
| 5666 | 7001 | | IAC | | / SET AC=1 |
| 5667 | 3342 | | DCA | FHFLG | / SET 1ST HALF FLAG |
| 5670 | 4502 | | JMS I | PRETURN | |
| 5671 | 3342 | CASS23, | DCA | FHFLG | / 0 1ST HALF FLAG |
| 5672 | 1344 | | TAD | FHBUF | / LOAD 1ST PAR OF WORD |
| 5673 | 7006 | | RTL | | / SHIFT LEFT 6 |
| 5674 | 7006 | | RTL | | |
| 5675 | 7006 | | RTL | | |
| 5676 | 0346 | | AND | CASSM1 | / 0 LAST 6 BITS |
| 5677 | 3344 | | DCA | FHBUF | / STORE IT |

```
5700  1743            TAD I   PCASSIN   / LOAD CURRENT INPUT
5701  0347            AND     CASSM2    / ZERO 1ST 6 BITS
5702  1344            TAD     FHBUF     / ADD IN 2ST HALF
5703  3344            DCA     FHBUF     / STORE IT
5704  1352            TAD     REAF1     / LOAD 1ST WORD FLAG
5705  7640            SZA CLA           / IS THIS 1ST TIME THROUGH
5706  5314            JMP     CASS24    / NO, GO STORE DATA
5707  7001            IAC               / YES, SET AC=1
5710  3352            DCA     REAF1     / SET FLAG
5711  1344            TAD     FHBUF     / LOAD 1ST WORD
5712  3355            DCA     SAWORD    / SAVE IT
5713  4502            JMS I   PRETURN   / RETURN
5714  1355   CASS24,  TAD     SAWORD    / RELOAD WORD
5715  0347            AND     CASSM2    / ZERO 1ST 6 BITS
5716  1353            TAD     CHKSUM    / ADD IN CHKSUM
5717  3353            DCA     CHKSUM    / STORE IT
5720  1355            TAD     SAWORD    / RELOAD IT
5721  7012            RTR               / SHIFT 6 RIGHT
5722  7012            RTR
5723  7012            RTR
5724  0347            AND     CASSM2    / ZERO 1ST 6 BITS
5725  1353            TAD     CHKSUM    / ADD IN CHKSUM
5726  3353            DCA     CHKSUM    / STORE IT
5727  7000            NOP               / INCR COUNT AT SOME LATER TIME
5730  5332            JMP     CASS25    / NOT 0 GO STORE IT
5731  4502            JMS I   PRETURN   / 0 FORGET IT
5732  6201   CASS25,  6201              / SET DF INST
5733  1355            TAD     SAWORD    / LOAD WORD
5734  3410            DCA I   STRLES    / STORE IT
5735  6201            6201              / REST DF=0
5736  1344            TAD     FHBUF     / LOAD CURRENT 1
5737  3355            DCA     SAWORD    / SAVE IT
5740  4502            JMS I   PRETURN   / RETURN
5741  0000   BLKFLG,  0000              / BLOCK CHECK FLAG
5742  0000   FHFLG,   0000              / 1ST HALF FLAG
5743  5320   PCASSIN, CASSIN            / PTR TO CASS INPUT
5744  0000   FHBUF,   0000              / 1ST HALF BUFFER
5745  7726   MM52,    -52               / CONSTANT -52
5746  7700   CASSM1,  7700              / MASK TO 0 LAST 6 BITS
5747  0077   CASSM2,  0077              / MASK TO 0 1ST 6 BITS
5750  4756   XLESNUM, LESNUM            / PTR TO LESSON NUMBER
5751  0000   IGNORF,  0000              / IGNORE FLAG
5752  0000   REAF1,   0000              / 1ST TIME READ FLAG
5753  0000   CHKSUM,  0000              / CHKSUM
5754  0000   INCOUN,  0000              / WORD COUNTER
5755  0000   SAWORD,  0000              / SAVE WORD
5756  0000   M52FLG,  0000              / M52FLAG
              /
              /        WAIT1
              /                          ROUTINE WAITS .3 SEC & RETURNS
              /
5757  0000   WAIT1,   000               / RETURN ADDR
5760  7200            CLA               / CLEAR AC
5761  1371            TAD     CONST     / LOAD NUMBER OF OUTER LOOPS
5762  3372            DCA     COUNT     / STORE IT
5763  2373            ISZ     COUNT1    / INNER LOOP
5764  5363            JMP     .-1
5765  2372            ISZ     COUNT     / OUTER LOOP
5766  5363            JMP     .-3
5767  7200            CLA               / CLEAR AC
5770  5757            JMP I   WAIT1     / RETUN
5771  7760   CONST,   -18
5772  0000   COUNT,   0000
5773  0000   COUNT1,  0000
              /
              /                          REMOTE CONTROL TABLES
              /
              /        *6000
              /
              /        RCT0
              /
6000  6100   RCT0,    RCT1              / POINTER TO RCT1
6001  0000            0                 / ACTIVE FLAG
6002  0000            0000              / REMOTE NUMBER MASK
```

| | | | | | |
|---|---|---|---|---|---|
| 6003 | 0000 | | 0000 | / | BACKSPACE COUNT FOR STEP |
| 6004 | 0401 | | 0401 | / | ADDR OF LAST CALL IN LESSON |
| 6005 | 0401 | | 0401 | / | ADDR OF NEXT INST. |
| 6006 | 0000 | | 0 | / | SAVE AC |
| 6007 | 0000 | | 0 | / | START KEY FLAG |
| 6010 | 0401 | | 0401 | / | ADDR OF BEGINNING OF LESSON |
| 6011 | 0401 | | 0401 | / | ADDR OF LAST STEP IN LESSON |
| 6012 | 0000 | | 0 | / | WAIT COUNT |
| 6013 | 6016 | | EOBP0 | / | PROCESS POINTER |
| 6014 | 6016 | | EOBP0 | / | STORE POINTER |
| 6015 | 6017 | | BOB0 | / | POINTER TO BEG. OF BUFFER |
| 6016 | 6035 | EOBP0, | ERR0 | / | POINTER TO END OF BUFFER |
| 6017 | 0000 | BOB0, | 0 | / | INPUT BUFFER 1 |
| 6020 | 0000 | | 0 | / | "       "      2 |
| 6021 | 0000 | | 0 | / | "       "      3 |
| 6022 | 0000 | | 0 | / | "       "      4 |
| 6023 | 0000 | | 0 | / | "       "      5 |
| 6024 | 0000 | | 0 | / | "       "      6 |
| 6025 | 0000 | | 0 | / | "       "      7 |
| 6026 | 0000 | | 0 | / | "       "      8 |
| 6027 | 0000 | | 0 | / | "       "      9 |
| 6030 | 0000 | | 0 | / | "       "     10 |
| 6031 | 0000 | | 0 | / | "       "     11 |
| 6032 | 0000 | | 0 | / | "       "     12 |
| 6033 | 0000 | | 0 | / | "       "     13 |
| 6034 | 0000 | | 0 | / | "       "     14 |
| 6035 | 0000 | ERR0, | 0 | / | ERROR COUNT |
| 6036 | 0000 | | 0 | / | RETURN ADDRESS FOR SYSTEM ROUTINE |
| 6037 | 0000 | | 0 | / | PARM 1 |
| 6040 | 0000 | | 0 | / |      2 |
| 6041 | 0000 | | 0 | / |      3 |
| 6042 | 0000 | | 0 | / |      4 |
| 6043 | 0000 | | 0 | / |      5 |
| 6044 | 0000 | | 0 | / |      6 |
| 6045 | 0000 | | 0 | / |      7 |
| 6046 | 0000 | | 0 | / |      8 |
| 6047 | 0000 | | 0 | / |      9 |
| 6050 | 0000 | | 0 | / |     10 |
| 6051 | 0000 | | 0 | / |     11 |
| 6052 | 0000 | | 0 | / | CLOCK FLAG |
| 6053 | 0000 | | 0 | / | AUDIO STOP FLAG |
| 6054 | 0000 | | 0 | / | RETURN ADDR FOR LESSONS |
| 6055 | 0000 | | 0 | / | AUDIO RESPONSE FLAG |
| 6056 | 0000 | | 0 | / | REPEAT LESSON FLAG |
| 6057 | 0000 | | 0 | / | REPEAT CALL FLAG |
| 6060 | 0000 | | 0 | / | REPEAT STEP FLAG |
| 6061 | 4000 | | 4000 | / | ADD PATTERN FOR REMOTE 0 |
| 6062 | 3777 | | 3777 | / | DELETE PATTERN FOR REMOTE 0 |
| 6063 | 0000 | | 0000 | / | PARTITION NUMBER OF LAST LESSON |
| 6064 | 0000 | | 0000 | / | RETURN ADDR FOR BANK1 |
| 6065 | 0000 | | 0000 | / | DF FOR TASKSW& DISPATC |
| 6066 | 0000 | | 0000 | / | DF FOR SAVE & RESTOR ROUTINE |
| 6067 | 0000 | | 0000 | / | DF FOR CURRENT LESSON |
| 6070 | 0000 | | 0000 | / | RETURN ADDR FOR SAVE4 |
| 6071 | 0000 | | 0000 | / | SAVE DF FOR SAVE4 |

```
                        *6100
                /
                /                RCT1
                /
```

| | | | | | |
|---|---|---|---|---|---|
| 6100 | 6200 | RCT1, | RCT2 | / | POINTER TO RCT2 |
| 6101 | 0000 | | 0 | / | ACTIVE FLAG |
| 6102 | 1000 | | 1000 | / | REMOTE NUMBER MASK |
| 6103 | 0000 | | 0 | / | BACKSPACE COUNT FOR STEP |
| 6104 | 0401 | | 0401 | / | ADDR OF LAST CALL IN LESSON |
| 6105 | 0401 | | 0401 | / | ADDR OF NEXT INST |
| 6106 | 0000 | | 0 | / | SAVE AC |
| 6107 | 0000 | | 0 | / | START KEY FLAG |
| 6110 | 0401 | | 0401 | / | ADDR OF BEG OF LESSON |
| 6111 | 0401 | | 0401 | / | ADDR OF LAST STEP IN LESSON |
| 6112 | 0000 | | 0 | / | WAIT COUNT |
| 6113 | 6116 | | EOBP1 | / | PROCESS POINTER |
| 6114 | 6116 | | EOBP1 | / | STORE POINTER |
| 6115 | 6117 | | BOB1 | / | POINTER TO BEG. OF BUFFER |
| 6116 | 6135 | EOBP1, | ERR1 | / | POINTER TO END OF BUFFER |
| 6117 | 0000 | BOB1, | 0 | / | INPUT BUFFER 1 |

```
6120   0000                0         /    "      "    2
6121   0000                0         /    "      "    3
6122   0000                0         /    "      "    4
6123   0000                0         /    "      "    5
6124   0000                0         /    "      "    6
6125   0000                0         /    "      "    7
6126   0000                0         /    "      "    8
6127   0000                0         /    "      "    9
6130   0000                0         /    "      "   10
6131   0000                0         /    "      "   11
6132   0000                0         /    "      "   12
6133   0000                0         /    "      "   13
6134   0000                0         /    "      "   14
6135   0000   ERR1,        0         /  ERROR COUNT
6136   0000                0         /  RETURN ADDRESS FOR SYSTEM ROUTINE
6137   0000                0         /  PARM 1
6140   0000                0         /       2
6141   0000                0         /       3
6142   0000                0         /       4
6143   0000                0         /       5
6144   0000                0         /       6
6145   0000                0         /       7
6146   0000                0         /       8
6147   0000                0         /       9
6150   0000                0         /      10
6151   0000                0         /      11
6152   0000                0         /  CLOCK FLAG
6153   0000                0         /  AUDIO STOP FLAG
6154   0000                0         /  RETURN ADDR FOR LESSONS
6155   0000                0         /  AUDIO RESPONSE FLAG
6156   0000                0         /  REPEAT LESSON FLAG
6157   0000                0         /  REPEAT CALL FLAG
6160   0000                0         /  REPEAT STEP FLAG
6161   2000             2000         /  ADD PATTERN FOR REMOTE 1
6162   5777             5777         /  DELETE PATTERN FOR REMOTE 1
6163   0000             0000         /  PARTITION OF LAST LESSON
6164   0000             0000         /  RETURN ADDR FOR BANK1
6165   0000             0000         /  DF FOR TASKSW & DISPAT
6166   0000             0000         /  DF FOR SAVE & RESTOR ROUTINE
6167   0000             0000         /  DF OF CURRENT LESSON
6170   0000             0000         /  RETURN ADDR FOR SAVE4
6171   0000             0000         /  SAVE DF FOR SAVE4
                        *6200
       /
       /
       /                      RCT2
6200   6300   RCT2,   RCT3              /  POINTER TO RCT3
6201   0000           0                 /  ACTIVE FLAG
6202   2000           2000              /  REMOTE NUMBER MASK
6203   0000           0                 /  BACKSPACE COUNT FOR STEP
6204   0401           0401              /  ADDR OF LAST CALL IN LESSON
6205   0401           0401              /  ADDR OF NEXT INST
6206   0000           0                 /  SAVE AC
6207   0000           0                 /  START KEY FLAG
6210   0401           0401              /  ADDR OF BEG OF LESSON
6211   0401           0401              /  ADDR OF LAST STEP IN LESSON
6212   0000           0                 /  WAIT COUNT
6213   6216           EOBP2             /  PROCESS PTR
6214   6216           EOBP2             /  STORE POINTER
6215   6217           BOB2              /  POINTER TO BEG. OF BUFFER
6216   6235   EOBP2,  ERR2              /  POINTER TO END OF BUFFER
6217   0000   BOB2,   0                 /  INPUT BUFFER 1
6220   0000           0                 /    "      "    2
6221   0000           0                 /    "      "    3
6222   0000           0                 /    "      "    4
6223   0000           0                 /    "      "    5
6224   0000           0                 /    "      "    6
6225   0000           0                 /    "      "    7
6226   0000           0                 /    "      "    8
6227   0000           0                 /    "      "    9
6230   0000           0                 /    "      "   10
6231   0000           0                 /    "      "   11
6232   0000           0                 /    "      "   12
6233   0000           0                 /    "      "   13
6234   0000           0                 /    "      "   14
```

```
6235    0000    ERR2,              0       / ERROR COUNT
6236    0000                       0       / RETURN ADDRESS FOR SYSTEM ROUTINE
6237    0000                       0       / PARM 1
6240    0000                       0       /    2
6241    0000                       0       /    3
6242    0000                       0       /    4
6243    0000                       0       /    5
6244    0000                       0       /    6
6245    0000                       0       /    7
6246    0000                       0       /    8
6247    0000                       0       /    9
6250    0000                       0       /   10
6251    0000                       0       /   11
6252    0000                       0       / CLOCK FLAG
6253    0000                       0       / AUDIO STOP FLAG
6254    0000                       0       / RETURN ADDR FOR LESSONS
6255    0000                       0       / AUDIO RESPONSE FLAG
6256    0000                       0       / REPEAT LESSON FLAG
6257    0000                       0       / REPEAT CALL FLAG
6260    0000                       0       / REPEAT STEP FLAG
6261    1000                    1000       / ADD PATTT FOR REMOTE 2
6262    6777                    6777       / DELETE PATTERN REMOTE 2
6263    0000                    0000       / PARTITION OF LAST LESSON
6264    0000                    0000       / RETURN ADDR FOR BANK 1
6265    0000                    0000       / DF FOR TASKSW & DISPAT
6266    0000                    0000       / DF FOR SAV & REST
6267    0000                    0000       / DF FOR CURRENT LESSON
6270    0000                    0000       / RETURN ADDR FOR SAVE4
6271    0000                    0000       / SAVE DF FOR SAVE4
                                *6300
        /
        /                      RCT3
        /
6300    6400    RCT3,          RCT4        / POINTER TO RCT4
6301    0000                      0        / ACTIVE FLAG
6302    3000                   3000        / REMOTE NUMBER MASK
6303    0000                      0        / BACKSPACE COUNT FOR STEP
6304    0401                   0401        / ADDR OF LAST CALL IN LESSON
6305    0401                   0401        / ADDR OF NEXT INST
6306    0000                      0        / SAVE AC
6307    0000                      0        / START KEY FLAG
6310    0401                   0401        / ADDR OF BEG OF LESSON
6311    0401                   0401        / ADDR OF LAST STEP IN LESSON
6312    0000                      0        / WAIT COUNT
6313    6316                   EOBP3       / PROCESS PTR
6314    6316                   EOBP3       / STORE POINTER
6315    6317                   BOB3        / POINTER TO BEG. OF BUFFER
6316    6335    EOBP3,         ERR3        / POINTER TO END OF BUFFER
6317    0000    BOB3,             0        / INPUT BUFFER 1
6320    0000                      0        /    "       "   2
6321    0000                      0        /    "       "   3
6322    0000                      0        /    "       "   4
6323    0000                      0        /    "       "   5
6324    0000                      0        /    "       "   6
6325    0000                      0        /    "       "   7
6326    0000                      0        /    "       "   8
6327    0000                      0        /    "       "   9
6330    0000                      0        /    "       "  10
6331    0000                      0        /    "       "  11
6332    0000                      0        /    "       "  12
6333    0000                      0        /    "       "  13
6334    0000                      0        /    "       "  14
6335    0000    ERR3,             0        / ERROR COUNT
6336    0000                      0        / RETURN ADDRESS FOR SYSTEM ROUTINE
6337    0000                      0        / PARM 1
6340    0000                      0        /    2
6341    0000                      0        /    3
6342    0000                      0        /    4
6343    0000                      0        /    5
6344    0000                      0        /    6
6345    0000                      0        /    7
6346    0000                      0        /    8
6347    0000                      0        /    9
6350    0000                      0        /   10
6351    0000                      0        /   11
```

```
6352   0000            0        /  CLOCK FLAG
6353   0000            0        /  AUDIO STOP FLAG
6354   0000            0        /  RETURN ADDR FOR LESSONS
6355   0000            0        /  AUDIO RESPONSE FLAG
6356   0000            0        /  REPEAT LESSON FLAG
6357   0000            0        /  REPEAT CALL FLAG
6360   0000            0        /  REPEAT STEP FLAG
6361   0400         0400        /  ADD PATT FOR REMOTE 3
6362   7377         7377        /  DEL PATT FOR REMOTE 3
6363   0000         0000        /  PARTITION OF LAST LESSON
6364   0000         0000        /  RETURN ADDR FOR BANK1
6365   0000         0000        /  DF FOR TASKSW & DISPAT
6366   0000         0000        /  DF FOR SAVE & RESTOR ROUTINE
6367   0000         0000        /  DF FOR CURRENT LESSON
6370   0000         0000        /  RETURN ADDR FOR SAVE4
6371   0000         0000        /  SAVE DF FOR SAVE4
                    *6400
              /
              /                    RCT4
              /
6400   6500   RCT4,   RCT5        /  PTR TO RCT5
6401   0000            0          /  ACTIVE FLAG
6402   4000         4000          /  REMOTE NUM MASK
6403   0000            0          /  BACKSPACE COUNT FOR STEP
6404   0401         0401          /  ADDR OF LAST CALL IN LESSON
6405   0401         0401          /  ADDR OF NEXT INST
6406   0000            0          /  SAVE AC
6407   0000         0000          /  START KEY FLAG
6410   0401         0401          /  ADDR OF BEG OF LESSON
6411   0401         0401          /  ADDR OF LAST STEP IN LESSON
6412   0000            0          /  WAIT COUNT
6413   6416         EOBP4         /  PROCESS PTR
6414   6416         EOBP4         /  STORE PTR
6415   6417         BOB4          /  POINTER TO BEG. OF BUFFER
6416   6435  EOBP4, ERR4          /  POINTER TO END OF BUFFER
6417   0000  BOB4,    0           /  INPUT BUFFER 1
6420   0000            0          /    "       "   2
6421   0000            0          /    "       "   3
6422   0000            0          /    "       "   4
6423   0000            0          /    "       "   5
6424   0000            0          /    "       "   6
6425   0000            0          /    "       "   7
6426   0000            0          /    "       "   8
6427   0000            0          /    "       "   9
6430   0000            0          /    "       "   10
6431   0000            0          /    "       "   11
6432   0000            0          /    "       "   12
6433   0000            0          /    "       "   13
6434   0000            0          /    "       "   14
6435   0000  ERR4,    0           /  ERROR COUNT
6436   0000            0          /  RETURN ADDRESS FOR SYSTEM ROUTINES
6437   0000            0          /  PARM 1
6440   0000            0          /       2
6441   0000            0          /       3
6442   0000            0          /       4
6443   0000            0          /       5
6444   0000            0          /       6
6445   0000            0          /       7
6446   0000            0          /       8
6447   0000            0          /       9
6450   0000            0          /       10
6451   0000            0          /       11
6452   0000            0          /  CLOCK FLAG
6453   0000            0          /  AUDIO STOP FLAG
6454   0000            0          /  RETURN ADDR FOR LESSONS
6455   0000            0          /  AUDIO RESPONSE FLAG
6456   0000            0          /  REPEAT LESSON FLAG
6457   0000            0          /  REPEAT CALL FLAG
6460   0000            0          /  REPEAT STEP FLAG
6461   0200         0200          /  ADD PATT FOR REM 4
6462   7577         7577          /  DEL PATT FOR REM 4
6463   0000         0000          /  PARTITION OF LAST LESSON
6464   0000         0000          /  RETURN ADDR FOR BANK 1
6465   0000         0000          /  DF FOR TASKSW & DISPAT
6466   0000          000          /  DF FOR SAVE & RESTOR ROUTINE
```

```
6467   0000              0000        /  DF FOR CURRENT LESSON
6470   0000              0000        /  RETURN ADDR FOR SAVE4 ROUTINE
6471   0000              0000        /  SAVE DF FOR RETURN ADDR
                        *6500
                  /
                  /                  RCT5
                  /
6500   6600   RCT5,      RCT6        /  PTR TO RCT6
6501   0000              0           /  ACTIVE FLAG
6502   5000              5000        /  REMOTE NUMBER MASK
6503   0000              0           /  BACKSPACE COUNT FOR STEP
6504   0401              0401        /  ADDR OF LAST CALL IN LESSON
6505   0401              0401        /  ADDR OF NEXT INST
6506   0000              0           /  SAVE AC
6507   0000              0           /  START KEY FLAG
6510   0401              0401        /  ADDR OF BEG OF LESSON
6511   0401              0401        /  ADDR OF LAST STEP IN LESSON
6512   0000              0           /  WAIT COUNT
6513   6516              EOBP5       /  PROCESS PTR
6514   6516              EOBP5       /  STORE PTR
6515   6517              BOB5        /  POINTER TO BEG. OF BUFFER
6516   6535   EOBP5,     ERR5        /  POINTER TO END OF BUFFER
6517   0000   BOB5,      0           /  INPUT BUFFER 1
6520   0000              0           /      "       "   2
6521   0000              0           /      "       "   3
6522   0000              0           /      "       "   4
6523   0000              0           /      "       "   5
6524   0000              0           /      "       "   6
6525   0000              0           /      "       "   7
6526   0000              0           /      "       "   8
6527   0000              0           /      "       "   9
6530   0000              0           /      "       "   10
6531   0000              0           /      "       "   11
6532   0000              0           /      "       "   12
6533   0000              0           /      "       "   13
6534   0000              0           /      "       "   14
6535   0000   ERR5,      0           /  ERROR COUNT
6536   0000              0           /  RETURN ADDRESS FOR SYSTEM ROUTINE
6537   0000              0           /  PARM 1
6540   0000              0           /       2
6541   0000              0           /       3
6542   0000              0           /       4
6543   0000              0           /       5
6544   0000              0           /       6
6545   0000              0           /       7
6546   0000              0           /       8
6547   0000              0           /       9
6550   0000              0           /       10
6551   0000              0           /       11
6552   0000              0           /  CLOCK FLAG
6553   0000              0           /  AUDIO STOP FLAG
6554   0000              0           /  RETURN ADDR FOR LESSONS
6555   0000              0           /  AUDIO RESPONSE FLAG
6556   0000              0           /  REPEAT LESSON FLAG
6557   0000              0           /  REPEAT CALL FLAG
6560   0000              0           /  REPEAT STEP FLAG
6561   0100              0100        /  ADD PATT FOR REM 5
6562   7677              7677        /  DEL PATT REM 5
6563   0000              0000        /  PARTITION OF LAST LESSON
6564   0000              0000        /  RETURN ADDR FOR BANK1
6565   0000              0000        /  DF FOR TASKSW & DISPAT
6566   0000              0000        /  DF FOR SAVE & RESTOR ROUTINE
6567   0000              0000        /  DF FOR CURRENT LESSON
6570   0000              0000        /  SAVE 4 RETURN ADDR
6571   0000              0000        /  SAVE DF FOR SAVE4
                        *6600
                  /
                  /                  RCT 6
                  /
6600   6700   RCT6,      RCT7        /  PTR TO RCT7
6601   0000              0           /  ACTIVE FLAG
6602   6000              6000        /  REMOTE NUMBER MASK
6603   0000              0           /  BACKSPACE COUNT FOR STEP
6604   0401              0401        /  ADDR OF LAST CALL IN LESSON
```

```
6605    0401              0401          / ADDR OF NEXT INST
6606    0000                 0          / SAVE AC
6607    0000                 0          / START KEY FLAG
6610    0401              0401          / ADDR OF BEG OF LESSON
6611    0401              0401          / ADDR OF LAST STEP IN LESSON
6612    0000                 0          / WAIT COUNT
6613    6616             EOBP6          / PROCESS PTR
6614    6616             EOBP6          / STORE PTR
6615    6617              BOB6          / POINTER TO BEG. OF BUFFER
6616    6635    EOBP6,    ERR6          / POINTER TO END OF BUFFER
6617    0000    BOB6,        0          / INPUT BUFFER 1
6620    0000                 0          /    "      "   2
6621    0000                 0          /    "      "   3
6622    0000                 0          /    "      "   4
6623    0000                 0          /    "      "   5
6624    0000                 0          /    "      "   6
6625    0000                 0          /    "      "   7
6626    0000                 0          /    "      "   8
6627    0000                 0          /    "      "   9
6630    0000                 0          /    "      "  10
6631    0000                 0          /    "      "  11
6632    0000                 0          /    "      "  12
6633    0000                 0          /    "      "  13
6634    0000                 0          /    "      "  14
6635    0000    ERR6,        0          / ERROR COUNT
6636    0000                 0          / RETURN ADDRESS FOR SYSTEM ROUTINE
6637    0000                 0          / PARM 1
6640    0000                 0          /      2
6641    0000                 0          /      3
6642    0000                 0          /      4
6643    0000                 0          /      5
6644    0000                 0          /      6
6645    0000                 0          /      7
6646    0000                 0          /      8
6647    0000                 0          /      9
6650    0000                 0          /     10
6651    0000                 0          /     11
6652    0000                 0          / CLOCK FLAG
6653    0000                 0          / AUDIO STOP FLAG
6654    0000                 0          / RETURN ADDR FOR LESSONS
6655    0000                 0          / AUDIO RESPONSE FLAG
6656    0000                 0          / REPEAT LESSON FLAG
6657    0000                 0          / REPEAT CALL FLAG
6660    0000                 0          / REPEAT STEP FLAG
6661    0040              0040          / ADD PATT REMOTE 6
6662    7737              7737          / DEL PATT REM 6
6663    0000              0000          / PARTITION OF LAST LESSON
6664    0000              0000          / RETURN ADDR FOR BANK1
6665    0000              0000          / DF FOR TASKSW & DISPAT
6666    0000              0000          / DF FOR SAVE & RESTOR ROUTINE
6667    0000              0000          / DF FOR CURRENT LESSON
6670    0000              0000          / RETURN ADDR FOR SAVE4
6671    0000              0000          / SAVE DF FOR SAVE4
                                *6700
                        /
                        /                    RCT7
                        /
6700    6000    RCT7,     RCT0          / PTR TO RCT0
6701    0000                 0          / ACTIVE FLAG
6702    7000              7000          / REMOTE NUMBER MASK
6703    0000                 0          / BACKSPACE COUNT FOR STEP
6704    0401              0401          / ADDR OF LAST CALL IN LESSON
6705    0401              0401          / ADDR OF NEXT INST
6706    0000                 0          / SAVE AC
6707    0000              0000          / START KEY FLAG
6710    0401              0401          / ADDR OF BEG OF LESSON
6711    0401              0401          / ADDR OF LAST STEP IN LESSON
6712    0000                 0          / WAIT COUNT
6713    6716             EOBP7          / PROCESS PTR
6714    6716             EOBP7          / STORE PTR
6715    6717              BOB7          / POINTER TO BEG. OF BUFFER
6716    6735    EOBP7,    ERR7          / POINTER TO END OF BUFFER
6717    0000    BOB7,        0          / INPUT BUFFER 1
6720    0000                 0          /    "      "   2
```

```
6721    0000                     0          /    "       "     3
6722    0000                     0          /    "       "     4
6723    0000                     0          /    "       "     5
6724    0000                     0          /    "       "     6
6725    0000                     0          /    "       "     7
6726    0000                     0          /    "       "     8
6727    0000                     0          /    "       "     9
6730    0000                     0          /    "       "     10
6731    0000                     0          /    "       "     11
6732    0000                     0          /    "       "     12
6733    0000                     0          /    "       "     13
6734    0000                     0          /    "       "     14
6735    0000    ERR7,            0          /  ERROR COUNT
6736    0000                     0          /  RETURN ADDRESS FOR SYSTEM ROUTINE
6737    0000                     0          /  PARM 1
6740    0000                     0          /       2
6741    0000                     0          /       3
6742    0000                     0          /       4
6743    0000                     0          /       5
6744    0000                     0          /       6
6745    0000                     0          /       7
6746    0000                     0          /       8
6747    0000                     0          /       9
6750    0000                     0          /       10
6751    0000                     0          /       11
6752    0000                     0          /  CLOCK FLAG
6753    0000                     0          /  AUDIO STOP FLAG
6754    0000                     0          /  RETURN ADDR FOR LESSON
6755    0000                     0          /  AUDIO RESPONSE FLAG
6756    0000                     0          /  REPEAT LESSON FLAG
6757    0000                     0          /  REPEAT CALL FLAG
6760    0000                     0          /  REPEAT STEP FLAG
6761    0020                  0020          /  ADD PATT REMOTE 7
6762    7757                  7757          /  DEL PATT REM 7
6763    0000                  0000          /  PARTITION OF LAST LESSON
6764    0000                  0000          /  RETURN ADDR FOR BANK1
6765    0000                  0000          /  DF FOR TASKSW & DISPAT
6766    0000                  0000          /  DF FOR SAVE & RESTOR ROUTINE
6767    0000                  0000          /  DF FOR CURRENT LESSON
6770    0000                  0000          /  RETURN ADDR FOR SAVE 4
6771    0000                  0000          /  SAVE DF FOR SAVE4
        *4400
INCORE, 0013          /  LESSON 13
        4600          /  ADDR OF LESSON FOR TEST
        0000
        0000
        *4600                    /  START ADDR FOR TEST

PAUSE
/
/       L013CA
/
        JMS I   PUPCALL   /  GO UPDATE CALL
        JMS I   PMCLRGO   /  MASTER CLEAR & GO
        JMS I   PUPSTEP   /  GO UPDATE STEP
        JMS I   PSAUDIO   /  PLAY AUDIO
        JMS I   PLON      /  AREA CODE 305 WHITE
        0600
        JMS I   PLON      /  HOTEL 1+ WHITE
        0624
        JMS I   PLON      /  KP GST WHITE
        0627
        JMS I   PLON      /  STATION PAID GREEN
        0647
        JMS I   PLON      /  RELEASE FWD RED
        0646
        JMS I   PLON      /  T&C WHITE
        0644
        JMS I   PLON      /  LOOP #2 CLD WHITE
        0732
        JMS I   PLON      /  LOOP 2 ACS WHITE
        0714
        JMS I   PLON      /  TIME ST RED
        0675
```

```
JMS I   PWLOFF      /   RELEASE FWD OFF
0646
JMS I   PUPSTEP     /   GO UPDATE STEP
JMS I   PARKEY      /   AUDIO, KEY, RESP
-0102               /   KP GST KEY
JMS I   PWLON       /   KP RED ON
0703
JMS I   PWLOFF      /   KP RED OFF
0703
JMS I   PLON        /   KP GREEN ON
0702
JMS I   PWVRSP      /   WAIT FOR VERBAL RESP
JMS I   PWAST       /   WAIT FOR AUDIO AUDIO TO STOP
TAD Z   C20         /   2 SEC WAIT
JMS I   PDELAY
JMS I   PUPSTEP     /   UP DATE STEP
JMS I   PZASTPF     /   ZERO AUDIO STOP FLAG
TAD Z   PLAY        /   PLAY AUDIO
JMS I   POUT
JMS I   PKEYPUL     /   KEYPULSE
7                   /   BIN 7
-12                 /   0
-12                 /   0
-2                  /   2
-6                  /   -6
JMS I   PWLOFF      /   KP GREEN OFF
0702
JMS I   PDOFF       /   TURN DISPLAY OFF
JMS I   PLOFF       /   KP GST OFF
0627
JMS I   PWAST       /   WAIT FOR AUDIO TO STOP
JMS I   PRKEY       /   VERB & KEY
-0050               /   TIME ST KEY
JMS I   PWLOFF      /   TIME ST RED OFF
0675
JMS I   PLON        /   TIME ST GREEN ON
0674
JMS I   PWVRSP      /   WAIT FOR VERBAL RESP
JMS I   PUPSTEP     /   GO UPDATE STEP
JMS I   PSAKEY      /   AUDIO & KEY
-0052
JMS I   PINCOFF     /   TURN OFF ALL LAMPS
JMS I   PWAST       /   WAIT FOR AUDIO TO STOP
/
/
/   L013CB
/
JMS I   PUPCALL /   GO UPDATE CALL
JMS I   PMCLRGO /   MASTER CLEAR & GO
JMS I   PUPSTEP /   GO UPDATE STE
JMS I   PSAUDIO /   PLAY AUDIO
JMS I   PLON    /   AREA CODE 305 WHITE
0600
JMS I   PLON    /   HOTEL 1+ WHITE
0624
JMS I   PLON    /   KP GST WHITE
0627
JMS I   PLON    /   STATION PAID GREEN
0647
JMS I   PLON    /   RELEASE FWD RED
0646
JMS I   PLON    /   T&C WHITE
0644
JMS I   PLON    /   LOP #3 CLD WHITE
0733
JMS I   PLON    /   LOOP 3 ACS WHITE
0715
JMS I   PLON    /   TIME ST RED
0675
JMS I   PWLOFF  /   RELEASE FWD OFF
0646
JMS I   PUPSTEP /   GO UPDATE STEP
JMS I   PARKEY  /   AUDIO, KEY, RESP
-0102           /   KP GST KEY
```

```
JMS I    PWLON    / KP RED ON
0703
JMS I    PWLOFF   / KP RED OFF
0703
JMS I    PLON     / KP GREEN ON
0702
JMS I    PWVRSP   / WAIT FOR VERBAL RESP
JMS I    PWAST    / WAIT FOR AUDIO AUDIO TO STOP
TAD Z    C20      / 2 SEC WAIT
JMS I    PDELAY
JMS I    PUPSTEP  / UP DATE STEP
JMS I    PZASTPF  / ZERO AUDIO STOP FLAG
TAD Z    PLAY     / PLAY AUDIO
JMS I    POUT
JMS I    PKEYPUL  / KEYPULSE
7                 / BIN 7
-12               / 0
-3                / 3
-11               / 9
-2                / 2
JMS I    PWLOFF   / KP GREEN OFF
0702
JMS I    PDOFF    / TURN DISPLAY OFF
JMS I    PLOFF    / KP GST OFF
0627
JMS I    PWAST    / WAIT FOR AUDIO TO STOP
JMS I    PRKEY    / VERB & KEY
-0050             / TIME ST KEY
JMS I    PWLOFF   / TIME ST RED OFF
0675
JMS I    PLON     / TIME ST GREEN ON
0674
JMS I    PWVRSP   / WAIT FOR VERBAL RESP
JMS I    PUPSTEP  / GO UPDATE STEP
JMS I    PSAKEY   / AUDIO & KEY
-0052
JMS I    PINCOFF  / TURN OFF ALL LAMPS
JMS I    PWAST    / WAIT FOR AUDIO TO STOP

/
/
/  L013CC
/
JMS I    PUPCALL  / GO UPDATE CALL
JMS I    PMCLRGO  / MASTER CLEAR & GO
JMS I    PUPSTEP  / GO UPDATE STEP
JMS I    PSAUDIO  / PLAY AUDIO
JMS I    PLON     / AREA CODE 305 WHITE
0600
JMS I    PLON     / HOTEL 1+ WHITE
0624
JMS I    PLON     / KP GST WHITE
0627
JMS I    PLON     / STATION PAID GREEN
0647
JMS I    PLON     / RELEASE FWD RED
0646
JMS I    PLON     / T&C WHITE
0644
JMS I    PLON     / LOOP #4 CLD WHITE
0734
JMS I    PLON     / LOOP 4 ACS WHITE
0716
JMS I    PLON     / TIME ST RED
0675
JMS I    PWLOFF   / RELEASE FWD OFF
0646
JMS I    PUPSTEP  / GO UPDATE STEP
JMS I    PARKEY   / AUDIO, KEY, RESP
-0102             / KP GST KEY
JMS I    PWLON    / KP RED ON
0703
JMS I    PWLOFF   / KP RED OFF
0703
JMS I    PLON     / KP GREEN ON
0702
```

```
        JMS I   PWVRSP   / WAIT FOR VERBAL RESP
        JMS I   PWAST    / WAIT FOR AUDIO AUDIO TO STOP
        TAD Z   C20      / 2 SEC WAIT
        JMS I   PDELAY
        JMS I   PUPSTEP  / UPDATE STEP
        JMS I   PZASTPF  / ZERO AUDIO STOP FLAG
        TAD Z   PLAY     / PLAY AUDIO
        JMS I   POUT
        JMS I   PKEYPUL  / KEYPULSE
        7                / BIN 7
        -1               / 1
        -10              / 8
        -4               / 4
        -7               / 7
        JMS I   PWLOFF   / TURN KP GREEN OFF
        0702
        JMS I   PDOFF    / TURN THE DISPLAY OFF
        JMS I   PLOFF    / KP GST OFF
        0627
        JMS I   PWAST    / WAIT FOR AUDIO TO STOP
        JMS I   PRKEY    / VERB & KEY
        -0050            / TIME ST KEY
        JMS I   PWLOFF   / TIME ST RED OFF
        0675
        JMS I   PLON     / TIME ST GREEN ON
        0674
        JMS I   PWVRSP   / WAIT FOR VERBAL RESP
        JMS I   PUPSTEP  / GO UPDATE STEP
        JMS I   PSAKEY   / AUDIO & KEY
        -0052
        JMS I   PINCOFF  / TURN OFF ALL LAMPS
        JMS I   PWAST    / WAIT FOR AUDIO TO STOP

/
/
/       L013CD
/
        JMS I   PUPCALL  / GO UPDATE CALL
        JMS I   PMCLRGO  / MASTER CLEAR & GO
        JMS I   PUPSTEP  / GO UPDATE STEP
        JMS I   PSAUDIO  / PLAY AUDIO
        JMS I   PLON     / AREA CODE 305 WHITE
        0600
        JMS I   PLON     / HOTEL 1+ WHITE
        0624
        JMS I   PLON     / KP GST WHITE
        0627
        JMS I   PLON     / STATION PAID GREEN
        0647
        JMS I   PLON     / RELEASE FWD RED
        0646
        JMS I   PLON     / T&C WHITE
        0644
        JMS I   PLON     / LOOP #1 CLD WHITE
        0731
        JMS I   PLON     / LOOP 1 ACS WHITE
        0713
        JMS I   PLON     / TIME ST RED
        0675
        JMS I   PWLOFF   / RELEASE FWD OFF
        0646
        JMS I   PUPSTEP  / GO UPDATE STEP
        JMS I   PARKEY   / AUDIO, KEY, RESP
        -0102            / KP GST KEY
        JMS I   PWLON    / KP RED ON
        0703
        JMS I   PWLOFF   / KP RED OFF
        0703
        JMS I   PLON     / KP GREEN ON
        0702
        JMS I   PWVRSP   / WAIT FOR VERBAL RESP
        JMS I   PWAST    / WAIT FOR AUDIO AUDIO TO STOP
        TAD Z   C20      / 2 SEC WAIT
        JMS I   PDELAY
        JMS I   PUPSTEP  / UP DATE STEP
        JMS I   PZASTPF  / ZERO AUDIO STOP FLAG
```

```
        TAD Z   PLAY     / PLAY AUDIO
        JMS I   POUT
        JMS I   PKEYPUL  / KEYPULSE
        7                / BIN 7
        -12              / 0
        -12              / 0
        -4               / 4
        -7               / 7
        JMS I   PWLOFF   / KP GREEN OFF
        0702
        JMS I   PDOFF    / TURN DISPLAY OFF
        JMS I   PLOFF    / KP GST OFF
        0627
        JMS I   PWAST    / WAIT FOR AUDIO TO STOP
        JMS I   PRKEY    / VERB & KEY
        -0050            / TIME ST KEY
        JMS I   PWLOFF   / TIME ST RED OFF
        0675
        JMS I   PLON     / TIME ST GREEN ON
        0674
        JMS I   PWVRSP   / WAIT FOR VERBAL RESP
        JMS I   PUPSTEP  / GO UPDATE STEP
        JMS I   PSAKEY   / AUDIO & KEY
        -0052
        JMS I   PINCOFF  / TURN OFF ALL LAMPS
        JMS I   PWAST    / WAIT FOR AUDIO TO STOP
/
/
/       L013CE
/
        JMS I   PUPCALL  / GO UPDATE CALL
        JMS I   PMCLRGO  / MASTER CLEAR & GO
        JMS I   PUPSTEP  / GO UPDATE STE
        JMS I   PSAUDIO  / PLAY AUDIO
        JMS I   PLON     / AREA CODE 305 WHITE
        0600
        JMS I   PLON     / HOTEL 1+ WHITE
        0624
        JMS I   PLON     / KP GST WHITE
        0627
        JMS I   PLON     / STATION PAID GREEN
        0647
        JMS I   PLON     / RELEASE FWD RED
        0646
        JMS I   PLON     / T&C WHITE
        0644
        JMS I   PLON     / LOOP 2 ACS
        0732
        JMS I   PLON     / LOOP 2 ACS WHITE
        0714
        JMS I   PLON     / TIME ST RED
        0675
        JMS I   PWLOFF   / RELEASE FWD OFF
        0646
        JMS I   PUPSTEP  / GO UPDATE STEP
        JMS I   PARKEY   / AUDIO, KEY, RESP
        -0102            / KP GST KEY
        JMS I   PWLON    / KP RED ON
        0703
        JMS I   PWLOFF   / KP RED OFF
        0703
        JMS I   PLON     / KP GREEN ON
        0702
        JMS I   PWVRSP   / WAIT FOR VERBAL RESP
        JMS I   PWAST    / WAIT FOR AUDIO TO STOP
        TAD Z   C20      / 2 SEC WAIT
        JMS I   PDELAY
        JMS I   PUPSTEP  / UP DATE STEP
        JMS I   PZASTPF  / ZERO AUDIO STOP FLAG
        TAD Z   PLAY     / PLAY AUDIO
        JMS I   POUT
        JMS I   PKEYPUL  / KEYPULSE
        7                / BIN 7
        -12              / 0
        -12              / 0
```

```
                -12             /   0
                -11             /   9
                JMS I   PWLOFF  /   KP GREEN OFF
                0702
                JMS I   PDOFF   /   TURN DISPLAY OFF
                JMS I   PLOFF   /   KP GST OFF
                0627
                JMS I   PWAST   /   WAIT FOR AUDIO TO STOP
                JMS I   PRKEY   /   VERB & KEY
                -0050           /   TIME ST KEY
                JMS I   PWLOFF  /   TIME ST RED OFF
                0675
                JMS I   PLON    /   TIME ST GREEN ON
                0674
                JMS I   PWVRSP  /   WAIT FOR VERBAL RESP
                JMS I   PUPSTEP /   GO UPDATE STEP
                JMS I   PSAKEY  /   AUDIO & KEY
                -0052
                JMS I   PINCOFF /   TURN OFF ALL LAMPS
                JMS I   PWAST   /   WAIT FOR AUDIO TO STOP
                JMS I   PUPSTEP
                JMS I   PSAUDIO /   END OF LESSON PHRASE
                JMS I   PDISPAT /   JUMP TO DISPATCHER
                          LESSON #24

HANDLING PERSON DELAYS:  NON-COIN 0+

/PERSON PAID (HOLDING)

/   LESSON 024 INCORE TABLE
                        *4400
4400  0024    INCORE,  0024
4401  4401             L024CA
4402  0000             0000
4403  0000             0000
                        *4600
                        PAUSE

/   BEGIN LESSON 024, CALL A
4400  4507    L024CA,  JMS I   PUPCALL
4601  4512             JMS I   PMCLRGO /   MASTER CLEAR + GO
4602  4510             JMS I   PUPSTEP /   UPDATE STEP
4603  4474             JMS I   PSAUDIO /   PLAY AUDIO
4604  4532             JMS I   PLON
4605  0600             0600            /   CALLING 305 WHITE
4606  4532             JMS I   PLON
4607  0604             0604            /   NON COIN 0+ WHITE
4610  4532             JMS I   PLON
4611  0646             0646            /   RELEASE FWD RED
4612  4532             JMS I   PLON
4613  0675             0675            /   TIME ST RED
4614  4532             JMS I   PLON
4615  0732             0732            /   LOOP 2 ACS WHITE
4616  4532             JMS I   PLON
4617  0714             0714            /   LOOP 2 CLD WHITE
4620  1156             TAD Z   C10
4621  4514             JMS I   PDELAY  /   1 SEC DELAY
4622  4531             JMS I   PLOFF   /   THEN RLS FWD GOES DARK
4623  0646             0646
4624  4510             JMS I   PUPSTEP /   UPSTEP
4625  4474             JMS I   PSAUDIO /   PLAY AUDIO
4626  4510             JMS I   PUPSTEP /   GO UPDATE STEP
4627  4474             JMS I   PSAUDIO /   ZIPTONE
4630  4475             JMS I   PRESP   /   VERB RESP
4631  0036             36              /   3 SECOND RESPONSE
4632  4510             JMS I   PUPSTEP /   UPDATE STEP
4633  4526             JMS I   PARKEY  /   AUDIO, VERB, KEY
4634  7721             -0057           /   PERSON PAID KEY
4635  4527             JMS I   PWLON   /   PERSON PAID RED ON
4636  0662             0662
4637  4530             JMS I   PWLOFF  /   PERSON PAID RED OFF
4640  0662             0662
4641  4532             JMS I   PLON    /   PERSON PAID GREEN ON
4642  0661             0661
4643  4561             JMS I   PWVRSP  /   WAIT FOR VERB RESP
```

| | | | | | |
|---|---|---|---|---|---|
| 4644 | 4513 | JMS I | PWAST | / | WAIT FOR AUDIO TO STOP |
| 4645 | 4510 | JMS I | PUPSTEP | / | UPSTEP |
| 4646 | 4474 | JMS I | PSAUDIO | / | RINGING |
| 4647 | 1154 | TAD Z | C20 | / | 2 SEC WAIT |
| 4650 | 4514 | JMS I | PDELAY | | |
| 4651 | 4531 | JMS I | PLOFF | / | LOOP 2 CLD OFF |
| 4652 | 0714 | | | | |
| 4653 | 4510 | JMS I | PUPSTEP | / | UPSTEP |
| 4654 | 4474 | JMS I | PSAUDIO | / | PLAY AUDIO |
| 4655 | 4475 | JMS I | PRESP | / | VERB RESP |
| 4656 | 0062 | 0062 | | / | 5 SEC |
| 4657 | 4510 | JMS I | PUPSTEP | / | UPSTEP |
| 4660 | 4474 | JMS I | PSAUDIO | / | PLAY AUDIO |
| 4661 | 4475 | JMS I | PRESP | / | VERB RESP |
| 4662 | 0062 | 0062 | | / | 5 SEC |
| 4663 | 4510 | JMS I | PUPSTEP | / | UPSTEP |
| 4664 | 4474 | JMS I | PSAUDIO | / | PLAY AUDIO |
| 4665 | 4475 | JMS I | PRESP | / | VERB RESP |
| 4666 | 0036 | 36 | | / | 3 SEC WAIT |
| 4667 | 4510 | JMS I | PUPSTEP | / | UPDATE STEP |
| 4670 | 4517 | JMS I | PZASTPF | | |
| 4671 | 1141 | TAD Z | PLAY | | |
| 4672 | 4462 | JMS I | POUT | | |
| 4673 | 4563 | JMS I | PKEYRNT | | |
| 4674 | 7730 | -0050 | | / | TIME ST KEY |
| 4675 | 4530 | JMS I | PWLOFF | / | TIME ST RED OFF |
| 4676 | 0675 | 0675 | | | |
| 4677 | 4532 | JMS I | PLON | / | TIME ST GREEN ON |
| 4700 | 0674 | 0674 | | | |
| 4701 | 4563 | JMS I | PKEYRNT | | |
| 4702 | 7726 | -0052 | | / | POS RLS KEY |
| 4703 | 4562 | JMS I | PINCOFF | / | ALL LAMPS OFF |
| 4704 | 4565 | JMS I | PMUTON | / | TURN MUTE BIT ON |
| 4705 | 4513 | JMS I | PWAST | / | WAIT FOR AUDIO |
| 4706 | 4566 | JMS I | PMUTOFF | / | TURN MUTE BIT OFF |
| | | | | / | END CALL A |
| | | PAUSE | | | |
| | | | | / | L024, BEGIN CALL B |
| 4707 | 4507 | JMS I | PUPCALL | / | UPCALL |
| 4710 | 4512 | JMS I | PMCLRGO | / | MASTER CLEAR + GO |
| 4711 | 4510 | JMS I | PUPSTEP | / | UPSTEP |
| 4712 | 4474 | JMS I | PSAUDIO | / | PLAY AUDIO |
| 4713 | 4532 | JMS I | PLON | / | CALLING 305 WHITE |
| 4714 | 0600 | 0600 | | | |
| 4715 | 4532 | JMS I | PLON | / | NON COIN 0+ |
| 4716 | 0604 | 0604 | | | |
| 4717 | 4532 | JMS I | PLON | / | RELEASE FWD RED |
| 4720 | 0646 | 0646 | | | |
| 4721 | 4532 | JMS I | PLON | / | TIME ST RED |
| 4722 | 0675 | 0675 | | | |
| 4723 | 4532 | JMS I | PLON | / | LOOP 3 ACS WHITE |
| 4724 | 0733 | 0733 | | | |
| 4725 | 4532 | JMS I | PLON | / | LOOP 3 CLD WHITE |
| 4726 | 0715 | 0715 | | | |
| 4727 | 1156 | TAD Z | C10 | | |
| 4730 | 4514 | JMS I | PDELAY | / | 1 SEC DELAY |
| 4731 | 4531 | JMS I | PLOFF | / | THEN RLS FWD GOES DARK |
| 4732 | 0646 | 0646 | | | |
| 4733 | 4510 | JMS I | PUPSTEP | / | UPDATE STEP |
| 4734 | 4474 | JMS I | PSAUDIO | / | PLAY AUDIO |
| 4735 | 4510 | JMS I | PUPSTEP | / | GO UPDATE STEP |
| 4736 | 4474 | JMS I | PSAUDIO | / | ZIPTONE |
| 4737 | 4475 | JMS I | PRESP | / | VERB RESP |
| 4740 | 0036 | 36 | | / | 3 SEC WAIT |
| 4741 | 4510 | JMS I | PUPSTEP | / | UPSTEP |
| 4742 | 4526 | JMS I | PARKEY | / | AUD, VERB, KEY |
| 4743 | 7721 | -0057 | | / | PER PAID KEY |
| 4744 | 4527 | JMS I | PWLON | / | PER PAID RED ON |
| 4745 | 0662 | 0662 | | | |
| 4746 | 4530 | JMS I | PWLOFF | / | PER PAID RED OFF |
| 4747 | 0662 | 0662 | | | |
| 4750 | 4532 | JMS I | PLON | / | PER PAID GREEN ON |
| 4751 | 0661 | 0661 | | | |
| 4752 | 4561 | JMS I | PWVRSP | / | WAIT FOR VERB |

| | | | | | |
|---|---|---|---|---|---|
| 4753 | 4513 | JMS I | PWAST | / | WAIT FOR AUDIO TO STOP |
| 4754 | 4510 | JMS I | PUPSTEP | / | UPSTEP |
| 4755 | 4474 | JMS I | PSAUDIO | / | RINGING |
| 4756 | 1154 | TAD Z | C20 | / | 2 SEC DELAY |
| 4757 | 4514 | JMS I | PDELAY | | |
| 4760 | 4531 | JMS I | PLOFF | / | LOOP 3 CLD OFF |
| 4761 | 0715 | 0715 | | | |
| 4762 | 4510 | JMS I | PUPSTEP | / | UPSTEP |
| 4763 | 4474 | JMS I | PSAUDIO | / | PLAY AUDIO |
| 4764 | 4475 | JMS I | PRESP | / | VER RESPONSE |
| 4765 | 0062 | 0062 | | / | 5 SEC |
| 4766 | 4510 | JMS I | PUPSTEP | / | UPSTEP |
| 4767 | 4474 | JMS I | PSAUDIO | / | PLAY AUDIO |
| 4770 | 4475 | JMS I | PRESP | / | VERBAL RESP |
| 4771 | 0062 | 62 | | / | 5 SEC WAIT |
| 4772 | 4510 | JMS I | PUPSTEP | / | UPSTEP |
| 4773 | 4474 | JMS I | PSAUDIO | / | PLAY AUDIO |
| 4774 | 4475 | JMS I | PRESP | / | VERB RESP |
| 4775 | 0062 | 62 | | / | 5 SEC WAIT |
| 4776 | 4510 | JMS I | PUPSTEP | / | UP STEP |
| 4777 | 4474 | JMS I | PSAUDIO | | |
| 5000 | 4510 | JMS I | PUPSTEP | | |
| 5001 | 4517 | JMS I | PZASTPF | | |
| 5002 | 1141 | TAD Z | PLAY | | |
| 5003 | 4462 | JMS I | POUT | | |
| 5004 | 4563 | JMS I | PKEYRNT | | |
| 5005 | 7730 | -0050 | | / | TIME ST KEY |
| 5006 | 4530 | JMS I | PWLOFF | / | TIME ST RED OFF |
| 5007 | 0675 | 0675 | | | |
| 5010 | 4532 | JMS I | PLON | / | TIME ST GREEN ON |
| 5011 | 0674 | 0674 | | | |
| 5012 | 4563 | JMS I | PKEYRNT | | |
| 5013 | 7726 | 5052 | | / | POS RLS KEY |
| 5014 | 4562 | JMS I | PINCOFF | / | ALL LAMPS OFF |
| 5015 | 4565 | JMS I | PMUTON | / | TURN ON MUTE |
| 5016 | 4513 | JMS I | PWAST | / | WAIT FOR AUD |
| 5017 | 4566 | JMS I | PMUTOFF | / | TURN MUTE OFF |
| | | | | / | L024, END CALL B |
| | | PAUSE | | | |
| | | | | / | L024, BEGIN CALL C |
| 5020 | 4507 | JMS I | PUPCALL | / | GO UPDATE CALL |
| 5021 | 4512 | JMS I | PMCLRGO | / | MASTER CLEAR & GO |
| 5022 | 4510 | JMS I | PUPSTEP | / | TO UPDATE STEP |
| 5023 | 4510 | JMS I | PUPSTEP | / | GO UPDATE STEP |
| 5024 | 4474 | JMS I | PSAUDIO | / | PLAY AUDIO |
| 5025 | 4532 | JMS I | PLON | / | CALLING 305 WHITE |
| 5026 | 0600 | 0600 | | | |
| 5027 | 4532 | JMS I | PLON | / | NON COIN 0+ WHITE |
| 5030 | 0604 | 0604 | | | |
| 5031 | 4532 | JMS I | PLON | / | RELEASE FWD RED |
| 5032 | 0646 | 0646 | | | |
| 5033 | 4532 | JMS I | PLON | / | TIME ST RED |
| 5034 | 0675 | 0675 | | | |
| 5035 | 4532 | JMS I | PLON | / | LOOP 4 ACS WHITE |
| 5036 | 0734 | | | | |
| 5037 | 4532 | JMS I | PLON | / | LOOP 4 CLD WHITE |
| 5040 | 0716 | 0716 | | | |
| 5041 | 1156 | TAD Z | C10 | | |
| 5042 | 4514 | JMS I | PDELAY | / | 1 SEC DELAY |
| 5043 | 4531 | JMS I | PLOFF | / | THEN RLS FWD GOES DARK |
| 5044 | 0646 | | | | |
| 5045 | 4510 | JMS I | PUPSTEP | / | UP STEP |
| 5046 | 4474 | JMS I | PSAUDIO | / | PLAY AUDIO |
| 5047 | 4510 | JMS I | PUPSTEP | / | GO UPDATE STEP |
| 5050 | 4474 | JMS I | PSAUDIO | / | ZIPTONE |
| 5051 | 4475 | JMS I | PRESP | / | VERBAL RESP |
| 5052 | 0036 | 36 | | / | 3 SEC WAIT |
| 5053 | 4510 | JMS I | PUPSTEP | / | UPSTEP |
| 5054 | 4526 | JMS I | PARKEY | / | AUD, RESP, KEY |
| 5055 | 7721 | -0057 | | / | PER PAID KEY |
| 5056 | 4527 | JMS I | PWLON | / | PER PAID RED |
| 5057 | 0662 | 0662 | | | |
| 5060 | 4530 | JMS I | PWLOFF | / | PER PAID RED OFF |

| | | | | | |
|---|---|---|---|---|---|
| 5061 | 0662 | | 0662 | | |
| 5062 | 4532 | | JMS I | PLON | / PER PAID GREEN ON |
| 5063 | 0661 | | 0661 | | |
| 5064 | 4561 | | JMS I | PWVRSP | / WAIT FOR VERB |
| 5065 | 4513 | | JMS I | PWAST | / WAIT FOR AUDIO TO STOP |
| 5066 | 4510 | | JMS I | PUPSTEP | / GO UP STEP |
| 5067 | 4474 | | JMS I | PSAUDIO | / RINGING |
| 5070 | 1154 | | TAD Z | C20 | / 2 SEC WAIT |
| 5071 | 4514 | | JMS I | PDELAY | |
| 5072 | 4531 | | JMS I | PLOFF | / LOOP 4 CLD OFF |
| 5073 | 0716 | | 0716 | | |
| 5074 | 4510 | | JMS I | PUPSTEP | / UP STEP |
| 5075 | 4474 | | JMS I | PSAUDIO | / PLAY AUDIO |
| 5076 | 4475 | | JMS I | PRESP | / VERB RESP |
| 5077 | 0062 | | 62 | | / 5 SEC WAIT |
| 5100 | 4510 | | JMS I | PUPSTEP | / UP STEP |
| 5101 | 4474 | | JMS I | PSAUDIO | / PLAY AUDIO |
| 5102 | 4475 | | JMS I | PRESP | / VERB RESP |
| 5103 | 0036 | | 36 | | / 3 SEC WAIT |
| 5104 | 4510 | | JMS I | PUPSTEP | / GO UP STEP |
| 5105 | 4474 | | JMS I | PSAUDIO | / PLAY AUDIO |
| 5106 | 4475 | | JMS I | PRESP | / VERBAL RESP |
| 5107 | 0062 | | | | / 5 SEC WAIT |
| 5110 | 4510 | | JMS I | PUPSTEP | / UP STEP |
| 5111 | 4474 | | JMS I | PSAUDIO | / PLAY AUDIO |
| 5112 | 4475 | | JMS I | PRESP | / VERBAL RESP |
| 5113 | 0144 | | 0144 | | / 7 SEC |
| 5114 | 4510 | | JMS I | PUPSTEP | / UP STEP |
| 5115 | 4526 | | JMS I | PARKEY | / AUD, RESP, KEY |
| 5116 | 7732 | | -0046 | | / DISP CLD NUMBER |
| 5117 | 4527 | | JMS I | PWLON | / DISPLAY CLD NO. WHITE |
| 5122 | 0722 | | 0722 | | |
| 5121 | 4476 | | JMS I | PDISPLY | / DISPLAY |
| 5122 | 0001 | | 1 | | / BIN 1 |
| 5123 | 0003 | | 3 | | |
| 5124 | 0001 | | 1 | | |
| 5125 | 0007 | | 7 | | |
| 5126 | 0004 | | 4 | | |
| 5127 | 0002 | | 2 | | |
| 5130 | 0007 | | 7 | | |
| 5131 | 0003 | | 3 | | |
| 5132 | 0001 | | 1 | | |
| 5133 | 0006 | | 6 | | |
| 5134 | 0006 | | 6 | | |
| 5135 | 4561 | | JMS I | PWVRSP | / WAIT FOR VERB |
| 5136 | 4513 | | JMS I | PWAST | / WAIT FOR AUDIO |
| 5037 | 1154 | | TAD Z | C20 | |
| 5140 | 4514 | | JMS I | PDELAY | / 2 SEC TO FINISH VERB RESP |
| 5141 | 4510 | | JMS I | PUPSTEP | / UP STEP |
| 5142 | 4526 | | JMS I | PARKEY | / VER, AUD, KEY |
| 5143 | 7711 | | -0067 | | / RELEASE FWD KEY |
| 5144 | 4527 | | JMS I | PWLON | / RELEASE FWD RED |
| 5145 | 0646 | | 0646 | | |
| 5146 | 4532 | | JMS I | PLON | / LOOP CLD WHITE |
| 5147 | 0716 | | 0716 | | |
| 5150 | 4561 | | JMS I | PWVRSP | / WAIT FOR VERBAL |
| 5151 | 0513 | | JMS I | PWAST | / WAIT FOR AUDIO |
| 5152 | 1160 | | TAD Z | C30 | |
| 5153 | 4514 | | JMS I | PDELAY | / FOR V.R. TO FINISH |
| 5154 | 4510 | | JMS I | PUPSTEP | / UP STEP |
| 5155 | 4525 | | JMS I | PSAKEY | / AUDA KEY |
| 5156 | 7755 | | -0023 | | / KP CD KEY |
| 5157 | 4527 | | JMS I | PWLON | / KP WHITE |
| 5160 | 0735 | | 0735 | | |
| 5161 | 4532 | | JMS I | PLON | / KP RED |
| 5162 | 0703 | | 0703 | | |
| 5163 | 4457 | | JMS I | PDOFF | / TURN DISPLAY OFF |
| 5164 | 4530 | | JMS I | PWLOFF | / KP RED OFF |
| 5165 | 0703 | | 0703 | | |
| 5166 | 4532 | | JMS I | PLON | / KP GREEN ON |
| 5167 | 0702 | | 0702 | | |
| 5170 | 4477 | | JMS I | PKEYPUL | / GO TO KEYPULSE |
| 5171 | 0001 | | 1 | | / BIN 1 |
| 5172 | 7775 | | -3 | | |

```
5173  7777              -1
5174  7771              -7
5175  7774              -4
5176  7767              -11
5177  7775              -3
5200  7777              -1
5201  7772              -6
5202  7767              -11
5203  7773              -5
5204  4533      JMS I   PKEYR       / ST KEY
5205  7765              -0013
5206  4530      JMS I   PWLOFF      / KP CD OFF
5207  0735              0735
5210  4530      JMS I   PWLOFF      / KP OFF
5211  0702              0702
5212  4457      JMS I   PDOFF       / TURN DISPLAY OFF
5213  4531      JMS I   PLOFF       / RELEASE FWD OFF
5214  0646              0646
5215  4513      JMS I   PWAST       / WAIT FOR AUDIO STOP
5216  4510      JMS I   PUPSTEP     / GO UP STEP
5217  4474      JMS I   PSAUDIO     / PLAY AUDIO
5220  1154      TAD Z   C20         / 2 SEC WAIT
5221  4514      JMS I   PDELAY
5222  4531      JMS I   PLOFF       / LOOP CLD OFF
5223  0716              0716
5224  4510      JMS I   PUPSTEP     / UP STEP
5225  4474      JMS I   PSAUDIO     / PLAY AUDIO
5226  4475      JMS I   PRESP       / VERB RESP
5227  0062              0062        / 5 SEC
5230  4510      JMS I   PUPSTEP     / UP STEP
5231  4474      JMS I   PSAUDIO     / PLAY AUDIO
5232  4475      JMS I   PRESP       / VERB
5233  0036              36
5234  4510      JMS I   PUPSTEP     / GO UPDATE STEP
5235  4517      JMS I   PZASTPF
5236  1141      TAD Z   PLAY
5237  4462      JMS I   POUT
5240  4563      JMS I   PKEYRNT
5241  7730              -0050       / TIME ST KEY
5242  4530      JMS I   PWLOFF      / TIME ST RED OFF
5243  0675              0675
5244  4532      JMS I   PLON        / TIME ST GREEN ON
5245  0674
5246  4563      JMS I   PKEYRNT
5247  7726              -0052       / POS RLS KEY
5250  4562      JMS I   PINCOFF     / ALL LAMPS OFF
5251  4565      JMS I   PMUTON      / TURN MUTE BIT ON
5252  4513      JMS I   PWAST       / WAIT FOR AUDIO
5253  4566      JMS I   PMUTOFF     / TURN MUTE BIT OFF
5254  4510      JMS I   PUPSTEP
5255  4474      JMS I   PSAUDIO
5256  4453      JMS I   PDISPAT
      / LESSON #26 PERSON DELAY: NON COIN 0+/PERSON PAID
      /     L026        (CALLBACK #6 LEFT)
      /
0200  4507  L026CA, JMS I  PUPCALL  / UP CALL
0201  4512      JMS I   PMCLRGO     / MASTER CLEAR & GO
0202  4510      JMS I   PUPSTEP     / UP STEP
0203  4474      JMS I   PSAUDIO     / PLAY AUDIO
0204  4532      JMS I   PLON        / 305 WHITE
0205  0600              0600
0206  4532      JMS I   PLON        / NON COIN 0;
0207  0604              0604
0210  4532      JMS I   PLON        / REL FWD RED
0211  0646              0646
0212  4532      JMS I   PLON        / LOP 4 ACS
0213  0734              0734
0214  4532      JMS I   PLON        / LOOP 4 CLD
0215  0716              0716
0216  4532      JMS I   PLON        / TIME ST RED
0217  0675              0675
0220  4530      JMS I   PWLOFF      / RE FWD OFF
0221  0646              0646
0222  4510      JMS I   PUPSTEP     / UP STEP
0223  4474      JMS I   PSAUDIO     / PLAY AUDIO
```

```
0224  4475        JMS I   PRESP   / VERB
0225  0050        50              / 4 SEC
0226  4510        JMS I   PUPSTEP / UP STEP
0227  4526        JMS I   PARKEY  / VER AUD KEY
0230  7721        -0057
0231  4532        JMS I   PLON    / PER PAID RED
0232  0662        0662
0233  4530        JMS I   PWLOFF  / PER PAID RED OFF
0234  0662        0662
0235  4532        JMS I   PLON    / PER PAID GREEN
0236  0661        0661
0237  4561        JMS I   PWVRSP  / WAIT FOR VERBAL
0240  4513        JMS I   PWAST   / WAIT FOR AUFD
0241  4510        JMS I   PUPSTEP
0242  4474        JMS I   PSAUDIO / RINGING
0243  4531        JMS I   PLOFF   / LOOP 4 CLD
0244  0716        0716
0245  4510        JMS I   PUPSTEP / UP STEP
0246  4474        JMS I   PSAUDIO / PLAY AUD
0247  4475        JMS I   PRESP   / VERB
0250  0062        62              / 5 SEC WAIT
0251  4510        JMS I   PUPSTEP / UP STEP
0252  4474        JMS I   PSAUDIO / PLY AUD
0253  4475        JMS I   PRESP   / VER
0254  0062        62              / 5 SEC WAIT
0255  4510        JMS I   PUPSTEP / UP STEP
0256  4525        JMS I   PSAKEY  / AUD & KEY
0257  7731        -0047           / DIS CLG NO.
0260  4527        JMS I   PWLON   / LOOP 4 CLG
0261  0707        0707
0262  4532        JMS I   PLON    / DIS CLG NUMBER
0263  0721        0721
0264  4476        JMS I   PDISPLY / DISPLAY
0265  0004        4               / BIN 4
0266  0006        6
0267  0004        4
0270  0004        4
0271  0007        7
0272  0000        0
0273  0007        7
0274  0001        1
0275  4513        JMS I   PWAST   / WAIT FOR AUDIO
0276  4475        JMS I   PRESP   / VERBAL
0277  0226        226             / 15 SEC
0300  4510        JMS I   PUPSTEP / UP STEP
0301  4474        JMS I   PSAUDIO
0302  4475        JMS I   PRESP
0303  0017        17              / 1.5 SEC
0304  4533        JMS I   PKEYR
0305  7727        -0051           / CACALL
0306  4457        JMS I   PDOFF   / TURN DISPLAY OFF
0307  4562        JMS I   PINCOFF / ALL OFF
                  /                 END OF LESSON 026 CALL A.
                                PAUSE
                  /
                  /             LESSON 026 CALL B.
                  /
0310  4507        JMS I   PUPCALL / UP CALLL
0311  4512        JMS I   PMCLRGO / MASTER CLEAR & GO
0312  4510        JMS I   PUPSTEP / UP STEP
0313  4474        JMS I   PSAUDIO / PLAY AUDIO
0314  4532        JMS I   PLON    / 305 WHITE
0315  0600        0600
0316  4532        JMS I   PLON    / NON COIN 0;
0317  0604        0604
0320  4532        JMS I   PLON    / REL FWD RED
0321  0646        0646
0322  4532        JMS I   PLON    / LOOP 1 ACS
0323  0713        0713
0324  4532        JMS I   PLON    / LOOP 1 CLD
0325  0731        0731
0326  4532        JMS I   PLON    / TIME ST RED
0327  0675        0675
0330  1156        TAD Z   C10
```

```
0331  4514          JMS I   PDELAY
0332  4531          JMS I   PLOFF    / REL FWD OFF
0333  0646          0646
0334  4510          JMS I   PUPSTEP  / UP STEP
0335  4474          JMS I   PSAUDIO  / PLAY AUDIO
0336  4475          JMS I   PRESP    / VERB
0337  0036          36                / 3S EC
0340  4510          JMS I   PUPSTEP  / UP STEP
0341  4526          JMS I   PARKEY   / VER AUD KEY
0342  7721          -0057
0343  4532          JMS I   PLON     / PER PAID RED
0344  0662          0662
0345  4530          JMS I   PWLOFF   / PER PAID RED OFF
0346  0662          0662
0347  4532          JMS I   PLON     / PER PAID GREEN
0350  0661          0661
0351  4561          JMS I   PWVRSP   / WAIT FOR VERBAL
0352  4513          JMS I   PWAST    / WAIT FOR AUFD
0353  4510          JMS I   PUPSTEP
0354  4474          JMS I   PSAUDIO
0355  4531          JMS I   PLOFF    / LOOP 1 CLD
0356  0713          0713
0357  4510          JMS I   PUPSTEP  / UP STEP
0360  4474          JMS I   PSAUDIO  / PLAY AUD
0361  4475          JMS I   PRESP    / VERB
0362  0062          62                / 5 SEC WAIT
0363  4510          JMS I   PUPSTEP  / UP STEP
0364  4474          JMS I   PSAUDIO  / PLY AUD
0365  4475          JMS I   PRESP    / VER
0366  0062          62                / 5 SEC WAIT
0367  4510          JMS I   PUPSTEP  / UP STEP
0370  4474          JMS I   PSAUDIO  / PLAY AUD
0371  4475          JMS I   PRESP    / VERB
0372  0106          106               / 7SEC WAIT
0373  4510          JMS I   PUPSTEP  / UP STEP
0374  4474          JMS I   PSAUDIO
0375  4533          JMS I   PKEYR
0376  7727          -0051             / CA CALL KEY
0377  4562          JMS I   PINCOFF  / ALL OFF
              /     PAUSE
                              / LESSON 026 CALL C.
              /
0400  4507          JMS I   PUPCALL  / UP CALL
0401  4512          JMS I   PMCLRGO  / MASTER CLEAR & GO
0402  4510          JMS I   PUPSTEP  / UP STEP
0403  4474          JMS I   PSAUDIO  / PLAY AUDIO
0404  4532          JMS I   PLON     / 305 WHITE
0405  0600          0600
0406  4532          JMS I   PLON     / NON COIN 0;
0407  0604          0604
0410  4532          JMS I   PLON     / REL FWD RED
0411  0646          0646
0412  4532          JMS I   PLON     / LOOP 2 ACS
0413  0732          0732
0414  4532          JMS I   PLON     / LOOP 2 CLD
0415  0714          0714
0416  0716          0716
0417  4532          JMS I   PLON     / TIME ST RED
0420  0675          0675
0421  4530          JMS I   PWLOFF   / RE FWD OFF
0422  0646          0646
0423  4510          JMS I   PUPSTEP  / UP STEP
0424  4474          JMS I   PSAUDIO  / PLAY AUDIO
0425  4475          JMS I   PRESP    / VERB
0426  0036          36                / 3S EC
0427  4510          JMS I   PUPSTEP  / UP STEP
0430  4526          JMS I   PARKEY   / VER AUD KEY
0431  7721          -0057
0432  4532          JMS I   PLON     / PER PAID RED
0433  0662          0662
0434  4530          JMS I   PWLOFF   / PER PAID RED OFF
0435  0662          0662
0436  4532          JMS I   PLON     / PER PAID GREEN
0437  0661          0661
```

```
0440  4561           JMS I   PWVRSP  / WAIT FOR VERBAL
0441  4513           JMS I   PWAST   / WAIT FOR AUFD
0442  4510           JMS I   PUPSTEP / UP STEP
0443  4474           JMS I   PSAUDIO / PLAY AUD
0444  1154           TAD Z   C20     / 2 SEC WAIT
0445  4514           JMS I   PDELAY
0446  4531           JMS I   PLOFF   / LOOP 2 CLD OFF
0447  0714
0450  4510           JMS I   PUPSTEP / UP STEP
0451  4474           JMS I   PSAUDIO / PLAY AUD
0452  4475           JMS I   PRESP   / VER
0453  0062           62              / 5 SEC WAIT
0454  4510           JMS I   PUPSTEP / UP STEP
0455  4474           JMS I   PSAUDIO / PLAY AUD
0456  4475           JMS I   PRESP   / VER
0457  0062           62              / 5 SEC WAIT
0460  4510           JMS I   PUPSTEP / UP STEP
0461  4474           JMS I   PSAUDIO / PLAY AUD
0462  4475           JMS I   PRESP   / VER
0463  0036           36              / 3S EC WAIT
0464  4510           JMS I   PUPSTEP / UP STEO
0465  4517           JMS I   PZASTPF
0466  1141           TAD Z   PLAY
0467  4462           JMS I   POUT
0470  4563           JMS I   PKEYRNT
0471  7730           -0050           / TIME ST
0472  4532           JMS I   PLON    / TIME ST RED
0473  0675           0675
0474  4530           JMS I   PWLOFF  / TIME ST RED OFF
0475  0675           0675
0476  4532           JMS I   PLON    / TIME ST GREEN ON
0477  0674           0674
0500  4563           JMS I   PKEYRNT
0501  7726           -0052           / POS RLD
0502  4562           JMS I   PINCOFF / ALL OFF
0503  4565           JMS I   PMUTON  / TURN MUTE ON
0504  4513           JMS I   PWAST   / WAIT FOR AUDIO
0505  4566           JMS I   PMUTOFF / TURN MUTE OFF
                                     / END L026 CALL C.
                     PAUSE
              /      LESSON 026 CALL D.
              /
0506  4507           JMS I   PUPCALL / UP CALLL
0507  4512           JMS I   PMCLRGO / MASTER CLEAR & GO
0510  4510           JMS I   PUPSTEP / UP STEP
0511  4474           JMS I   PSAUDIO / PLAY AUDIO
0512  4532           JMS I   PLON    / 305 WHITE
0513  0600           0600
0514  4532           JMS I   PLON    / NON COIN 0;
0515  0604           0604
0516  4532           JMS I   PLON    / REL FWD RED
0517  0646           0646
0520  4532           JMS I   PLON    / LOOP 3 ASC
0521  0733           0733
0522  4532           JMS I   PLON    / LOOP 3 CLD
0523  0715           0715
0524  0716           0716
0525  4532           JMS I   PLON    / TIME ST RED
0526  0675           0675
0527  4530           JMS I   PWLOFF  / RE FWD OFF
0530  0646           0646
0531  4510           JMS I   PUPSTEP / UP STEP
0532  4474           JMS I   PSAUDIO / PLAY AUDIO
0533  4475           JMS I   PRESP   / VERB
0534  0036           36              / 3S EC
0535  4510           JMS I   PUPSTEP / UP STEP
0536  4526           JMS I   PARKEY  / VER AUD KEY
0537  7721           -0057
0540  4532           JMS I   PLON    / PER PAID RED
0541  0662           0662
0542  4530           JMS I   PWLOFF  / PER PAID RED OFF
0543  0662           0662
0544  4532           JMS I   PLON    / PER PAID GREEN
0545  0661           0661
0546  4561           JMS I   PWVRSP  / WAIT FOR VERBAL
```

```
0547  4513        JMS I   PWAST    / WAIT FOR AUFD
0550  4510        JMS I   PUPSTEP  / UP STEP
0551  4474        JMS I   PSAUDIO  / PLAY AUD
0552  1154        TAD Z   C20      / 2 SEC WAIT
0553  4514        JMS I   PDELAY
0554  4531        JMS I   PLOFF    / LOOP 3 CLD OFF
0555  0715                0715
0556  4510        JMS I   PUPSTEP  / UP STEP
0557  4474        JMS I   PSAUDIO  / PLAY AUD
0560  4475        JMS I   PRESP    / VER
0561  0062                62       / 5 SEC
0562  4510        JMS I   PUPSTEP  / UP STEP
0563  4474        JMS I   PSAUDIO  / PLAY AUD
0564  4475        JMS I   PRESP    / VER
0565  0036                36       / 3 SEC WAIT
0566  4510        JMS I   PUPSTEP  / UP STEP
0567  4474        JMS I   PSAUDIO  / PLAY AUD
0570  4475        JMS I   PRESP    / VER
0571  0062                62       / 5S EC WAIT
0572  4510        JMS I   PUPSTEP  / UP STEO
0573  4517        JMS I   PZASTPF  / AUD & KEY
0574  1141        TAD Z   PLAY
0575  4462        JMS I   POUT
0576  4563        JMS I   PKEYRNT
0577  7730                -0050    / TIME ST
0600  4532        JMS I   PLON     / TIME ST RED
0601  0675                0675
0602  4533        JMS I   PWLOFF   / TIME ST RED OFF
0603  0675                0675
0604  4532        JMS I   PLON     / TIME ST GREEN ON
0605  0674                0674
0606  4563        JMS I   PKEYRNT  / AUD & KEY
0607  7726                -0052    / POS RLD
0610  4562        JMS I   PINCOFF  / ALL OFF
0611  4565        JMS I   PMUTON   / TURN MUTE ON
0612  4513        JMS I   PWAST    / WAIT FOR AUDIO
0613  4566        JMS I   PMUTOFF  / TURN MUTE OFF
                                   / END LESSON 026 CALL D.
                  PAUSE
            /     LESSON 026 CALL E.
            /
0614  4507        JMS I   PUPCALL  / UP CALLL
0615  4512        JMS I   PMCLRGO  / MASTER CLEAR & GO
0616  4510        JMS I   PUPSTEP  / UP STEP
0617  4474        JMS I   PSAUDIO  / PLAY AUDIO
0620  4532        JMS I   PLON     / 305 WHITE
0621  0600                0600
0622  4532        JMS I   PLON     / NON COIN 0;
0623  0604                0604
0624  4532        JMS I   PLON     / REL FWD RED
0625  0646                0646
0626  4532        JMS I   PLON     / LOOP 4 ACS
0627  0734                0734
0630  4532        JMS I   PLON     / LOOP 4 CLD
0631  0716                0716
0632  4532        JMS I   PLON     / TIME ST RED
0633  0675                0675
0634  1156        TAD Z   C10
0635  4514        JMS I   PDELAY
0636  4531        JMS I   PLOFF    / RE FWD OFF
0637  0646                0646
0640  4510        JMS I   PUPSTEP  / UP STEP
0641  4474        JMS I   PSAUDIO  / PLAY AUDIO
0642  4475        JMS I   PRESP    / VERB
0643  0036                36       / 3S EC
0644  4510        JMS I   PUPSTEP  / UP STEP
0645  4526        JMS I   PARKEY   / VER AUD KEY
0646  7721                -0057
0647  4532        JMS I   PLON     / PER PAID RED
0650  0662                0662
0651  4530        JMS I   PWLOFF   / PER PAID RED OFF
0652  0662                0662
0653  4532        JMS I   PLON     / PER PAID GREEN
0654  0661                0661
```

| | | | | | |
|---|---|---|---|---|---|
| 0655 | 4561 | JMS I | PWVRSP | / | WAIT FOR VERBAL |
| 0656 | 4513 | JMS I | PWAST | / | WAIT FOR AUFD |
| 0657 | 4510 | JMS I | PUPSTEP | | |
| 0660 | 4474 | JMS I | PSAUDIO | | |
| 0661 | 1154 | TAD Z | C20 | / | 2 SEC WAIT |
| 0662 | 4514 | JMS I | PDELAY | | |
| 0663 | 4531 | JMS I | PLOFF | / | LOOP 4 CLD OFF |
| 0664 | 0716 | 0716 | | | |
| 0665 | 4510 | JMS I | PUPSTEP | / | UP STEP |
| 0666 | 4474 | JMS I | PSAUDIO | / | PLAY AUDIO |
| 0667 | 4475 | JMS I | PRESP | / | VER |
| 0670 | 0050 | 50 | | / | 4 SEC WAIT |
| 0671 | 4510 | JMS I | PUPSTEP | / | UP STEP |
| 0672 | 4474 | JMS I | PSAUDIO | / | PLAY AUD |
| 0673 | 4475 | JMS I | PRESP | / | VER |
| 0674 | 0042 | 42 | | / | 5 SEC WAIT |
| 0675 | 4510 | JMS I | PUPSTEP | / | UP STEP |
| 0676 | 4474 | JMS I | PSAUDIO | / | PLAY AUD |
| 0677 | 4475 | JMS I | PRESP | / | VER |
| 0700 | 0144 | 144 | | / | 10S EC WAIT |
| 0701 | 4510 | JMS I | PUPSTEP | / | UP STE0 |
| 0702 | 4526 | JMS I | PARKEY | / | AUD & KEY |
| 0703 | 7732 | -0046 | | | |
| 0704 | 4527 | JMS I | PWLON | / | DISP CLD ON |
| 0705 | 0722 | 0722 | | | |
| 0706 | 4476 | JMS I | PDISPLY | / | DISPLAY |
| 0707 | 0001 | 1 | | / | BIN 1 |
| 0710 | 0011 | 11 | | | |
| 0711 | 0000 | 0 | | | |
| 0712 | 0004 | 4 | | | |
| 0713 | 0004 | 4 | | | |
| 0714 | 0003 | 3 | | | |
| 0715 | 0002 | 2 | | | |
| 0716 | 0005 | 5 | | | |
| 0717 | 0006 | 6 | | | |
| 0720 | 0001 | 1 | | | |
| 0721 | 0004 | 4 | | | |
| 0722 | 4561 | JMS I | PWVRSP | / | WAIT FOR VERBAL |
| 0723 | 4513 | JMS I | PWAST | / | WAIT FOR AUDIO |
| 0724 | 4475 | JMS I | PRESP | | |
| 0725 | | | | / | 2 SEC |
| 0726 | 4533 | JMS I | PKEYR | | |
| 0727 | 7711 | -0067 | | / | REL FWD KEY |
| 0730 | 4527 | JMS I | PWLON | / | REL FWD ON |
| 0731 | 0646 | 0646 | | | |
| 0732 | 4532 | JMS I | PLON | / | LOOP 4 CLD |
| 0733 | 0716 | 0716 | | | |
| 0734 | 4533 | JMS I | PKEYR | / | KEY RESP |
| 0735 | 7755 | -0023 | | / | KP CD |
| 0736 | 4532 | JMS I | PLON | / | KP CD ON |
| 0737 | 0735 | 0735 | | | |
| 0740 | 4532 | JMS I | PLON | / | KP RED ON |
| 0741 | 0703 | 0703 | | | |
| 0742 | 4457 | JMS I | PDOFF | / | TURN DISPLY OFF |
| 0743 | 4530 | JMS I | PWLOFF | / | KP RED OFF |
| 0744 | 0703 | 0703 | | | |
| 0745 | 4532 | JMS I | PLON | / | KP GREEN ON |
| 0746 | 0702 | 0702 | | | |
| 0747 | 4477 | JMS I | PKEYPUL | / | GOTO KEYPUL |
| 0750 | 0001 | 1 | | / | BIN 1 |
| 0751 | 7767 | -11 | | | |
| 0752 | 7766 | -12 | | | |
| 0753 | 7774 | -4 | | | |
| 0754 | 7774 | -4 | | | |
| 0755 | 7775 | -3 | | | |
| 0756 | 7776 | -2 | | | |
| 0757 | 7776 | -2 | | | |
| 0760 | 7774 | -4 | | | |
| 0761 | 7766 | -12 | | | |
| 0762 | 7766 | -12 | | | |
| 0763 | 4533 | JMS I | PKEYR | / | KEY RESPONNSE |
| 0764 | 7765 | -0013 | | / | ST KEY |
| 0765 | 4530 | JMS I | PWLOFF | / | KP GREEN OFF |
| 0766 | 0702 | 0702 | | | |
| 0767 | 4457 | JMS I | PDOFF | / | DISPLAY OFF |

```
0770  4531        JMS I   PLOFF    / KP CD OFF
0771  0735        0735
0772  4531        JMS I   PLOFF    / REL FWD OFF
0773  0646        0646
0774  4510        JMS I   PUPSTEP  / UP STEP
0775  4474        JMS I   PSAUDIO  / PLAY AUDIO
0776  1154        TAD Z   C20      / 2 SEC DELAY
0777  4514        JMS I   PDELAY
1000  4531        JMS I   PLOFF    / LOOP 4 CLD OFF
1001  0716        0716
1002  4510        JMS I   PUPSTEP  / UP STEP
1003  4474        JMS I   PSAUDIO  / PLAY AUDIO
1004  4475        JMS I   PRESP    / VERBAL
1005  0062        62               / 5 SEC WAIT
1006  4510        JMS I   PUPSTEP  / UP STEP
1007  4474        JMS I   PSAUDIO  / AUD & KEY
1010  4510        JMS I   PUPSTEP
1011  4517        JMS I   PZASTPF
1012  1141        TAD Z   PLAY
1013  4462        JMS I   POUT
1014  4563        JMS I   PKEYRNT
1015  7730        -0050            / TIME ST KEY
1016  4530        JMS I   PWLOFF   / TIME ST RED OFF
1017  0675        0675
1020  4532        JMS I   PLON     / TIME ST GREEN ON
1021  0674        0674
1022  4563        JMS I   PKEYRNT
1023  7726        -0052            / POS RLSD
1024  4562        JMS I   PINCOFF  / ALL OFF
1025  4565        JMS I   PMUTON   / TURN MUTE BIT ON
1026  4513        JMS I   PWAST    / WAIT FOR AUDIO
1027  4566        JMS I   PMUTOFF  / TURN MUTE BIT OFF
                                   / END OF LESSON 026 CALL E.
            PAUSE
            /       / LESSON 026 CALL F.

1030  4507        JMS I   PUPCALL  / MASTER CLEAR & GO
1031  4512        JMS I   PMCLRGO  / UPDATE STEP
1032  4510        JMS I   PSAUDIO  / PLAY AUDIO
1033  4474        JMS I   PSAUDIO  / PLAY AUDIO
1034  4532        JMS I   PLON     / 305 WHITE
1035  0600        0600
1036  4532        JMS I   PLON     / HOTEL 0+
1037  0625        0625
1040  4532        JMS I   PLON     / KP GST
1041  0627        0627
1042  4532        JMS I   PLON     / REL FWD
1043  0646        0646
1044  4532        JMS I   PLON     / LOOP 1 ACS
1045  0731        0731
1046  4532        JMS I   PLON     / LOOP 1 CLD
1047  0713        0713
1050  4532        JMS I   PLON     / TIME ST RED
1051  0675        0675
1052  4532        JMS I   PLON     / T6 C WHITE
1053  0644        0644
1054  4530        JMS I   PWLOFF   / REL FWD OFF
1055  0646        0646
1056  4510        JMS I   PUPSTEP  / UP STEP
1057  4474        JMS I   PSAUDIO  / PLAY AUDIO
1060  4475        JMS I   PRESP    / VER
1061  0036        36               / 3 SEC WAIT
1062  4510        JMS I   PUPSTEP  / UP STEP
1063  4526        JMS I   PARKEY   / AUD VER KEY
1064  7721        -0057            / PER PAID KEY
1065  4532        JMS I   PLON     / PER PAID RED
1066  0662        0662
1067  4530        JMS I   PWLOFF   / PER PAID RED OFF
1070  0662        0662
1071  4532        JMS I   PLON     / PER PAID GREEN ON
1072  0661        0661
1073  4561        JMS I   PWVRSP   / WAIT OR VERB
1074  4513        JMS I   PWAST    / WAIT FOR AUDIO
1075  4534        JMS I   PRKEY    / VER & KEY
```

```
1076  7676         -0102              / KP GST KEY
1077  4532   JMS I PLON      / KP RED
1100  0703         0703
1101  4530   JMS I PWLOFF    / KP RED OFF
1102  0703         0703
1103  4532   JMS I PLON      / KP GREEN ON
1104  0702         0702
1105  4561   JMS I PWVRSP    / WAIT FOR VERBAL RSO
1106  4510   JMS I PUPSTEP   / UP STEP
1107  4517   JMS I PZASTPF   / ZERO AUD STOP FLAG
1110  1141   TAD Z PLAY      / PLAY AUD
1111  4462   JMS I POUT
1112  4477   JMS I PKEYPUL   / GO TO KEYPULSE
1113  0007         7         / BIN 7
1114  7766         -12
1115  7777         -1
1116  7774         -4
1117  7776         -2
1120  4530   JMS I PWLOFF    / KP GREEN OFF
1121  0702         0702
1122  4457   JMS I PDOFF     / TURN DISPLAY OFF
1123  4531   JMS I PLOFF     / KP GST OFF
1124  0627         0627
1125  4513   JMS I PWAST     / WAIT FOR AUDIO
1126  4475   JMS I PRESP     / VERVAB RESP
1127  0036         36
1130  4510   JMS I PUPSTEP   / UP STEP
1131  4474   JMS I PSAUDIO   / PLAY AUDIO
1132  1154   TAD Z C20       / 2 SEC DELAY
1133  4514   JMS I PDELAY
1134  4531   JMS I PLOFF     / LLOPP CLD OFF
1135  0713         0713
1136  4510   JMS I PUPSTEP   / UP STEP
1137  4474   JMS I PSAUDIO   / PLAY AUD
1140  4475   JMS I PRESP     / VER
1141  0062         62        / 5 SEC WAIT
1142  4510   JMS I PUPSTEP   / UP STEP
1143  4474   JMS I PSAUDIO   / PLAY AUD
1144  4475   JMS I PRESP     / VER RESP
1145  0062         62        / 5 SEC WAIT
1146  4510   JMS I PUPSTEP   / UP STEP
1147  4474   JMS I PSAUDIO   / PLAY AUD
1150  4475   JMS I PRESP     / VER
1151  0062         62        / 5 SEC WAIT
1152  4510   JMS I PUPSTEP   / UP STEP
1153  4474   JMS I PSAUDIO   / PLAY AUD
1154  4475   JMS I PRESP     / VER
1155  0062         62        / 5 SEC WAIT
1156  4510   JMS I PUPSTEP   / UP STEP
1157  4526   JMS I PARKEY    / VER AUD KEY
1160  7731         -0047     / DIS CLG NO.
1161  4527   JMS I PWLON     / DIS CLG WHITE
1162  0721         0721
1163  4476   JMS I PDISPLY   / DISPLY
1164  0004         4         / BIN 4
1165  0010         10
1166  0003         3
1167  0010         10
1170  0003         3
1171  0001         1
1172  0001         1
1173  0002         2
1174  4561   JMS I PWVRSP    / WAIT FOR VERBAL
1175  4513   JMS I PWAST     / WAIT FIOR AUF
1176  1156   TAD Z C10
1177  4514   JMS I PDELAY
1200  4475   JMS I PRESP     / VER RESP
1201  0226         0226      / 15 SEC
1202  4510   JMS I PUPSTEP   / UP STEP
1203  4474   JMS I PSAUDIO
1204  4533   JMS I PKEYR
1205  7727         -0051     / CA CALL KEY
1206  4562   JMS I PINCOFF   / ALL LAMPS OFF
1207  4457   JMS I PDOFF     / TURN DISPLAY OFF
```

```
1210   4510           JMS I    PUPSTEP
1211   4474           JMS I    PSAUDIO  / END L026 CALL F.
1212   4453           JMS I    PDISPAT  / JUMP TO DISPATCHER

/ END LESSON 026.
                       PAUSE
                            LESSON #37

HANDLING NON COIN 0+/STATION SPECIAL

CALLING (CREDIT CARD)

*4400
4400   0037   INCORE,  0037
4401   4600            4600
4402   0000            0000
4403   0000            0000
                       *4600
                       PAUSE

/
4600   4507   L037CA,  JMS I    PUPCALL  / L037 CALL A
4601   4512            JMS I    PMCLRGO  / CLEAR ALL & GO
4602   4510            JMS I    PUPSTEP  / UPSTEP
4603   4474            JMS I    PSAUDIO  / PLAY PREAMBLE
4604   4532            JMS I    PLON     / LIGHTS ON
4605   0600            0600              / AC 305
4606   4532            JMS I    PLON
4607   0604            0604              / NON COIN 0+
4610   4532            JMS I    PLON
4611   0646            0646              / RELEASE FWD
4612   4532            JMS I    PLON
4613   0734            0734              / LOOP 4 ACS
4614   4532            JMS I    PLON
4615   0716            0716              / CLD
4616   4532            JMS I    PLON
4617   0675            0675              / TIME ST RED
4620   1156            TAD Z    C10
4621   4514            JMS I    PDELAY   / 1 SEC
4622   4531            JMS I    PLOFF    / REL FWD DARK
4623   0646            0646
4624   4510            JMS I    PUPSTEP  / LS3
4625   4474            JMS I    PSAUDIO  / MORE PREAMBLE
4626   4510            JMS I    PUPSTEP  / LS 3
4627   4474            JMS I    PSAUDIO  / ZIPTONE
4630   4475            JMS I    PRESP
4631   0036            0036              / SHORT
4632   4510            JMS I    PUPSTEP  / LS4
4633   4517            JMS I    PZASTPF  / GET CREDIT NO.
4634   1141            TAD Z    PLAY
4635   4462            JMS I    POUT
4636   4563            JMS I    PKEYRNT
4637   7762            -16               / FIRST PRESS KP SPL
4640   4532            JMS I    PLON
4641   0720            0720              / KP SPL LIGHTS
4642   4532            JMS I    PLON     / KP RED
4643   0703            0703
4644   4530            JMS I    PWLOFF   / THEN
4645   0703            0703
4646   4532            JMS I    PLON     / GREEN
4647   0702            0702
4650   4477            JMS I    PKEYPUL  / ENTER CARD NO.
4651   0001            0001              / 10 DIGITS
4652   7772            -0006             / 6
4653   7771            -0007             / 7
4654   7770            -0010             / 8
4655   7772            -0006             / 6
4656   7776            -0002             / 2
4657   7771            -0007             / 7
4660   7767            -0011             / 9
4661   7777            -0001             / 1
```

```
4662  7770          -0010            /  8
4663  7766          -0012            /  0
4664  4513          JMS I   PWAST    /  END CREDIT AUD
4665  1156          TAD Z   C10
4666  4514          JMS I   PDELAY   /  1 SEC
4667  4457          JMS I   PDOFF    /  DISPLAY OFF
4670  4531          JMS I   PLOFF    /  KP OFF
4671  0702          0702
4672  4531          JMS I   PLOFF    /  KP SPL OFF
4673  0720          0720
4674  4510          JMS I   PUPSTEP  /  LS-9
4675  4526          JMS I   PARKEY   /  AUDIO, VR, AND
4676  7714          -0064            /  PRESS STA SPL CLG
4677  4532          JMS I   PLON     /  IT LIGHTS
4700  0654          0654             /  RED
4701  4530          JMS I   PWLOFF   /  THEN
4702  0654          0654
4703  4532          JMS I   PLON     /  GREEN
4704  0653          0653
4705  4561          JMS I   PWVRSP   /  WAIT FOR VR START
4706  4513          JMS I   PWAST    /  & AUD STOP
4707  1156          TAD Z   C10
4710  4514          JMS I   PDELAY   /  TIME FOR VR STOP
4711  4510          JMS I   PUPSTEP  /  LS12
4712  4525          JMS I   PSAKEY   /  AUD AND
4713  7730          -0050            /  TIME ST KEY
4714  4530          JMS I   PWLOFF   /  & LIGHT
4715  0675          0675
4716  4532          JMS I   PLON     /  GOES GREEN
4717  0674          0674
4720  4513          JMS I   PWAST    /  AUD STOP
4721  4510          JMS I   PUPSTEP  /  LS14
4722  4525          JMS I   PSAKEY   /  AUD AND
4723  7734          -0044            /  DISPLAY SPL NO.
4724  4527          JMS I   PWLON    /  LIGHTS
4725  0712          0712
4726  4476          JMS I   PDISPLY  /  DISPLAYS 678 627 9180
4727  0001          1                /  STARTS IN BIN ONE
4730  0006          6
4731  0007          7
4732  0010          10               /  OCTAL 8
4733  0006          6
4734  0002          2
4735  0007          7
4736  0011          11               /  OCTAL 9
4737  0001          1
4740  0010          10
4741  0000          0
4742  4513          JMS I   PWAST    /  AUD INSTR STOP
4743  4510          JMS I   PUPSTEP  /  LS16
4744  4525          JMS I   PSAKEY   /  INSTR & RING
4745  7726          -0052            /  AND POS RLS KEY
4746  4562          JMS I   PINCOFF  /  LIGHTS OFF
4747  4457          JMS I   PDOFF    /  DISP OFF
4750  4513          JMS I   PWAST    /  END CALL A.
                    PAUSE            /
4751  4507          JMS I   PUPCALL  /  L037, CALL B
4752  4512          JMS I   PMCLRGO  /  CLEAR ALL & GO
4753  4510          JMS I   PUPSTEP  /  UP STEP
4754  4474          JMS I   PSAUDIO  /  PLAY PREAMBLE
4755  4532          JMS I   PLON     /  LIGHTS ON
4756  0600          0600             /  AC 305 CLG
4757  4532          JMS I   PLON
4760  0625          0625             /  HOTEL 0+
4761  4532          JMS I   PLON
4762  0627          0627             /  KP GST
4763  4532          JMS I   PLON
4764  0646          0646             /  RELEASE FWD
4765  4532          JMS I   PLON
4766  0644          0644             /  T&C
4767  4532          JMS I   PLON
4770  0731          0731             /  LOOP 1 : ACS
4771  4532          JMS I   PLON
4772  0713          0713             /         CLD
```

| | | | | |
|---|---|---|---|---|
| 4773 | 4532 | JMS I | PLON | |
| 4774 | 0675 | 0675 | | / TIME ST RED |
| 4775 | 1156 | TAD Z | C10 | |
| 4776 | 4514 | JMS I | PDELAY | / 1 SEC |
| 4777 | 4531 | JMS I | PLOFF | |
| 5000 | 0646 | 0646 | | / RELEASE FWD DARK |
| 5001 | 4510 | JMS I | PUPSTEP | / LS3 |
| 5002 | 4474 | JMS I | PSAUDIO | / MORE PREAMBLE |
| 5003 | 4510 | JMS I | PUPSTEP | / LS3 |
| 5004 | 4474 | JMS I | PSAUDIO | / ZIPTONE |
| 5005 | 4475 | JMS I | PRESP | |
| 5006 | 0036 | 0036 | | / SHORT VR |
| 5007 | 4510 | JMS I | PUPSTEP | / LS4 |
| 5010 | 4526 | JMS I | PARKEY | / VR DURING AUD |
| 5011 | 7762 | -0016 | | / KP SPL KEY |
| 5012 | 4532 | JMS I | PLON | / & LIGHT |
| 5013 | 0720 | 0720 | | |
| 5014 | 4531 | JMS I | PLOFF | / KP GST OFF |
| 5015 | 0627 | 0627 | | |
| 5016 | 4532 | JMS I | PLON | |
| 5017 | 0703 | 0703 | | / KP RED |
| 5020 | 4530 | JMS I | PWLOFF | |
| 5021 | 0703 | 0703 | | / THEN |
| 5022 | 4532 | JMS I | PLON | |
| 5023 | 0702 | 0702 | | / GREEN |
| 5024 | 4561 | JMS I | PWVRSP | / WAIT VR START |
| 5025 | 4513 | JMS I | PWAST | / WAIT AUD STOP |
| 5026 | 1160 | TAD Z | C30 | |
| 5027 | 4514 | JMS I | PDELAY | / FOR VR STOP |
| 5030 | 4510 | JMS I | PUPSTEP | / LS7 |
| 5031 | 4517 | JMS I | PZASTPF | / AUDIO AND |
| 5032 | 1141 | TAD Z | PLAY | |
| 5033 | 4462 | JMS I | POUT | |
| 5034 | 4477 | JMS I | PKEYPUL | / CREDIT CARD |
| 5035 | 0001 | 1 | | |
| 5036 | 7772 | -6 | | |
| 5037 | 7774 | -4 | | |
| 5040 | 7774 | -4 | | |
| 5041 | 7777 | -1 | | |
| 5042 | 7774 | -4 | | |
| 5043 | 7774 | -4 | | |
| 5044 | 7775 | -3 | | |
| 5045 | 7777 | -1 | | |
| 5046 | 7770 | -10 | | / 8 |
| 5047 | 7766 | -12 | | / 0 |
| 5050 | 4513 | JMS I | PWAST | / AUD END |
| 5051 | 1156 | TAD Z | C10 | |
| 5052 | 4514 | JMS I | PDELAY | / 1 SEC |
| 5053 | 4457 | JMS I | PDOFF | / DISPLAY OFF |
| 5054 | 4531 | JMS I | PLOFF | |
| 5055 | 0702 | 0702 | | / KP DARK |
| 5056 | 4531 | JMS I | PLOFF | |
| 5057 | 0720 | 0720 | | / KP SPL DARK |
| 5060 | 4532 | JMS I | PLON | / KP GST LIGHTS |
| 5061 | 0627 | 0627 | | |
| 5062 | 4510 | JMS I | PUPSTEP | / LS10 |
| 5063 | 4526 | JMS I | PARKEY | / VR DURING AUD |
| 5064 | 7714 | -0064 | | / AND STA SPL CLG KEY |
| 5065 | 4532 | JMS I | PLON | |
| 5066 | 0654 | 0654 | | / LIGHTS RED |
| 5067 | 4530 | JMS I | PWLOFF | |
| 5070 | 0654 | 0654 | | / THEN |
| 5071 | 4532 | JMS I | PLON | |
| 5072 | 0653 | 0653 | | / GREEN |
| 5073 | 4561 | JMS I | PWVRSP | / WAIT VR START |
| 5074 | 4513 | JMS I | PWAST | / WAIT AUD STOP |
| 5075 | 1156 | TAD Z | C10 | |
| 5076 | 4514 | JMS I | PDELAY | / FOR VR END |
| 5077 | 4510 | JMS I | PUPSTEP | / LS13 |
| 5100 | 4525 | JMS I | PSAKEY | / AUD AND |
| 5101 | 7676 | -0102 | | / KP GST KEY |
| 5102 | 4532 | JMS I | PLON | |
| 5103 | 0703 | 0703 | | / KP RED |
| 5104 | 4530 | JMS I | PWLOFF | |

| | | | | | |
|---|---|---|---|---|---|
| 5105 | 0703 | 0703 | | / | THEN |
| 5106 | 4532 | JMS I | PLON | | |
| 5107 | 0702 | 0702 | | / | GREEN |
| 5110 | 4477 | JMS I | PKEYPUL | | |
| 5111 | 0007 | 0007 | | / | DUMMY |
| 5112 | 7766 | -0012 | | / | ROOM #0000 |
| 5113 | 7766 | -0012 | | | |
| 5114 | 7766 | -0012 | | | |
| 5115 | 7766 | -0012 | | | |
| 5116 | 4513 | JMS I | PWAST | / | WAIT FOR AUDIO STOP |
| 5117 | 1156 | TAD Z | C10 | | |
| 5120 | 4514 | JMS I | PDELAY | / | 1 SEC |
| 5121 | 4457 | JMS I | PDOFF | / | DISPLAY OFF |
| 5122 | 4531 | JMS I | PLOFF | | |
| 5123 | 0702 | 0702 | | / | KP DARK |
| 5124 | 4531 | JMS I | PLOFF | | |
| 5125 | 0627 | 0627 | | / | KP GST DARK |
| 5126 | 4510 | JMS I | PUPSTEP | / | LS18 |
| 5127 | 4525 | JMS I | PSAKEY | / | AUD AND |
| 5130 | 7730 | -0050 | | / | TIME ST KEY |
| 5131 | 4531 | JMS I | PLOFF | | |
| 5132 | 0675 | 0675 | | / | TIME ST FROM RED |
| 5133 | 4532 | JMS I | PLON | | |
| 5134 | 0674 | 0674 | | / | TO GREEN. |
| 5135 | 4513 | JMS I | PWAST | / | WAIT AUD STOP |
| 5136 | 4510 | JMS I | PUPSTEP | / | LS20 |
| 5137 | 4525 | JMS I | PSAKEY | / | AUD AND |
| 5140 | 7734 | -0044 | | / | DISPLAY SPL NO KEY |
| 5141 | 4527 | JMS I | PWLON | / | IT LIGHTS |
| 5142 | 0712 | 0712 | | | |
| 5143 | 4476 | JMS I | PDISPLY | / | CREDIT NO DISPLAYS |
| 5144 | 0001 | 1 | | / | TEN DIGITS 644 1443 180 |
| 5145 | 0006 | 6 | | | |
| 5146 | 0004 | 4 | | | |
| 5147 | 0004 | 4 | | | |
| 5150 | 0001 | 1 | | | |
| 5151 | 0004 | 4 | | | |
| 5152 | 0004 | 4 | | | |
| 5153 | 0003 | 3 | | | |
| 5154 | 0001 | 1 | | | |
| 5155 | 0010 | 10 | | / | 8 |
| 5156 | 0000 | 0 | | | |
| 5157 | 4513 | JMS I | PWAST | | |
| 5160 | 1157 | TAD Z | C50 | / | 10 SEC BEFORE RING |
| 5161 | 1157 | TAD Z | C50 | | |
| 5162 | 4514 | JMS I | PDELAY | / | CHECK VALIDITY |
| 5163 | 4510 | JMS I | PUPSTEP | / | LS22 |
| 5164 | 4525 | JMS I | PSAKEY | / | RING AND |
| 5165 | 7726 | -0052 | | / | POS RLS KEY |
| 5166 | 4457 | JMS I | PDOFF | / | DISPLAY DARK |
| 5167 | 4562 | JMS I | PINCOFF | / | ALL DARK |
| 5170 | 4513 | JMS I | PWAST | / | AUD DONE |
| | | | | / | END CALL B OF L037 |
| | | P | | | |
| | | A | | | |
| | | USE | | | |
| 5272 | 4510 | JMS I | PUPSTEP | / | LS-10 |
| 5273 | 4526 | JMS I | PARKEY | / | INSTR & VR & |
| 5274 | 7723 | -0055 | | / | PRESS PER SPL CLG |
| 5275 | 4532 | JMS I | PLON | / | IT LIGHTS |
| 5276 | 0666 | 0666 | | / | RED |
| 5277 | 4530 | JMS I | PWLOFF | / | THEN |
| 5300 | 0666 | 0666 | | | |
| 5301 | 4532 | JMS I | PLON | / | GREEN |
| 5302 | 0665 | 0665 | | | |
| 5303 | 4561 | JMS I | PWVRSP | / | WAIT FOR VR START |
| 5304 | 4513 | JMS I | PWAST | / | & AUD STOP |
| 5305 | 1156 | TAD Z | C10 | | |
| 5306 | 4514 | JMS I | PDELAY | / | TIME FOR VR STOP |
| 5307 | 4510 | JMS I | PUPSTEP | / | LS13 |
| 5310 | 4525 | JMS I | PSAKEY | / | AUD AND |
| 5311 | 7734 | -0044 | | / | DISPLAY SPL NO. |
| 5312 | 4527 | JMS I | PWLON | / | LIGHTS |

| | | | | | |
|---|---|---|---|---|---|
| 5313 | 0712 | 0712 | | | |
| 5314 | 4476 | JMS I | PDISPLY | / | DISPLAYS |
| 5315 | 0001 | 1 | | / | STARTS IN BIN ONE |
| 5316 | 0006 | 6 | | | |
| 5317 | 0007 | 7 | | | |
| 5320 | 0010 | 10 | | / | OCTAL 8 |
| 5321 | 0005 | 5 | | | |
| 5322 | 0006 | 6 | | | |
| 5323 | 0007 | 7 | | | |
| 5324 | 0000 | 0 | | | |
| 5325 | 0001 | 1 | | | |
| 5326 | 0010 | 10 | | | |
| 5327 | 0000 | 0 | | | |
| 5330 | 4513 | JMS I | PWAST | / | AUD INSTR STOP |
| 5331 | 1156 | TAD Z | C10 | / | CREDIT CHECK, BEFORE |
| 5332 | 4514 | JMS I | PDELAY | / | RING, IF POSS. |
| 5333 | 4510 | JMS I | PUPSTEP | / | LS15 |
| 5334 | 4474 | JMS I | PSAUDIO | / | 6 RINGS |
| 5335 | 1154 | TAD Z | C20 | | |
| 5336 | 4514 | JMS I | PDELAY | | |
| 5337 | 4531 | JMS I | PLOFF | / | CLD DARK |
| 5340 | 0714 | 0714 | | | |
| 5341 | 4510 | JMS I | PUPSTEP | / | LS17 |
| 5342 | 4474 | JMS I | PSAUDIO | / | ANSWERS |
| 5343 | 4475 | JMS I | PRESP | | |
| 5344 | 0062 | 62 | | / | MED LENGTH VR |
| 5345 | 4510 | JMS I | PUPSTEP | / | LS18 |
| 5346 | 4474 | JMS I | PSAUDIO | | |
| 5347 | 4475 | JMS I | PRESP | | |
| 5350 | 0036 | 36 | | | |
| 5351 | 4510 | JMS I | PUPSTEP | / | LS19 |
| 5352 | 4517 | JMS I | PZASTPF | / | AUDIO AND |
| 5353 | 1141 | TAD Z | PLAY | | |
| 5354 | 4462 | JMS I | POUT | | |
| 5355 | 4563 | JMS I | PKEYRNT | | |
| 5356 | 7730 | -0050 | | / | TIME ST KEY |
| 5357 | 4530 | JMS I | PWLOFF | / | & LIGHT |
| 5360 | 0675 | 0675 | | | |
| 5361 | 4532 | JMS I | PLON | / | GOES GREEN |
| 5362 | 0674 | 0674 | | | |
| 5363 | 4563 | JMS I | PKEYRNT | | |
| 5364 | 7726 | -0052 | | / | AND POS RLS KEY |
| 5365 | 4565 | JMS I | PMUTON | / | MUTE REST OF AUD |
| 5366 | 4457 | JMS I | PDOFF | / | DISPLAY OFF |
| 5367 | 4562 | JMS I | PINCOFF | / | LIGHTS OFF |
| 5370 | 4513 | JMS I | PWAST | / | END TAPE BEFORE UNMUTING |
| 5371 | 4566 | JMS I | PMUTOFF | | |
| 5372 | 4510 | JMS I | PUPSTEP | | |
| 5373 | 4474 | JMS I | PSAUDIO | / | END OF L037, CALL C. |
| 5374 | 4453 | JMS I | PDISPAT | / | END OF LESSON 037 |
| | | PAUSE | | | |
| | | | | / | |
| 5171 | 4507 | JMS I | PUPCALL | / | L037, CALL C |
| 5172 | 4512 | JMS I | PMCLRGO | | |
| 5173 | 4510 | JMS I | PUPSTEP | / | PREAMBLE |
| 5174 | 4474 | JMS I | PSAUDIO | | |
| 5175 | 4532 | JMS I | PLON | / | LIGHTS ON |
| 5176 | 0600 | 0600 | | / | AC 305 |
| 5177 | 4532 | JMS I | PLON | | |
| 5200 | 0604 | 0604 | | / | NON COIN 0+ |
| 5201 | 4532 | JMS I | PLON | | |
| 5202 | 0646 | 0646 | | / | RELEASE FWD |
| 5203 | 4532 | JMS I | PLON | | |
| 5204 | 0732 | 0732 | | / | LOOP 2 ACS |
| 5205 | 4532 | JMS I | PLON | | |
| 5206 | 0714 | 0714 | | / | CLD |
| 5207 | 4532 | JMS I | PLON | | |
| 5210 | 0675 | 0675 | | / | TIME ST RED |
| 5211 | 1156 | TAD Z | C10 | | |
| 5212 | 4514 | JMS I | PDELAY | / | 1 SEC |
| 5213 | 4531 | JMS I | PLOFF | | |
| 5214 | 0646 | 0646 | | / | RELEASE FWD DARK |
| 5215 | 4510 | JMS I | PUPSTEP | / | LS 3 |

```
5216  4474       JMS I  PSAUDIO  / MORE PREAMBLE
5217  4510       JMS I  PUPSTEP
5220  4474       JMS I  PSAUDIO  / ZIPTONE
5221  4475       JMS I  PRESP
5222  0036       0036            / SHORT VR
5223  4510       JMS I  PUPSTEP  / LS 4
5224  4526       JMS I  PARKEY   / AUD, VR AND
5225  7762       -16             / FIRST PRESS KP SPL
5226  4532       JMS I  PLON
5227  0720       0720            / KP SPL LIGHTS
5230  4532       JMS I  PLON     / KP RED
5231  0703       0703
5232  4530       JMS I  PWLOFF   / THEN
5233  0703       0703
5234  4532       JMS I  PLON     / GREEN
5235  0702       0702
5236  4561       JMS I  PWVRSP   / WAIT VR START
5237  4513       JMS I  PWAST    / WAIT AUD STOP
5240  1160       TAD Z  C30
5241  4514       JMS I  PDELAY   / FOR VR STOP
5242  4510       JMS I  PUPSTEP  / LS 7
5243  4517       JMS I  PZASTPF  / GET CREDIT NO.
5244  1141       TAD Z  PLAY
5245  4462       JMS I  POUT
5246  4477       JMS I  PKEYPUL  / ENTER CARD NO.
5247  0001       0001            / 10 DIGITS
5250  7772       -0006           / 6
5251  7771       -0007           / 7
5252  7770       -0010           / 8
5253  7773       -0005           / 5
5254  7772       -0006           / 6
5255  7771       -0007           / 7
5256  7766       -0012           / 0
5257  7777       -0001           / 1
5260  7770       -0010           / 8
5261  7766       -0012           / 0
5262  4513       JMS I  PWAST    / END CREDIT AUD
5263  1156       TAD Z  C10
5264  4514       JMS I  PDELAY   / 1 SEC
5265  4457       JMS I  PDOFF    / DISPLAY OFF
5266  4531       JMS I  PLOFF    / KP OFF
5267  0702       0702
5270  4531       JMS I  PLOFF    / KP SPL OFF
5271  0720       0720
```

We claim:

1. In a training device for a telephone system, a training position for a trainee comprising visual display means and a set of key means, input means over which coded digital words which simulate a given telephone call condition are received, decoder means for decoding at least certain of the coded digital words received over said input means, control means for controlling said display means to present the information which is identified by a decoded word, word format means enabled in response to operation of one of said key means by the trainee to generate an output word which identifies the operated one of said key means, audio tape means for providing a prerecorded audio cue to the trainee, an audio tape control circuit including first means for controlling operation of said audio means to output said predetermined audio cue for certain of said call conditions, signal means for enabling said audio control circuit in response to input of a predetermined code word to said decoder means over said input means, voice detection means for providing a signal to said word format means to effect generation of an output word with detection of a voice response by the trainee, and decision means connected to the output of said word format means operative in said certain call conditions to receive an output word which represents a voice response and a work which identifies the operation of a predetermined one of said keys in overlapping time periods and in random sequences, such decision means being operative in the absence of receipt of a voice response output word in said certain call conditions to indicate an error by the trainee.

2. A training device for a telephome system as set forth in claim 1 in which said audio control means includes reverse means for reversing said audio tape means to repeat said audio cue, and signal responsive means for enabling said reverse means in response to the input of a different predetermined code word to said decoder means over said input means by said decision means.

3. A training device as set forth in claim 2 in which said audio tape means includes tone signals recorded thereon, and in which said audio tape control circuit includes further word generator means, and means responsive to said tone signals to enable said word generating means to generate a word which indicates the relative position of the tape to said decision means.

4. A training device as set forth in claim 3 in which said word format generating means are connected to said decision means. over a first output circuit for providing the output word to said decision means which represents the operated key for error checking purposes, and said audio tape control circuit includes a different output circuit for transmitting said word which identifies the tape position to said decision means, whereby words for identifying the tape position and the key response may be forwarded to said decision means in a random time sequence.

5. A training device as set forth in claim 2 in which said audio tape means includes a tape having a first tone set which indicates the start of a lesson, a second tone set which indicates the start of a call in the lesson, and a third tone set which indicates the start of a step in the call, and in which said audio tape control includes means responsive to said tones to generate words which represent the position of the tape indicated by said tones.

6. A training device as set forth in claim 1 in which said word format means includes gate means for generating a plurality of bits, each of which is operative to provide logic 1 and logic 0 bits, and in which each of the keys in said key means includes a marking circuit connected to mark correspondingly different ones of said bit gates to thereby provide a discrete code word output for each key which is operated by the trainee.

7. A training device as set forth in claim 6 which includes a key channel circuit connected to the output of said bit gates, and means in said key channel circuit operative to provide a clock pulse to gate the bit outputs of said gate means over an output circuit in response to said marking of an input of any one of said bit gates.

8. A training device as set forth in claim 7 in which said output circuit for said generated word includes further gating means, and means for limiting the time of gating of said bits from said output circuit by said further gating means.

9. A training device as set forth in claim 1 in which said further coded digital word provided over said input means by said decision means comprises a stop audio code word for said audio tape control circuit.

10. In a training device for a telephone system, a training position for a trainee comprising a lamp display board and a set of key means which simulate the lamp display and key means of a telephone board, input means over which coded digital words are provided to indicate different steps in a call, decoder means for decoding at least certain of the coded digital words received over said input means, lamp control means for illuminating the ones of the lamps on said telephone board which are identified by the coded words, word format means enabled in response to the operation of said key means by the trainee in the performance of the required step to generate output words which identify the ones of said key means which are operated by said trainee, audio tape control means including voice detection means for detecting audio responses of the trainee and for providing a signal to said word format means to effect generation of an output word with detection of a voice response by the trainee, control means for comparing the key identified by the digital words output from said word format means with the keys required to be operated in response to the condition represented by the digital word input over said input means and for verifying the receipt of a voice response by the trainee, said control means being operative to receive the digital words which represent the key and audio responses in a time overlapping manner, and being operative in response to detection of a trainee in the operation of one of said keys to output a set of coded words over said input means to provide a lamp display of a predetermined earlier condition in the call, and thereby erase the diaplay presented at the time of the error.

11. A training device as set forth in claim 10 in which said lamp display board includes a group of incandescent lamps and a group of Nixie lamps, and in which said decoder means includes a first decoder circuit operative in response to one group of words to enable the one of the incandescent lamps which was identified by the code word decoded by said decoder means, and a second decoder circuit responsive to the receipt of a word in said second group to enable the one of the Nixie lamps which is represented by such word.

12. A training device as set forth in claim 11 in which said key means includes selection means operable by the trainee to indicate the value of a least one digit, and means for connecting said selection means to said word format means to effect generation of a word for said control means which identifies the value of said digit, and in which said control means is operative to compare the value of the keyed digit with the value of the digit required to be keyed by the trainee.

13. A training system as set forth in claim 10 in which said audio tape control means is controlled by predetermined ones of said coded digital words to adjust a tape to provide an audio cue, and which includes word generating means for providing a signal which indicates the position of said tape, and in which said control means is responsive to detection of an error to provide a digital word to said audio tape control means to reposition said tape to the position required for said previous step.

14. In a training device for use in the training of personnel in the operation of a telephone switchboard, a plurality of individual training positions, each of which positions includes visual display means and a set of keys, source means including means for providing coded words for one of said positons to simulate the conditions for successive steps of a telephone call, data means for transmitting said coded words to one of said positions, decoder means in said one position for detecting and decoding the words input thereto from said data means, means at each position for controlling the presentation of the display which is identified by the words which are decoded by its decoding means, word format means response to the operation of one of said key means to generate an output word which identifies the operated one of said keys, means for effecting generation of an output word with detection of a voice response by the trainee, and program means in said source means for comparing the words which identify the operated key and the audio response with the key and audio response required by the program said program means being operative in response to a miscompare to output the coded words for a predetermined earlier display condition for said call to thereby reset the visudal display means for use by the trainee in a further attempt to process the simulated call from such earlier call condition.

15. A training device as set forth in claim 14 which includes key means operable by the trainee to enable said word format means to generate a word request to said source means to effect retransmission of the coded words for a predetermined earlier step in the call to thereby reset the display on the board for such step.

16. A training device as set forth in claim 14 which includes data bus means connecting said source means to said positions and in which said source means includes means for clocking the time of transmitting certain words over said data bus means, means for measuring a predetermined period of time following transmission of said certain words, and means for transmitting a word over said data bins which indicates an incorrect operation with failure of the receipt of the required word from the position addressed by the certain word within said predetermined period of time.

17. A method of training a telephone switchboard trainee with a training board having a visual display means and keys arranged in a pattern similar to the telephone switchboard for which training is required comprising the steps of providing a stored program in a computer which indicate the different switchboard conditions to be displayed for successive steps of a plurality of simulated telephone calls and the steps to be performed in response to the display of the different conditions, generating and transmitting a digital word requesting service from the computer, transmitting a word from the computer to the board requesting identity of the telephone call desired, generating and transmitting a further digital word from the board to identify the one of the telephone calls desired, transmitting digital words to the training board from the computer indicating the condition to be displayed for one of the steps in such telephone call, decoding the received digital word at the training board, enabling the visual display means at the training board to present the visual display identified by the digital words, providing a digital words which identifies the keyed and audio responses performed by the trainee for such display and comparing said digital word with the digital word identified in program as the word to be provided by the trainee, changing the visual display on said board in accordance with the key response by the trainee whenever the proper key and audio response are performed, and resetting the visual display on the board to a predetermined earlier display condition whenever the comparison indicates an error in a required key or audio response by the trainee.

18. A method as set forth in claim 17 which includes the further step of transmitting a word to the board to indicate occurrence of a miscompare, and sending a further word to effect repeat of said step in the event of a miscompare.

19. A method as set forth in claim 18 which includes the step of noting the time of transmission of the word for a step to the board, and providing an incorrect step operation in the event of proper response is not received at the computer within a predetermined period of time.

20. The method if claim 18 which includes the further step of operating audio tape means to provide voice cues to simulate the voice of a calling subscriber at predetermined steps in the call, and for resetting the audio tape means and the visual display on the board to a predetermined earlier condition whenever an erroneous trainee response is detected.

21. In a training device for use in the training of a trainee in the operation of a telephone switchboard, at least one training position including visual display means and a set of keys, source means including means for providing coded words for said position to simulate the conditions for successive steps of a call, data means for transmitting said coded words to said one position, decoder means in said one position for detecting and decoding the words input thereto from said data means, means at said one position for controlling the presentation of the visual display which is identified by the words which are decoded by its decoding means, words format means responsive to the operation of one of said key means by a trainee to generate an output word which identifies the operated one of said keys, voice detection means for detecting audio responses of the trainee and for providing a signal to said word format means to effect generation of an output word with detection of a voice reponse by the trainee, decision means in said source means for comparing each word which identifies the operated key with the key response required by a preselected program and for verifying the receipt of the voice response, and input means for inputting said words which identify the operated one of the keys and the voice response to said decision means in overlapping time periods and sequences.

22. A training device as set forth in claim 21 which includes a tape having a plurality of lessons recorded threon, each lesson having a discrete decimal number, and which includes a control panel having selection keys operable by the trainee to provide a signal output which identifies the decimal number of a desired training lesson, and means connecting said signal output of said word format means.

23. A training device as set forth in claim 22 in which said control panel includes a lesson key for selectively enabling said word format means to generate a word for transmission to the control means which requests the repeat of a lesson.

24. A training device as set forth in claim 22 which includes means connected to said control means for storing a purality of different lessons, each of which comprises recorded signals for simulating a plurality of different telephone calls, and in which said contol panel includes a call key for selectively enabling said word format means to generate a word to the control means which requests repeat of a telephone call in the selected lesson, and in which said source means outputs digit words to change the display on the board to the presentation required at the start of said call.

25. A training device as set forth in claim 22 in which each telephone call includes a plurality of steps, and in which said control panel includes a further call key for selectively enabling said word format means to generate a word to the control means which requests repeat of a step in a telephone call of the selected lesson, and in which said source means responsively provides digital words to change the display on said board to the display for such step.

26. A training device as set forth in claim 21 which said source means includes storage means for storing a plurality of lessons, digital computer having access to said storage means and lesson selection means operable by the trainee to enable said word format means to generate a word which identifies to the computer the one of the stored lessons to be accessed by said digital computer.

27. A training device as set forth in claim 21 in which each training position further includes audio tape means, and audio control means connected to said decoder means for controlling said audio control means to provide audio cues for said trainee with the visual cues provided by the display means.

28. A training device as set forth in claim 21 in which said audio control means includes means responsive to decoding of a repeat word by said decoder means to back up the audio tape in said audio tape means to a previous step in the call for repeat purposes, and in which said program means is also operative to provide the code words which effect the proper display for said previous step.

29. A training device as set forth in claim 21 in which said source means includes a digital computer having a core memory, a storage tape having a plurality of lessons stored thereon, and control means for said storage tape, and in which said digital computer is operative in response to receipt of a word request for a lesson which is not in said core memory to signal said control means to transmit the requested lesson from said storage tape to said computer for transfer to said core memory.

30. A training device as set forth in claim 21 in which each position includes a tape having audio cues therein, and an audio control circuit for controlling movement of the tape to output said audio cues in response to decoding for a predetermined word by its associated decoded means, means for detecting a voice response by the trainee, means for enabling said word format means to output a word to said source means which identifies the detection of said voice response, and word generating means for providing a further signal over a separate path to said source means to indicate the position of the tape, whereby audio and key responses may be effected simultaneously by the trainee.

31. A training device as set forth in claim 21 which includes a tape having a plurality of discrete lesson segments of recorded material thereon, each of which segments has a preassigned designator, and which includes selection means operable by the trainee to the designator for the discrete lesson segment desired including means for providing a signal output which represents said designator, and means connecting said designator representing signal output to said word format means to effect generation of a word representing the segment desired to said source means.

32. A training device as set forth in claim 21 which includes memory means for said source means, and tape means having digital information which identifies a training segment recorded on said tape means for temporary storage in said memory means at least during the period the training segment represented by the digital information is selected for use by the trainee, said tape means further including recorded audio signals for use with the training segment identified by said digital information, and control tones for controlling tape movement in the training operation respresented by said digital information which is stored in said memory means.

33. In a training device for use in the training of a trainee in the operation of a telephone switchboard, at least one training position including visual display means and a set of keys, source means including means for providing coded words for said position to simulate the conditions for successive steps of a call, data means for transmitting said coded words to said one position, decoder means in said one position for detecting and decoding the words input thereto from said data means, means at said position for controlling the presentation of the visual display which is identified by the words which are decoded by its decoding means, word format means responsive to the operation of one of said key means by a trainee to generate an output word which identifies the operated one of said keys, voice detection means for detecting audio responses of the trainee and for providing a signal to said word format means to effect generation of an output word with detection of a voice response by the trainee, decision means in said source means for comparing each word which identifies the operated key with the key response required by a preselected program and for verifying the receipt of the voice response, memory means for said source means, and tape means having recorded digital information for storage in said memory means in response to selection of a training segment by the trainee for use in a training operation, said tape means further including audio signals, certain of which require a voice response by the trainee, and control signals for use in control of the movement of the tape means during the training operation identified by the digital information stored in the memory.

* * * * *

UNITED STATES PATENT OFFICE
CERTIFICATE OF CORRECTION

Patent No. 4,048,728    Dated September 20, 1977

Inventor(s) George F. Nason, III and Walter W. Winter

It is certified that error appears in the above-identified patent and that said Letters Patent are hereby corrected as shown below:

Column 183, last line, "work" should be -- word --;

Column 184, line 47, "telephome" should be -- telephone --;

Column 184, line 65, delete the period after "means";

Column 185, last line, "diaplay" should be -- display --;

Column 186, line 10, after "represented" insert -- by the word and the display of the digit value in the selected Nixie lamp represented --;

Column 186, line 13, "a" should be -- at --;

Column 186, line 34, "positons" should be -- positions --;

Column 186, line 52, "visudal" should be -- visual --;

Column 186, last line, "bins" should be -- bus means --;

Column 187, line 24, cancel "a";

Column 187, line 64, "words" should be -- word --;

Column 188, line 3, "reponse" should be -- response --;

Column 188, line 13, "threon" should be -- thereon --;

UNITED STATES PATENT OFFICE
CERTIFICATE OF CORRECTION

Patent No. 4,048,728    Dated September 20, 1977

Inventor(s) George F. Nason, III and Walter W. Winter

It is certified that error appears in the above-identified patent and that said Letters Patent are hereby corrected as shown below:

Column 188, line 26, "purality" should be -- plurality --;

Column 188, line 28, "contol" should be -- control --;

Column 188, line 33, "digit" should be -- digital --;

Column 188, line 45, before "which" insert -- in --;

Column 188, line 48, insert a comma before "and";

Column 189, line 12, "for" should be -- "of".

Signed and Sealed this

Twenty-first Day of March 1978

[SEAL]

Attest:

RUTH C. MASON
Attesting Officer

LUTRELLE F. PARKER
Acting Commissioner of Patents and Trademarks